United States Patent
Okuda et al.

(10) Patent No.: US 6,493,467 B1
(45) Date of Patent: Dec. 10, 2002

(54) IMAGE PROCESSOR, DATA PROCESSOR, AND THEIR METHODS

(75) Inventors: Hiroshi Okuda, Kanagawa (JP);
Masuyoshi Kurokawa, Kanagawa (JP);
Seiichiro Iwase, Kanagawa (JP);
Yoshihito Kondo, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/125,636

(22) PCT Filed: Dec. 25, 1997

(86) PCT No.: PCT/JP97/04841

§ 371 (c)(1),
(2), (4) Date: Jan. 8, 1999

(87) PCT Pub. No.: WO98/29832

PCT Pub. Date: Jul. 9, 1998

(30) Foreign Application Priority Data

| Dec. 12, 1959 | (JP) | 8-345359 |
| Mar. 31, 1997 | (JP) | 9-081293 |
| Mar. 31, 1997 | (JP) | 9-081294 |
| Mar. 31, 1997 | (JP) | 9-081295 |

(51) Int. Cl.[7] .............. G06T 5/00; G06T 1/20; H04N 1/409
(52) U.S. Cl. .............. 382/260; 382/266; 382/304
(58) Field of Search ............. 382/260, 261, 382/263, 264, 266, 254, 274, 275, 304, 302

(56) References Cited

U.S. PATENT DOCUMENTS 5,311,428 A * 5/1994 Hayes et al. ............. 382/260

FOREIGN PATENT DOCUMENTS

| JP | 4-330858 | 11/1992 |
| JP | 5-22629 | 1/1993 |
| JP | 07-160874 | 6/1995 |
| JP | 08-294047 | 11/1996 |

OTHER PUBLICATIONS

"Scalable architectures for image processing", Diamantaras et al, Proceedings of the SPIE, vol. 2064 (1993) pp. 2–13.*

Etsuro Endo, "Advi Photoshop A to Z in Japanese" (Tokyo), K.K. BNN (1993) pp. 192–2002.

* cited by examiner

Primary Examiner—Scott Rogers
(74) Attorney, Agent, or Firm—Frommer Lawrence & Haug LLP; William S. Frommer

(57) ABSTRACT

The characteristic of nonlinear processing with respect to image data is designated by a GUI and the result of the processing quickly displayed. A personal computer 72 displays a GUI image for input on a monitor. When a user designates a nonlinear characteristic on the GUI image by an input device 70, the personal computer 72 extracts a break point approximation function indicating the nonlinear characteristic and displays the same in the GUI image. Further, the personal computer 72 generates a program for executing nonlinear processing indicated by the extracted break point approximation function by a linear array type multiple parallel processor (DSP 80) and downloads the generated program to the DSP 80.

11 Claims, 90 Drawing Sheets

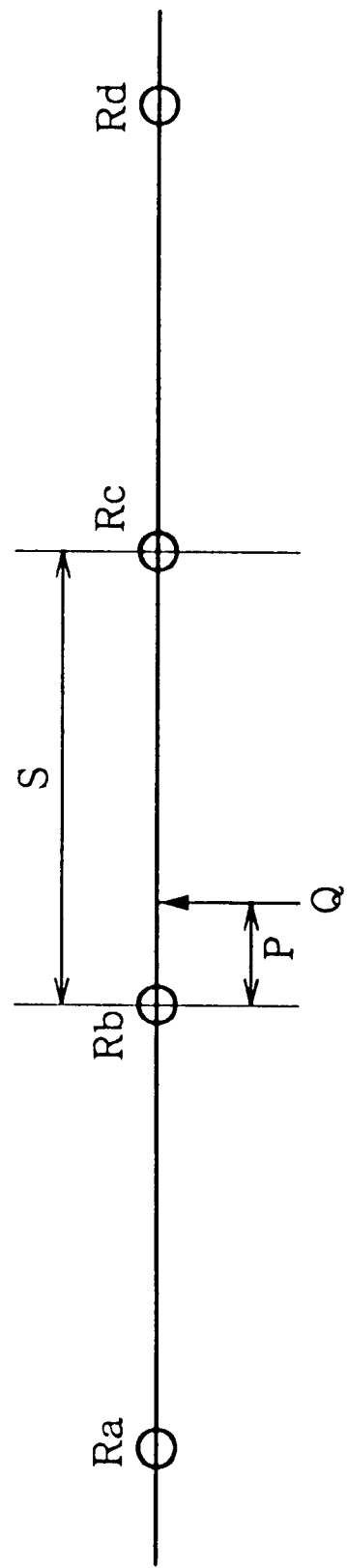

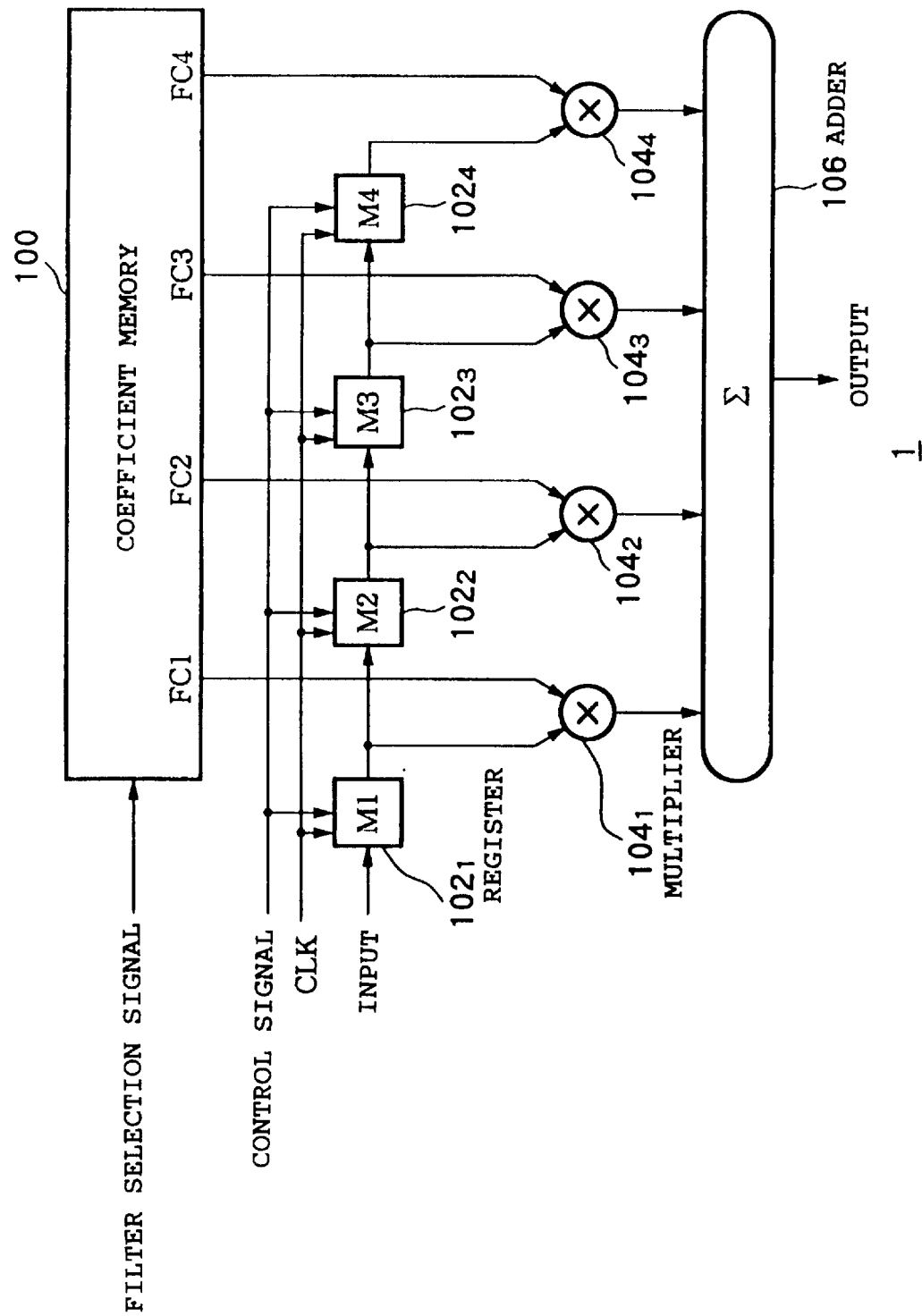

FIG. 11

| CYCLE | INPUT DATA | FILTER SELECTION SIGNAL | CONTROL SIGNAL | REGISTERS 1021~1024 | | | | OUTPUT DATA |
|---|---|---|---|---|---|---|---|---|
| 1 | R1 | | H | Rm0 | Rm1 | Rm2 | Rm3 | |
| 2 | R2 | | H | R1 | Rm0 | Rm1 | Rm2 | |
| 3 | R3 | | H | R2 | R1 | Rm0 | Rm1 | |
| 4 | R4 | P0 | L | R3 | R2 | R1 | Rm0 | |
| 5 | R4 | P7 | H | R3 | R2 | R1 | Rm0 | Q1 |
| 6 | R5 | P4 | H | R4 | R3 | R2 | R1 | Q2 |
| 7 | R6 | P1 | L | R5 | R4 | R3 | R2 | Q3 |
| 8 | R6 | P8 | H | R5 | R4 | R3 | R2 | Q4 |
| 9 | R7 | P5 | H | R6 | R5 | R4 | R3 | Q5 |
| 10 | R8 | P2 | L | R7 | R6 | R5 | R4 | Q6 |
| 11 | R8 | P9 | H | R7 | R6 | R5 | R4 | Q7 |
| 12 | R9 | P6 | H | R8 | R7 | R6 | R5 | Q8 |
| 13 | R10 | P3 | L | R9 | R8 | R7 | R6 | Q9 |
| 14 | R10 | P0 | H | R9 | R8 | R7 | R6 | Q10 |
| | | | | | | | | Q11 |

FIG. 12

| FILTER SELECTION SIGNAL Pi | NORMALIZATION POSITION AMOUNT x | DECIMAL POINT NOTATION COEFFICIENT | | | | 8-BIT NOTATION COEFFICIENT | | | | SUM OF COEFFI-CIENTS |
|---|---|---|---|---|---|---|---|---|---|---|
| | | FC1 | FC2 | FC3 | FC4 | FC1 | FC2 | FC3 | FC4 | |
| P0 | $\frac{0}{10}=0.0$ | 0.0 | 1.0 | 0.0 | 0.0 | 0 | 128 | 0 | 0 | 128 |
| P1 | $\frac{1}{10}=0.1$ | -0.009 | 0.981 | 0.109 | -0.081 | -1 | 126 | 14 | -10 | 129 |
| P2 | $\frac{2}{10}=0.2$ | -0.032 | 0.928 | 0.232 | -0.128 | -4 | 119 | 30 | -16 | 129 |
| P3 | $\frac{3}{10}=0.3$ | -0.063 | 0.847 | 0.363 | -0.147 | -8 | 108 | 46 | -19 | 127 |
| P4 | $\frac{4}{10}=0.4$ | -0.096 | 0.744 | 0.496 | -0.144 | -12 | 95 | 63 | -18 | 128 |
| P5 | $\frac{5}{10}=0.5$ | -0.125 | 0.625 | 0.625 | -0.125 | -16 | 80 | 80 | -16 | 128 |
| P6 | $\frac{6}{10}=0.6$ | -0.144 | 0.496 | 0.744 | -0.096 | -18 | 63 | 95 | -12 | 128 |
| P7 | $\frac{7}{10}=0.7$ | -0.147 | 0.363 | 0.847 | -0.063 | -19 | 46 | 108 | -8 | 127 |
| P8 | $\frac{8}{10}=0.8$ | -0.128 | 0.232 | 0.928 | -0.032 | -16 | 30 | 119 | -4 | 129 |
| P9 | $\frac{9}{10}=0.9$ | -0.081 | 0.109 | 0.981 | -0.009 | -10 | 14 | 126 | -1 | 129 |

FIG.15

| TYPE | LEFT 2ND ADJOINING | LEFT 1ST ADJOINING | DIRECTLY ABOVE | RIGHT 1ST ADJOINING | RIGHT 2ND ADJOINING | RIGHT 3RD ADJOINING | EXAMPLE |
|---|---|---|---|---|---|---|---|
| 1 | ○ |  | ○ | ○ |  | ○ | $Q_3, Q_6, Q_{13}, \cdots$ |
| 2 |  | ○ | ○ |  | ○ | ○ | $Q_4, Q_7, Q_{11}, \cdots$ |
| 3 | ○ | ○ |  | ○ | ○ |  | $Q_5, Q_8, Q_{12}, \cdots$ |
| 4 |  |  | ○ | ○ |  |  | $Q_9, \cdots$ |
| 5 |  | ○ | ○ | ○ |  | ○ | $Q_{10} \cdots$ |

FIG.22

| TYPE | LEFT 2ND ADJOINING | LEFT 1ST ADJOINING | SELF | RIGHT 1ST ADJOINING | RIGHT 2ND ADJOINING | RIGHT 3RD ADJOINING |
|---|---|---|---|---|---|---|
| 2 |  | ◯ | ◯ |  | ◯ | ◯ |
| 4 | ◯ |  | ◯ | ◯ | ◯ |  |

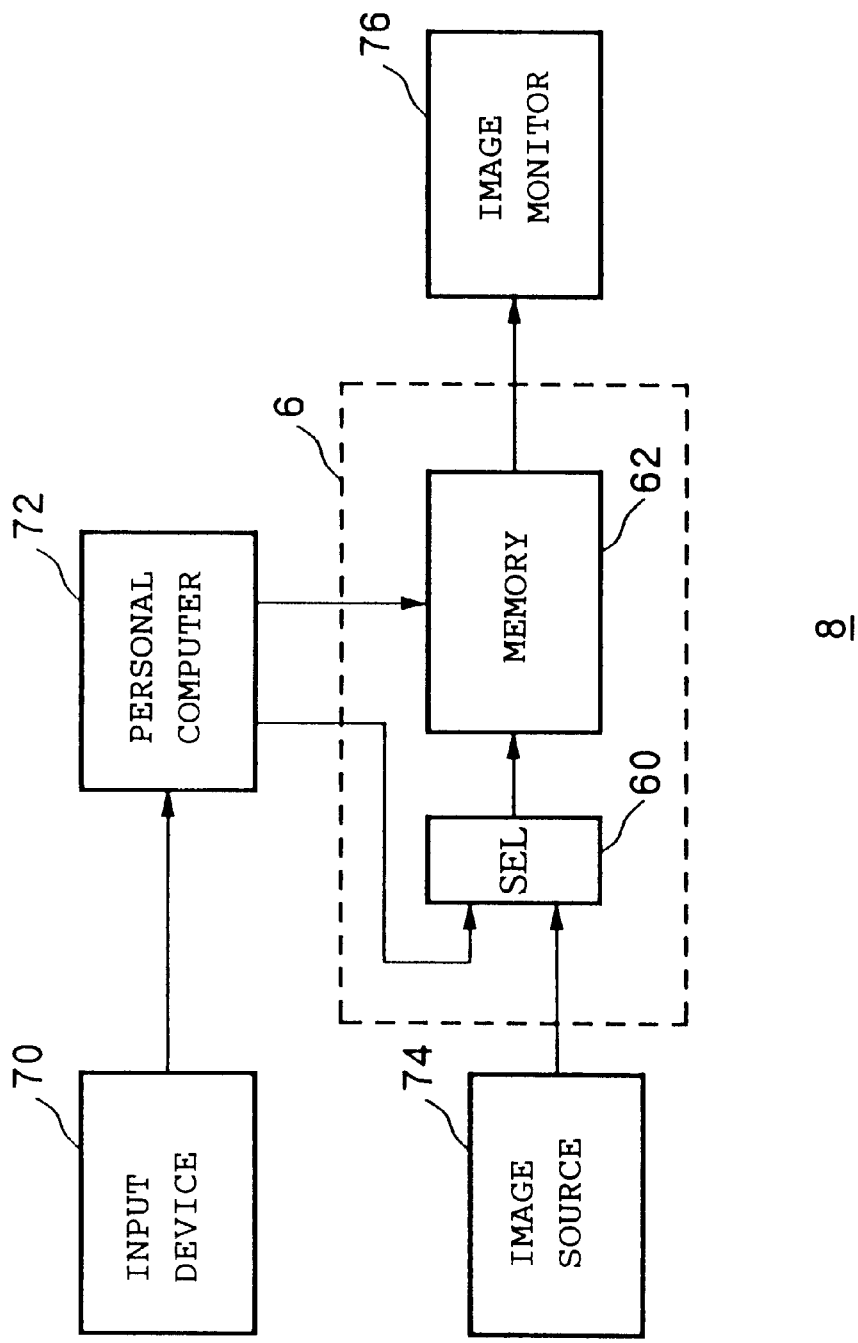

$S = aY + bCb + cCr$

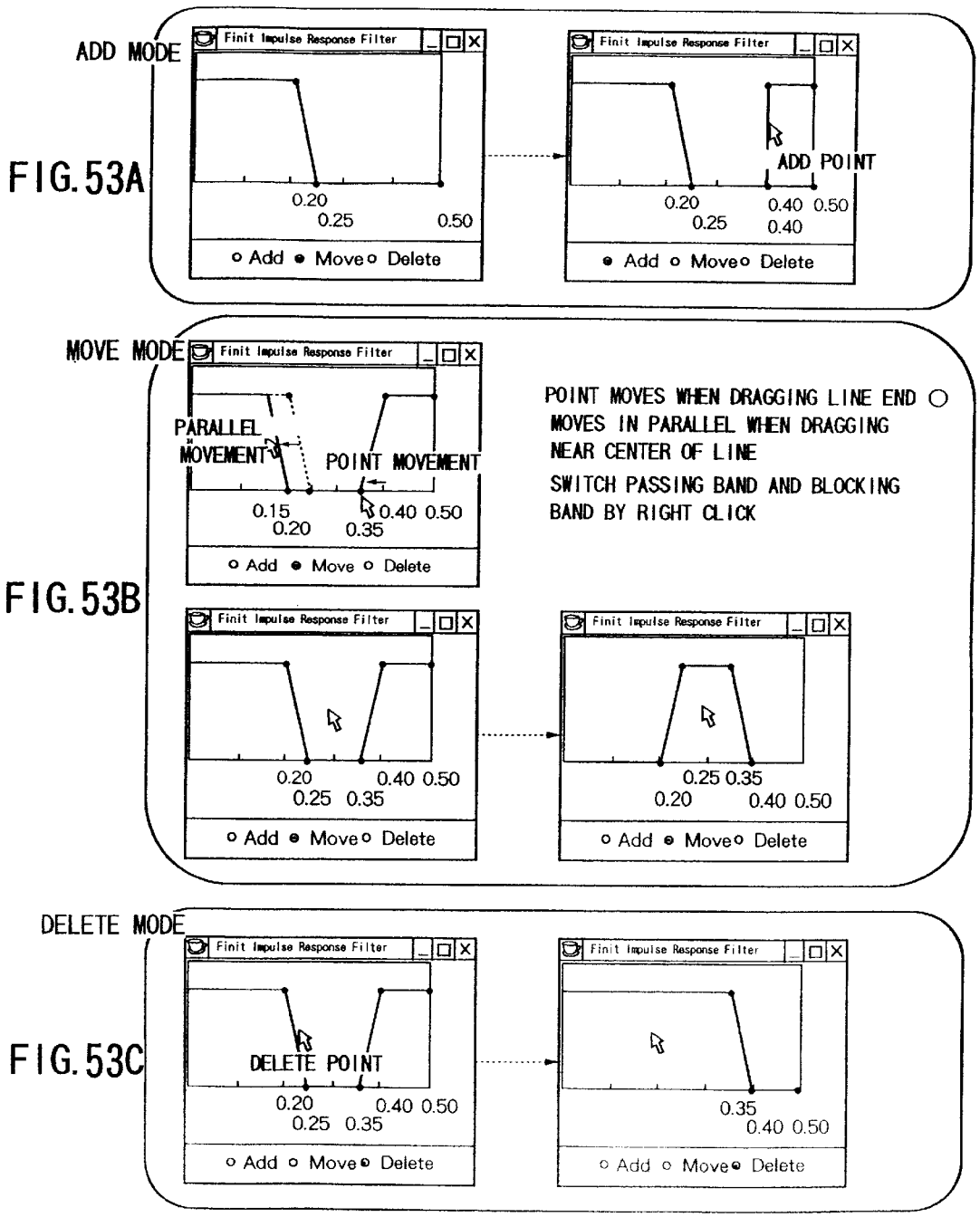

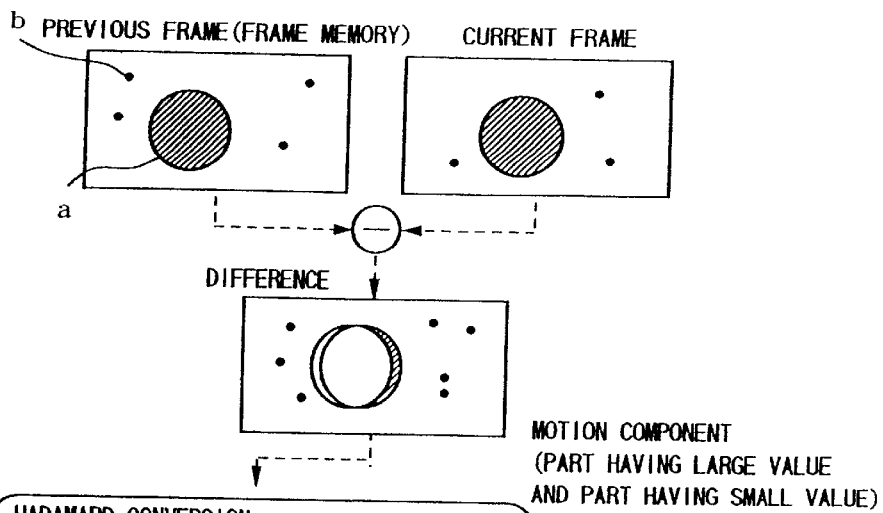
FIG. 63A
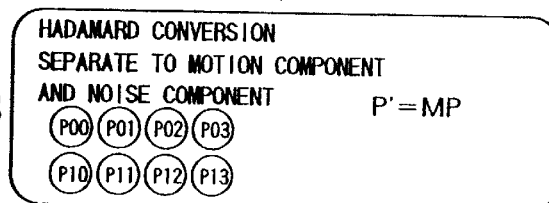
FIG. 63B
FIG. 63C
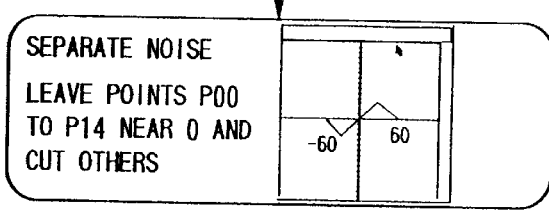
FIG. 63D
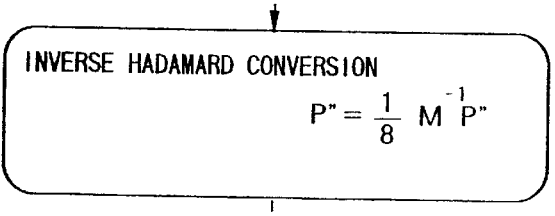
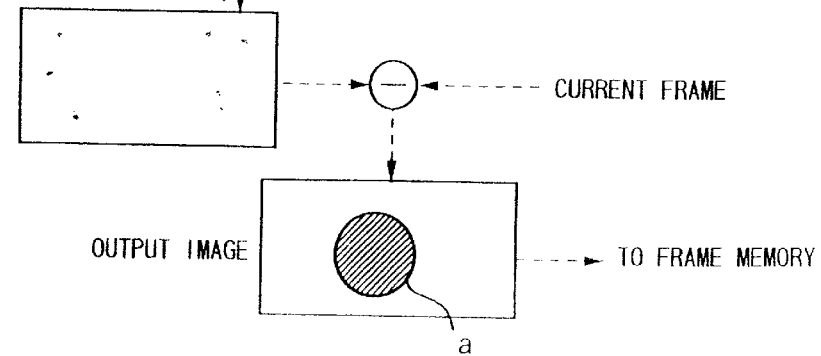
FIG. 63E FIG. 84A
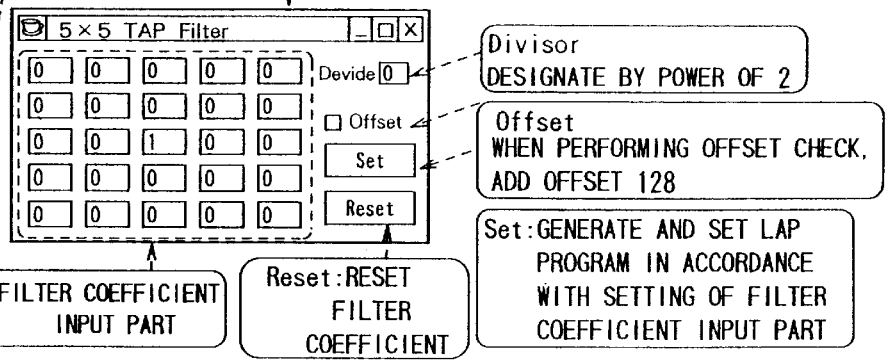
FIG. 84B
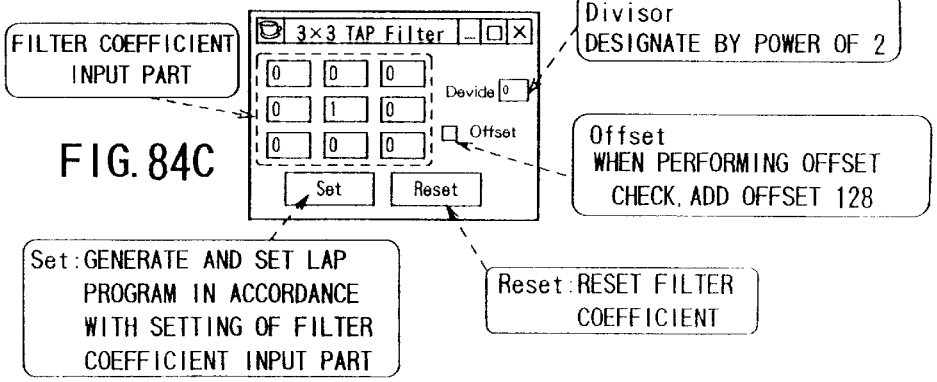
FIG. 84C

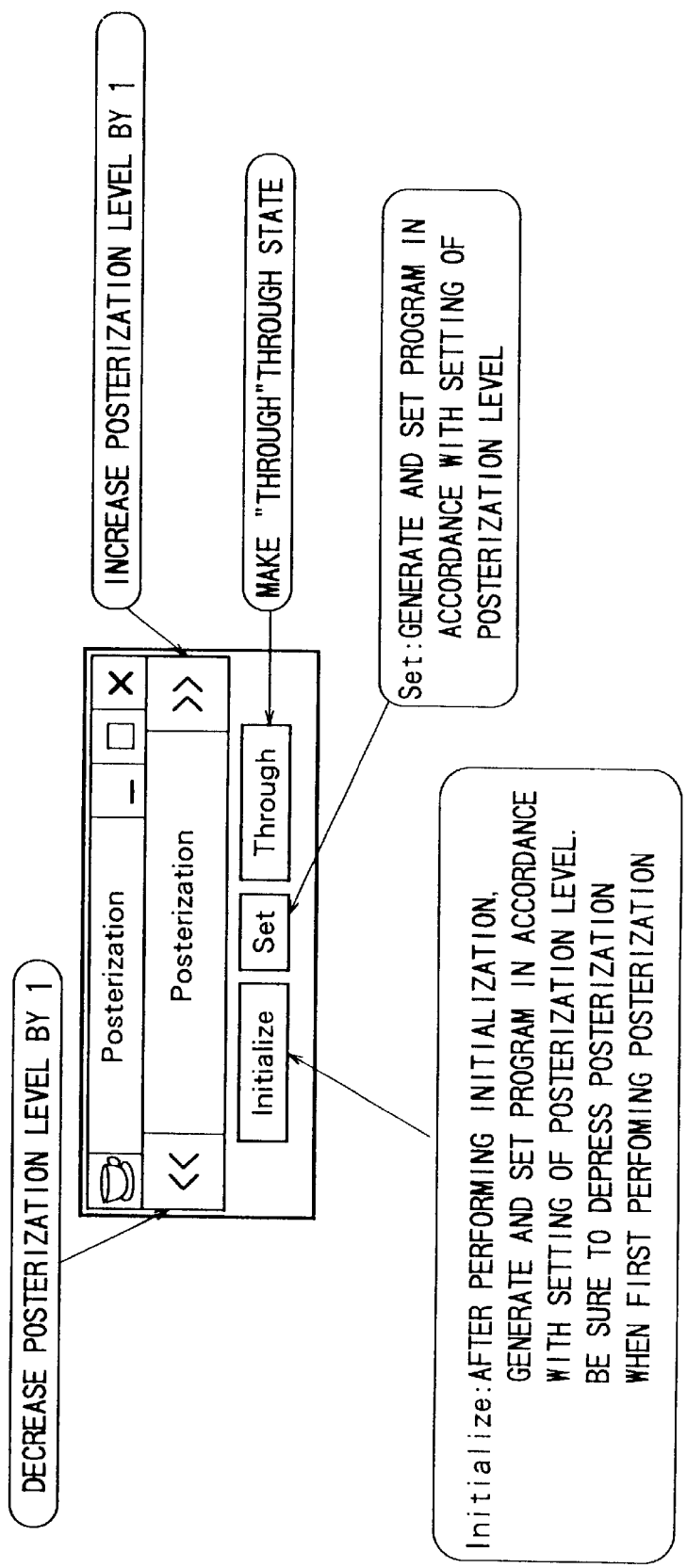

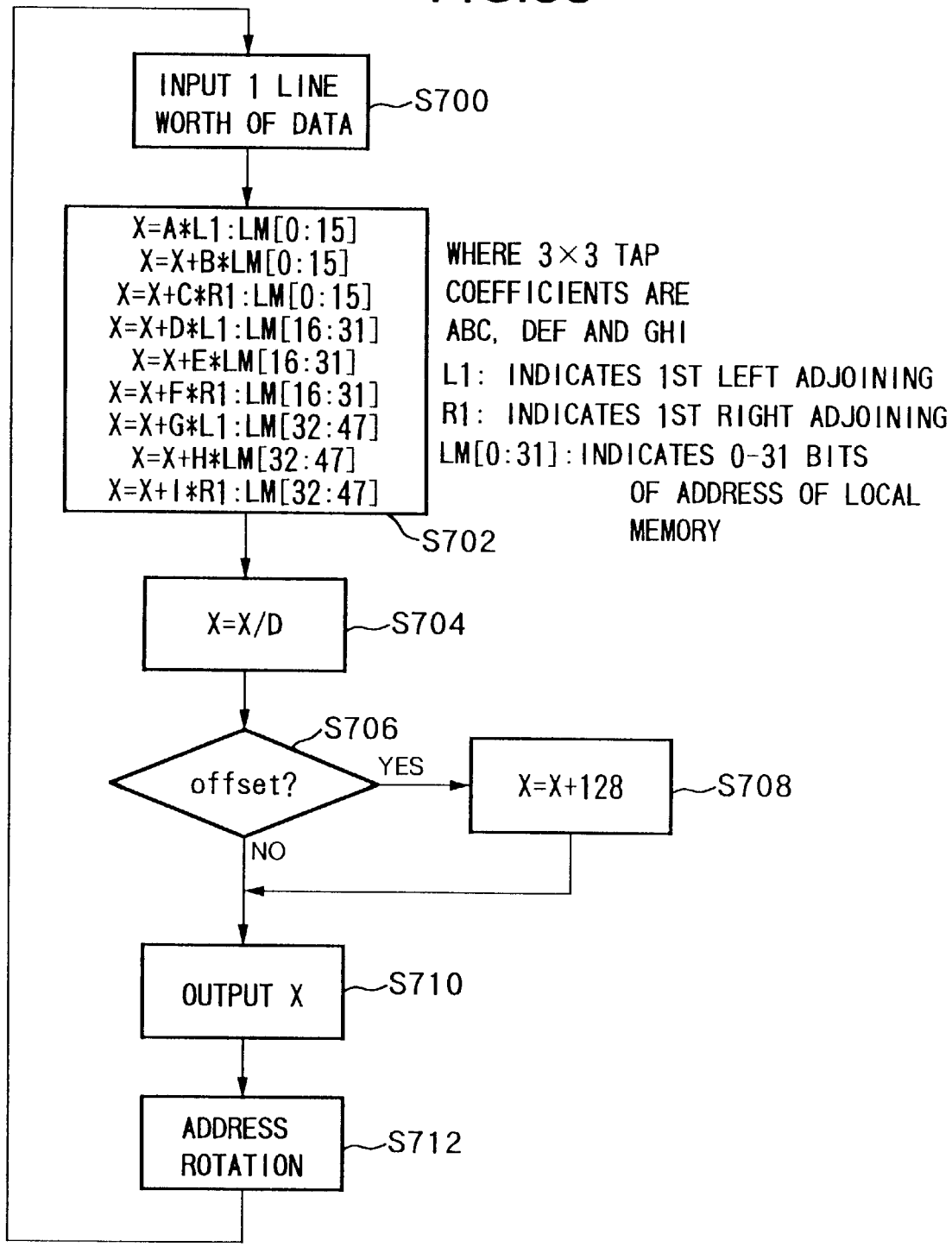

IMAGE PROCESSOR, DATA PROCESSOR, AND THEIR METHODS

TECHNICAL FIELD

The present invention relates to an image processing apparatus for supplying image data to a plurality of processor elements, performing image processing in parallel by SIMD (single instruction multiple data stream) control of these plurality of processor elements, and performing contour enhancement for enhancing the contours of an image and a method of the same and to a data processing apparatus for filtering for example image data by an FIR filter and a method of the same.

BACKGROUND ART

Color signals of a plurality of formats such as RGB signals, YIQ signals, and YCrCb signals (below, a luminance signal Y will also be treated as a color signal) are processed in the fields of image signal processing, television signal processing, etc.

In order to correct an optical system in a video camera, correct nonlinearity in a display device (display), impart a special effect, and so on, it sometimes becomes necessary to perform nonlinear processing such as color correction and γ (gamma) correction with respect to these various types of color signals.

In the past, nonlinear processing of these various types of color signals had been carried out by analog processing. However, when a color signal is processed analogly, non-uniformity occurs in the processing among components of color signals or a changes occur along with time due to repetition of processing, so the image is deteriorated. Accordingly, at the present time, nonlinear processing of color signals is generally carried out by digital processing.

As the method of nonlinear processing by digital processing, for example, there can be mentioned the exclusive logic circuit method which uses a delay circuit, multiplier circuit, adder circuit, and other logic circuits for realization of nonlinear input/output characteristics by break point approximation. However, the former method requires that a logic circuit be prepared for every processing, therefore lacks flexibility in the processing content. Accordingly, this method is rarely adopted.

Further, as another method of nonlinear processing by digital processing, mention may be made, for example, of a method of establishing correspondence between the values of input data and the values of output data via a memory. According to this method, the content of the nonlinear processing can be easily changed by just changing the storage content of the memory establishing correspondence between the input data and the output data. However, in the related art, no method for designating the processing content by a GUI (graphical user interface) had yet been established.

In addition, the result of the nonlinear processing had been checked by once recording the image data obtained by the processing on a VTR tape etc. and then reproducing and displaying the recorded image data, which was very troublesome.

Further, the apparatus for establishing correspondence between the input and output data using this method was usually configured for only color correction, γ correction, and other nonlinear processing, therefore it was necessary to place other dedicated hardware in front or back of it to perform the other processing. Accordingly, even when establishing correspondence between input and output data to carry out color correction and γ correction, in the end, in the same way as the method using logic circuits, it was necessary to prepare dedicated hardware to handle the other processing.

On the other hand, in order to flexibly perform various types of image processing, the method of using a DSP (digital signal processor) to process the image data by software can be considered. However, while a DSP is normally suitable for linear processing, it is not suitable for color correction, γ correction, and other nonlinear processing, therefore there was only a few examples of utilization of a DSP for the nonlinear processing in the past.

Further, contour enhancement is currently used in televisions, video cameras, VTR apparatuses, image editing apparatuses, special effect apparatuses, etc. for industrial use in television broadcast stations etc. In the future, it expected to be actively utilized in the image processing apparatuses of the general consumers as well.

In the past, contour enhancement apparatuses for performing the contour enhancement were realized by dedicated hardware constituted by multipliers, adders, etc.

However, contour enhancement is realized by processing for detecting the contours of the image of the object and processing for enhancing the detected contour part, therefore the hardware of the contour enhancing apparatus ends up becoming large in size.

Further, once dedicated hardware for performing these processings is prepared, it is difficult to change the frequency characteristic of the high pass filters used when detecting the contour parts or the degree of enhancement of the contour parts etc.

Further, filtering by digital processing is used in a wide range of fields such as image processing and audio processing at present. In particular, in the field of image processing, it is indispensable for a band limitation, recording, editing and imparting of special effects for television signals etc. and has been used for a wide range of purposes.

In the past, as the filtering apparatus for performing filtering by digital processing, for example, use has been made of an FIR filter apparatus comprised of a multiplier, adder, etc. with specifications fixed by the hardware.

Further, the design of such a FIR filter apparatus required work for calculation for determining the filter coefficient satisfying the desired passing band characteristic and element band characteristic and work for actually preparing an FIR filter apparatus for performing the filtering using the filter coefficient obtained as a result of the calculation and using the same to verify the characteristics of the filtering by hardware or for using circuit simulator software to verify the characteristics of the filtering by software.

However, when using the method of preparing FIR filters of individual specifications to verify the characteristics by hardware, a long time is required for the preparation of the FIR filters, so the development period of the filter apparatus becomes long.

Further, when using the method of verifying the characteristics by software, the filter processing can not be simulated in real time, therefore it is not possible to verify the characteristics by viewing the image data obtained by actual filtering.

Further, not suitable method has yet been conceived as the method of evaluating the effect of the filtering of the image data of a moving picture.

Further, it has been known that the filtering by an FIR filter can be carried out by software by using an SIMD-controlled linear array type multiple parallel processor and that the desired characteristics can be realized by this, but in the past there had been no development apparatus for uniformly performing everything from the determination of the filtering characteristics (specifications) of the program for making an SIMD-controlled linear array multiple parallel processor control perform filtering by an FIR filter to the verification (evaluation) of the characteristics.

Further, the procedures from the determination of the specifications of the filtering program of the SIMD-controlled linear array multiple parallel processor to the evaluation are difficult. It would be convenient if it were possible to perform this series of work by operation using a GUI for example.

DISCLOSURE OF THE INVENTION

The present invention was made so as to solve the above problems and has as an object thereof to provide an image processing apparatus capable of performing nonlinear processing such as color correction on image data by using for example a DSP and a method of the same.

Further, another object of the present invention is to provide an image processing apparatus enabling free setting of the content of nonlinear processing such as color correction for every component of the color signals (Y, Cr, Cb, R, G. B, etc.) by using a GUI and in addition enabling quickly confirmation of the result of the color correction etc. on a GUI screen and a method of the same.

Further, still another object of the present invention is to provide an image processing apparatus enabling contour enhancement by software by using an SIMD-controlled linear array type multiple parallel processor and a method of the same.

Further, still another object of the present invention is to provide an image processing apparatus enabling contour enhancement by simple setting of the characteristic of the filtering when detecting the contour of the image of the object in the image data and characteristics of the nonlinear conversion for adjusting the degree of contour enhancement by for example a GUI and in addition enabling quick confirmation of the result of the processing and a method of the same.

Further, still another object of the present invention is to provide a data processing apparatus enabling filtering by software by using an SIMD-controlled linear array multiple parallel processor and in addition enabling uniform determination of the filtering characteristic to verification of the characteristic and a method of the same.

Further, still another object of the present invention is to provide a data processing apparatus enabling a reduction of the development period of a filtering apparatus and a method of the same.

An image processing apparatus according to the present invention comprises an input use image displaying means for displaying an input use image showing an input/output characteristic between an input image data and an output image data; a designation data receiving means for receiving designation data input in accordance with the displayed input use image and designating the input/output characteristic; an input/output characteristic extracting means for extracting the input/output characteristic from the received designation data; an input/output characteristic image displaying means for displaying the input/output characteristic image showing the extracted input/output characteristic; and an image data processing means for processing the input image data to generate the output image data so that the input image data and the output image data have a relationship indicated by the extracted input/output characteristic.

Preferably, the input image displaying means displays a graph of an initial value of the input/output characteristic; the designation data receiving means receives at least a first designation data for designating addition of a passing point of a curve of the displayed graph and the position of the passing point to be added on the graph, a second designation data for designating a change of the position of the added passing point and the position of the passing point to be changed after the change, and a third designation data for designating deletion of the added passing point; and the input image displaying means changes the graph of the input/output characteristic based on the received first designation data to third designation data.

Preferably, the apparatus comprises an input/output characteristic data generating means for generating input/output characteristic data for establishing correspondence between the input image data and the output image data according to the extracted input/output characteristic; and the image data processing means converts the value of the input image data to the value of the output image data by a memory mapping method based on the generated input/output characteristic data.

Preferably, the image data processing means processes the input image data based on a set program to generate the output image data and comprises a program generating means enabling the image data processing means to prepare a program for generating the output image data from the input image data based on the extracted input/output characteristic.

Preferably, the image data processing means comprises a SIMD-controlled linear array type multiple parallel processor.

The input use image displaying means for example first displays a graph of the initial value (y=x) of the input/output characteristic showing to output the value (x) of a component (R, G, B, Y, I, Q, etc.; input image data) of the color signal to be processed without change as the value (y) of the component (output image data) of the color signal obtained as the result of processing in a window of a GUI image for every component of the color signal.

When the user for example uses a mouse to designate the addition of a passing point of the curve of the displayed graph, a position of the passing point to be added on the graph, a change of the position of the added passing point, the position after change or the deletion of the added passing point with respect to each window of the components of the color signal of the GUI image, the designation data receiving means receives the designation data showing these designations for every component of the color signal.

The input/output characteristic extracting means extracts a function (break point approximation function) showing the input/output characteristic indicated by the received designation data by for example a break point approximation line for every component of the color signal.

The input/output characteristic image displaying means displays a graph showing a break point approximation function showing the extracted input/output characteristic in each window of the components of the color signal of the GUI screen at a point of time when the input of all designation data is terminated.

The input/output characteristic data generating means generates input/output characteristic data for establishing correspondence of the value of the input image data with the output image data according to the extracted input/output characteristic for every component of the color signal based on the extracted break point approximation function.

The image data processing means stores for example the input/output characteristic data and processes the input image data for every component of the color signal to generate the output image data using the memory mapping method where the input image data is used as the address input and the value of the input/output characteristic data stored at the address indicated by the value of the input image data is used as the output image data, and displays the same.

Further, for example, where an SIMD-controlled linear array type multiple parallel processor is used to process the input image data for every component of the color signal to generate the output image data, the program generating means prepares a program for realizing the extracted input/output characteristic and downloads the same to the processor.

Further, the image processing method according to the present invention comprises the steps of displaying an input use image showing an input/output characteristic between input image data and output image data; receiving designation data input in accordance with the displayed input use image and designating the input/output characteristic; extracting the input/output characteristic from the received designation data; displaying an input/output characteristic image showing the extracted input/output characteristic; processing the input image data to generate the output image data so that the input image data and the output image data have a relationship indicated by the extracted input/output characteristic; and displaying the generated output image data.

Preferably, the method displays a graph of the initial value of the input/output characteristic; receives at least a first designation data for designating an addition of a passing point of a curve of the displayed graph and the position of the passing point to be added on the graph, a second designation data for designating a change of the position of the added passing point and the position of the passing point to be changed after the change, and a third designation data for designating deletion of the added passing point and changes the graph of the input/output characteristic based on the received first designation data to third designation data.

Preferably, the method generates input/output characteristic data for establishing correspondence between the input image data and the output image data according to the extracted input/output characteristic and converts the value of the input image data to the value of the output image data by a memory mapping method based on the generated input/output characteristic data.

Preferably, the method processes the input image data based on a set program to generate the output image data, prepares a program for generating the output image data from the input image data based on the extracted input/output characteristic, and executes that generated program to process the input image data to generate the output image data.

Further, the image processing apparatus according to the present invention comprises a characteristic image displaying means for displaying a characteristic image showing a characteristic of contour enhancement with respect to image data input from an external portion; a characteristic receiving means for receiving the characteristic of contour enhancement in accordance with an operation with respect to the displayed characteristic image; a characteristic image changing means for changing the characteristic image showing the characteristic of contour enhancement in accordance with the received characteristic of contour enhancement; and a contour enhancement means for performing the contour enhancement with respect to the input image data based on the received characteristic of contour enhancement.

Preferably, the characteristic image displaying means displays characteristic images showing each of a characteristic of a first nonlinear conversion with respect to the image data input from the external portion, a characteristic of a second nonlinear processing, and a characteristic of filtering; the characteristic receiving means receives each of the characteristic of first nonlinear conversion, the characteristic of second nonlinear processing, and the characteristic of filtering in accordance with an operation with respect to the displayed characteristic image; the characteristic image changing means changes the characteristic images showing each of the characteristic of first nonlinear conversion, the characteristic of second nonlinear processing, and the characteristic of filtering in accordance with the received characteristic of first nonlinear conversion, the characteristic of second nonlinear processing, and the characteristic of filtering; and the contour enhancement means comprises a first nonlinear processing means for applying first nonlinear conversion with respect to the image data based on the received characteristic of first nonlinear conversion, a contour detecting means for performing filtering on the first nonlinear converted image data based on the received characteristic of filtering to detect the contour of the image in the image data and generate contour data showing the detected contour, a second nonlinear processing means for applying second nonlinear processing to the generated contour data based on the received characteristic of second nonlinear conversion, a time delaying means for imparting a time delay corresponding to the first nonlinear processing, the generation of the contour data, and the second nonlinear processing to the image data input from the external portion, and an adding means for adding the second nonlinear processed image data and the delayed image data.

Preferably, the apparatus further comprises a displaying means for displaying the contour enhanced image data.

Preferably, the apparatus further comprises a program preparing means for preparing a program to be executed by the contour enhancement means based on the received characteristic of contour enhancement; and the contour enhancement means executes the prepared program to perform the contour enhancement with respect to the input image data.

Preferably, the apparatus is characterized in that the contour enhancement means is a SIMD-controlled multiple parallel processor.

The image processing apparatus according to the present invention enables the user to set the characteristics of various processings in the contour enhancement for enhancing the contours of an image, that is, the characteristic of filtering by a high pass filter in contour detection, and to set the characteristics of the nonlinear conversion before or after the filtering by performing an operation with respect to a GUI image, performs the contour enhancement by software in accordance with these settings, and displays the result of the processing to provide the same to the user for confirmation.

The characteristic image displaying means displays, with respect to image data input from an external portion for contour enhancement, an image showing the characteristic of nonlinear conversion (first nonlinear conversion; level depend) for the component for enhancement of the contour of the image of the object in the image data and the characteristic of the nonlinear processing (second nonlinear conversion; clispining) for suppressing unnaturalness of the image due to over-enhancing of the detected contour part, for example, in a window of a GUI image in the form of a graph showing the value of the pixel data after the nonlinear processing with respect to pixel data of the input image.

Further, the characteristic image displaying means displays an image showing the frequency characteristic of the high pass filter used for the filtering, when detecting for example the contour of the image of an object, in a window of a GUI image in the form of a graph of the frequency response.

The user for example uses a mouse etc. for an operation for modifying the curves of the graphs of the characteristics of the nonlinear processing and the high pass filter in the windows of the GUI image so as to input the characteristics of the level depend, clispining, and filtering and uses a mouse etc. to push predetermined buttons in the GUI image to finally set these characteristics.

The characteristic receiving means receives the characteristics of the processings input as mentioned above when for example the user finally sets the characteristics of the processings.

The characteristic image changing means successively changes and displays the curves of the graphs in accordance with a modification operation during the period when for example the user performs an operation for modifying the curves of the graphs by a mouse etc. before finally setting the characteristics of the processings and shows them to the user.

By viewing the curves of the graphs changed by the characteristic image changing means, the user can obtain a general grasp of the characteristics of the processings.

The program preparing means prepares a program for controlling the operation of the contour enhancement means based on characteristics of the processings received by the characteristic receiving means so that each processing exhibits the received characteristics.

The contour enhancement means is for example an SIMD-controlled linear array type multiple parallel processor which executes the program prepared by the program preparing means to perform the level depend, clispining, and filtering and thereby performs the contour enhancement by the characteristics desired by the user.

That is, in the contour enhancement means, the first nonlinear processing means executes the program to performs level depend for enhancing the contour of image data input from the external portion.

The contour detecting means performs filtering by a high pass filter with respect to the contour enhanced image data, detects the contour part of the image of an object having a high frequency, and generates contour data showing the detected contour.

The second nonlinear processing means performs clispining for preventing the contour from being over-enhanced and becoming unnatural when the contour data generated by the contour detecting means is combined with the original image data.

The time delaying means delays the image data input from the external portion by exactly the time required for the above processings to match the timing with the clispined contour data.

The adding means adds the delayed image data and the clispined contour data to generate the contour enhanced image data of the image.

Further, the image processing method according to the present invention comprises the steps of displaying a characteristic image showing a characteristic of contour enhancement with respect to image data input from an external portion; receiving the characteristic of contour enhancement in accordance with an operation with respect to the displayed characteristic image; changing the characteristic image showing the characteristic of contour enhancement in accordance with the received characteristic of contour enhancement; and performing the contour enhancement with respect to the input image data based on the received characteristic of contour enhancement.

Preferably, the method comprises the steps of displaying characteristic images showing each of a characteristic of first nonlinear conversion with respect to the image data input from the external portion, a characteristic of second nonlinear processing, and a characteristic of filtering; receiving each of the characteristic of first nonlinear conversion, the characteristic of second nonlinear processing, and the characteristic of filtering in accordance with an operation with respect to the displayed characteristic images; changing each of the characteristic images showing the characteristic of first nonlinear conversion, the characteristic of second nonlinear processing, and the characteristic of filtering in accordance with the received characteristic of first nonlinear conversion, the characteristic of second nonlinear processing, and the characteristic of filtering; applying first nonlinear conversion with respect to the image data based on the received characteristic of first nonlinear conversion; performing filtering on the first nonlinear converted image data based on the received characteristic of filtering to detect a contour of the image in the image data; generating a contour data showing the detected contour; applying second nonlinear processing to the generated contour data based on the received characteristic of second nonlinear conversion; imparting a time delay corresponding to the first nonlinear processing, the generation of contour data, and the second nonlinear processing to the image data input from the external portion; and adding the second nonlinear processed image data and the delayed image data.

Preferably, the method displays the contour enhanced image data.

Preferably, the method prepares a program of the contour enhancement based on the received characteristic of contour enhancement and executes the prepared program to perform the contour enhancement on the input image data.

Preferably, the method prepares a parameter file based on the received characteristic of contour enhancement and executes the program of the contour enhancement referring to this parameter file to perform contour enhancement on the input image data.

Preferably, the method is characterized in that a SIMD-controlled multiple parallel processor executes the contour enhancement program.

Further, the data processing apparatus according to the present invention comprises a characteristic image displaying means for displaying a characteristic image showing a characteristic of filtering on data of a signal input from an external portion; a characteristic receiving means for receiving the characteristic of filtering in accordance with an operation with respect to the displayed characteristic image; a characteristic image changing means for changing the characteristic image showing the characteristic of filtering in accordance with the received characteristic of filtering; and a filtering means for performing the filtering on the input data based on the received characteristic of filtering.

Specifically, the data of the signal is image data; and the apparatus further comprises an image displaying means for displaying the filtered image data.

Preferably, the apparatus further comprises a filter circuit designing means for designing a filter circuit for performing the filtering on the input data by the received characteristic of filtering and describing the designed filter circuit by a predetermined hardware description language.

Preferably, the apparatus further comprises a program preparing means for preparing a program to be executed by the filtering means based on the received characteristic of filtering; and the filtering means executes the prepared program to perform the filtering with respect to the input data.

Specifically, the filtering means is an SIMD-format multiple parallel processor which performs the filtering by an FIR filter.

The data processing apparatus according to the present invention enables the user to set a filtering characteristic with respect to image, audio, or other data by performing an operation with respect to the GUI image, performs the filtering by software in accordance with these settings, and displays the result of the processing to provide the same to the user for his/her confirmation.

The characteristic image displaying means for example displays on a monitor a GUI image showing the frequency passing band, frequency blocking band, and other desired characteristics in the filtering of the image data in the form of for example a graph.

The user for example performs a modification operation on the curve of the graph in the GUI image by using a mouse etc. to input the filtering characteristic and further depresses a predetermined button in the GUI image by using the mouse etc. to finally set the desired characteristic.

The characteristic receiving means receives the input characteristic of filtering when for example the user finally sets the desired characteristic of filtering.

The characteristic image changing means for example successively changes and displays the curves of the graphs in accordance with the modification operation while the user performs the modification operation of the curves of the graphs by a mouse etc. before finally setting the filtering characteristic and shows the same to the user. By viewing the curves of the graphs changed by the characteristic image changing means, the user can obtain a general grasp of the characteristic of filtering.

The program preparing means calculates the filter coefficient of the FIR filter based on the filtering characteristic received by the characteristic receiving means so as to show for example the received characteristic and uses the calculated filter coefficient to prepare the program for filtering to be executed by the filtering means.

The filtering means is for example an SIMD-controlled linear array type multiple parallel processor which executes the program prepared by the program preparing means to perform the filtering on the image data by the characteristic desired by the user.

The filter circuit designing means for example designs the circuit of the FIR filter for filtering the image data by hardware by the characteristic desired by the user and generates a description of the content of the designed filter circuit by the HDL (hardware description language) or other hardware description language.

Further, the data processing method according to the present invention comprises the steps of displaying a characteristic image showing a characteristic of filtering on data of a signal input from an external portion; receiving the characteristic of filtering in accordance with an operation with respect to the displayed characteristic image; changing the characteristic image showing the characteristic of filtering in accordance with the received characteristic of filtering; and performing the filtering on the input data based on the received characteristic of filtering.

Specifically, the data of a signal is image data; and further the method displays the filtered image data.

Preferably, further, the method designs a filter circuit for performing the filtering on the input data by the received characteristic of filtering and describes the designed filter circuit by a predetermined hardware description language.

Preferably, further, the method prepares a program for realizing the filtering based on the received characteristic of filtering and executes the prepared program to perform the filtering on the input data.

Specifically, an SIMD-format multiple parallel processor performs the filtering by an FIR filter.

BRIEF DESCRIPTION OF THE DRAWINGS

FIG. 8 is a view of an example of the positional relationship between pixels of the original image and pixels generated by interpolation.

FIG. 10 is a block diagram of an example of the configuration of an apparatus for performing a filter operation by hardware.

FIG. 11 is a view of an example of signals of portions in cycles of the filter operation carried out in the apparatus of FIG. 10.

FIG. 12 is a view of an example of a correspondence between a filter selection signal and a filter coefficient set.

FIG. 15 is a view of the example of the positional relationship with processor elements having data required for the processing.

FIG. 22 is a view of an example of the positional relationship obtained by reducing the positional relationship of FIG. 21.

FIG. 34 is a view of the configuration of an eighth embodiment of the present invention.

FIGS. 53A to 53C are views of a GUI image used for setting the characteristic of filtering in contour enhancement by the image data processing system (FIG. 37).

FIGS. 63A to 63E are second views of the granular noise elimination in the 13th embodiment of the present invention.

FIGS. 84A to 84C are views exemplifying a GUI image for filtering (LAP retouch) displayed on the display device (FIG. 74) in the processing of S600 shown in FIG. 82.

FIG. 85 is a view of an example of a GUI image for a color number conversion (posterization) displayed on the display device (FIG. 74) in the processing of S600 shown in FIG. 82.

FIG. 86 is a flow chart of the filtering executed by a DSP of the image data processing system (FIG. 74) in the 15th embodiment.

BEST MODE FOR CARRYING OUT THE INVENTION

First Embodiment

Below, a first embodiment of the present invention will be explained.

In the past, when displaying NTSC, PAL, and other various image transmission system image signals on a image display device (display) using a CRT (cathode ray tube) of a television receiver etc., the method was adopted of processing the image signal by an analog format in accordance with each of these image transmission systems to change the horizontal scanning frequency for the display.

On the other hand, along with recent advances of digital signal processing techniques, the method is now being adopted of using digital processing to make the horizontal scanning frequency of the image display device match the image data of each image transmission system for the display.

The resolution of the image differs for every image transmission system (NTSC, PAL, etc.). Also, the numbers of pixels in the vertical direction and horizontal direction of the image are different. Further, other than the NTSC system and PAL system, there are various image transmission systems such as the HDTV system. The standard of resolution (number of pixels) differs for every system. Further, there are also a variety of image display devices. In the recent LCDs and other fixed pixel display devices, there are displays of various pixel sizes.

Accordingly, when it is desired to process and display image data of all of these image transmission systems by the same digital image processing system, it becomes necessary to converting the image data of a certain image transmission system to the image data suited for the display device by an "interpolation filter" etc.

Below, an explanation will be made of the filtering method for converting the number of pixels of an image by using an interpolation filter by taking as an example the enlargement and/or reduction of an image and a sampling frequency (number of pixels) conversion.

Both of the processing for enlargement and/or reduction of the image and the processing for conversion of the sampling frequency of the image (processing for conversion of number of pixels between image transmission systems having different standards of resolution) are realized by performing processing to calculate pixel data which did not exist in the original image from the positions of the pixels of the original image and the data (pixel data) expressing the luminance and color of the pixels.

The interpolation filter performs the operations for performing the processing for enlargement and/or reduction of the image and the processing for conversion of the sampling frequency so as to filter the image data. Therefore these processings can be realized by utilizing the interpolation filter.

Figure 1:
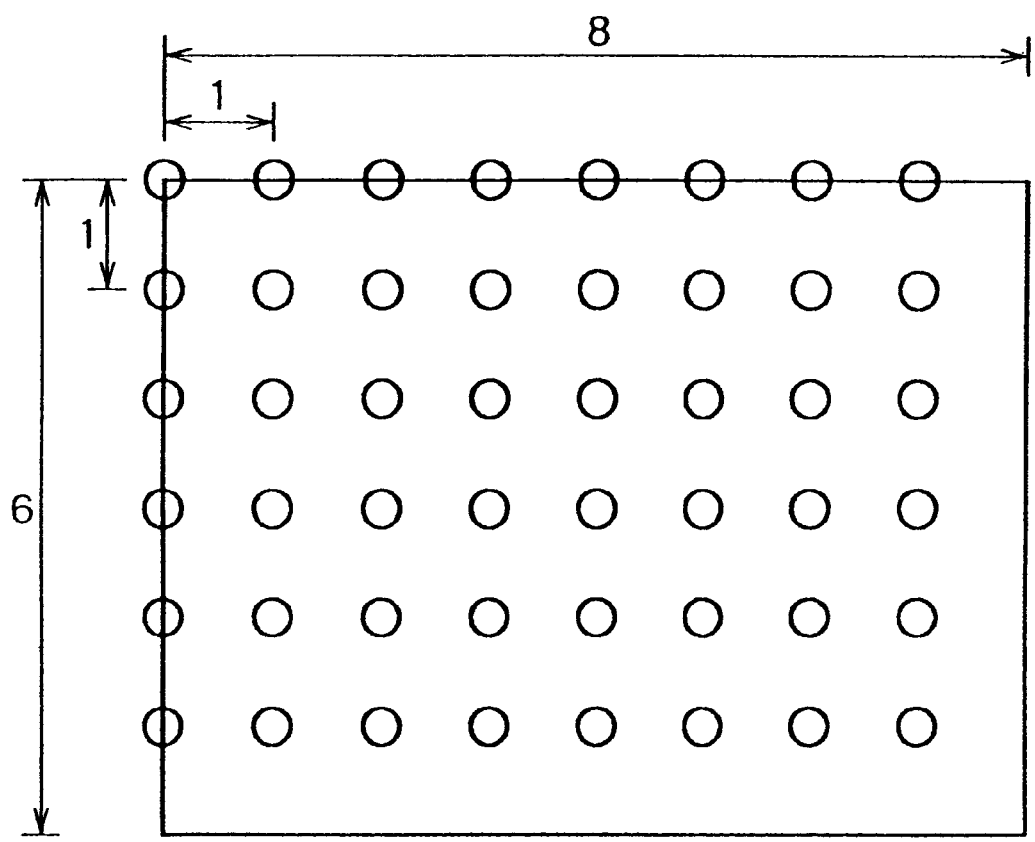
FIG. 1 is a view of an example of an original image.

FIG. 1 is a view of an example of an arrangement of pixels of the original image.

Note that, in actuality, an image is frequently comprised by many pixels, but for simplification of the explanation and illustration, an image comprised by a small number of pixels (vertical six pixels x horizontal eight pixels) is exemplified in FIG. 1. In FIG. 1, further, the circle marks indicate the positions of the pixels of the original image (same in the following drawings).

Processing for Enlargement of Image for Enlarging Length While Maintaining Arrangement of Pixels First, an explanation will be made referring to FIG. 2 and FIG. 3 of the processing for enlargement of an image taking as an example a case where the original image shown in FIG. 1 is enlarged 10/7-fold in terms of the ratio of length while maintaining the arrangement of pixels shown in FIG. 1 (interval between pixels and positional relationship) the same without changing the specifications of the image display per se.

Figure 2:
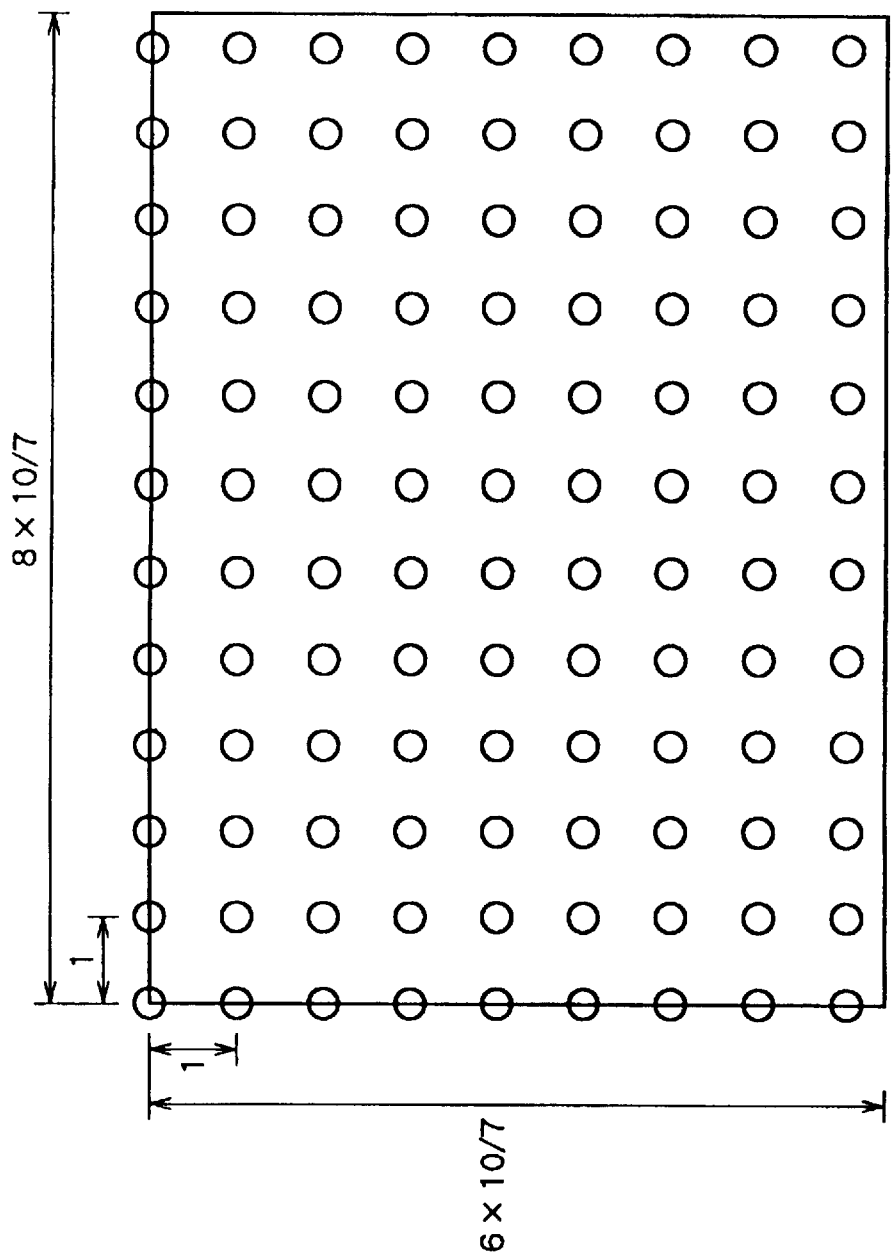
FIG. 2 is a view of an example of an image obtained by enlarging the original image.

FIG. 2 is a view of the enlarged image obtained by enlarging the length 10/7-fold while maintaining the arrangement of pixels of the original image shown in FIG. 1 without changing the specifications of the image display per se.

When the original image (FIG. 1) is enlarged while maintaining the arrangement of pixels, the enlarged image shown in FIG. 2 is obtained. That is, the enlargement rate of the length of the image is 1.429 ($\approx$10/7), therefore the length of one side of the image after enlargement (enlarged image) is enlarged 1.429-fold and the number of pixels is increased about $1.429^2$-fold.

Specifically, in contrast to the fact that for example the number of pixels of the original image is 8 in the horizontal direction (direction of horizontal scanning), the number of pixels of the enlarged image becomes 11 or 12 ($\approx$8×10/7 (1.429)). Accordingly, the positional relationship among the pixels of the original image and the positional relationship among the pixels of the enlarged image change, and the pixel data of the enlarged image become values different from the image data of the corresponding original image.

Figure 3:
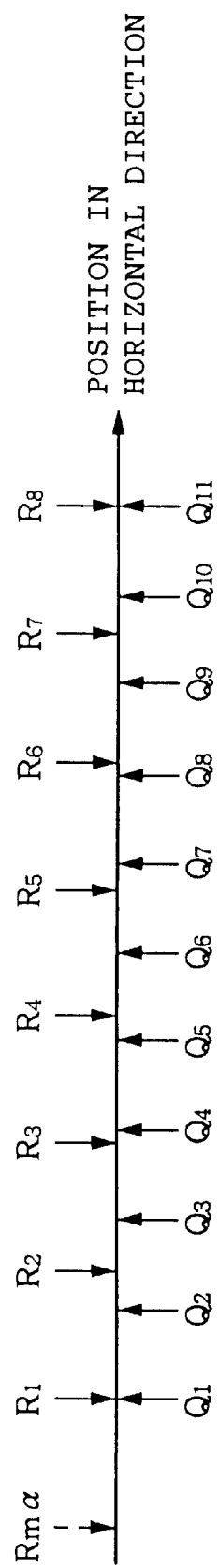
FIG. 3 is a view of an example of a positional relationship between pixels of the original image and pixels of the enlarged image.

FIG. 3 is a view of the positional relationship in the horizontal direction between pixels of the original image shown in FIG. 1 and pixels of the enlarged image obtained by enlarging the length of the original image with an enlargement rate of 10/7. Note that, in FIG. 3, the symbols Ri (i=1, 2, ...) at the upper side of the abscissa indicate the pixels of the original image, while the symbols Qi at the lower side of the abscissa indicate pixels of the enlarged image. Further, FIG. 3 shows only the positional relationship between pixels of the original image and pixels of the enlarged image in the horizontal direction, but the positional relationship between the pixels of the original image and the pixels of the enlarged image in the direction perpendicular to the direction of the horizontal scan (vertical direction) is the same.

As shown in FIG. 3, in the sense of the pixel position with respect to the picture projected on a screen, the pixels Qi of the enlarged image are arranged in the horizontal direction at intervals of 10/7 th that of the pixels Ri of the original image.

The pixel data of the pixels of the enlarged image, as will be explained later, is calculated by performing an interpolation filter operation, that is, a convolution operation to an interpolation function, with respect to the a predetermined number of pixel data values of the original image on the periphery of each of the pixels of the enlarged image in accordance with a correspondence etc. between pixels of the original image shown in FIG. 3 and pixels of the enlarged image.

Image Conversion for Raising Sampling frequency While Maintaining Arrangement of Pixels Below, an explanation will be made further referring to FIG. 4. of the image conversion (processing for conversion of sampling frequency) for raising the sampling frequency by taking as an example a case where the original image shown in FIG. 1 is converted to 10/7 times the sampling frequency without changing the size of the image.

Figure 4:
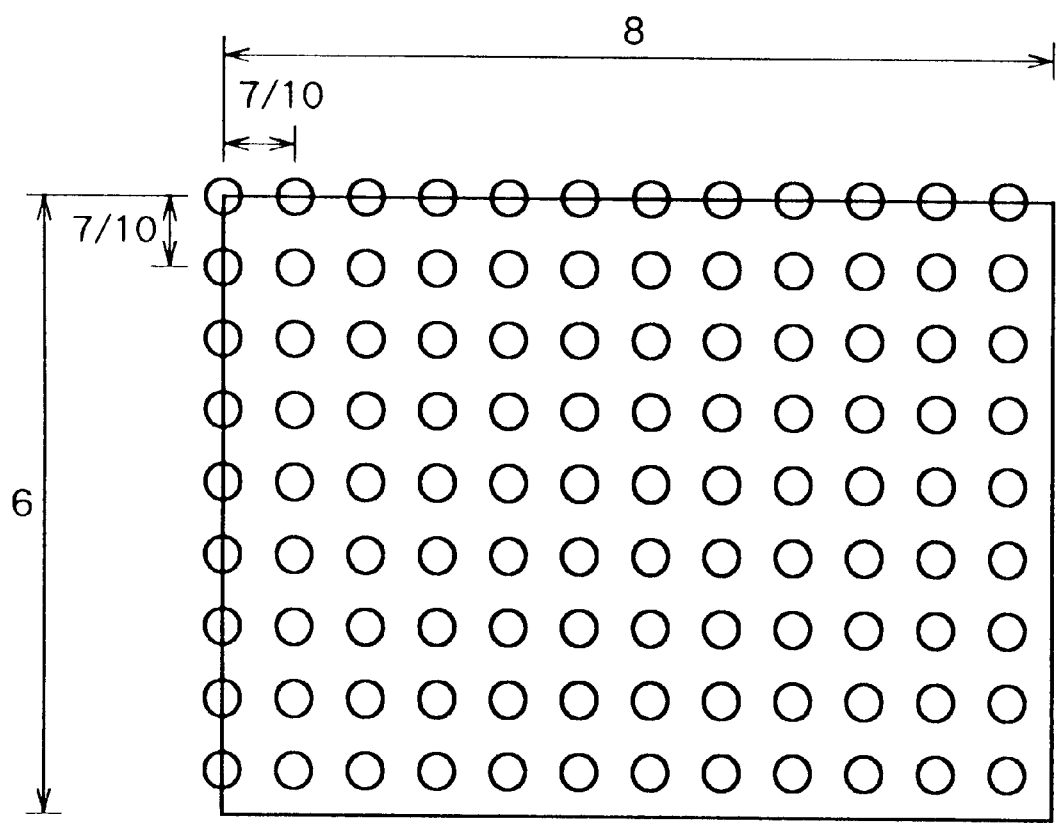
FIG. 4 is a view of an example of the image obtained by raising the resolution of the original image.

FIG. 4 is a view of the converted image obtained by conversion of the original image shown in FIG. 1 to 10/7 times the sampling frequency without changing the size of the image.

This sampling frequency conversion is equivalent to the conversion of the original image to an image of an image transmission system having the standard of a resolution higher by exactly 10/7. That is, as shown in FIG. 4, by this sampling frequency conversion, the original image shown in FIG. 1 is converted to a converted image containing (10/7 (=1.429 times)) the number of pixels in the same length and containing $1.429^2$ times the number of pixels in the same surface area (having $1.429^2$ times the surface density).

The positional relationship between pixels of the original image (FIG. 1) and pixels of the enlarged image (FIG. 2) and the positional relationship between pixels of the original image and pixels of the image after the sampling frequency conversion (FIG. 4) are identical. Both are as shown in FIG. 3. Therefore the operation for raising the sampling frequency and surface density of the pixels is similar to the operation of the enlargement with respect to the original image.

Processing for Reduction of Image for Reducing Length While Maintaining Arrangement of Pixels Below, an explanation will be made by further referring to FIG. 5 and FIG. 6 of the processing for reduction of the image taking as an example a case where the original image shown in FIG. 1 is reduced with a reduction rate of 10/13 while maintaining the arrangement of pixels shown in FIG. 1 (interval between pixels and positional relationship of pixels) without changing the specifications of the image display per se.

When processing an image for reduction in this way, the interval and the positional relationship of the pixels in the image obtained by the reduction (reduced image) become the same as those of the original image shown in FIG. 1.

Figure 5:
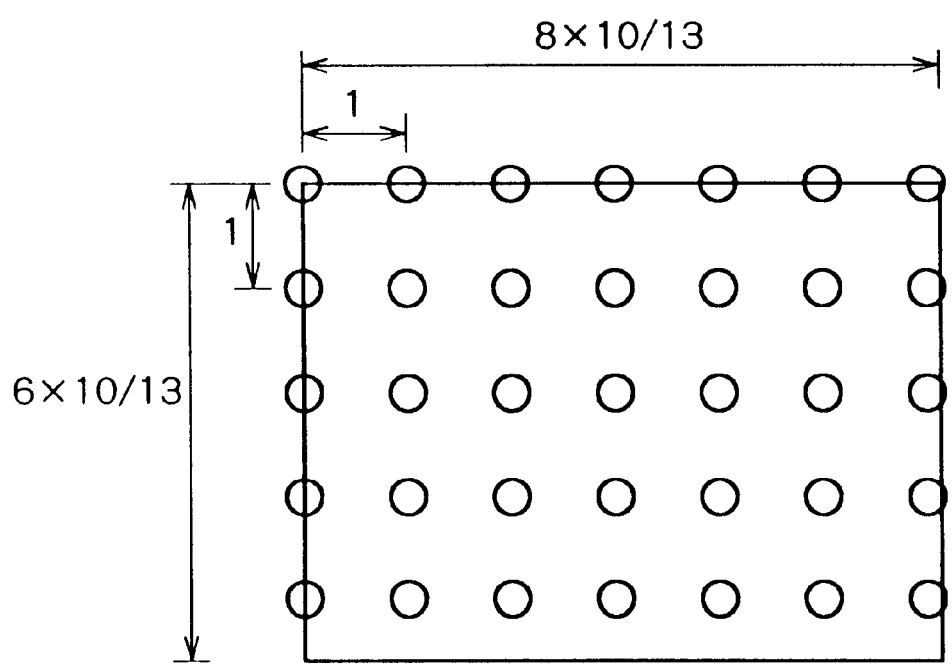
FIG. 5 is a view of an example of the image obtained by reducing the original image.

FIG. 5 is a view of the reduced image obtained by reducing the original image shown in FIG. 1 to 10/13th of the length without changing the arrangement of pixels.

In this reduction, the reduction rate is 0.769 (=10/13), therefore the length of one side of the image becomes 0.769 th the length and the number of pixels composing the reduced screen is reduced to about $0.769^2$ the number.

For example, as shown in FIG. 1, where the number of pixels of the original image in the horizontal direction is 8, the number of pixels of the reduced image in the horizontal direction becomes 6 or 7 ($\approx$8×10/13 (6.154)). Accordingly, the positional relationship among pixels of the original image and the positional relationship among pixels of the reduced image change, and the pixel data of the reduced image become values different from those of the corresponding pixel data of the original image.

Figure 6:
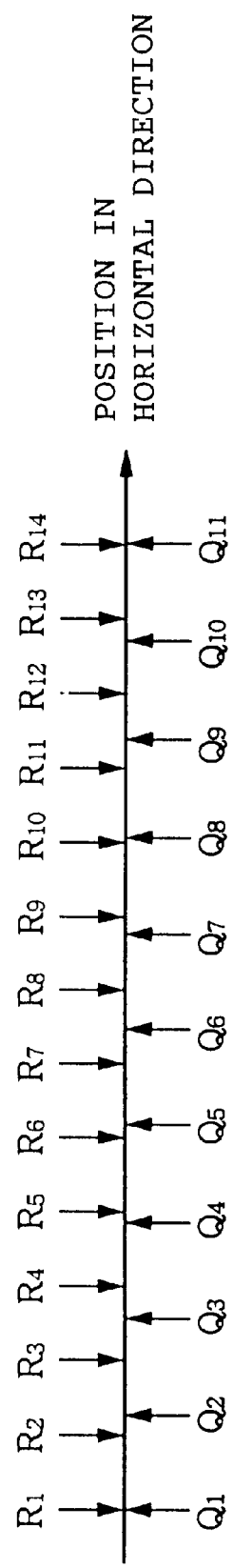
FIG. 6 is a view of an example of the positional relationship between pixels of the original image and pixels of the reduced image.

FIG. 6 is a view of the positional relationship between pixels of the original image shown in FIG. 1 where a picture projected on the screen is fixed and the pixels of the reduced image obtained by reducing the length of the original image in the horizontal direction with a reduction rate of 10/13. Note that, in FIG. 6, Ri (i=1, 2, . . . ) at the upper side of the abscissa indicate pixels of the original image, while Qi at the lower side of the abscissa indicate pixels of the reduced image. Note that while FIG. 6 shows the positional relationship between pixels of the original image and pixels of the reduced image in the horizontal direction, the positional relationship in the vertical direction is the same.

As shown in FIG. 6, the pixels Ri of the original image are arranged at intervals of 10/13th those of the pixels Qi of the reduced image.

The values of the pixel data of the reduced image are calculated by performing an interpolation filter operation, that is, convolution operation of the interpolation function, on the pixel data of a predetermined number of pixels around a corresponding pixel of the original image in accordance with a correspondence with pixels of the original image shown in FIG. 6.

Image Conversion for Lowering Sampling Frequency While Maintaining Arrangement of Pixels Below, an explanation will be made by further referring to FIG. 7 of the processing for conversion of the sampling frequency for lowering the sampling frequency taking as an example a case where the original image shown in FIG. 1 is converted to 10/13th the sampling frequency without changing the size of the image.

Figure 7:
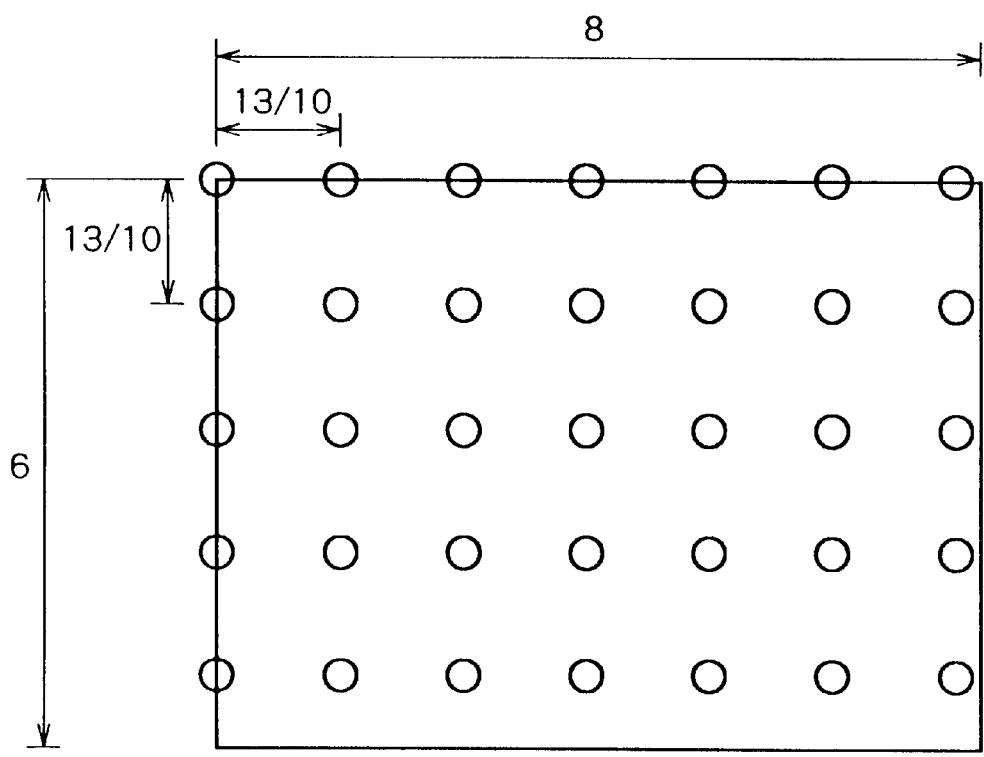
FIG. 7 is a view of an example of the image obtained by lowering the resolution of the original image.

FIG. 7 is a view of the converted image obtained by performing the processing for conversion on the original image shown in FIG. 1 to 10/13th the sampling frequency without changing the size of the image.

This sampling frequency conversion is equivalent to the conversion of the original image to an image of an image transmission system having a standard of resolution lower by exactly 10/13. That is, as shown in FIG. 7, by this sampling frequency conversion, the original image shown in FIG. 1 is converted to a converted image containing (10/13 (≈0.769 time)) the number of pixels in the same length and $0.769^2$ times the number of pixels in the same surface area (having $1.429^2$ times the surface density).

The positional relationship between pixels of the original image (FIG. 1) and pixels of the reduced image (FIG. 5) and the positional relationship between pixels of the original image and pixels of the image after the sampling frequency conversion (FIG. 7) are identical. Both are as shown in FIG. 6. Therefore, the operation of lowering the sampling frequency and the surface density of pixels is similar to the operation of the reduction with respect to the original image.

As explained above, for the processing for enlargement and/or reduction of an image and the processing for conversion of the sampling frequency, filtering by an interpolation filter for calculating the pixel data of new pixels is necessary for the positions at which pixels do not exist in the original image.

Operation of Interpolation Filter

Below, an explanation will be made of the operation used for the filtering by the interpolation filter.

FIG. 8 is a view of the filtering by the interpolation filter.

As shown in FIG. 8, when the sampling interval of the original image is S and the position away from the position of a pixel R of the original image by exactly a distance (phase) P is defined as the position (interpolation point) of the pixel (interpolation pixel) Qi generated by interpolation, the value of the interpolation pixel Qi is calculated by performing a convolution operation with respect to the value R of a nearby pixel of the original image (hereinafter referred to as a "peripheral pixel").

FIGS. 9A to 9D are views of the interpolation function used for the filtering by an interpolation filter.

Figure 9A:
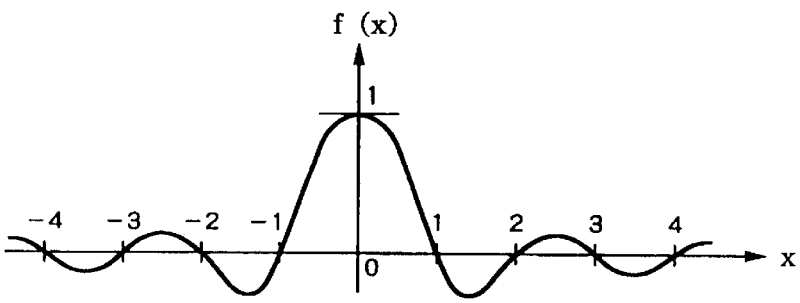
FIGS. 9A to 9D are views of an example of an interpolation relationship.

Processing for calculation of the pixel data of the interpolation pixel by ideal "interpolation" based on a "sampling theorem" is carried out by the convolution operation on the pixel data of the pixel of the infinite past original image up to the pixel data of the infinite future pixel by using a sinc function shown in following equation 1 and FIG. 9A as the interpolation function f(x).

$$f(x)=\sin c(\pi x x)=\sin(\pi x x)/(\pi x x) \tag{1}$$

where, $\pi$ is the ratio the circumference of the circle to the diameter.

In actuality, however, it is necessary to calculate the pixel data of the interpolation pixel for a finite time, therefore an interpolation function obtained by approximating the sinc function shown in equation 1 and FIG. 9A within a finite range is utilized. As the method of approximating the sinc function, the nearest approximation method, the bilinear approximation method, the cubic approximation method, etc. have been known.

Figure 9B:
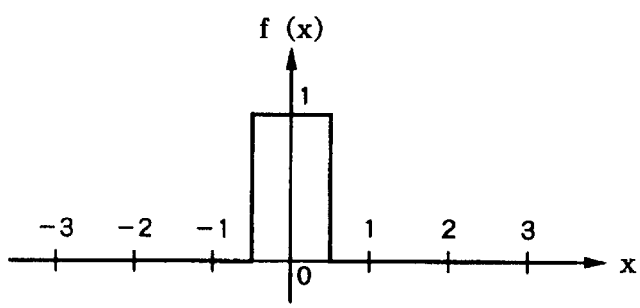

Among the above approximation methods, the nearest approximation method is for calculating one interpolation pixel's worth of pixel data from the nearest one pixel's worth of pixel data of the original image by using the interpolation function shown in the following equation 2 and FIG. 9B:

$$f(x)=1; \; -0.5 < x \leq 0.5$$
$$f(x)=0; \; -0.5 \geq x, x > 0.5 \tag{2}$$

Note that in equation 2 and FIG. 9B, a variable x is the amount obtained by normalizing a displacement from the pixel position of the original image in the horizontal direction (P of FIG. 8) by the standard interval S of the original image (the same in the following equations).

Figure 9C:
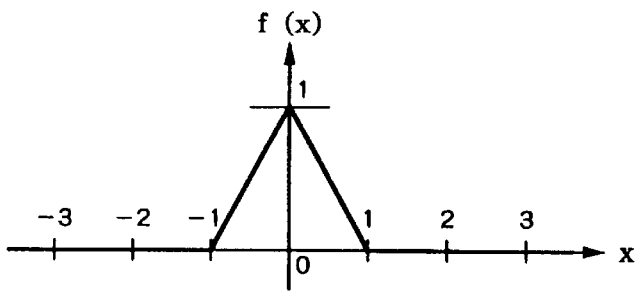

Further, the bilinear approximation method is for calculating one interpolation pixel's worth of pixel data from pixel's worth of pixel data of the original image by using the interpolation function shown in the following equation 3 and FIG. 9C:

$$f(x)=1-|x|; \; |x| \geq 1$$
$$f(x)=0; \; |x|>1 \tag{3}$$

Further, the bilinear approximation method is well known as linear interpolation and is for calculating the pixel data of the interpolation pixel by calculating a weighted average of the pixel data at the two sides of a pixel of the original image.

Figure 9D:
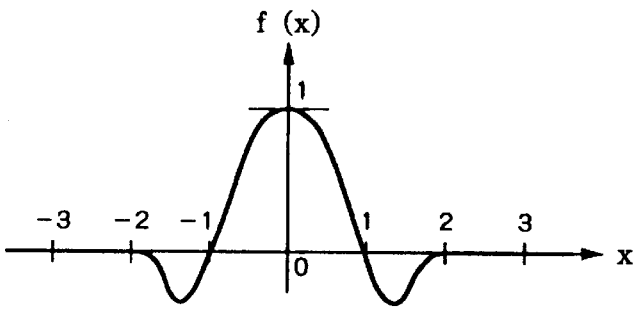

Further, the cubic approximation method is for calculating the data of one interpolation pixells worth of pixel data from four pixel's worth of nearby pixel data of the original image by using the interpolation function shown in the following equation 4 and FIG. 9D:

$$f(x)=|x|^3-2|x|+1; \quad |x|\leq 1$$

$$f(x)=-|x|^3+5x|^2+4-8|x|; \quad 1<|x|\leq 2$$

$$f(x)=0; \quad 2<|x| \tag{4}$$

It is possible to perform these convolution operations by utilizing a so-called FIR digital filter. As the values of the coefficients (filter coefficients) set in the multiplication elements of the FIR digital filter for realizing this convolution operation, use is made of the values of the interpolation functions at positions (sample points) of a predetermined number of (nearby) pixels of the original image around a center of interpolation functions defined as the interpolation point (position of the interpolation pixel). Note that the combination of filter coefficients set in the multiplication elements of the FIR digital filter will be referred to as the "filter coefficient set".

Filter Coefficient Set

The filter coefficient set of the FIR digital filter for realizing the convolution operation will be further explained by concrete examples.

Filter Coefficient Set Where Interpolation Is Carried out by Bilinear Approximation Method For example, the FIR digital filter used for the interpolation by the bilinear approximation method adopts a 2-tap configuration. When the value of the difference between the pixel of the original image sampled at the sampling interval S of the original image and the position of the interpolation pixel (phase P shown in FIG. 8) is 0.0, the two filter coefficients set in this FIR digital filter become 1.0 and 0.0. That is, these two filter coefficients compose a filter coefficient set outputting the pixel data of the original image per se as the pixel data of the interpolation pixel by the FIR digital filter when the pixel of the original image and the interpolation pixel coincide in position (phase P=0).

Further, for example, when the phase P is 0.5, the two filter coefficients set in the FIR digital filter become 0.5 and 0.5.

Further, for example, when the phase P is 0.3, the two filter coefficients set in the FIR digital filter become 0.7 and 0.3.

Filter Coefficient Set Where Performing Interpolation by Cubic Approximation Method The FIR digital filter used for the interpolation by the cubic approximation method adopts a 4-tap configuration. When the phase P is 0.0, the four filter coefficients set in the FIR digital filter are 0.0, 1.0, 0.0, and 0.0. These four filter coefficients compose a filter coefficient set outputting the pixel data of the pixel of the original image which matches the position of the interpolation pixel as the pixel data of the interpolation pixel as it is.

Further, when the phase P is 0.5, the four filter coefficients set in the FIR digital filter become −0.125, 0.625, 0.625, and −0.125.

Further, when the phase P is 0.3, the four filter coefficients set in the FIR digital filter become −0.063, 0.847, 0.363, and −0.147.

Note that the phase P changes for every interpolation pixel, therefore it is necessary to prepare a filter coefficient set of different values for every phase and perform the interpolation by using the filter coefficient set of the value in accordance with each phase of the interpolation pixel.

Interpolation Filter Processor

Below, an explanation will be made of an interpolation filter processor for performing the convolution operation of the interpolation function with respect to the pixel data of the original image.

FIG. 10 is a view of an example of the configuration of a processor 1 operating as a FIR digital filter for performing a convolution operation by the interpolation function (FIG. 9D) by performing utilizing the cubic approximation method to perform interpolation on the pixel data of the original image and generate the pixel data of the interpolation pixel.

As shown in FIG. 10, the processor 1 is constituted by a coefficient memory 100, registers $102_1$ to $102_4$, multipliers $104_1$ to $104_4$, and an adder 106.

The processor 1 calculates the pixel data of the interpolation pixel by performing a convolution operation by the interpolation function (FIG. 9D) utilizing the cubic approximation method on a total of four bits of pixel data of the original image, i.e., two each in the front and rear in the horizontal direction sandwiching the position of the interpolation pixel (interpolation point) by using a shift register of a 4-stage configuration by these constituent parts.

Constituent Parts of Processor 1

Below, the constituent parts of the processor 1 will be explained.

Coefficient Memory 100

The coefficient memory 100 stores a plurality of filter coefficient sets corresponding to the interpolation points (phase P (FIG. 8)), reads a stored filter coefficient set in accordance with a filter selection signal synchronized with the input original image from an externally connected VTR apparatus or other image apparatus and editing apparatus and other image processing apparatus (not shown, below referred to overall as "image processing apparatuses"), and set the four filter coefficients FC1 to FC4 comprising the read filter coefficient set in the multipliers $104_1$ to $104_4$, respectively.

Registers $102_1$ to $102_4$

The registers $102_1$ to $102_4$ are connected in series and constitute a shift register of a 4-stage configuration, hold four consecutive bits of pixel data of the image data, which are obtained by horizontally scanning the original image and are successively input in time series from the external image processing apparatus in units of words, in accordance with a logical value of the control signal, and shift at the timing at which for example a clock signal CLK synchronized with the pixel data of the original image rises from a logical value 0 (L) to the logical value 1 (H).

That is, the registers $102_1$ to $102_4$ latch and hold the pixel data of the original image input from the external image processing apparatus and the registers $102_1$ to $102_3$ of the former stages at the rising point of the clock signal CLK and perform a shift operation only in the case where for example the control signal has the logical value 1 (H). On the other hand, the registers $102_1$ to $102_4$ do not perform the shift operation even at the rising point of the clock signal CLK when the control signal has the logical value 0 (L).

Multipliers $104_1$ to $104_4$

The multipliers $104_i$ (i=1 to 4) multiply the pixel data of the original image input from the registers $102_i$ and the filter coefficients FCi input from the coefficient memory 100 and output the result of the multiplication to the adder 106.

Adder 106

The adder 106 calculates the sum of the results of multiplication input from the multipliers $104_1$ to $104_4$ and outputs the same as the pixel data of the interpolation pixel (interpolation value).

Operation of Processor 1

The coefficient memory 100 sets the filter coefficients FC1 to FC4 of a plurality of filter coefficient sets respectively corresponding to interpolation points (phase P (FIG. 8)) in the multipliers $104_1$ to $104_4$, respectively, in accordance with a filter selection signal synchronized with the input original image.

The registers $102_1$ to $102_4$ shift four consecutive bits of pixel data in synchronization with the clock signal CLK in accordance with the logical value of the control signal and supply the held pixel data to the multipliers $104_1$ to $104_4$.

The multipliers $104_1$ to $104_4$ multiply the four consecutive bits of pixel data of the original image and the filter coefficients FC1 to FC4.

The adder 106 calculates the sum of the results of multiplication of the multipliers $104_1$ to $104_4$ to calculate the pixel data of the interpolation pixel and outputs the same.

As explained above, the processor 1 performs the summation operation for the pixel data of the original image input in time series to the processor 1 and the filter coefficients by the multipliers $104_1$ to $104_4$ and the adder 106 and outputs the result of the operation in time series as the pixel data of the interpolation pixel.

Concrete Examples of Operation of Processor 1

Below, an explanation will be made of the operation of the processor 1 by giving concrete examples.

Processing for Enlarging Length of Original image 10/7-Fold

Below, an explanation will be made of the operation of the processor 1 (FIG. 10) taking as an example a case where the original image is enlarged 10/7-fold by the cubic approximation method.

The processing for enlarging the length of the original image 10/7-fold in the horizontal direction is realized by setting the positional relationship of pixels between the interpolation pixel (interpolation point) and the pixel of the original image as mentioned above by referring to FIG. 8 to perform the interpolation filter operation.

FIG. 11 is a graph exemplifying the value of the data of each constituent part of the processor 1 (FIG. 10) for performing the processing for enlarging the length of the original image 10/7 times in the horizontal direction for every processing cycle. Note that, in actuality, in the processor 1 for performing the image processing by hardware, a delay (latency) occurs for the realization of a high speed operation where the multipliers $104_1$ to $104_4$ and the adder 106 perform the multiplication and the calculation of the sum by pipeline processing, but for the convenience of illustration and explanation, a case where the latency does not occur in the processor 1 is shown in FIG. 11.

The processor 1 performs the filter operation shown 10 in FIG. 11 for every cycle using the cycle at which one pixel's worth of pixel data of the original image is input as the processing cycle of outputting one pixel's worth of the enlarged image. Note that, in actuality, the cycle at which one pixel's worth of the pixel data of the original image is input is a little shorter than the processing cycle.

First Cycle (FIG. 11)

As shown in FIG. 11, in a first cycle, the value of the control signal takes the logical value 1 (H) and a first pixel data R1 of the original image is input to the register $102_1$ from an external image processing apparatus.

At the starting point of the first cycle, the registers $102_1$ to $102_4$ respectively hold the pixel data Rm0 to Rm3 of the original image input to the registers $102_1$ one to four cycles before the pixel data R1, perform the shift operation at the timing at which the clock signal CLK rises after the start of the first cycle, and newly hold the pixel data R1 and Rm0 to Rm2.

Second Cycle (FIG. 11)

In a second cycle, the value of the control signal takes the logical value 1 (H), and the second pixel data R2 of the original image is input to the register $102_1$ from the external image processing apparatus.

At the starting point of the second cycle, the registers $102_1$ to $102_4$ respectively hold the pixel data R1 and Rm0 to Rm2, perform the shift operation at the timing at which the clock signal CLK rises after the start of the second cycle, and newly hold the pixel data R2, R1, Rm0, and Rm1.

Third Cycle (FIG. 11)

In a third cycle, the value of the control signal takes the logical value 1 (H), and the third pixel data R3 of the original image is input to the register $102_1$ from the external image processing apparatus.

At the starting point of the third cycle, the registers $102_1$ to $102_4$ respectively hold the pixel data R2, R1, Rm0, and Rm1, perform the shift operation at the timing at which the clock signal CLK rises after the start of the third cycle, and newly hold the pixel data R3, R2, R1, and Rm0.

Fourth Cycle (FIG. 11)

In a fourth cycle, the pixel data R4 of the next original image is input to the register $102_1$. Note that, as will be mentioned later, the pixel data of the original image used for the generation of the interpolation pixel data (Q1) in the fourth cycle is used for the generation of the interpolation pixel data (Q2) also in a fifth cycle as it is, therefore the external image processing apparatus (control device) changes the value of the control signal to the logical value 0 (L), and the registers $102_1$ to $102_4$ do not perform a shift operation, but hold the pixel data R3, R2, Rm0, and Rm1 the same as those of the third cycle.

Further, the outside connected image processing apparatus (control device) outputs the filter selection signal P0 corresponding to the phase P (FIG. 8) in the case where the positional relationship between the pixels of the original image and interpolation pixels (FIG. 3), that is, the pixels Ra, Rb, Rc, and Rd of the original image and the interpolation pixel Q shown in FIG. 8, are respectively defined as the pixel data Rm0 and R1 to R3 and the interpolation pixel data Q1 shown in FIG. 11 to the coefficient memory 100.

FIG. 12 is a graph showing 10 types of filter coefficient sets stored by the coefficient memory 100 of the processor 1 shown in FIG. 10.

Note that FIG. 12 shows the value of the filter coefficient by a decimal point representation and 8-bit representation by assigning 10 types of phases P (FIG. 3) which may be produced when performing the processing for enlarging the length of the original image to 10/7 times as the variable x into equation 4 and limiting the data length to 8 bits (maximum amplitude: 128).

When the length of the original image is enlarged to 10/7 times, as shown in FIG. 3, the positional relationship between pixels of 10 types of original images and interpolation pixels (phase P; FIG. 8) is produced. Accordingly, the coefficient memory 100 stores 10 types of filter coefficient sets (FIG. 12) respectively corresponding to positional relationships shown in FIG. 3 in advance, selects any of the stored 10 types of filter coefficient sets based on the filter selection signal Pk (k=0 to 9) input in each cycle after the fourth cycle, and sets four filter coefficients FC1 to FC4 composing the selected filter coefficient set in the multipliers $104_1$ to $104_4$, respectively.

That is, the external image processing apparatus (control device) outputs the filter selection signal Pk corresponding to the k-th phase P to the coefficient memory 100 when the position of the pixel of the original image and the position of the interpolation pixel (interpolation point) have the positional relationship of the k-th phase P among 10 phases obtained by equally dividing the sampling interval S (FIG.

8) by 10, and the coefficient memory 100 selects the filter coefficient set in accordance with the filter selection signal Pk input from the image processing apparatus (control device) and sets the filter coefficients FC1 to FC4 contained in the selected filter coefficient set in the multipliers $104_1$ to $104_4$, respectively.

In the fourth cycle, as exemplified in FIG. 11, the position of a pixel of the original image and the position of an interpolation pixels (interpolation points) have the relationship of the 0-th phase P. The external image processing apparatus (control device) outputs the filter selection signal P0 to the coefficient memory 100. The coefficient memory 100 selects a filter coefficient set (0.0, 1.0, 0.0, 0.0 (0, 128, 0, 0 in 8- bit representation)) corresponding to the phase P0 shown in FIG. 12 in accordance with the filter selection signal P0 input from the external image processing apparatus and outputs four filter coefficients FC1 to FC4 (0.0, 1.0, 0.0, 0.0) comprising the selected filter coefficient set to the multipliers $104_1$ to $104_4$, respectively.

The multipliers $104_1$ to $104_4$ respectively multiply the pixel data of the original image input from the registers $102_1$ to $102_4$ and the filter coefficients FC1 to FC4 input from the coefficient memory 100, and the adder 106 calculates the sum of the four results of multiplication input from the multipliers $104_1$ to $104_4$.

In this way, the multipliers $104_1$ to $104_4$ and the adder 106 perform a summation operation and output the result of the summation operation as the interpolation pixel data Q1.

Fifth Cycle (FIG. 11)

At the starting point of the fifth cycle, the registers $102_1$ to $102_4$ respectively hold the pixel data R3, R2, R1, and Rm0 held in the fourth cycle, and the fourth pixel data R4 of the original image the same as that of the fourth cycle is input to the register $102_1$ from the external image processing apparatus (control device).

Further, in the fifth cycle, the value of the phase P of the interpolation pixel Q2 with respect to the position of the pixel R1 is (7/10), therefore the external image processing apparatus (control device) outputs a filter coefficient set P7 corresponding to the seventh phase P (7/10) to the coefficient memory 100.

The coefficient memory 100 outputs four filter coefficients FC1 to FC4 of a filter coefficient set corresponding to the filter selection signal P7 (FIG. 12; −0.147, 0.363, 0.847, −0.063 (−19, 46, 108, −8 in 8-bit representation)) to the multipliers $104_1$ to $104_4$.

The multipliers $104_1$ to $104_4$ and the adder 106 perform a summation operation in the same way as that in the fourth cycle and output the result of the summation operation as the interpolation pixel data Q2.

Note that, as will be mentioned later, in a sixth cycle, the next interpolation pixel data Q3 is calculated from the pixel data R4 to R1, therefore, in the fifth cycle, the external image processing apparatus (control device) changes the value of the control signal to the logical value 1 (H) and outputs the same to the registers $102_1$ to $102_4$ as shown in FIG. 11 to authorize the shift operation.

The registers $102_1$ to $102_4$ perform the shift operation at the timing at which the clock signal CLK rises after the summation by the multipliers $104_1$ to $104_4$ and the adder 106 is terminated in accordance with the value of the input control signal and newly hold the pixel data R4 to R1.

Sixth Cycle (FIG. 11)

At the starting point of the sixth cycle, the registers $102_1$ to $102_4$ respectively hold the pixel data R4 to R1, and the fifth pixel data R5 is input to the register $102_1$ from the external image processing apparatus (control device).

Further, in a seventh cycle, as shown in FIG. 11, the interpolation pixel data Q4 is generated from the pixel data R5 to R2 of the original image, therefore the external image processing apparatus (control device) changes the value of the control signal to the logical value 1 (H) and outputs the same to the registers $102_1$ to $102_4$ to authorize the shift operation.

Further, the value of the phase P in the sixth cycle becomes a value (14/10) obtained by further adding (7/10) to the original value of the phase P in the fifth cycle (7/10). However, the external image processing apparatus delays the phase of the pixel of the original image by the amount of exactly one pixel data (10/10) in the fourth to fifth cycles, therefore, the value of the phase P in the sixth cycle becomes a value (4/10) obtained by subtracting (10/10) from (14/10).

Further generally speaking, for example, where the phase relationship between a pixel of the original image and an interpolation pixel is as shown in FIG. 3, the value of the phase P in the m-th cycle (m=4, 5, . . . ) becomes ({mod (10, 7 (m−4))}/10). That is, in the m-th cycle, the external image processing apparatus (control device) sets the filter selection signal Pk corresponding to the phase P of the value reducing the result of a modulo 10 operation of 7(m−4) to 1/10 with respect to the coefficient memory 100.

Accordingly, the external image processing apparatus (control device) outputs the filter selection signal P4 corresponding to the value of the phase P (4/10) to the coefficient memory 100 in the sixth cycle.

The coefficient memory 100 outputs four filter coefficients FC1 to FC4 of a filter coefficient set corresponding to the filter selection signal P4 (FIG. 12; −0.096, 0.744, 0.496, −0.144 (−12, 95, 63, −18 in 8-bit representation)) to the multipliers $104_1$ to $104_4$ respectively.

The multipliers $104_1$ to $104_4$ and the adder 106 perform a summation operation in the same way as that in the fourth and fifth cycles and output the result of the summation operation as the interpolation pixel data Q3.

The registers $102_1$ to $102_4$ perform the shift operation at the timing at which the clock signal CLK rises after the summation by the multipliers $104_1$ to $104_4$ and the adder 106 is terminated in accordance with the value of the input control signal and newly hold the pixel data R5 to R2.

Below, similarly, in each cycle k (7≧k), the processor 1 performs the processing as shown in FIG. 11, successively calculates the output data (interpolation pixel data Q (k−3)) from the pixel data of the original image, and outputs the same to the outside.

As explained above, the processor 1 (FIG. 10) can perform the filtering with respect to the original image and perform the enlargement. That is, the processor 1 can perform the enlargement and/or reduction of the original image and the conversion of the resolution by hardware, in other words, by utilizing an electronic circuit provided corresponding to each processing.

However, when the original image is enlarged and/or reduced (conversion of number of pixels) by using the processor 1, the data rate of the original image input from the external image processing apparatus and the data rate of the enlarged image output by the processor 1 fluctuate due to the change of the number of pixels.

That is, for example, as mentioned above, where the original image is enlarged by using the processor 1 and the conversion is carried out to increase the number of pixels, the average value of the data rates of the enlarged image output by the processor 1 inevitably becomes fast.

Contrarily, where the original image is reduced and converted for decreasing the number of pixels by using the processor 1, the data rate of the reduced image output by the processor 1 becomes low.

Accordingly, in actuality, the processor 1 is constituted so that buffer memories are provided on the input side and the output side, the image data of the input original image and the image data of the enlarged and/or reduced image are buffered, and the data rate is held constant.

Further, where the enlargement and/or reduction etc. of the original image are carried out by using the processor 1, desirably various image processings, television signal processing, noise elimination, etc. are carried out in parallel.

However, the processor 1 only performs the enlargement and/or reduction and the conversion of the resolution by using dedicated hardware and can not perform the noise elimination etc. Accordingly, in order to perform these processings and other processings in parallel, it is necessary to separately use a plurality of apparatuses for respectively performing the noise elimination etc. other than the processor 1, therefore the scale of the entire processing apparatus becomes large.

SIMD Parallel Processor

In order to cope with such a problem, for example, there is a method of performing the enlargement and/or reduction etc. of the original image and the noise elimination etc. by software in parallel by using a parallel processor of the SIMD (Single instruction stream multiple data stream) control system.

Configuration of SIMD Parallel Processor 2

Below, the configuration of the parallel processor 2 will be explained.

Figure 13:
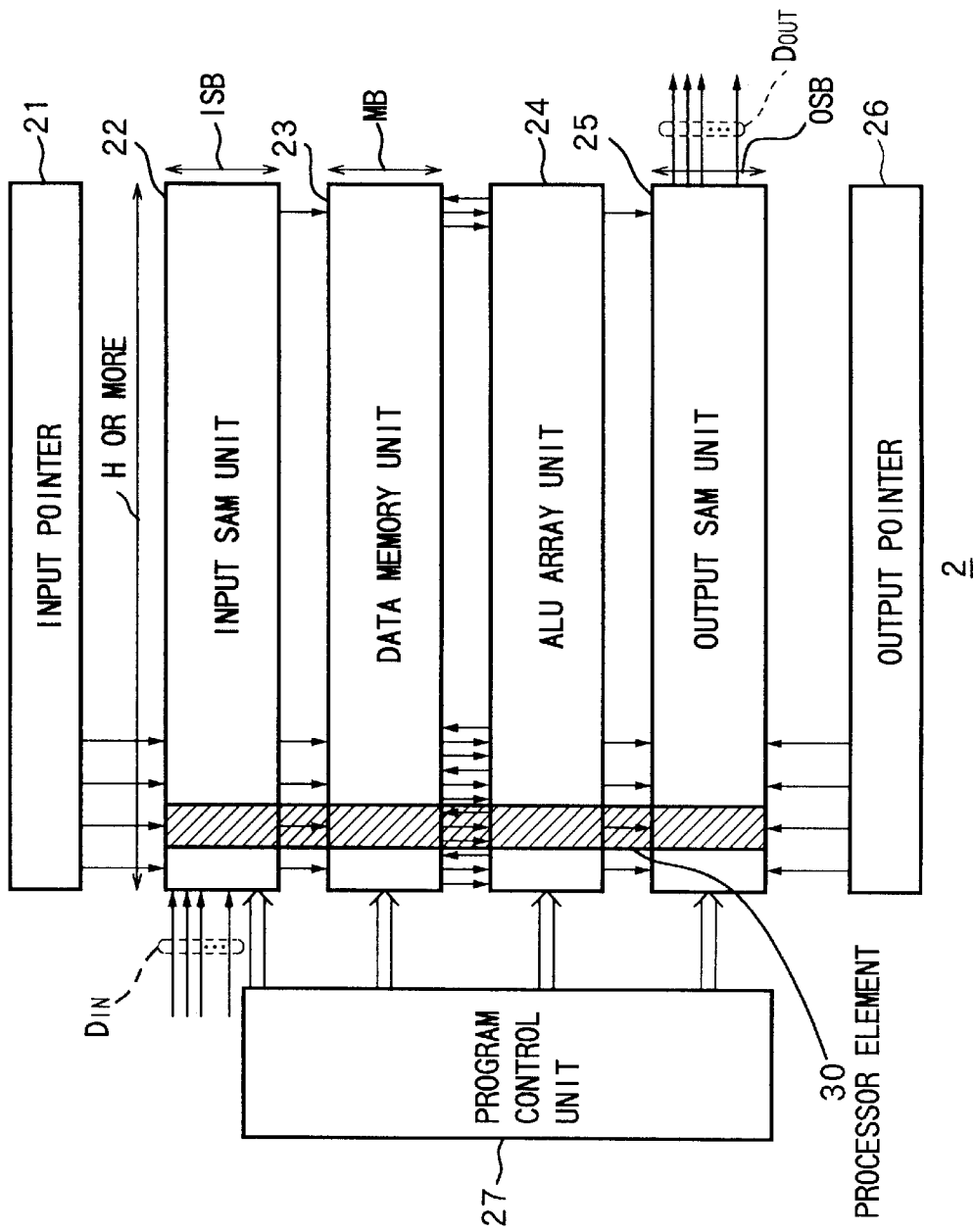
FIG. 13 is a block diagram of an example of the configuration of an apparatus for performing the filter operation by software.

FIG. 13 is a view of an example of the configuration of the parallel processor 2 for performing the image processing by software.

As shown in FIG. 13, the parallel processor 2 is constituted by an input pointer 21, an input SAM (serial access memory) unit 22, a data memory unit 23, an ALU array unit 24, an output SAM unit 25, an output pointer 26, and a program control unit 27.

Among these constituent parts, the input SAM unit 22, the data memory unit 23, and the output SAM unit 25 are mainly constituted by memories.

The input SAM unit 22, data memory unit 23, ALU array unit 24, and output SAM unit 25 constitute a plurality of (not less than one horizontal scanning period's worth of a number of pixels H of the original image) processor elements 30 arranged in parallel in a linear array format.

Each (single element) of the processor elements 30 has the constituent parts of an independent processor and corresponds to a part indicated by hatching in FIG. 13. Further, a plurality of processor elements 30 are arranged in parallel in a lateral direction in FIG. 13 and constitute a processor element group.

Constituent Parts of Parallel Processor 2

Below, the constituent parts of the parallel processor 2 will be explained.

Program Control Unit 27

The program control unit 27 is constituted by a program memory, a sequence control circuit for controlling the progress of the program stored in the program memory, a "row" address decoder for memories constituting the input SAM unit 22, the data memory unit 23, and the output SAM unit 25, and so on (all are not illustrated).

The program control unit 27 stores a single program by these constituent parts, generates various control signals based on the stored single program for every horizontal scanning period of the original image, and controls all processor elements 30 in cooperation via various generated control signals to perform the processing with respect to the image data. The control of a plurality of processor elements based on a single program in this way will be referred to as SIMD control.

Input Pointer 21

The input pointer 21 is a 1-bit shift register which shifts a 1-bit signal (input pointer signal (SIP)) of the logical value 1 (H) whenever one pixel of the original image's worth of pixel data is input from an external image processing apparatus (not illustrated) so as to designate the processor element 30 in charge of the input one pixel's worth of the pixel data and writes the corresponding pixel data of the original image into the input SAM unit 22 (input SAM cell) of the designated processor element 30.

That is, the input pointer 21 first sets the input pointer signal for the processor element 30 of the left end of FIG. 13 to the logical value 1 for every horizontal scanning period of the original image, writes the first pixel data of the original image input in accordance with the clock signal in synchronization with the pixel data into the input SAM unit 22 of the processor element 30 of the left end of the parallel processor 2 shown in FIG. 13. After this, whenever the clock signal changes by the amount of one cycle, the input pointer signal of the logical value 1 for the right adjoining processor element 30 successively shifts rightward so that one pixel's worth of the image data of the original image at a time is written into the input SAM unit 22 of each of the processor elements 30.

Processor Element 30

Each of the processor elements 30 is a 1-bit processor which performs a logic operation and an arithmetic operation with respect to each of the pixel data of the original image input from the external image processing apparatus. The processor elements 30 as a whole realize filtering etc. in the horizontal direction and vertical direction by a FIR digital filter.

Note that the SIMD control by the program control unit 27 is carried out in cycles of the horizontal scanning period, therefore, each processor element 30 can execute at the maximum a program of a number of steps obtained by dividing the horizontal scanning period by the cycle of the command cycle of the processor element 30 for every horizontal scanning period.

Further, the processor element 30 is connected to adjoining processor elements 30 and has a function of performing inter-processor communication with adjoining processor elements 30 according to need. That is, each of the processor elements 30 can access the data memory unit 23 etc. of for example the right adjoining or left adjoining processor element 30 under the SIMD control of the program control unit 27 to perform processing. Further, by repeating the access to the right adjoining processor elements 30, the processor element 30 can access the data memory unit 23 of a processor element 30 which is not directly connected to it and can read the data there. The processor elements 30 as a whole utilize the communication function between adjoining processors to realize filtering in the horizontal direction.

Here, if inter-processor communication is carried out when, for example, processing with pixel data about 10 pixels away in the horizontal direction becomes necessary, the number of program steps becomes very large, but actual FIR filtering contains almost no processing with pixel data 10 pixels away. Most of the processing is with respect to continuous pixel data. Accordingly, there is almost never a case where the program steps of the FIR filtering for the inter-processor communication are increased and the processing becomes inefficient.

Further, each of the processor elements 30 always exclusively handles pixel data at the same position in the horizontal scanning direction in processing. Accordingly, it is possible to change the write address of the destination data memory unit 23 of transfer of the pixel data (input data) of the original image from the input SAM unit 22 at every initial period of the horizontal scanning period and hold the input data of the past horizontal scanning period, therefore the processor element 30 can filter the pixel data of the original image in the vertical direction as well.

Input SAM Unit 22

In each of the processor elements 30, the input SAM unit 22 stores one pixel's amount of the pixel data (input data) input to an input terminal DIN from an external image processing apparatus when the input pointer signal which is input from the input pointer 21 becomes the logical value 1 as mentioned above. That is, the input SAM unit 22 of the processor element 30 stores one horizontal scanning period's worth of the pixel data of the original image for every horizontal scanning period as a whole. Further, the input SAM unit 22 transfers one horizontal scanning period's worth of the stored pixel data (input data) of the original image to the data memory unit 23 according to need in the next horizontal scanning period under the control of the program control unit 27.

Data Memory Unit 23

The data memory unit 23 stores the pixel data of the original image, data being processed, constant data, etc. input from the input SAM unit 22 under the control of the program control unit 27 and outputs the same to the ALU array unit 24.

ALU Array Unit 24

The ALU array unit 24 performs arithmetic operations and the logic operations with respect to the pixel data of the original image, data being processed, constant data, etc. input from the input SAM unit 22 and stores the same at predetermined addresses of the data memory unit 23.

Note that, the ALU array unit 24 performs all processing with respect to the pixel data of the original image in units of bits and performs the processing for one bit's worth of the data every cycle.

The processing time of the ALU array unit 24 will be explained by giving a concrete example.

For example, where the ALU array unit 24 performs a logic operation on two 8-bit configuration pixel data, at least 8 cycles' worth of processing time is required, while where it performs addition of two 8-bit configuration pixel data, at least 9 cycles worth of processing time is required. Further, where the ALU array unit 24 performs multiplication with respect to two 8-bit configuration pixel data, since this multiplication is equivalent to the addition of 64 bits, a processing time of at least 64 cycles is required.

Output SAM Unit 25

The output SAM unit 25 receives the transfer of the result of the processing from the data memory unit 23 when the processing allocated to one horizontal scanning period is terminated under the control of the program control unit 27 and further outputs the same via the output SAM unit 25 in the next horizontal scanning period.

Processing Format of Processor Element 30

Note that input for writing the pixel data (input data) of the original image in each of the processor elements 30 into the input SAM unit 22 (first processing), transfer of the input data stored in the input SAM unit 22 to the data memory unit 23, operations by the ALU array unit 24, and transfer of the result of the processing (output data) to the output SAM unit 25 under the control of the program control unit 27 (second processing), and the output of the output data from the output SAM unit 25 (third processing) are executed by the pipeline format setting the processing cycle as one horizontal scanning period.

Accordingly, when taking note of the input data, each of first to third processings with respect to the same input data requires one horizontal scanning period's worth of processing time and three horizontal scanning periods' worth of processing time is required for the start to end of these three processings. However, since these three processings are executed in parallel in the pipeline format, when averaging them, only one horizontal scanning period's worth of processing time is required for the processing of one horizontal scanning period's worth of input data.

Operation of Parallel Processor 2

Below, an explanation will be made of the operation of the linear array type parallel processor (parallel processor 2) for image processing shown in FIG. 13.

The input pointer 21 successively shifts the input pointer signal of the logical value 1 (H) with respect to each processor element 30 in accordance with the clock in synchronization with the pixel data of the input original image in the initial horizontal scanning period (first horizontal scanning period) so as to designate the processor element 30 which takes charge of each of pixel data of the original image and performs the processing for this.

The pixel data of the original image is input to the input SAM unit 22 via the input terminal DIN. The input SAM unit 22 stores one pixel's worth of pixel data of the original image in each of the processor elements 30 in accordance with the logical value of the input pointer signal.

When the input SAM units 22 of all processor elements 30 corresponding to the pixels contained in one horizontal scanning period store the pixel data of the original image and store one horizontal scanning period's worth of the pixel data as a whole, the input (first processing) is terminated.

The program control unit 27 executes the processing with respect to the pixel data of the original image by performing SIMD control of the input SAM unit 22, data memory unit 23, ALU array unit 24, and output SAM unit 25 of the processor elements 30 according to a single program for every horizontal scanning period when the input (first processing) is terminated.

That is, in the next horizontal scanning period (second horizontal scanning period), each of the input SAM unit 22 transfers each of the pixel data (input data) of the original image stored in the first horizontal scanning period to the data memory unit 23.

Note that, this data transfer is realized by controlling the input SAM unit 22 and data memory unit 23 so that the program control unit 27 activates the input SAM read signal (SIR) (to logical value 1 (H)), selects and accesses the data of the predetermined row (ROW) of the input SAM unit 22, and further activates the memory access signal (SWA) and writes the accessed data into the memory cell (mentioned later) of the predetermined row of the data memory unit 23.

Next, the program control unit 27 controls the processor elements 30 based on the program, makes the data memory unit 23 output the data to the ALU array unit 24 therefrom, makes the ALU array unit 24 perform the arithmetic operation and the logic operation, and makes the data memory unit 23 write the result of the processing at the predetermined address thereof.

When the arithmetic operation and logic operation in accordance with the program are terminated, the program control unit 27 controls the data memory unit 23 and makes this transfer the result of the processing to the output SAM unit 25 (up to this the second processing). Further, in the next horizontal scanning period (third horizontal scanning period), it controls the output SAM unit 25 and makes this output the result of the processing (output data) to the outside (third processing).

That is, one horizontal scanning period's worth of the input data stored in the input SAM unit 22 is in accordance with need transferred to the data memory unit 23 where it is stored in the next horizontal scanning period and used for the processing in the subsequent horizontal scanning period.

Second Embodiment

Below, a second embodiment of the present invention will be explained.

Problem of Parallel Processor 2 (FIG. 13)

According to the parallel processor 2 (FIG. 13) explained as the first embodiment, a general FIR digital filter can be realized. However, where the enlargement and/or reduction of the image or conversion of resolution requiring interpolation are carried out by one type of FIR digital filter, since the number of data stored in the input SAM unit 22 and the number of data output by the output SAM unit 25 are different, the pixel data (input data) Ri of the original image and the result of the processing (output data) Qi cannot be densely arranged in the input SAM unit 22 and the output SAM unit 25. Note that the impossibility of dense arrangement means that, for example, as will be mentioned later by referring to FIG. 14, input side pixels are thinly arranged like the pixel data Ri in the input SAM unit 22 in the case of the enlargement or the output side pixels are thinly arranged like the output data Q in the data memory unit 23 in the case of reduction.

That is, in the parallel processor 2, in contrast to the fact that the positional relationship with the adjoining pixels in the horizontal direction required for the operation is different depending on the processor element 30, since all processor elements 30 perform the same operation under the SIMD control of the program control unit 27, the addresses respectively accessed by processor elements 30 cannot be individually set. Accordingly, in the parallel processor 2, it is difficult to transfer the data required for the interpolation by inter-processor communication among a plurality of processor elements 30.

The problem of the parallel processor 2 mentioned above will be further explained by giving a concrete example.

Figure 14:
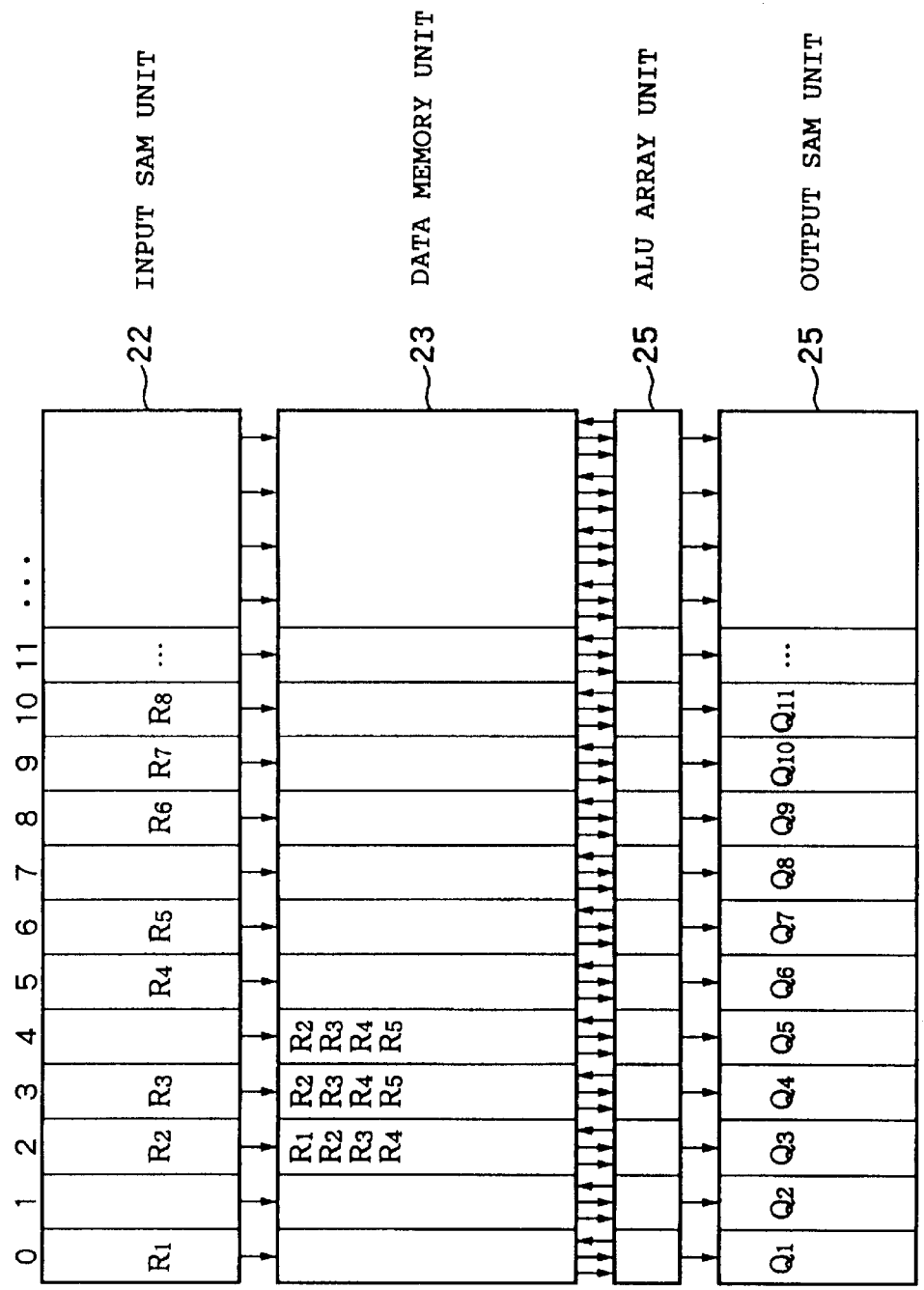
FIG. 14 is a view of an example of a pattern of supply of input data in a case where the image is enlarged in the apparatus of FIG. 13.

FIG. 14 is a view of the arrangement of data stored in the input SAM unit 22, data memory unit 23, and output SAM unit 25 of the processor elements 30 when enlarging the length of the original image to (10/7) times by the parallel processor 2 (FIG. 13).

For example, where performing filtering utilizing cubic approximation, as mentioned above, a convolution operation with respect to four consecutive pixel data (input data) of the original image is necessary. When taking as a concrete example enlargement for enlarging the length of the original image to (10/7) times, as shown in FIG. 14, since the image data Ri are not densely arranged among the processor elements 30, the input data R1, R3, and R4 among the input data R1 to R4 which become necessary when calculating for example the output data Q3 are respectively stored in the processor elements 30 away from the processor element 30 for calculating the result of the processing (output data) Q3 second to the left, first to the right, and third to the right.

On the other hand, the input data R2, R4, and R5 among the input data R2 to R5 required for the calculation of the output data Q4 are respectively stored in the processor elements 30 away from the processor element 30 for calculating the output data Q4 first to the left, second to the right, and third to the right.

Further, the input data R2 to R5 required for the calculation of the output data Q5 are respectively stored in the processor elements 30 away from the processor element 30 for calculating the output data Q5 second to the left, first to the left, first to the right, and second to the right.

FIG. 15 is a view of patterns of data reference relationship among processor elements 30 storing the input data required for the calculation of the output data when performing enlargement for enlarging the length of the original image to (10/) times by using the parallel processor 2 (FIG. 13).

As shown in FIG. 15, when performing enlargement for enlarging the original image to (10/7) times by using the parallel processor 2 (FIG. 13), the data reference relationship among the processor elements 30 storing the input data required for the calculation of the output data may be classified into five patterns.

As explained above, in the parallel processor 2, the positional relationship between the processor element 30 storing the input data Rk required for the calculation of the output data Q(k−3) and the processor element 30 calculating the output data Q(k−3) is not constant and changes for every output data Q(k−3).

Further, as explained above, since the phase P (FIG. 8) is different for every pixel, it is necessary to set a different filter coefficient set for every processor element 30.

Object and Summary of Second Embodiment

The parallel processor explained below as the second embodiment was designed to solve the problem of the parallel processor 2 (FIG. 13) shown as the first embodiment.

The parallel processor shown as the second embodiment is constituted so as to be able to easily perform the interpolation operation on the original image by SIMD control by the method of making the number of patterns of the positional relationship between other processor elements for storing the image data to be processed by the predetermined processor element and the predetermined processor element the minimum, giving the same pixel data (input data) of the original image to a plurality of processor elements, and further outputting respectively different filter coefficients to the processor elements or calculating the filter coefficient within the processor element.

Configuration of Parallel Processor 3

Below, the configuration of the parallel processor 3 will be explained.

Figure 16:
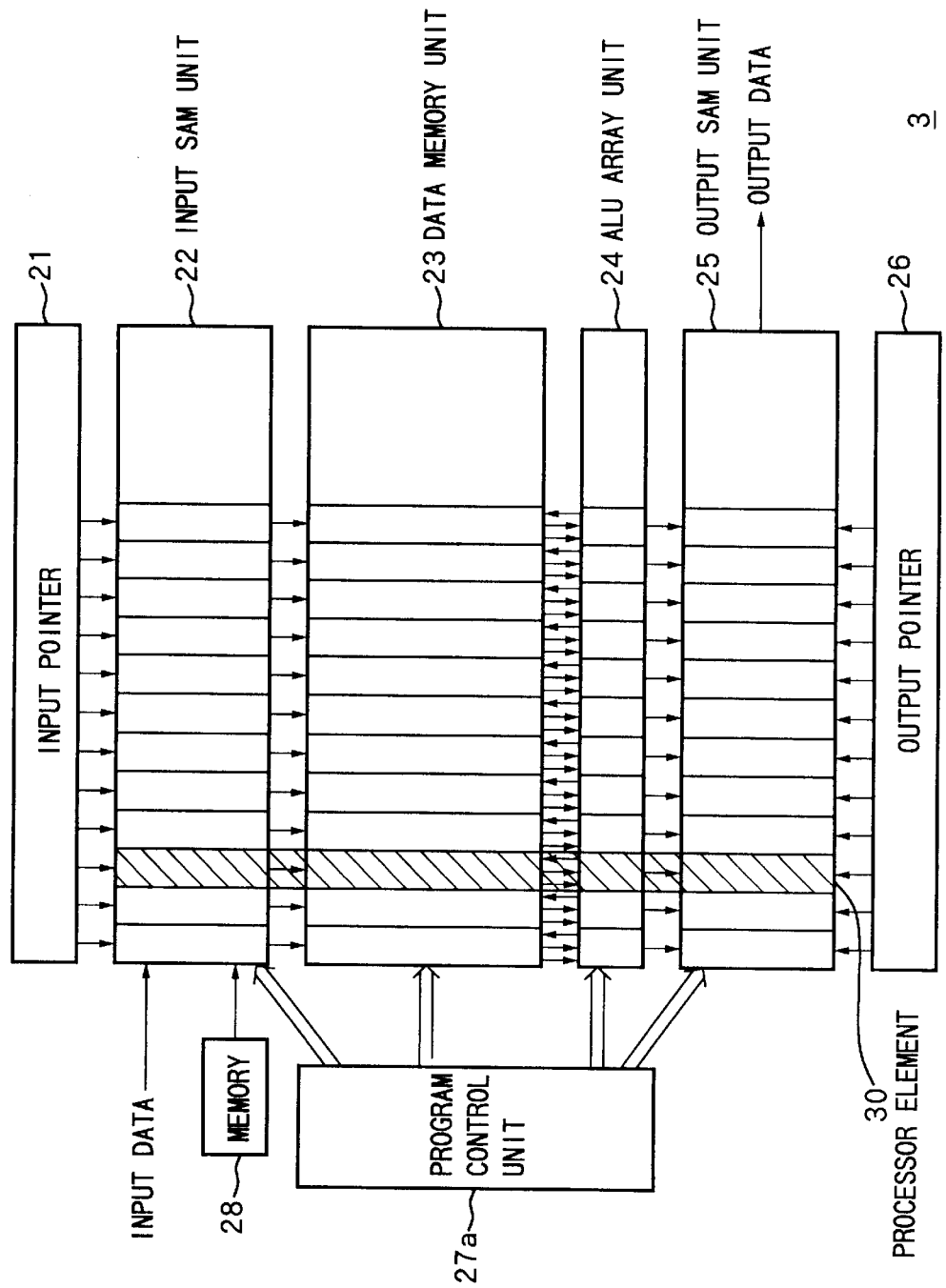
FIG. 16 is a block diagram of the configuration of a second embodiment of the image processing apparatus of the present invention.

FIG. 16 is a view of the configuration of the parallel processor 3 according to the present invention shown as the second embodiment. Note that, in FIG. 16, among the constituent parts of the parallel processor 3, the same constituent parts as those of the parallel processor 2 shown in FIG. 13 are indicated by the same reference numerals.

As shown in FIG. 16, the parallel processor 3 is constituted by the input pointer 21, input SAM unit 22, data memory unit 23, ALU array unit 24, output SAM unit 25, program control unit 27a, and memory 28.

That is, in the parallel processor 3, the program to be executed is different at first. It is configured replacing the program control unit 27 with the program control unit 27a among the constituent parts of the parallel processor 2 (FIG. 13) and further adding the memory 28. The input SAM unit 22, data memory unit 23, ALU array unit 24, and output SAM unit 25 constitute a plurality of processor elements 30 of not less than the number of pixels in one horizontal scanning period of the original image (input data) and the image (output data) obtained as the result of the processing in the same way as that in the parallel processor 2.

Constituent Parts of Parallel Processor 3

Below, the constituent parts of the parallel processor 3 will be explained.

Input Pointer 21

The input pointer 21 is a 1-bit shift register which selectively outputs an input pointer signal (SIP) to each of the processor elements 30 and controls the input SAM unit 22 in the same way as that in the parallel processor 2 to make this read the pixel data (input data) of the original image input from an external image processing apparatus.

Input SAM Unit 22

The input SAM unit 22 is mainly constituted by memories (input buffer memory 302 mentioned later referring to FIG. 17) provided corresponding to each of the processor elements 30 in the same way as that in the parallel processor 2 and stores the pixel data (input data) of the original image input to each of the processor elements 30 in accordance with the logical value of the input pointer signal (SIP) input from the input pointer 21.

Further, when the transfer control signal SIR input from the program control unit 27a is activated, the input SAM unit 22 outputs the stored input data to the data memory unit 23.

Data Memory Unit 23

The data memory unit 23 is mainly constituted by memories (data memories 304 mentioned later by referring to FIG. 17) provided corresponding to each of the processor elements 30 in the same way as that in the parallel processor 2 and stores the data input from the input SAM unit 22 or the ALU array unit 24 when the memory write access signal (SWA) input to each of the processor elements 30 from the program control unit 27a is activated.

Further, the data memory unit 23 outputs the stored data to the ALU array unit 24 when the memory read access signals (SRAA, SRBA) input from the program control unit 27a are activated.

ALU Array Unit 24

The ALU array unit 24 is constituted by ALUs (arithmetic and logical units 306 mentioned later by referring to FIG. 17) etc. in the same way as that in the parallel processor 2 and performs a logic operation and an arithmetic operation in units of bits under control of the program control unit 2a via the ALU control signal (SALU-CONT) on the data input from the data memory unit 23.

Output SAM Unit 25

The output SAM unit 25 is mainly constituted by memories (output buffer memories 308 mentioned later by referring to FIG. 17) provided corresponding to each of the processor elements 30 and stores the result of the processing (output data) input from the ALU array unit 24 when the output SAM write signal (SOW) input to each of the processor elements 30 from the program control unit 27a is activated. Further, the output SAM unit 25 outputs the stored data to the outside when the output pointer signal (SOP) input to each of the processor elements 30 from the output pointer 26 is activated.

Output Pointer 26

The output pointer 26 is a 1-bit shift register which selectively activates and outputs the output pointer signal (SOP) to the output SAM units 25 of the processor elements 30 to control the output of the result of the processing (output data).

Program Control Unit 27a

The program control unit 27a executes a program different from that of the first embodiment, activates or deactivates various control signals based on the single program stored in advance in the same way as the program control unit 27 of the parallel processor 2, and performs SIMD control for the processor elements 30.

Memory 28

The memory 28 (storing means) holds the data of the interpolation filter coefficients which are input from the external control use CPU (not illustrated) etc. at the time of activation in a horizontal blanking period, vertical blanking period, etc. and necessary for the filtering in all processor elements 30 in the order of the numbers of the processor elements 30.

Note that, in the parallel processor 3, at the time of activation, the filter coefficient sets stored in the memory 28 are output to the data memory units 23 of the processor elements 30 in the horizontal blanking period or the vertical blanking period.

Detailed Explanation of Processor Element 30

Below, the processor element 30 of the parallel processor 3 (FIG. 16) will be explained in detail by further referring to FIG. 17 and FIG. 18.

Figure 17:
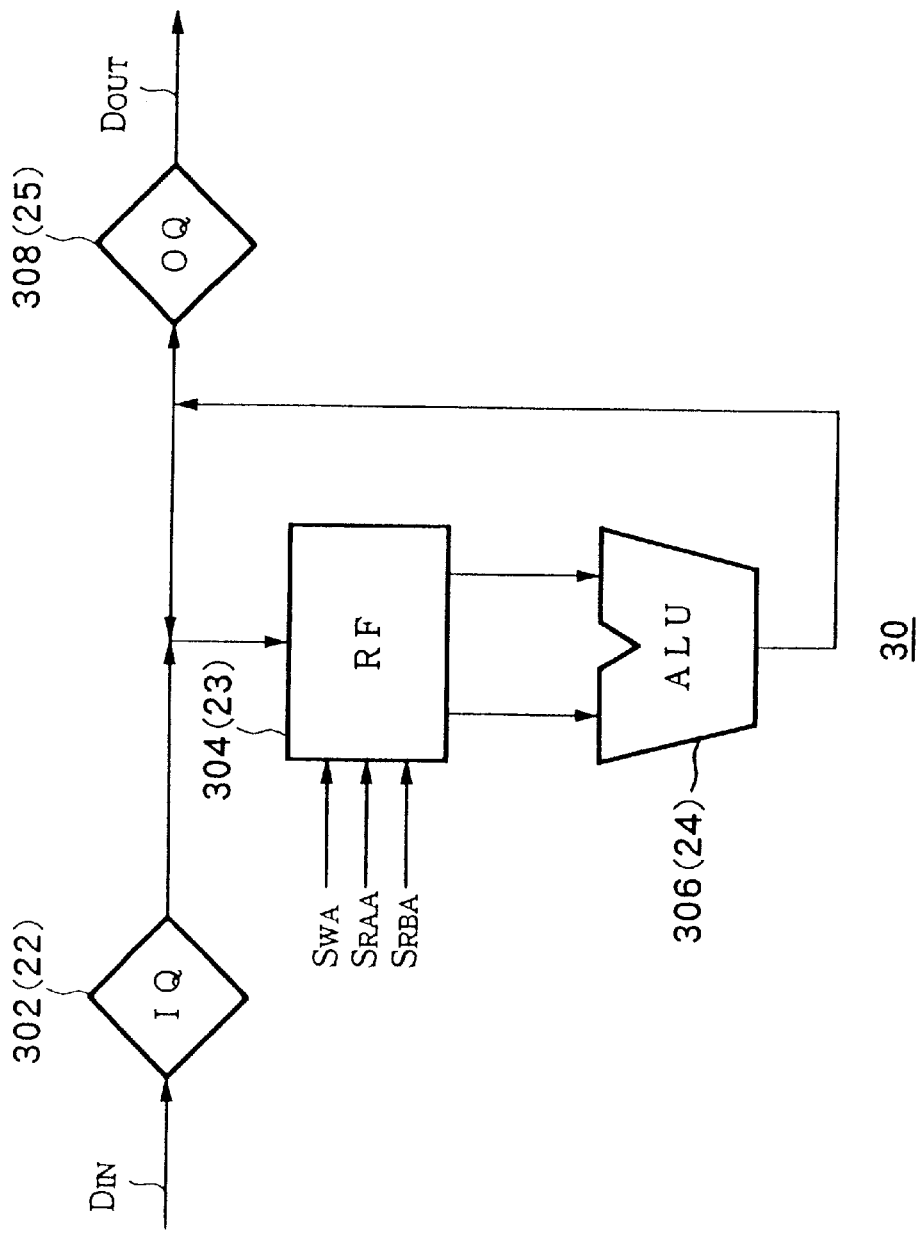
FIG. 17 is a block diagram of an example of the configuration of the processor element.

FIG. 17 is a view of an example of the configuration of the processor element 30 of the parallel processor 3 shown in FIG. 16.

As shown in FIG. 17, the processor element 30 of the parallel processor 3 is a 1-bit processor which is constituted by an input buffer memory (IQ) 302, a data memory (RF) 304, an ALU 306, and an output buffer memory (OQ) 308.

The cells of the input SAM unit 22, data memory unit 23, ALU array unit 24, and output SAM unit 25 (FIG. 16) respectively correspond to the input buffer memory 302, data memory 304, ALU 306, and output buffer memory 308 (FIG. 17) and constitute one processor element 30.

That is, the cells of the input SAM unit 22, data memory unit 23, and output SAM unit 25 in the processor element 30 constitute a "column" of memories.

In each of the processor elements 30, the input buffer memory 302 stores the pixel data (input data) of the original image once and transfers the same to the data memory 304.

The ALU 306 is constituted by a circuit mainly comprising a full adder, performs various operations in units of 1 bit with respect to the input data newly transferred to the data memory 304, data stored in the past, data stored on the middle of the processing, etc. under the control of the program control unit 27a, and stores the same again in the data memory 304.

Note that, the ALU 306 performs operations in units of 1 bit in the same way as the ALU array unit 24 of the parallel processor 2 unlike for example a general purpose processor for personal computers which performs operations in unit of words. Accordingly, the processor element 30 is a so-called bit processor.

By constituting the processor element 30 as a bit processor, the size of the hardware per processor element 30 is made small, the degree of parallelness is raised, and the number of parallel elements which can be contained in an LSI can be increased to more than one horizontal scanning period's worth of number of pixels H.

The output buffer memory 308 receives the result of the processing (output data) transferred from the data memory 304 under the control of the program control unit 27a, stores the same, and outputs the same to the outside.

Concrete Circuit Configuration of Processor Element 30

Figure 18:
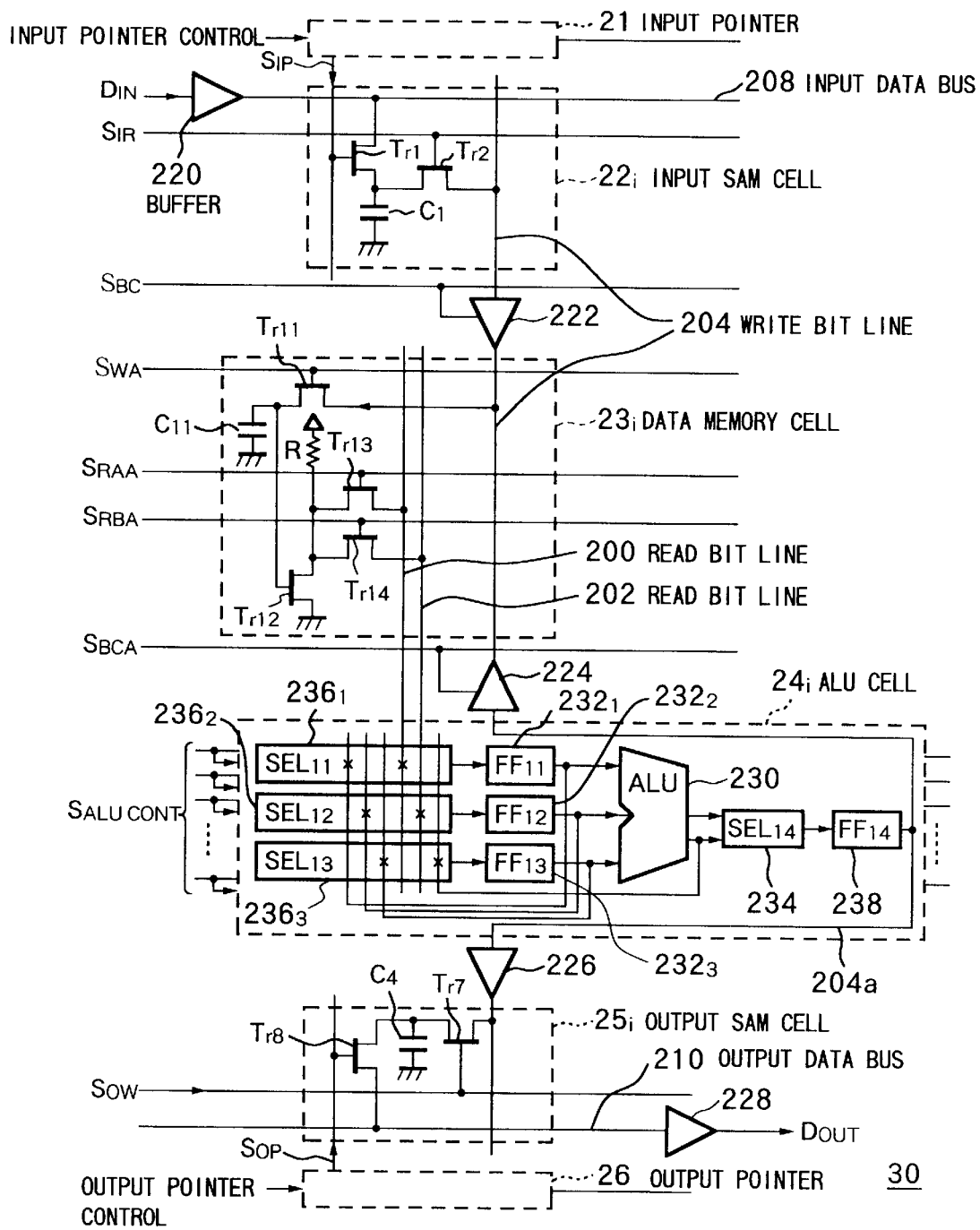
FIG. 18 is a circuit diagram of a detailed example of the configuration of the processor element.

FIG. 18 is a view of an example of the concrete detailed circuit configuration of the processor element 30 of the parallel processor 3 shown in FIG. 16. Note that, in FIG. 18, a very general circuit is shown for facilitating the understanding of the configuration of the processor element 30 and that only one circuit is shown for the convenience of illustration although there are a plurality of the same circuits.

Input SAM Cell $22_i$

As shown in FIG. 18, a part of the input SAM unit 22 (FIG. 16) corresponding to one processor element 30 (input buffer memory 302 (FIG. 17)) is constituted by an input SAM cell $22_i$ containing transistors Tr1 and Tr2 and a capacitor C1 and stores one bit's worth of the pixel data of the original image.

Note that, in actuality, the part of the input SAM unit 22 (input buffer memory 302) corresponding to one processor element 30 is constituted by ISB number of input SAM cells $22_1$ to $22_{ISB}$ corresponding to the bits (number ISB of bits) of the pixel data (input data) of the original image, but in FIG. 18, only one input SAM cell $22_1$ ($i \leq i \leq ISB$) is shown.

In the input SAM cell $22_1$, a gate terminal of a transistor Tr1 is connected to the input pointer 21. The other two terminals of the transistor Tr1 are respectively connected to an input data bus 208 and one end of the capacitor C1 for storing one bit of data.

Further, the input SAM read signal (SIR) is input to the gate terminal of the transistor Tr2 from the program control unit 27a. The other two terminals of the transistor Tr2 are respectively connected to a write bit line 204 and one end of the capacitor C1.

Further, one end of the capacitor C1 is connected to transistors Tr1 and Tr2 while the other end is grounded.

Data Memory Cell $23_i$

The part of the data memory unit 23 (data memory 304 (FIG. 17)) corresponding to one processor element 30 is constituted by a data memory cell $23_i$ ($1 \leq i \leq MB$) of a three-port configuration having three ports of two read bit lines 200 and 202 and one write bit line 204 containing transistors Tr11 to Tr14, a capacitor C11, and a resistor R.

Note that, in actuality, the part of the data memory unit 23 corresponding to one processor element 30 (data memory 304) has MB number of data memory cells $23_1$ to $23_{MB}$ corresponding to the number MB of bits required as the data memory, but in FIG. 18, only one data memory cell $23_i$ is shown.

In the data memory cell $23_i$, the memory access signal (SWA) is input to the gate terminal of the transistor Tr11 from the program control unit 27a. The other two terminals of the transistor Tr11 are respectively connected to the write bit line 204 and one end of the capacitor C11 storing one bit of data.

One end of the capacitor C11 is connected to the gate terminal of the transistor Tr12 and the transistor Tr11, while the other end is grounded.

Two terminals other than the gate terminal of the transistor Tr12 are connected to a negative power supply (ground) (grounded) and connected to a positive power supply (not illustrated) via the resistor R. Note that the resistor R can be omitted.

The memory read access signal SRAA signal is input to the gate terminal of the transistor Tr13 from the program control unit 27a, while the transistor Tr12 and resistor R and the read bit line 200 are respectively connected to the other two terminals of the transistor Tr13.

The memory read access signal SRBA is input to the gate terminal of the transistor Tr14 from the program control unit 27a, while the transistor Tr12 and resistor R and the read bit line 202 are respectively connected to the other two terminals of the transistor Tr14.

ALU Cell $24_1$

The part of the ALU array unit 24 (ALU 306 (FIG. 17)) corresponding to one processor element 30 is constituted by an ALU cell $24_i$ having an ALU circuit 230, flip-flops (FF) $232_1$ to $232_3$ and 238, and selectors (SEL) 234, $236_1$, to $236_3$.

In the ALU cell $24_i$, the ALU circuit 230 adopts a one-bit ALU configuration containing a full adder circuit, etc., performs a logic operation and arithmetic operation on 1-bit data input from the flip-flops $232_1$ to $232_3$, and outputs the result of the processing to the selector 234.

Output SAM Cell $25_i$

The part of the ALU array unit 24 (output buffer memory 308 (FIG. 17)) corresponding to one processor element 30 is constituted by an output SAM cell $25_i$ ($1 \leq i \leq OSB$) having transistors Tr7 and Tr8 and a capacitor C4 and operating under the control of the output pointer 26.

Note that OSB number of output SAM cells $25_i$ are actually provided corresponding to the number of bits (OSB) of the result of the processing (output data), but in FIG. 18, only one (output SAM cell $25_i$) among these output SAM cells $25_1$ to $25_{OSB}$ is shown for the simplification of illustration.

In the output SAM cell $25_i$, the output SAM write signal SOW is input to the gate terminal of the transistor Tr7 from the program control unit 27a. The write bit line 204a and one end of the capacitor C4 storing one bit of data are respectively connected to the other two terminals of the transistor Tr7.

One end of the capacitor C4 is connected to the transistors Tr7 and Tr8, while the other end is grounded.

The gate terminal of the transistor Tr8 is connected to the output pointer 26. One of the other two terminals is connected to the capacitor C4 and the transistor Tr7, while the other is connected to the output data bus 210.

Word Line, SiQnal Line, and Data Bus

All word lines of the processor element 30 shown in FIG. 18 are connected to other processor elements 30, are address decoded inside the program control unit 27a (FIG. 16), and transfer the input SAM read signal SIR, memory write line SWA, memory read access signals SRAA and SRBA, output SAM write signal SOW, etc. to all processor elements 30.

Further, the input data bus 208 is connected to the input SAM cells $22_1$ of all processor elements 30, while the output data bus 210 is connected to the output SAM cells $25_i$ of all processor elements 30.

Data Transfer and Operation by Processor Element 30

Below, an explanation will be made of the transfer and operation of the data by the processor element 30 of the parallel processor 3.

When the input pointer 21 designates the input SAM cell $22_1$ of the processor element 30, the transistor Tr1 of the designated input SAM cell $22_i$ is turned ON and makes the terminal voltage of the capacitor C1 a voltage in accordance with the pixel data (input data) of the original image input via the input data bus 208 and the buffer 220.

By this operation, the input SAM unit 22 (input buffer memory 302) of the processor element 30 designated by the input pointer 21 stores the pixel data (input data) of the original image.

Next, the program control unit 27a activates the input SAM read signal SIR and selects the input SAM cell $22_i$. The transistor Tr2 of the selected input SAM cell $22_i$ is turned ON and produces a transfer data signal in accordance with the voltage of the capacitor C1 in the write bit line 204.

Further, when the program control unit 27a activates a write bit line source switch signal SBC (logical value 1; H) to permit the output of the buffer 222 and further activates the memory access signal SWA (logical value 1; H), the transistor Tr11 of the data memory cell $23_i$ is turned ON and makes the terminal voltage of the capacitor C11 a voltage in accordance with the data stored in the capacitor C1 of the input SAM cell $22_i$.

Note that when the data is input from the ALU cell $24_i$ to the data memory cell $23_j$, the other write bit line source switch signal SBCA is output to the buffer 224.

Note that the data transfer to the data memory cell $23_i$ from the input SAM cell $22_i$ or the ALU cell $24_i$ mentioned above is carried out in accordance with the activation of the signal of the word line via the write bit line 204 by each bit per cycle.

Next, the ALU cell $24_i$ successively executes the processing in units of bits by using the pixel data (input data) of the original image which was input from the ALU cell $24_i$ or the input SAM cell $22_i$ to the data memory unit 23 and stored, data in the middle of operations, and/or the data stored in the flip-flops $232_1$ to $232_3$.

The processing of the ALU cell $24_i$ will be further explained by taking as a concrete example a case where the first data in the data memory cell $23_i$ corresponding to the predetermined bit of the data memory unit 23 and the second data in the data memory cell $23_j$ corresponding to the other bit are added and the result of addition is written into the data memory cell $23_j$ corresponding to the third bit.

The program control unit 27a activates and outputs the access signal SRAA for the first read bit 200 of the data memory unit 23 to the data memory cell $23_i$ corresponding to the predetermined bit of the data memory unit 23, turns the transistor Tr13 ON, and makes this output the first data stored in the capacitor C11 to one read bit line 200.

Simultaneously, the program control unit 27a activates the access signal SRBA signal for the first read bit 200 of the data memory unit 23 with respect to the data memory cell $23_j$ (i≈j) corresponding to the other bit and outputs the same, turns the transistor Tr14 ON, and makes this output the second data stored in the capacitor C11 to the other read bit line 202.

The first data and the second data read from the capacitor Cii of the data memory cells $23_i$ and $23_j$ are output to the ALU 230 via the selectors $236_1$ to $236_3$ of the ALU cell $24_i$.

The ALU circuit 230 performs the predetermined processing under the control of the program control unit 27a with respect to the first data and second data input from the data memory cells $23_i$ and $23_j$, outputs the result of the processing to the flip-flop 238 via the selector 234, and makes this hold the data.

Next, the program control unit 27a activates the second write bit line source switch signal SBCA and outputs the same to the ALU cell $24_i$, makes this output the result of the processing held in the flip-flop 238 to the write bit line 204, further activates the memory write bit line access signal SWA, outputs the same to the data memory cell $23_i$ corresponding to the predetermined third write address (usually SAM, but carry is sometimes used in the case of the MSB), turns the transistor Tr11 ON, and makes the terminal voltage of the capacitor C11 the voltage corresponding to the result of the processing.

Note that, the processing operation in the ALU cell $24_i$ is controlled by the program control unit 27a via the ALU control signal (SALU-CONT).

Further, the result of the processing in the ALU cell $24_i$ is written into the data memory unit 23 as mentioned above or stored in the flip-flop $232_3$ of the ALU cell $24_i$ in accordance with need.

Further, where the processing in the ALU 230 is addition, the ALU cell $24_i$ stores the carry obtained as the result of the addition in the flip-flop $232_3$ and stores the result of addition (sum) in the data memory unit 23.

Next, where making the data be output from the data memory cell $23_i$, the program control unit 27a activates the memory access signal SRAA or the memory access signal SRBA with respect to the data memory cell $23_i$ storing the result of the processing and outputs the same, turns the transistor Tr13 or Tr14 ON, and makes this output the data stored in the capacitor C11 to the read bit line 200 or the read bit line 202.

Further, the program control unit 27a outputs the predetermined control signal (SALUCONT) to the ALU cell $24_i$, makes the ALU cell $24_i$ transfer the data to the output SAM cell $25_i$ from the data memory cell $23_i$, activates the output SAM write signal SOW, outputs the same to the designated output SAM cell $25_i$, turns the transistor Tr17 ON, and makes the terminal voltage of the capacitor C4 a voltage in accordance with the data to make this hold the data.

Note that the data is transferred from the data memory cell $23_i$ to the output SAM cell $25_i$ bit by bit via the write bit line 204.

Further, it is also possible for the ALU circuit 230 to perform certain processing with respect to the transferred data at the time of transfer of the data.

Next, the output pointer 26 successively activates the output of the processor element 30 of the left end (FIG. 16) to the output of the processor element 30 of the right end according to the output use clock signal by the output pointer signal SOP, turns the transistor Tr8 of each output SAM cell $25_i$ ON, and makes this output the result of the processing (output data) in accordance with the voltage of the capacitor C4 to the output terminal DOUT via the output data bus 210.

Note that since a number of processor elements 30 corresponding to at least the number H of pixels of one horizontal scanning period of the original image and converted image are provided, under output control by the output pointer 26 mentioned above, one horizontal scanning period's worth of the conversion result (output data) is output for every horizontal period from the output SAM cell $25_i$ of each processor element 30 of the parallel processor 3.

Note that, as explained above, in the parallel processor 3, the filter coefficient sets are output from the memory 28 to the data memory units 23 of the processor elements 30 at the time of activation. When the filter coefficient sets are output from the memory 28 to the data memory unit 23, the filter coefficient sets are output to the input SAM unit 22 via part (predetermined bit number) of the input data bus 208 from the memory 28 and further transferred to the data memory unit 23.

As explained above, the processor elements 30 of the parallel processor 3 perform processing such as data input, data transfer, operation, and data output in accordance with various control signals input from the program control unit 27a and perform the filtering etc. with respect to the pixel data (input data) of the original image by the combination of these processings.

Enlargement by Parallel Processor 3

Below, an explanation will be made of the operation of the parallel processor 3 taking as a concrete example a case of enlarging the length of the pixel data of the original image to (10/7) times by further referring to FIG. 19 to FIG. 24.

Figure 19:
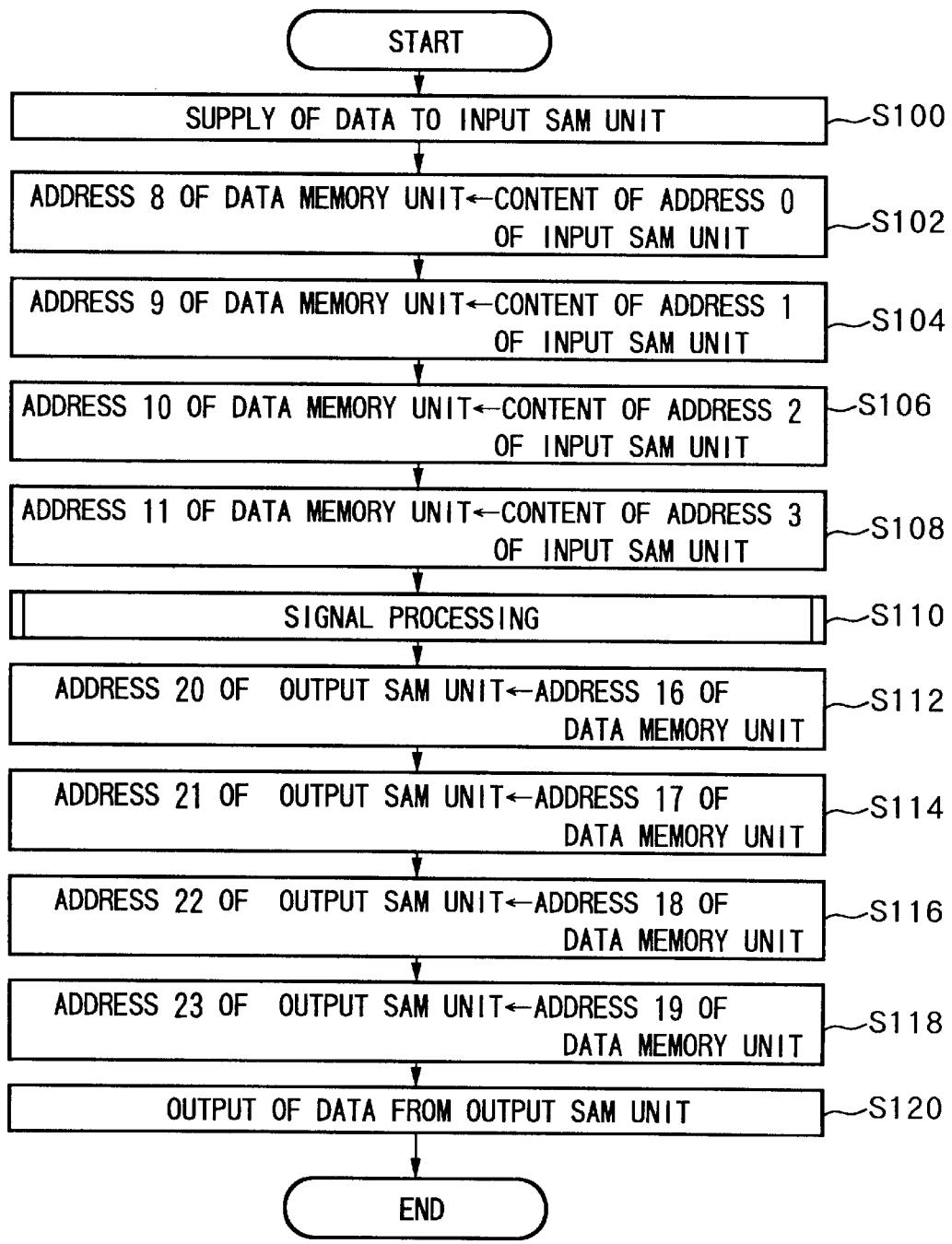
FIG. 19 is a flow chart explaining the operation of the image processing apparatus of FIG. 16.

FIG. 19 is a flow chart of the enlargement of the image by the parallel processor 3 shown in FIG. 16.

Figure 20:
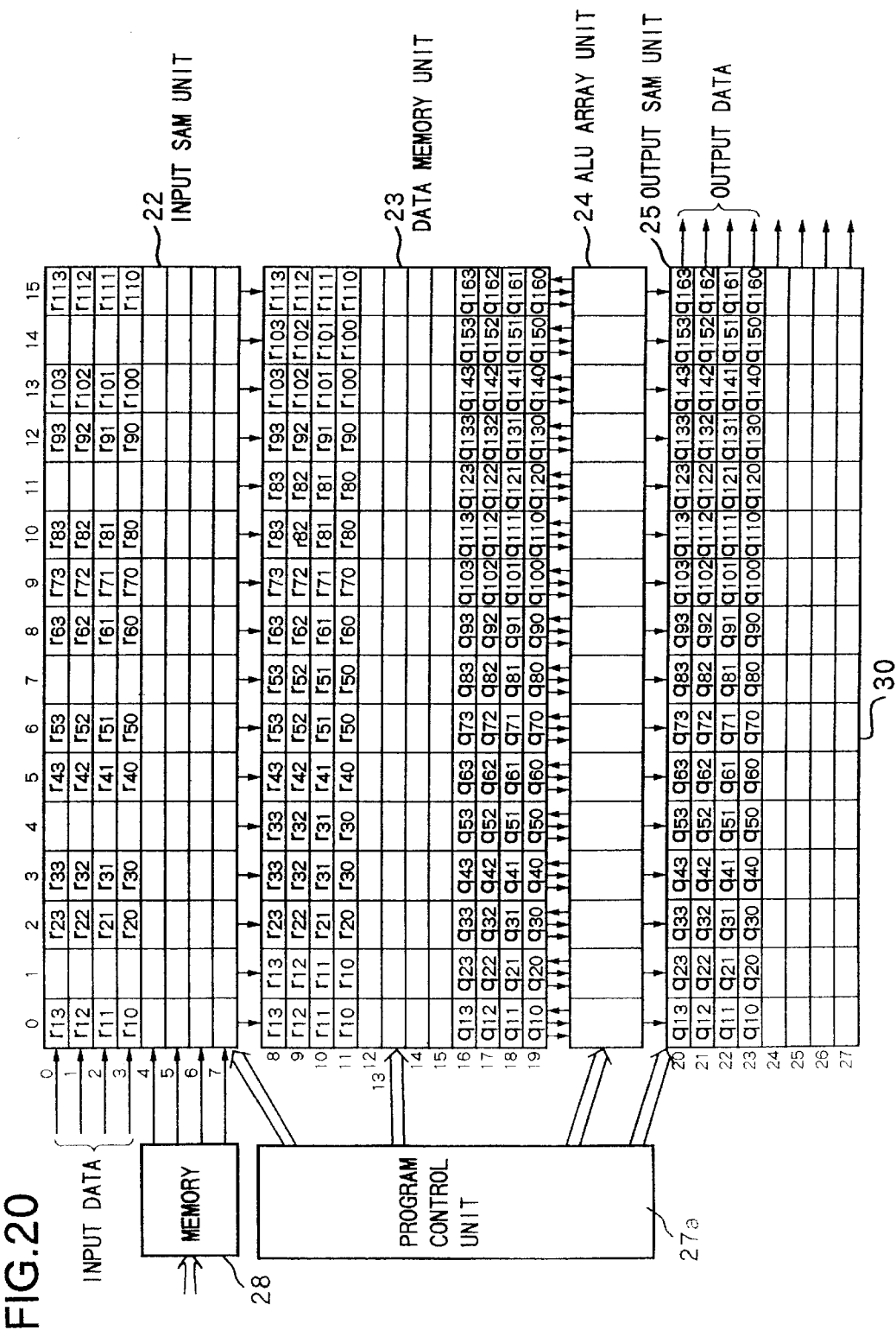
FIG. 20 is a view of an example of the data stored in each portion of the image processing apparatus of FIG. 16.

FIG. 20 is a view of the data stored in each constituent part of the parallel processor 3 (FIG. 16) when performing the enlargement of the image shown in FIG. 19.

Note that, in FIG. 20, each column of the input SAM unit 22 etc. corresponds to one bit. Note, the input data Ri and output data Qi consist of for example 8 bits in actuality, but for the simplification of illustration, they are expressed as 4-bit data in FIG. 20. In FIG. 20, only the content of the memory required for the following explanation is shown.

As shown in FIG. 19, at step S100, the input data Ri (={$r_{10}$ to $r_{i(L-1)}$}) of predetermined L number of bits of one horizontal scanning period portion are input to the input SAM unit 22. Note that, the processing of S100 is not processing of a program by the program control unit 27a.

When enlarging the length of the original image to (10/7) times, as mentioned above, the positional relationship between the processor element 30 storing the pixel data (input data) of the original image required for the calculation of the pixel data (output data) of the enlarged image and the processor element 30 calculating the pixel data (output data) of the enlarged image changes for every pixel data (output data) of the enlarged image. For example, where the output data of 10 pixels is calculated corresponding to the input data of 7 pixels, the pattern of the data reference relationship between processor elements 30 holding the input data required for the calculation of the output data is shown in FIG. 15 and limited to five types as will be explained later by referring to FIG. 21.

By utilizing the fact that the patterns of the reference relationship of the input data between processor elements 30 are limited to five types in this way, as shown in FIG. 20, data is stored so as to be densely arranged in 10 processor elements 30 by doubling any of the seven input data (for example the input data R1 to R7 where the input data R1 to R7 are converted to output data Q1 to Q10). That is, input data the same as that for the left adjoining processor element 30 is arranged for the processor elements 30 to which the input data is not supplied (for example, PE1, PE4, and PE5).

Below, an explanation will, be made of the method of arrangement of data to the processor elements 30 by further referring to FIG. 21 and FIG. 22.

Figure 21:
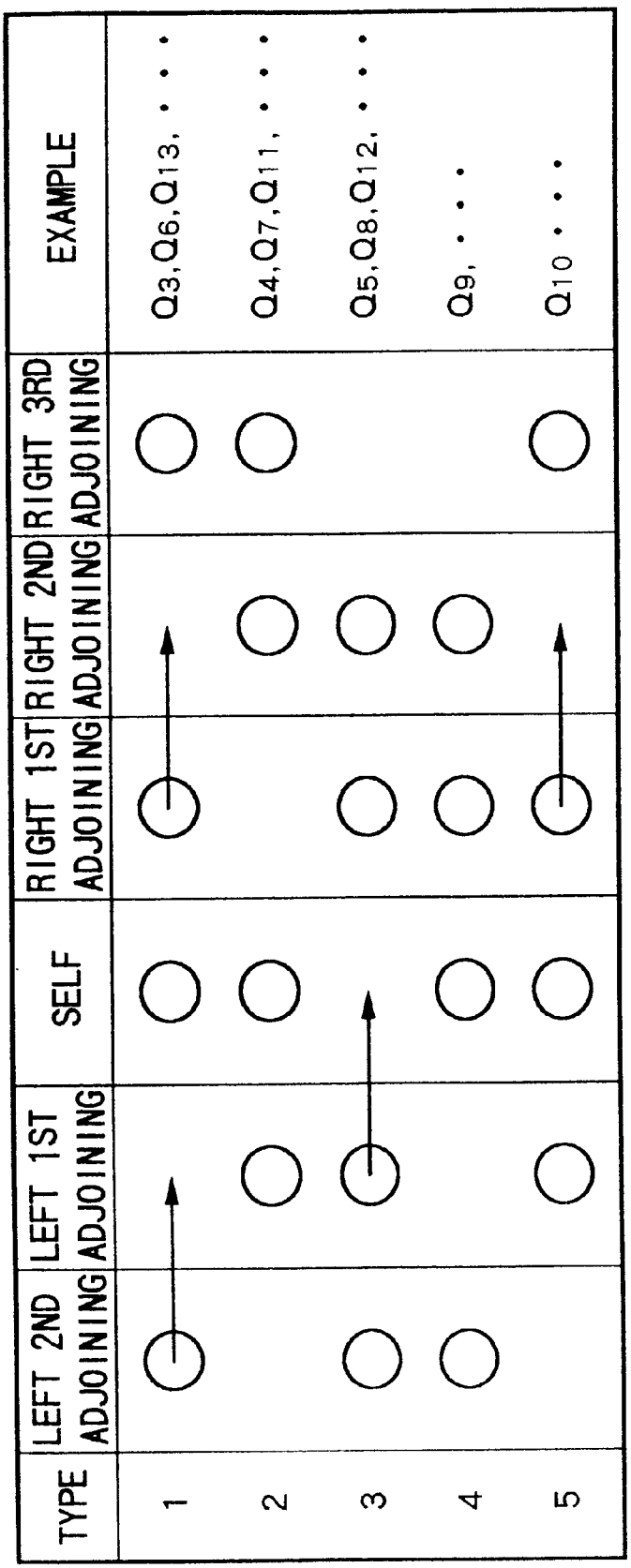
FIG. 21 is a view of an example of the positional relationship with processor elements having data required for the processing.

FIG. 21 is a view of five types of access patterns (reference relationship of the input data arranged in the processor elements 30 of the parallel processor 3 (FIG. 16)) of the adjoining four input image data required in the case of cubic interpolation.

Note that the data of FIG. 20 and FIG. 21 have a certain correspondence, for example, the output data Q3 can be calculated from among the data of the input data R1 to R4 located in PE0, PE2, PE3, and PE5. That is, they have a correspondence such that the output data Q4 can be calculated from the input data R2 to R5 located in the PE2, PE3, PE5, and PE6, and the output data Q5 can be calculated from the input data R2 to R4 located in the PE2, PE3, PE5, and PE6 (PE2, PE4, PE5, and PE6).

FIG. 22 is a view of two types of reference relationships (reference relationships where the duplication is eliminated for the access to five types of adjoining input image data shown in FIG. 21 and the image is reduced) obtained by arranging five types of reference relationships shown in FIG. 21 where the input data are arranged as shown in FIG. 20 in the processor elements 30 of the parallel processor (FIG. 16).

As described above, as shown in FIG. 20, by arranging the input data in the processor elements 30 of the parallel processor 3 so as to give the same input data as that for processor elements 30 to which input image data is not allocated, for example, where the reference relationship of input data among processor elements 30 is the first pattern shown in FIG. 21, while the predetermined processor element 30 (self) should originally access the input image data input to each of the left 2nd adjoining processor elements 30, the predetermined processor element 30, the right adjoining processor element 30, and the right adjoining processor element 30, the access to the left 2nd adjoining processor element 30 is the same as the access to the left adjoining processor element 30, while access to the right 2nd adjoining processor element 30 is the same as the access to the right 2 nd adjoining processor element 30, therefore the pattern of Type 1 can be treated (interpolation operation can be carried out) in the same way as the pattern of Type 2. That is, when the mark o shown in FIG. 21 is located at the front of the arrow, patterns given the mark o become the same.

Further, where the memory access for the interpolation operation of the processor elements 30 is of the third pattern shown in FIG. 21, the result is the same even if the processor element 30 (self) accesses the input image data located in the self processor element 30 in place of reference to the left adjoining processor element 30, therefore the third pattern can be treated in the same way as the fourth pattern.

Furthermore, when the memory access for the interpolation operation of the processor elements 30 is of the fifth pattern shown in FIG. 21, the processor element 30 (self) refers to the right adjoining processor element 30, the self processor element 30, the right 2nd adjoining processor element 30, and the right 3rd adjoining processor element 30. However, when the reference relationship is the fifth pattern, it is sufficient that memory access with respect to the same input data as that for the second pattern be carried out, therefore the fifth pattern can be treated in the same way as the second pattern.

Accordingly, by inputting the input data to the processor elements 30 as shown in FIG. 20, the five types of patterns of reference relationship shown in FIG. 21 are cleaned up and reduced to two types of patterns (Type 2, Type 4) shown in FIG. 22.

Note that even in the case of enlargement and/or reduction of the pixel data (input data) of the original image with a conversion rate other than (10/7), the patterns of the reference relationship can be reduced by finding the method of supply of the input data giving the minimum number of patterns of the reference relationship in advance.

In this way, the five types of patterns of the data reference relationship of processor elements 30 shown in FIG. 21 can be reduced to two types in actuality. 1-bit data (reference relationship data; 0, 1) showing which pattern between the two types shown in FIG. 22 is the pattern must be designated for every processor element 30, but this is given by a method of input the same as the image input data, a method of generation by the processor elements 30 by programming, or a method in the same way as the filter counting as will be explained later as a third embodiment.

Note that, as the method of performing the processing for supplying the input data to the processor elements 30 in the arrangement shown in FIG. 20, other than the method of supplying the input data to the processor elements 30 so as to obtain the arrangement shown in FIG. 20 from the first, there is the method in which, for example, in the same way as that in the processor 1 and parallel processor 2 (FIG. 10 and FIG. 14) shown in the first embodiment, first, input data is arranged in the processor elements 30 in a rough arrangement, and then the required input data is copied from other processor elements 30 under the control of the program control unit 27a.

Refer to FIG. 19 again.

At step S102 to step S108, the program control unit 27a controls the processor elements 30 so that all of the processor elements 30 operate in cooperation and transfer the supplied input data Ri from the input SAM unit 22 to the data memory unit 23 via the write bit line 204 one bit at a time.

As illustrated in FIG. 20, when assuming that the input data Ri consists of 4 bits and the bits of the input data Ri are stored at addresses 0 to 4 of the input SAM unit 22, these data are respectively transferred to the addresses 8 to 11 of the data memory unit 23.

At step S110, the processor elements 30 perform the signal processing mentioned later by referring to FIG. 23 and FIG. 24.

At step S112 to step S118, the program control unit 27a transfers the operation results (output data Qi) calculated by the processor elements 30 from the data memory unit 23 to the output SAM unit 25 via the read bit lines 200 and 202 and ALU cell $24_i$ one bit at a time by making the processor elements 30 operate in cooperation.

Note that, as illustrated in FIG. 20, if the output data Qi (=$c_{10}$ to $q_{13}$) has a 4-bit configuration and is stored at the addresses 16 to 19 of the data memory unit 23, the output data Qi stored at addresses 16 to 19 of the data memory unit 23 are respectively transferred to the addresses 20 to 23 of the output SAM unit 25.

At step S120, one horizontal scanning period's worth of the calculated output data Qi is output from the output SAM unit 25. Note that the processing of S120 is not processing of a program by the program control unit 27a.

The parallel processor 3 performs filtering with respect to the pixel data (input data) of the original image of one horizontal scanning period's worth. Note that the parallel processor 3 performs three processings (1) to (3), that is, (1) the processing of step S100, (2) the processing of step S102 to step S118, and (3) the processing of step S120 in parallel. That is, the parallel processor 3 performs the processing of step S120 with respect to the input data of the one previous horizontal scanning period and the processing of step S100 with respect to the image data of one horizontal scanning period's worth after this by one line in parallel while performing the processings of step S102 to step S118 with respect to the predetermined input data of one horizontal scanning period's worth.

Processing of Step S110

Below, the signal processing in step S110 shown in FIG. 19 will be explained in detail by referring to FIG. 23 and FIG. 24.

Figure 23:
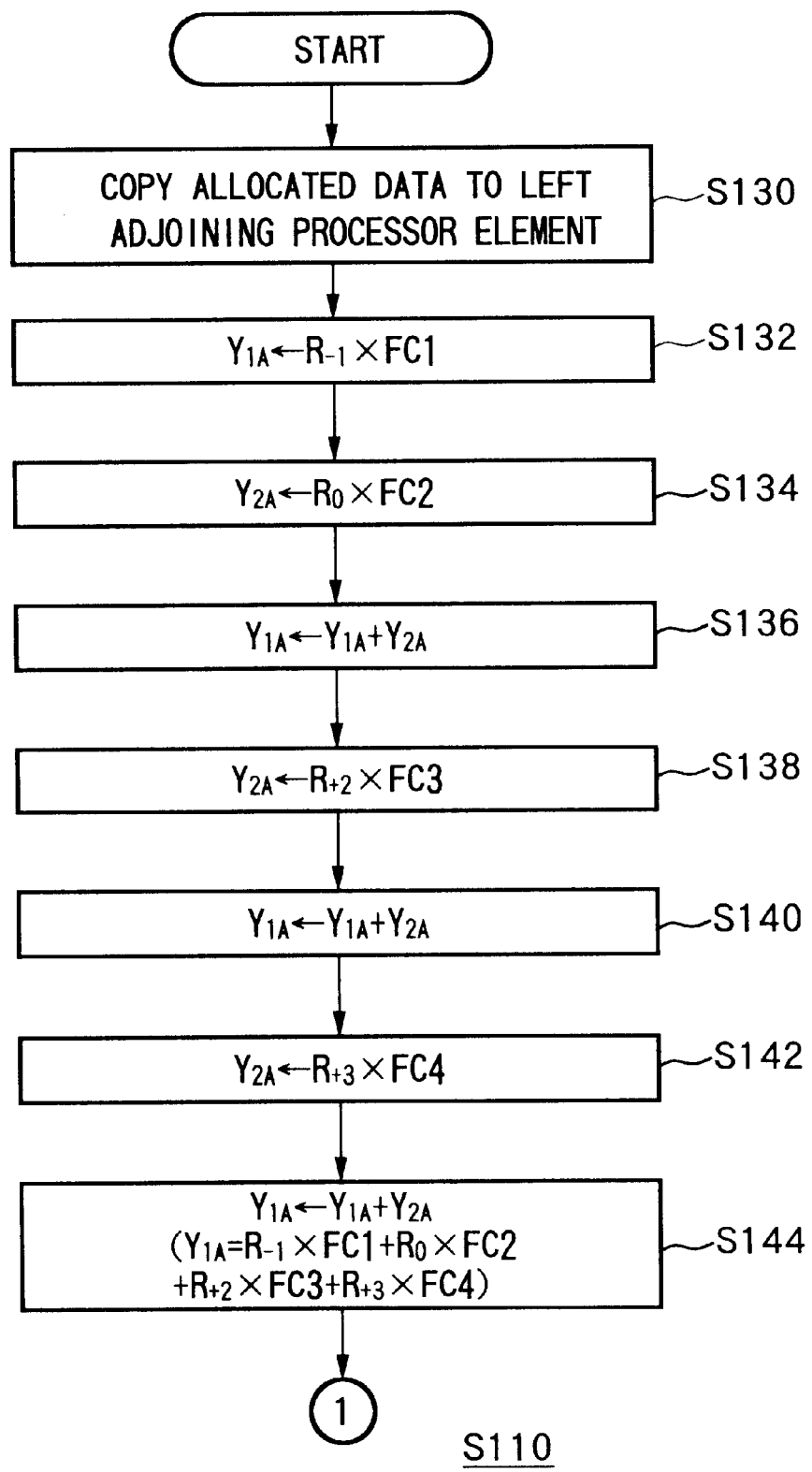
FIG. 23 is a flow chart for explaining the processing of the filter operation in the image processing apparatus of FIG. 16.
Figure 24:
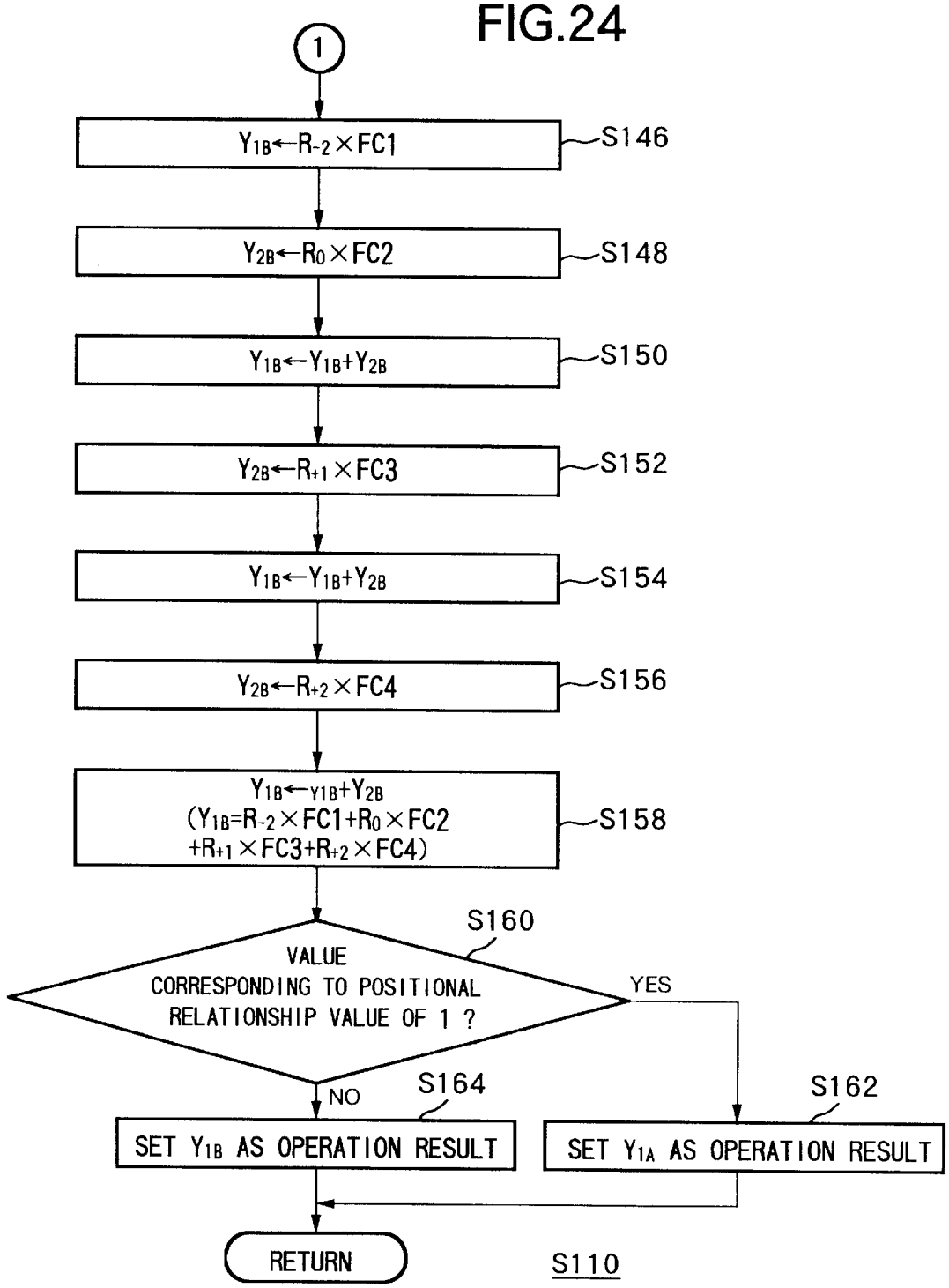
FIG. 24 is a flow chart for explaining the processing of the filter operation in the image processing apparatus of FIG. 16.

FIG. 23 and FIG. 24 are a first flow chart and second flow chart of the detailed processing of S110 shown in FIG. 19.

In the vertical blanking period etc., for example, the input pointer 21 receives the filter coefficient sets in order from the left end side from the data input terminal in advance, stores these in the input SAM unit of the processor element 30, and transfers the stored data to the data memory unit.

Note that, in contrast to the fact that the filter coefficient sets are successively set in the processor elements 30, the pixel data (input data) Ri of the original image are stored in the input SAM units 22 of the processor elements 30 in a pattern different from the order of the processor elements 30 shown in FIG. 20.

Accordingly, for example, it is necessary to provide two systems of a circuit for performing the pointer control when storing the input data Ri in the input SAM unit 22 and a circuit for performing the pointer control when storing the filter coefficient sets in the input SAM unit 22 in the input pointer 21 so as to enable the input pointer 21 to perform independent pointer controls in these two cases.

As shown in FIG. 23, at step S130, the data memory unit 23 of the processor elements 30 store the supplied input data, copy the input data stored in the left adjoining processor elements 30, and thereby realize dense data input. Note, at the time of copying, only the parts for filling blanks in the input SAM unit shown in FIG. 20 are copied.

Note that the data stored in a predetermined processor element 30 and the left adjoining, left 2nd adjoining, right adjoining, right 2nd adjoining, and right 3rd adjoining processor elements 30 of the predetermined processor element 30 are respectively described as the input data $R_0$, $R_{-1}$, $R_{-2}$, $R_{+1}$, $R_{+2}$, and $R_{+3}$.

At step S132, the predetermined processor element 30 calculates a product of the input data $R_{-1}$ of the left adjoining processor element 30 and the filter coefficient FC1 which is input from the memory 28 in advance and located in the data memory unit and defines the result of multiplication as a numerical value $Y_{-A\ (Y1A}=R_{-1}\times FC1)$. Note that the multiplication by the ALU cell $24_i$ is executed by repeating the bit operation by the ALU cell $24_i$ of each processor element 30 under the control of the program control unit 27a.

At step S134, the processor element 30 multiplies the input data R0 and the filter coefficient FC2 and defines the results of multiplication as a numerical value $Y_{2A}$ ($Y_{2A}=R_0\times FC2$).

At step S136, the processor element 36 adds the numerical values $Y_{1A}$ and $Y_{2A}$ and defines the result of addition as the numerical value $Y_{1A}$ ($Y_{1A}=Y_{1A}+Y_{2A}$). Note that the addition by the ALU cell $24_i$ is also executed by repeating the bit operation under the control of the program control unit 27a by the ALU cell $24_i$ of each processor element 30 in the same way as the multiplication.

At step S138, the processor element 30 multiplies the input data $R_{+2}$ of the right 2nd adjoining processor element 30 and the filter coefficient FC3 and defines the results of multiplication as the numerical value $Y_{2A}$ ($Y_{2A}=R_{+2}\times FC3$).

At step S140, the processor element 30 adds the numerical values $Y_{1A}$ and $Y_{2A}$ and defines the result of addition as the numerical value $Y_{1A}$ ($Y_{1A}=Y_{1A}+Y_{2A}$).

At step S142, the processor element 30 multiplies the data $R_{+3}$ of the right 3rd adjoining processor element 30 and the filter coefficient FC4 and defines the results of multiplication as the numerical value $Y_{2A}$ ($Y_{2A}=R_{+3}\times FC4$).

At step S144, the processor element 30 adds the numerical values $Y_{1A}$ and $Y_{2A}$ and defines the result of addition as the numerical value $Y_{1A}$ ($Y_{1A}=Y_{1A}+Y_{2A}$). Note that the value of the numerical value $Y_{1A}$ calculated by the processing of S144 is $R_{-1}\times FC1+R_0\times FC2+R_{+2}\times FC3+R_{+3\times FC}4$ and corresponds to the second pattern shown in FIG. 22.

At step S146, the processor element 30 multiplies the input data $R_{-2}$ of the left 2nd adjoining processor element 30 and the filter coefficient FC1 and defines the results of multiplication as a numerical value $Y_{1B}$ ($Y_{1B}=R_{-2}\times FC1$).

At step S148, the processor element 30 multiplies the input data $R_0$ stored in itself and the filter coefficient FC2 and defines the results of multiplication as a numerical value $Y_{2B}$ ($Y_{2B}=R_0\times FC2$).

Further, as shown in FIG. 24, at step S150, the processor element 30 adds the numerical values $Y_{1B}$ and $Y_{2B}$ and defines the result of addition as the numerical value $Y_{1B}$ ($Y_{1B}=Y_{1B}+Y_{2B}$).

At step S152, the processor element 30 multiplies the input data $R_{+1}$ of the right adjoining processor element 30 and the filter coefficient FC3 and defines the results of multiplication as the numerical value $Y_{2B}$ ($Y_{2B}=R_{+2}\times FC3$).

At step S154, the processor element 30 adds the numerical values $Y_{1B}$ and $Y_{2B}$ and defines the result of addition as the numerical value $Y_{1B}$ ($Y_{1B}=Y_{1B}+Y_{2B}$).

At step S156, the processor element 30 multiplies the data $R_{+2}$ of the right 2nd adjoining processor element 30 and the filter coefficient FC4 and defines the results of multiplication as the numerical value $Y_{2B}$ ($Y_{2B}=R_{+2}\times FC4$).

At step S158, the processor element 30 adds the numerical values $Y_{1B}$ and $Y_{2B}$ and defines the result of addition as the numerical value $Y_{1B}$ ($Y_{1B}=Y_{1B}+Y_{2B}$). The value of the numerical value $Y_{1B}$ calculated by the processing of S158 becomes $R_{-2} \times FC1+R_0 \times FC2+R+1_{+1}FC3+R_{+2} \times FC4$ and corresponds to the fourth pattern shown in FIG. 22.

At step S160, the processor element 30 refers to the reference relationship data (0, 1) shown in FIG. 22 and decides whether or not the value of the reference relationship data is the first value showing the second pattern (FIG. 22). The processor element 30 selects the result of processing of step S162 where the reference relationship data is the first value and selects the result of processing of S164 where the reference relationship data is not the first value, that is, the value corresponding to the fourth pattern shown in FIG. 22.

At step S162, the processor element 30 defines the numerical value $Y_{1A}$ calculated by the processing of step S144 as the result of the processing (output data).

At step S164, the processor element 30 defines the numerical value $Y_{1B}$ calculated at step S158 as the result of the processing (output data).

As explained above, the processor elements 30 performs filtering by using the input data stored in the adjoining processor elements 30 based on two types of reference relationships (FIG. 22).

Note that taking note of the fact that even if the parallel processor 3 is constituted so as to store filter coefficient sets respectively corresponding to all processor elements 30 in advance in the memory 28 (FIG. 16) as mentioned above, a processor element 30 for calculating the pixel data (output data) of the enlarged image having the same phase performs processing by using the same filter coefficient set, it is also possible to constitute the parallel processor 3 so as to store only a number of filter coefficient sets corresponding to the types of phases and conserve the storage capacity of the memory 28.

That is, for example, when enlarging the pixel data of the original image to (10/7) times, since there are 10 types of phases showing the relationship of position of the pixel data which becomes the interpolation result for the pixel data of the original image, it is possible to constitute the parallel processor 3 so as to store only 10 types of filter coefficient sets respectively corresponding to the 10 types of phases of the pixel data of the original image in the memory 28 in advance and to repeatedly set the stored 10 types of filter coefficient sets in the processor elements 30 in accordance with the value of the filter selection number Pi.

Further, it is possible to constitute the parallel processor 3 so as to be provided with a selector circuit for selecting one of the filter coefficient sets output by the memory 28 and the pixel data (input data) of the original image on the input side of the input SAM unit 22, selectively input the filter coefficient set or the input data to the input SAM unit 22, and set the filter coefficient set in the processor elements 30 in the period where for example the input SAM unit 22 in the vertical blanking period etc. is not being utilized for the supply of the input data Ri.

In this way, when the parallel processor 3 is constituted so as to use a selector to selectively set a filter coefficient set, the filter coefficient set can be 10 input by using a bus 208 having the same bit width as that of the input data, therefore the program control unit 27 a can set a filter coefficient set having a large bit width or a filter coefficient set having a long word length in the processor element 30 in a short time.

A concrete example will be explained below.

For example, where the bit width of the filter coefficient is 10 (total of sets of four filter coefficients is 40 bits) and the input data bus 208 (FIG. 18) has a 16-bit width, it is possible to set a filter coefficient set in the data memory unit 23 via the input SAM unit 22 within the perpendicular blanking period by using four horizontal operation periods by transferring the set divided for example into FC1 to FC4.

Further, it is also possible to configure for example the parallel processor 3 so as to once supply all of the filter coefficient sets, then use a bit width of about 4 bits in the input data bus 208 and gradually change the filter coefficient. Note that when using this method, in order to secure the continuity of the filtering, it is necessary to use the filter coefficient set before change as it is in several horizontal scanning periods up to the completion of transfer of the filter coefficient set.

Third Embodiment

Below, a third embodiment of the present invention will be explained.

Configuration of Parallel Processor 4

Figure 25:
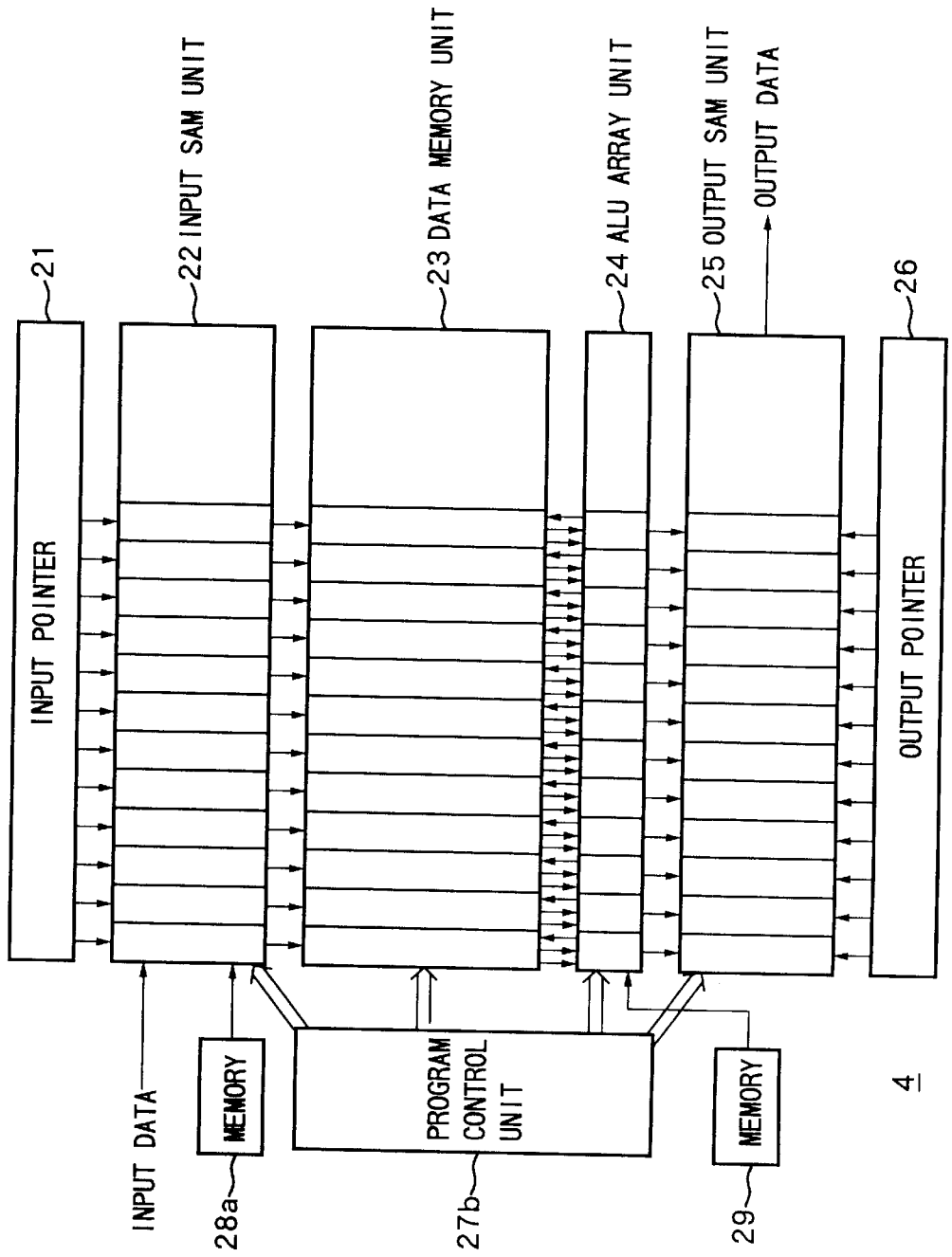
FIG. 25 is a block diagram of the configuration of a third embodiment of the image processing apparatus of the present invention.

FIG. 25 is a view of the configuration of the third embodiment (parallel processor 4) of the present invention. Note that, in FIG. 25, the same constituent parts as those of parallel processors 2 and 3 (FIG. 13, FIG. 16) among the constituent parts of the parallel processor 4 are indicated by the same reference numerals.

The parallel processor 4 shown in FIG. 25 is obtained by improving the parallel processors 2 and 3 (FIG. 13 and FIG. 16) so as to supply the filter coefficient sets through a different path from that for the input data Ri.

As shown in FIG. 25, the parallel processor 4 is constituted by the input pointer 21, input SAM unit 22, data memory unit 23, ALU array unit 24, output SUM cell $25_i$, output pointer 26, program control unit 27b, and memories 28a and 29. That is, the parallel processor 4 adopts a configuration obtained by replacing the program control unit 27a of the parallel processor 3 (FIG. 16) by the program control unit 27b, replacing the memory 28 by the memory 28a, and further adding the memory 29.

Constituent Parts of Parallel Processor 4

Below, an explanation will be made of constituent parts different from those of the parallel processors 2 and 3 among the constituent parts of the parallel processor 4.

Memory 29

The memory 29 stores filter coefficient sets corresponding to phases of pixels of the result of the processing (output data) which are input from an external control device (not illustrated) etc. in advance.

Further, the memory 29 stores the stored filter coefficient sets in the data memory units 23 of the processor elements 30 for calculating the pixels of the output data of the corresponding phase via the ALU array unit 24 at the time of activation in the horizontal blanking period or vertical blanking period or the like under the control of the program control unit 27b.

Memory 28a

The memory 28a stores the filter selection number i (corresponding to the filter selection signal Pi shown in FIG. 12) which is input from an external control device, etc. in advance and indicates the phase of the pixel of the input data for every pixel of the output data calculated by the processor elements 30.

Further, the memory 28a outputs the stored filter selection number i together with the input data Ri to the data memory unit 23 via the input data bus 208 in the same way as the filter coefficient set in the parallel processor 3.

Note that, in the same way as the filter selection signal Pi mentioned above, the filter selection number i can be expressed by 4 bits, therefore the memory 28a stores 4-bit data as the filter selection number i.

Further, there are 10 types of filter selection number i stored in the memory 28 irrespective of the number of pixels H contained in one horizontal scanning period where for example there are 10 types of phases of pixels of the output data and pixels of the input data.

Further, for example, even if there are 1,000 types of filter selection numbers i, they can be expressed as 10-bit data, therefore there is no problem in practical use.

Program Control Unit 27b

The program control unit 27b controls the constituent parts of the parallel processor 4 to make them perform operations mentioned later in the same way as the program control unit 27a in the parallel processor 3.

Figure 26:
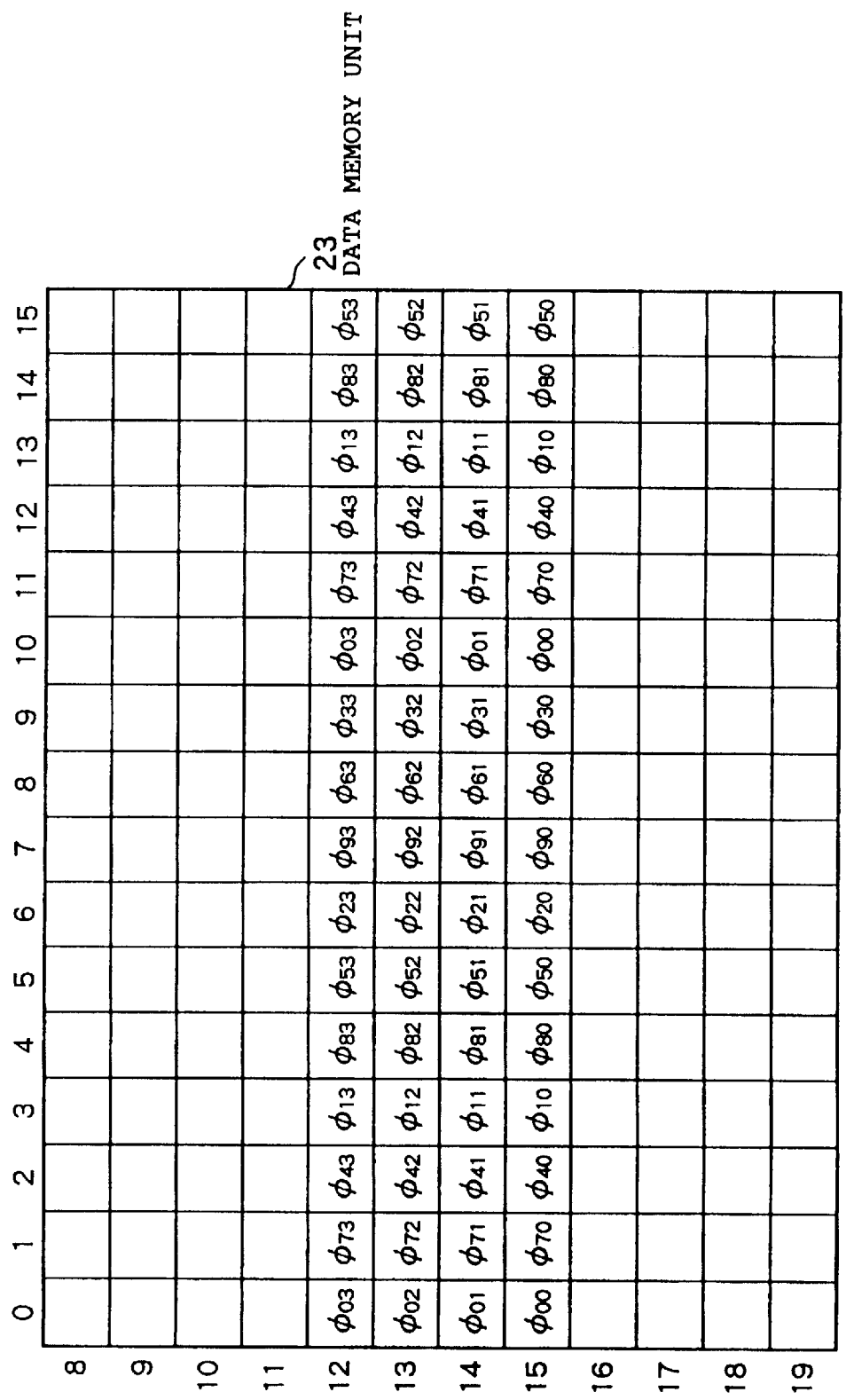
FIG. 26 is a view of an example of a filter selection number stored in a data memory unit.

FIG. 26 is a view of an example of the filter selection number i (={$\emptyset_{i0}$ to $\emptyset_{i3}$; $\emptyset$ indicates 1 or 0 in the case of bit decomposition}) stored in the data memory units 23 of the processor elements 30.

As shown in FIG. 26, the data memory unit 23 of the parallel processor 4 stores i×10 types of filter selection numbers i (i=0 to 9) as 4-bit data. That is, when giving a concrete example, the data memory unit 23 of the sixth processor element 30 (number 6) stores the data of the filter selection number i {i=2; $\emptyset_{20}$ to $\emptyset_{23}$}.

Operation for Supplying Filter Coefficient Set to Data Memory Unit 23

Below, an explanation will be made of the operation of the constituent parts of the parallel processor 4 when supplying the filter coefficient sets to the data memory units 23 of the processor elements 30 by referring to FIG. 27.

Figure 27:
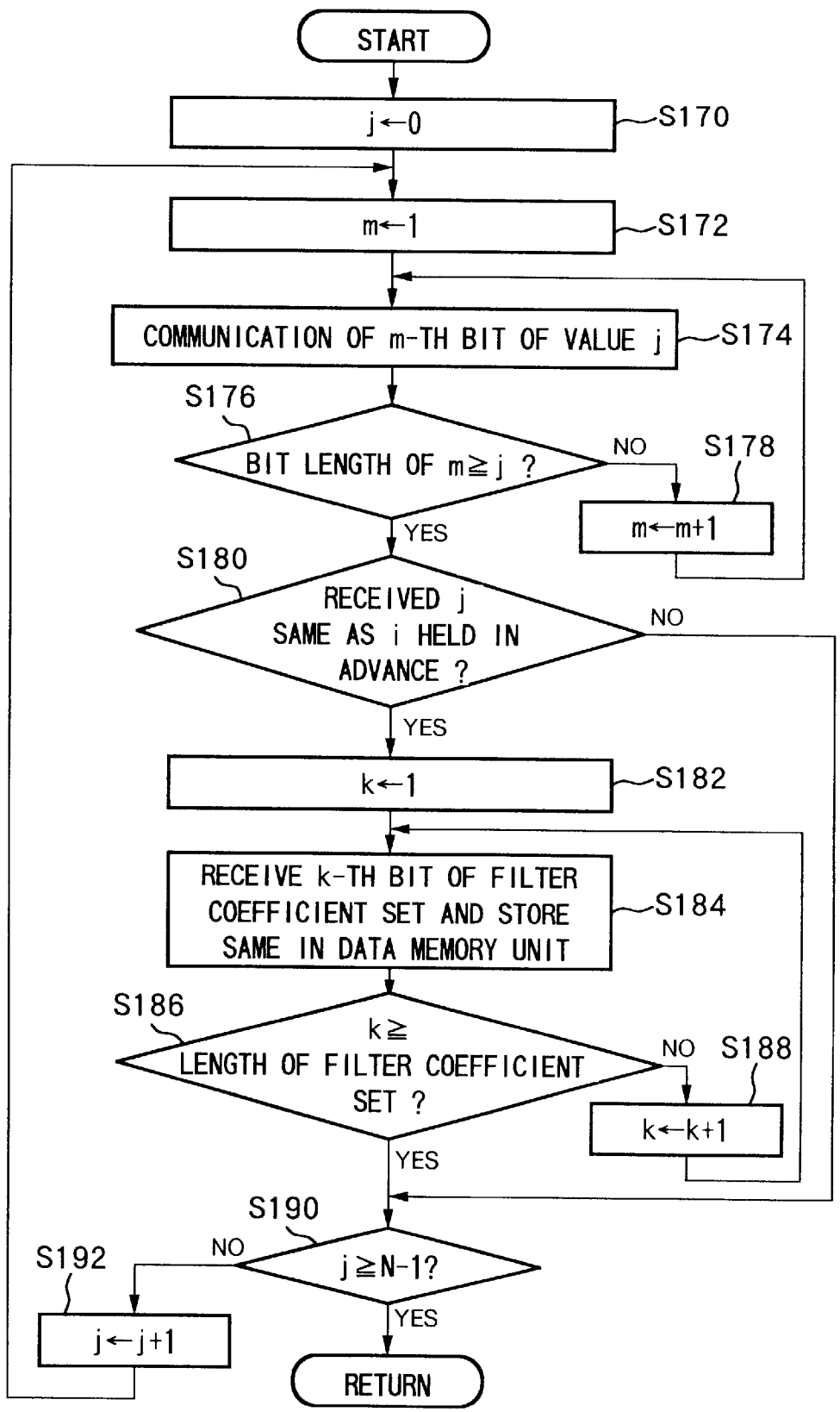
FIG. 27 is a flow chart explaining the operation of the image processing apparatus of FIG. 25 when a filter coefficient set is supplied.

FIG. 27 is a flow chart of the operation of the parallel processor 4 when supplying a filter coefficient set of the memory 29 to the data memory units 23 of the processor elements 30.

As shown in FIG. 27, at step S170, the program control unit 27b makes the count value of a counter j for counting the filter selection number i corresponding to the supplied filter coefficient set 0.

At step S172, the program control unit 27b makes the count value of a counter m used for supplying the count value of the counter i in units of bits 1.

At step S174, the program control unit 27b outputs the m-th bit of the count value of the counter j to the ALU cells $24_i$ of all processor elements 30. The ALU cell $24_i$ of each processor element 30 receives the data input from the program control unit 27b.

At step S176, the program control unit 27b decides whether or not the count value of the counter m is at least the bit length of the counter j. Where the count value of the counter m is equal to the bit length of the counter j, the last bit of the filter selection number i has been supplied, therefore the program control unit 27b proceeds to the processing of step S180, while where the count value of the counter m is the bit length of the counter j or less, it returns to the processing of step S174.

At step S178, the program control unit 27b increases (increments) the count value of the counter m by exactly 1 and returns to the processing of step S174.

By the processings of step S170 to step S178 explained above, the count values of the counter j are output to the processor elements 30 bit by bit.

At step S180, the processor elements 30 decide whether or not the input count value of the counter j and the value of the filter selection number i input from the memory 28a in advance are the same. Where they are the same, they give j and m to the memory 29, receive the read j-th filter coefficient set, and further set a predetermined flag.

Where the count value of the counter j and the filter selection number i are not the same, the processor elements 30 do not receive the filter coefficient set from the memory 29 and skip the processings of step S182 to step S188.

At step S182, the processor elements 30 set the count value of a counter k for counting the total number of bits of the filter coefficient set to 1 in accordance with the value of the flag.

At step S184, the processor elements 30 make the data memory unit 23 successively store the k-th bit of the filter coefficient set received by the ALU array unit 24 (ALU cell $24_i$; FIG. 18) from the memory 29 bit by bit.

Note that the memory 29 stores filter coefficient sets corresponding to phases (filter selection number i) in order from the most significant bit (MSB) or the least significant bit (LSB) and successively outputs the stored filter coefficient sets to the ALU cell $24_i$ of the processor elements 30 bit by bit via a line of a 1-bit width (interconnection from the memory 29 to the ALU array unit 24) as mentioned above.

At step S186, the processor elements 30 decide whether or not the count value of the counter k is the whole bit length of the filter coefficient set or more. The processor elements 30 proceed to the processing of S188 when the count value of the counter k is smaller than the whole bit length of the filter coefficient sets, while proceed to the processing of S190 when the count value of the counter k is the bit length of the filter coefficient set or more since the input of the filter coefficient set corresponding to the count value of the counter j is terminated.

At step S188, the processor elements 30 increase (increment) the count value of the counter k by exactly 1 and proceed to the processing of step S184.

At step S190, the program control unit 27b decides whether or not the count value of the counter j is more than the value (N−1) obtained by subtracting 1 from the number N of types of phases of pixels of output data and pixels of input data, decides that all of the N number of filter coefficient sets are supplied to the processor elements 30 where the count value of the counter j is more than (N−1) (j≧N−1), and terminates the processing of supply of the filter coefficient sets.

Further, the program control unit 27b proceeds to the processing of step S192 when the count value of the counter j is smaller than (N−1) (j<N−1).

At step S192, the program control unit 27b increases (increments) the count value of the counter j by exactly 1 and returns to the processing of step S172 where it supplies the filter coefficient set corresponding to the next filter selection number i.

By the processings shown in step S170 to step S192 in FIG. 27, the processor elements 30 of the parallel processor 4 receive a filter coefficient set corresponding to the filter selection number i set in advance from the memory 29 and store this in the data memory unit 23.

Note that the operations other than the operation of supply of the filter coefficient sets of the parallel processor 4, for example, the image processing operation, is the same as the image processing operation of the parallel processors 2 and 3 (FIG. 13, FIG. 16) shown as the first and second embodiments.

As explained above, according to the parallel processor 4, by supplying the filter coefficient sets through a different route from that for the input data Ri, the filter coefficient sets can be selectively supplied to the processor elements 30.

Further, according to the parallel processor 4, the processing of performing the supply of the filter coefficient sets to the processor elements 30 is easy and in addition the number of steps of the program used for the supply of the filter coefficient sets may be made small.

Further, according to the parallel processor 4, since the filter coefficient sets are supplied to the data memory units 23 of the processor elements 30 by a different route from that for the input data, the filter coefficient sets can be supplied at any timing irrespective of the operating conditions of the input SAM unit 22.

The characteristics of the parallel processor 4 will be further explained by giving a concrete example.

According to the processing shown in FIG. 27, for example, where 10 types of filter coefficient sets stored in the memory 29 are supplied to the processor elements 30, one filter coefficient set is simultaneously supplied to about one-tenth of the processor elements 30 of all of the processor elements 30. Accordingly, filter coefficient sets of 40 bits of data can be supplied to all of the processor elements 30 by processing a program of 400 (40 bits×10) steps irrespective of the number of the processor elements 30.

Fourth Embodiment

Below, a fourth embodiment of the present invention will be explained.

The fourth embodiment is obtained by improving the operation of the parallel processor 3 (FIG. 16) shown as the second embodiment so that the memory 28 stores the filter selection number in advance in the same way as the memory 28a of the parallel processor (FIG. 25) and further so that each processor element 30 calculates a filter coefficient set in accordance with the filter selection number i.

Operation for Calculation of Filter Coefficient Set of Parallel Processor 3 (FIG. 16)

Below, an explanation will be made of the operation of each constituent part when calculating the filter coefficient set used for filtering by the cubic approximation method (equation 4) when the parallel processor 3 enlarges and/or reduces the image data of the original image in a fourth embodiment by referring to FIG. 28 and FIG. 29.

Figure 28:
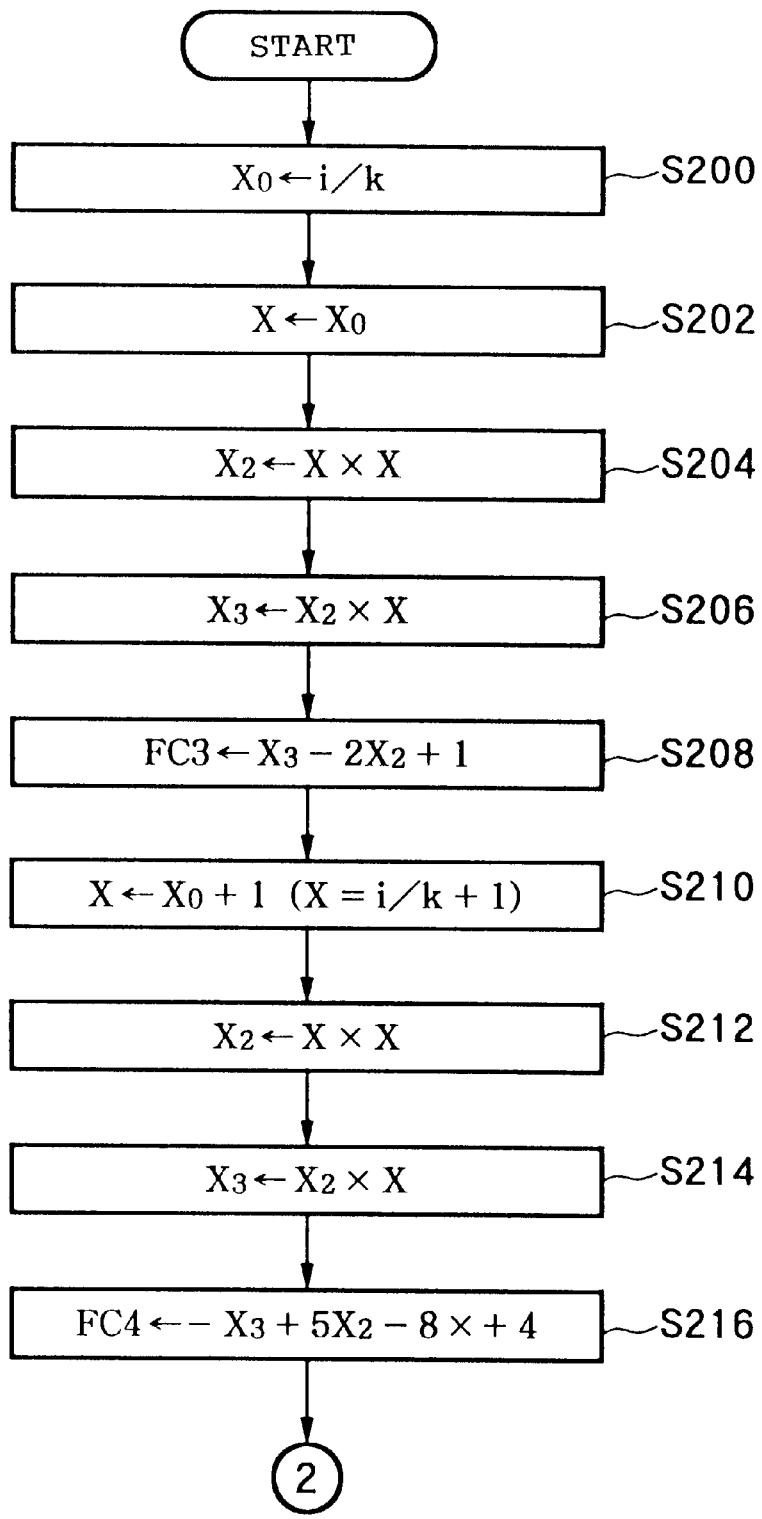
FIG. 28 is a flow chart explaining the operation when the processor elements process the filter coefficient set in a fourth embodiment.
Figure 29:
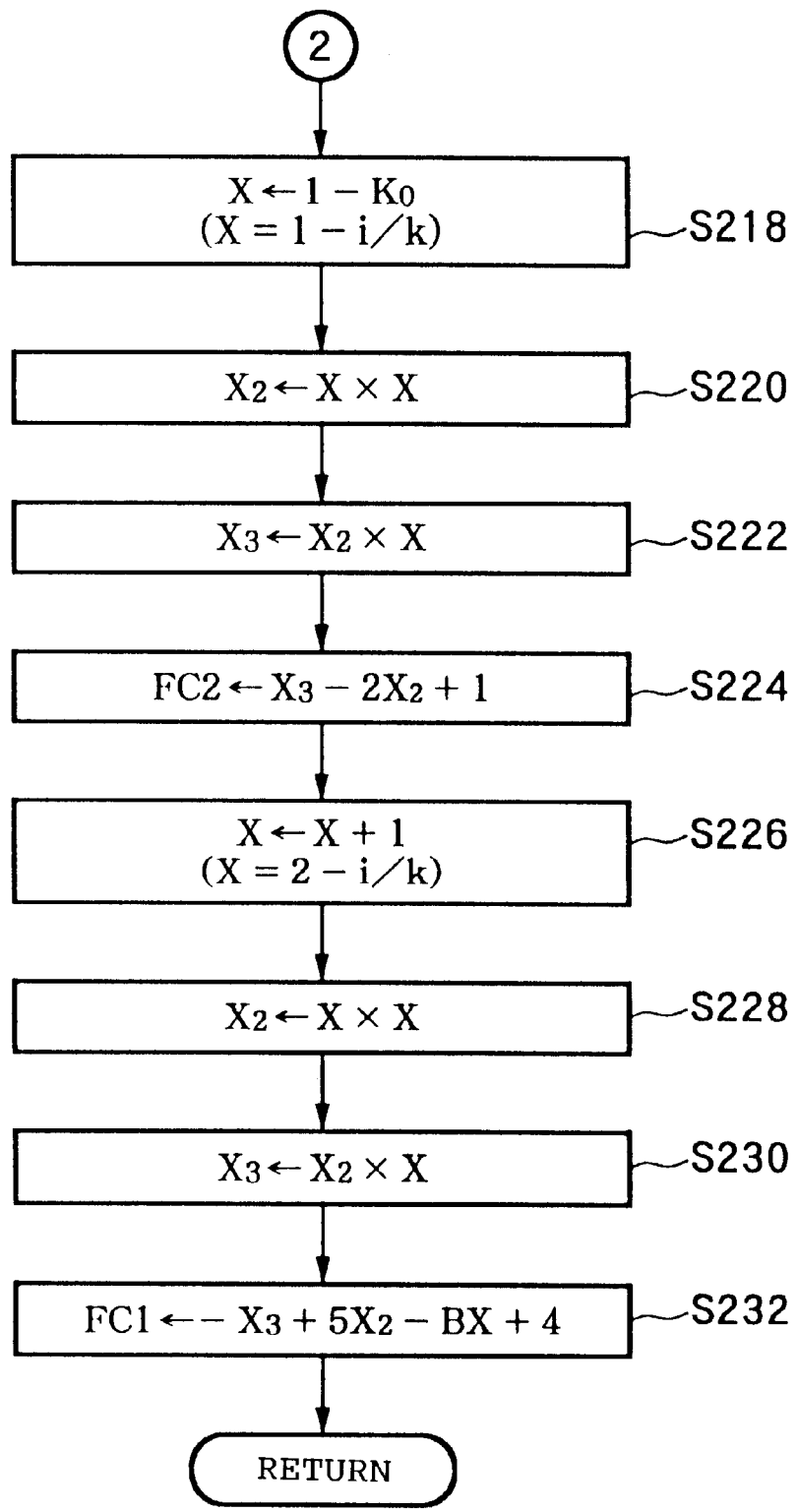
FIG. 29 is a flow chart explaining the operation when the processor elements process the filter coefficient set in the fourth embodiment.

FIG. 28 and FIG. 29 are first and second views of the operation for calculation of a filter coefficient set in the parallel processor 3 (FIG. 16) in the fourth embodiment.

As shown in FIG. 28, at step S200, the processor element 30 calculates a phase i/K of the pixel of the enlarged and/or reduced image (output data) and the pixel of the original image (input data) based on numerical values K and L which are input from the program control unit 27a and indicate the conversion rate (K/L) of the image and the value of the filter selection number i supplied in advance and stores this as a numerical value $X_0$.

At step S202, a processor element 30 assigns the numerical value $X_0$ for the numerical value X.

At step S204, the processor element 30 calculates a square value ($X^2$) of the numerical value X and stores the result of calculation as a numerical value $X_2$.

At step S206, the processor element 30 multiplies the numerical value $X_2$ and the numerical value X and stores the results of multiplication ($X^3$) as the numerical value $X_3$.

At step S208, the processor element 30 calculates the filter coefficient FC3 according to the following equation by numerical values X, $X_2$, and $X_3$ utilizing equation 4.

$$FC3=-X_3-2X_2+1 \qquad (5)$$

At step S210, the processor element 30 adds 1 to the numerical value $X_0$ (i/K) and assigns the same for the numerical value X.

At step S212, the processor element 30 calculates the square value ($X^2$) of the numerical value X and assigns the result of calculation for $X_3$.

At step S214, the processor element 30 multiplies the numerical value $X_2$ and the numerical value X and assigns the result of multiplication ($X^3$) for the numerical value $X_3$.

At step S216, the processor element 30 calculates the filter coefficient FC4 according to the following equation by X, $X_2$, and $X_3$ by utilizing equation 4.

$$FC4=-X_3+5X_2-8X+1 \qquad (6)$$

As shown in FIG. 29, at step S218, the processor element 30 subtracts the numerical value $X_0$ from 1 and assigns the subtracted value (1−$X_0$) for the numerical value X.

At step S220, the processor element 30 calculates the square value of the numerical value X and assigns the calculated value ($X^2$) for the numerical value $X_2$.

At step S222, the processor element 30 multiplies the numerical value $X_2$ and the numerical value X and assigns the multiplied value ($X^3$) for the numerical value $X_3$.

At step S224, the processor element 30 calculates the filter coefficient FC2 according to the following equation by numerical values X, $X_2$, and $X_3$ based on equation 4.

$$FC2=X_3-2X_2+1 \qquad (7)$$

At step S226, the processor element 30 adds 1 to the numerical value X to calculate the added value and assigns the result of addition (X+1) for the numerical value X.

At step S228, the processor element 30 calculates the square value of the X and assigns the result of calculation ($X^2$) for the numerical value $X_2$.

At step S230, the processor element 30 multiplies the numerical value $X_2$ and the numerical value X and assigns the result of multiplication ($X^3$) for the numerical value $X_3$.

At step S232, the processor element 30 calculates the filter coefficient FC1 according to the following equation by the numerical values X, $X_2$, and $X_3$ based on equation 4.

$$FC1=-X_3+5X_2-8X+4 \qquad (8)$$

As the above, by the processings of step S200 to step S232 shown in FIG. 28 and FIG. 29, the processor element 30 of the parallel processor 3 calculates the filter coefficient set (FC1 to FC4) in accordance with the filter selection number i.

According to the operation for calculation of the filter coefficient set of the parallel processor 3 shown as the fourth embodiment, since each processor element 30 calculates a filter coefficient set, it is not necessary to supply filter coefficient sets to the processor elements 30 from an external memory (memories 28 and 29 etc.) and it is not necessary to adjust the timing of the image processing and the timing of the supply of the filter coefficient sets.

Note that although the operation of the parallel processor 3 when a filter coefficient set is calculated by using the cubic approximation method was shown in FIG. 28 and FIG. 29, it is possible to calculate a filter coefficient set to be used for the filtering by another approximation method by suitably changing the operation.

Fifth Embodiment

Below, a fifth embodiment of the present invention will be explained.

Configuration of Parallel Processor 5

Figure 30:
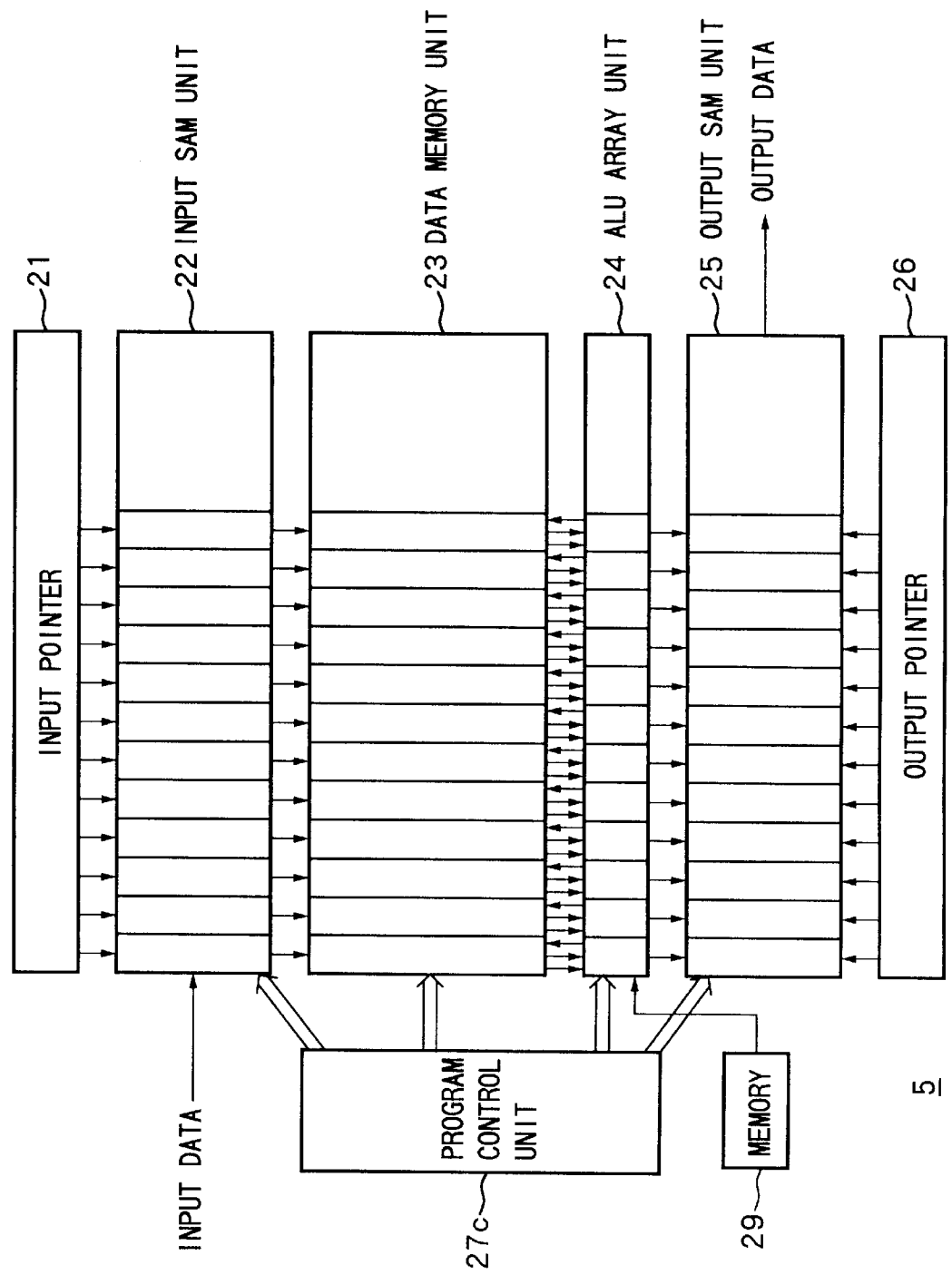
FIG. 30 is a block diagram of the configuration of a fifth embodiment of the image processing apparatus of the present invention.

FIG. 30 is a view of the configuration of a fifth embodiment (parallel processor 5) of the present invention. Note that, in FIG. 30, the same constituent parts as those of the parallel processors 2 to 4 shown as the first to third embodiments among the constituent parts of the parallel processor 5 are indicated by the same reference numerals.

As shown in FIG. 30, the parallel processor 5 is constituted by the input pointer 21, input SAM unit 22, data memory unit 23, ALU array unit 24, output SUM cell $25_i$, output pointer 26, a program control unit 27c, and a memory 29. That is, the parallel processor 5 is configured by deleting the memory 28a of the parallel processor 4 (FIG. 25) shown as the third embodiment and replacing the program control unit 27b by the program control unit 27c.

The parallel processor 5 is obtained by improving the operation of the parallel processor 4 (FIG. 25) so that the processor elements 30 calculate the filter selection number i.

Note that processings other than the calculation of the filter selection number i of the parallel processor 5 (image processing, supply of the filter coefficient set, etc.) are the same as those of the parallel processor 4 (FIG. 25).

Program Control Unit 27c

The operation of the program control unit 27c is changed as will be explained later by referring to FIG. 31 etc. compared with the operation of the program control unit 27b (FIG. 25) of the parallel processor 4.

Operation of Parallel Processor 5

Below, an explanation will be made of the operation of the parallel processor 5 at the time of calculation of the filter selection number by referring to FIG. 31.

Figure 31:
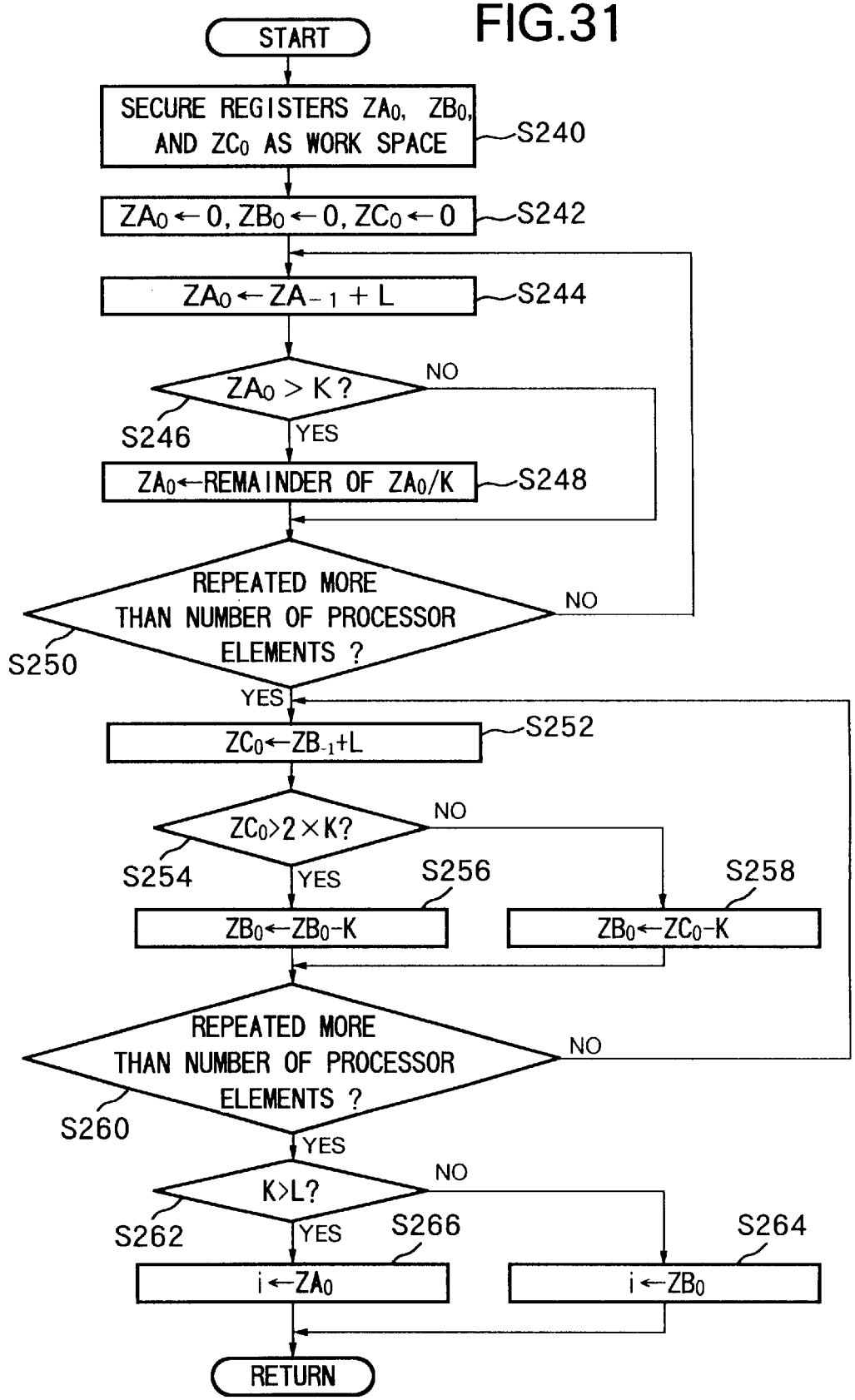
FIG. 31 is a flow chart explaining the operation of the image processing apparatus of FIG. 30 when the processor element process the filter selection number.

FIG. 31 is a flow chart of the operation when the parallel processor 5 calculates the filter selection number i.

As shown in FIG. 31, at step S240, the processor elements 30 secure registers $ZA_0$, $ZB_0$, and $ZC_0$ as work spaces.

At step S242, the processors element 30 store the numerical value 0 in the registers $ZA_0$, $ZB_0$, and $ZC_0$.

At step S244, the processor elements 30 add a stored value $ZA_{-1}$ of the register $ZA_0$ of the left adjoining processor elements 30 and the numerical value L between numerical values K and L which are input from the program control unit 27c and indicate the conversion rate K/L when enlarging and/or reducing the length of the image of the original image and store the result of addition ($ZA_{-1}$+L) in the register $ZA_0$. Note that, in the parallel processor 5, the left end processor element 30 performs the processing of step S244 by making the stored value of the register $ZA_{-1}$ 0 since there is no left adjoining processor element 30.

At step S246, the processor elements 30 decide whether or not the stored value of the register $ZA_0$ is larger than the numerical value K. Where the stored value of the register $ZA_0$ is larger than the numerical value K, they proceed to the processing of S248, while where the stored value of the register $ZA_0$ is not larger than the numerical value K, they proceed to the processing of S250.

At step S248, the processor elements 30 calculate a surplus where the stored value of the register $ZA_0$ is divided by the numerical value K and store the surplus value in the register $ZA_0$. Note that the processor elements 30 realize the calculation of surplus in the processing of step S248 by repeating subtraction. This calculation of the surplus involves many processing steps, but the calculation of the filter selection number i is carried out in advance before performing real time image processing or carried out in the vertical blanking period etc., therefore the problem of the processing time does not occur.

At step S250, the processor elements 30 decide whether or not the processings of step S244 to step S248 have been repeated more than the number of processor elements. When the operations of step S244 to step S248 have not been repeated more than the number of processor elements, they return to the processing of step S244.

Further, the processor elements 30 proceed to the processing of S252 when the operations of step S244 to step S248 have been repeated more than the number of processor elements.

At step S252, the processor elements 30 add a stored value $ZB_{-1}$ of the register $ZB_0$ of the left adjoining element processors 30 and the numerical value L and store the result of addition ($ZB_{-1}$+L) in the register $ZC_0$. Note that, the left end adjoining processor element 30 performs the processing of step S252 by making the stored value $ZB_{-1}$ 0 since there is no left adjoining processor element 30.

At step S254, the processor elements 30 decide whether or not the stored value of the register $ZC_0$ is larger than a value of twice of the numerical value K. They then proceed to the processing of S256 when the stored value of the register $ZC_0$ is larger than the value of twice of the numerical value K, while proceed to the processing of S258 when the stored value of the register $ZC_0$ is not larger than the value of twice of the numerical value K.

At step S256, the processor elements 30 subtract the numerical value K from the stored value of the register $ZB_0$ and store the subtracted value ($ZB_0$–K) in the register $ZB_0$.

At step S258, the processor elements 30 subtract the numerical value K from the stored value of the register $ZC_0$ and store a subtracted value ($ZC_0$–K) in the register $ZB_0$.

At step S260, the processor elements 30 decide whether or not the processings of step S252 to step S258 have been repeated more than the number of processor elements. They return to the processing of step S252 when the operations of step S252 to step S258 have not been repeated more than the number of processor elements.

Further, the processor elements 30 proceed to the processing of S262 when the operations of step S252 to step S258 have been repeated more than the number of pixels of horizontal direction of the enlarged and/or reduced image (output data).

At step S262, the processor elements 30 decide whether or not the numerical value K is larger than the numerical value L, that is, decide whether or not enlargement of the image has been carried out. They proceed to the processing of S266 when the numerical value K is larger than the numerical value L, while proceed to the processing of S264 when the numerical value K is not larger than the numerical value L.

At step S264, the processor elements 30 utilizes the stored value of the register $ZB_0$ as the filter selection number i.

At step S266, the processor elements 30 utilize the stored value of the register $ZA_0$ as the filter selection number i.

By the above, the processor elements 30 of the parallel processor 5 calculate the filter selection number i by the processings shown in FIG. 31.

Note that, it is also possible to set the correspondence between input data or output data and the processor element 30 corresponding to the decision in step S246 and step S254 (method of input of Ri of FIG. 14). That is, at step S248, similar processing to the above surplus (modulo) operation of the phase is carried out, therefore, corresponding to the decision at step S246, by comparing the number of pixels for which the modulo operation is carried out and the number of pixels calculated by the processor element thereof, the input data allocated to that processor element 30 can be determined.

Sixth Embodiment

Below, a sixth embodiment of the present invention will be explained.

Configuration of Parallel Processor 6

Figure 32:
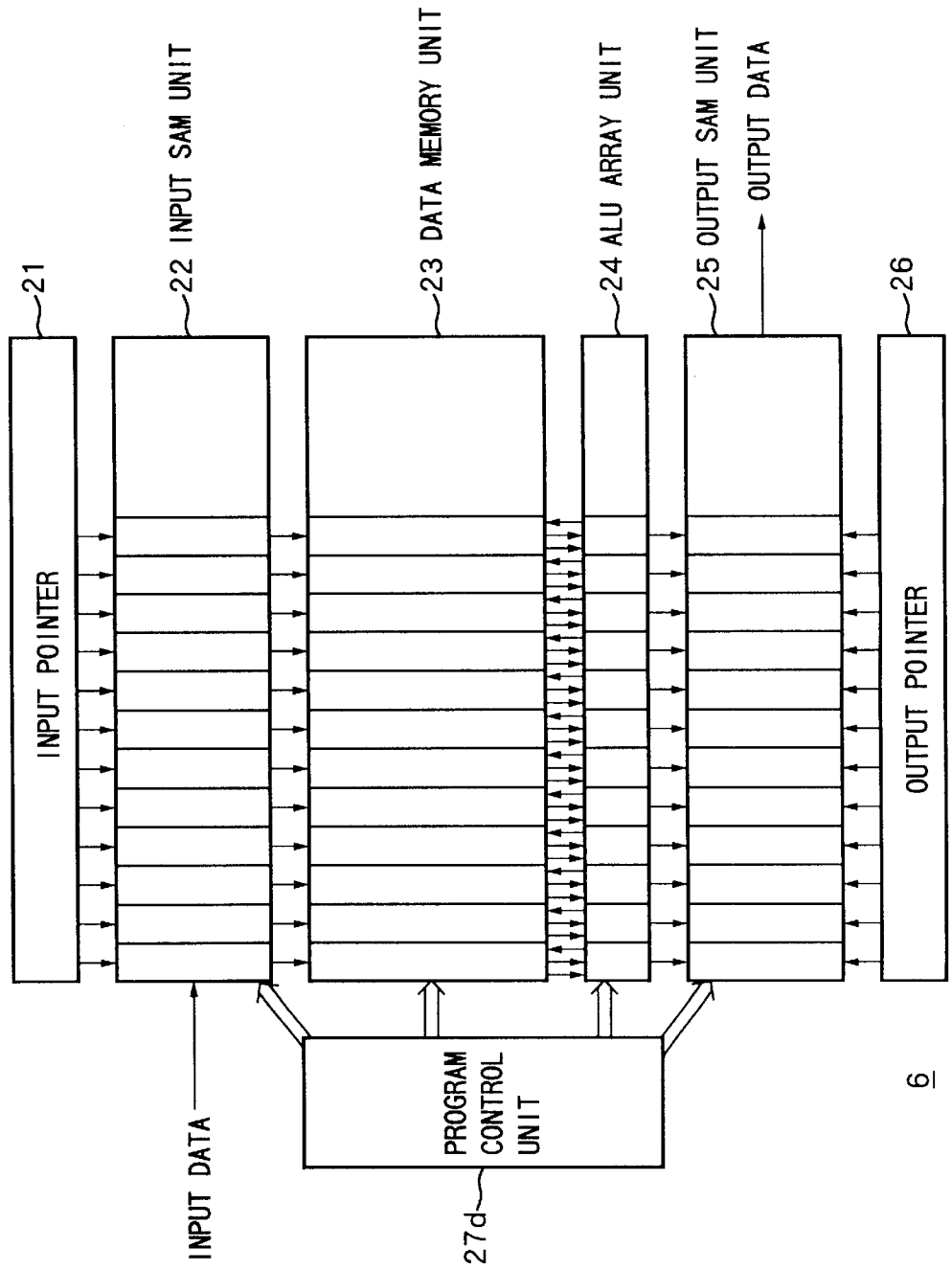
FIG. 32 is a block diagram of the configuration of a sixth embodiment of the image processing apparatus of the present invention.

FIG. 32 is a view of the configuration of a sixth embodiment (parallel processor 6) of the present invention. Note that, in FIG. 32, constituent parts the same as those of parallel processors 2 to 5 (FIG. 13, FIG. 16, FIG. 25, and FIG. 30) among the constituent parts of the parallel processor 6 shown as the first to fifth embodiments are indicated by the same reference numerals.

As shown in FIG. 32, the parallel processor 6 is constituted by the input pointer 21, input SAM unit 22, data memory unit 23, ALU array unit 24, output SUM cell $25_j$, output pointer 26, and a program control unit 27d. That is, the parallel processor 6 is configured by replacing the program control unit 27 of the parallel processor 3 (FIG. 13) by the program control unit 27d.

The parallel processor 6 makes the memories 28, 28a, and 29 unnecessary by improving the system so that the filter selection number i and the filter coefficient set corresponding to this are calculated at each processor element 30 in the same way as the parallel processors 3 and 5 (FIG. 13 and FIG. 30) indicated in the fourth and fifth embodiments.

Program Control Unit 27d

The program control unit 27d controls each processor element 30 and makes it calculate the filter selection number i and the filter coefficient set corresponding to this in the same way as the program control units 27 and 27c of the parallel processors 3 and 5 (FIG. 16 and FIG. 30) indicated in the fourth and fifth embodiments.

Note that the operation of the parallel processor 6 when performing calculation of the filter selection number i and the filter coefficient set and other processings (image processings etc.) is similar to the operation of the parallel processors 3 and 5 (FIG. 16 and FIG. 30) indicated in the fourth and fifth embodiments.

Further, as shown in FIG. 12, the sum of the filter coefficient sets of the phases P1, P2, P3, P8, and P9 among the filter coefficient sets of the 8-bit representation corresponding to the phases of the pixel data (input data) of the original image and the pixel data (output data) of the enlarged and/or reduced image does not become 128 (1, 0 in real number representation) and an error occurs. This error occurs when quantizing the filter coefficient sets to 8 bits. If these filter coefficient sets are used as they are, for example, a pulse flow is generated in the output data obtained by the enlargement and/or reduction of input data having a large DC component, so there is a possibility of deterioration of the image. Accordingly, preferably the filter coefficients FC1 to FC4 are corrected so that the above sum becomes 128.

Where correcting the filter coefficients, since there is less influence exerted upon the characteristic of the interpolation filtering in the correction of the filter coefficients FC1 and FC4 than the filter coefficients FC2 and FC3, preferably the filter coefficients FC1 and FC4 are corrected. For example, by changing the value of the filter coefficient FC1 corresponding to the phase P1 shown in FIG. 12 from −1 to −2, the sum of the filter coefficients becomes 128.

Further, it is also possible to amend the filter correction set having the largest error when quantizing the filter coefficient sets to 8 bits. Explaining this by giving a concrete example, for example, the filter coefficient FC3 of the phase P3 shown in FIG. 12 is 0.368 in real number representation and 46 in 8-bit representation. The error is a large 0.464 (=0.363× 128−46). Accordingly, by changing the value of the filter coefficient FC3 of the phase P3 from 46 to 47, the sum of filter coefficients can be made 128 and in addition the influence exerted upon the characteristic of the interpolation filtering can be minimized.

Note that, in the embodiments mentioned above, the explanation was made by mainly taking as an example the enlargement of an image, but needless to say it is also possible to reduce the image. Note that when reducing an image, the input data is densely supplied to the input SAM unit 22 in order and the output data is thinly output from the output SAM unit 25.

Further, in the above embodiments, processing using the numerical value 0 in place of the nonexisting data when there is no other processor element 30 storing the data required for the interpolation filtering at the periphery of the right end and left end processor elements 30 for processing pixel data at the end portion of the image was shown, but various methods can be adopted for the processing at the edge of the image, for example, it is possible to assume that the pixel data of the end portions of the image continue to the outside thereof or the pixel data become symmetrical about the end portion and it is possible to adopt any method by changing the program.

Further, in the above embodiments, each processor element 30 performs only a filter operation corresponding to the interpolation of pixels, but by changing or adding the program of the program control unit corresponding to various image processing and TV (television) signal processing which should be executed simultaneously with the conversion of the number of pixels, for example various filter processings, manipulation of color, conversion to data of a predetermined transmission method, noise elimination, and contour enhancing, these processings can be carried out without changing the configuration of the hardware.

Further, the conversion rate of the image can be changed by changing the program of the program control unit.

Further, the storage capacity of the memories 28, 28a, and 29 of parallel processors (FIG. 16, FIG. 25, FIG. 30, etc.) shown as the above embodiments is proportional to the number of phases of pixels of the original image and pixels of the enlarged and/or reduced image and may be relatively small. Accordingly, the influence exerted upon the size of the hardware of the parallel processor due to the provision of the memories 28 and 29 etc. is very small.

Seventh Embodiment

Below, a seventh embodiment of the present invention will be explained.

Figure 33:
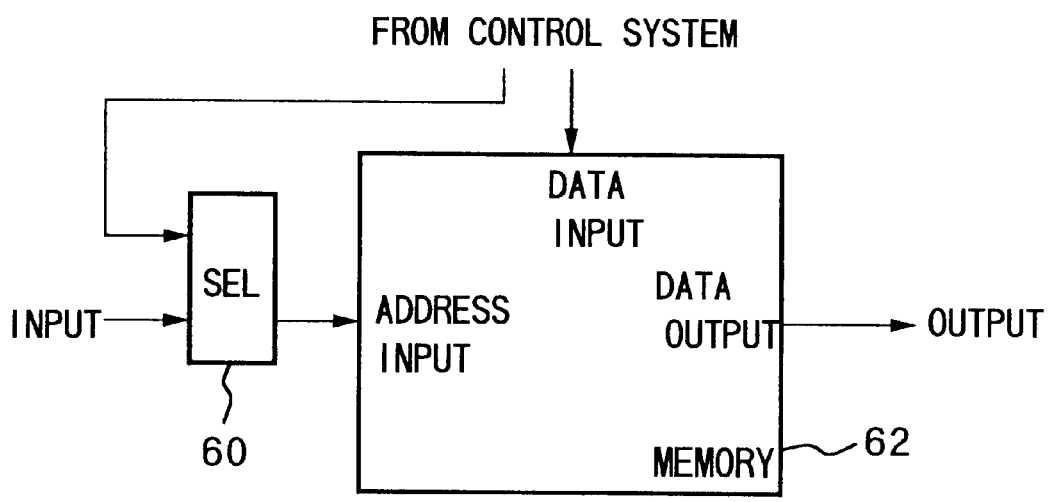
FIG. 33 is a view of the configuration of a seventh embodiment of the present invention.

FIG. 33 is a view of the configuration of the seventh embodiment (image data processing apparatus 7) of the present invention.

As shown in FIG. 33, the image data processing apparatus 7 is constituted by a selector circuit (SEL) 60 and a memory circuit 62 and performs nonlinear processing on the image by a so-called memory mapping method under the control of the control system.

In the image data processing apparatus 7, the control system (not illustrated) controls the selector circuit 60 so as to select the component of the input color signal when performing nonlinear processing on a component of the color signal, while controls the selector circuit 60 so as to select the data output by the control system when nonlinear data is stored in the memory circuit 62.

The selector circuit 60 selects the data input from the control system or the components (R, G, B, Y, I, Q, etc.) of a color signal input from the outside under the control by the control system and outputs the same to the address input unit of the memory circuit 62.

The memory circuit 62 stores in advance the nonlinear data which is output from the control system as mentioned above and prescribes the nonlinear characteristic between components of the color signal and the output data. The memory circuit 62 outputs the nonlinear data set at the addresses corresponding to the values of the components of the color signal and performs nonlinear processing.

Note that where the content of the nonlinear processing by the image data processing apparatus 7 is changed, the control system may change the nonlinear data stored in the memory circuit 62. That is, the control system can freely change the content of the nonlinear processing by just changing the values of the data stored at the addresses of the memory circuit 62 corresponding to the values of the component of the input color signal.

Eighth Embodiment

Below, an eighth embodiment of the present invention will be explained.

The image data processing apparatus 7 (FIG. 33) shown in the seventh embodiment can perform nonlinear processing by establishing correspondence between the values of the input data (components of the color signal) and the values of the output data via the memory circuit 62. In addition, according to the image data processing apparatus 7, the content of the nonlinear processing can be changed by just changing the content of the nonlinear data stored in the memory circuit 62 by the control system.

Here, in the image data processing apparatus 7, the content of the nonlinear data stored in the memory circuit 62 must be prepared by the editor himself using the image data processing apparatus 7. It is convenient if this nonlinear data can be prepared by the manipulation using a GUI. However, no method of designation of the processing content for a GUI has yet been established.

Further, the image processed by the image data processing apparatus 7 is confirmed by reproducing and displaying the image data once recorded on for example a VTR tape, which is very troublesome.

The eighth embodiment of the present invention was designed in order to solve such a problem and is constituted so that the content of the nonlinear processing on the image data can be designated by using a GUI and in addition the image obtained as a result of the designated nonlinear processing can be quickly confirmed on the GUI screen.

Configuration of Image Data Processing System 8

FIG. 34 is a view of the configuration of the eighth embodiment (image data processing system 8) of the present invention. Note that, in FIG. 34, the same constituent parts as those of the image data processing apparatus 7 shown in FIG. 33 among the constituent parts of the image data processing system 8 are indicated by the same reference numerals.

As shown in FIG. 34, the image data processing system 8 is constituted by an input device 70, a personal computer 72, an image source 74, an image data processing apparatus 7, and an image monitor 76.

Constituent Parts of Image Data Processing System 8

The personal computer 72 contains a computer, hard disk drive (HDD), monitor, etc. The CPU bus of the personal computer 72 is connected to the input device 70 and the image data processing apparatus 7 via a predetermined interface board.

The personal computer 72 controls the selector circuit 60 of the image data processing apparatus 7 in the same way as the control system explained in the seventh embodiment and, generates nonlinear data based on the nonlinear characteristic input from the input device 70, sets the generated nonlinear data in the memory circuit 62 and, and displays the GUI image for the nonlinear characteristic input on the monitor to indicate this to the user.

The input device 70 receives a component of the color signal input to the image data processing system 8 and the nonlinear characteristic with the output data and outputs the same to the personal computer 72 in accordance with the manipulation of the image data processing system 8 by the user with respect to the GUI screen on the monitor of the personal computer 72 by a mouse, keyboard, tablet, track ball, or acupoint.

The image source 74 is for example a digital camera or digital VTR apparatus and supplies a component of the color signal to the selector circuit 60.

A plurality of image data processing apparatuses 7 are provided in actuality respectively corresponding to components of these color signals where components of color signals are processed in parallel, perform the nonlinear processing for components of input color signals by using the nonlinear data set by the personal computer in the same way as the seventh embodiment, and output the same to the image monitor 76.

The image monitor 76 displays the image data input from the image data processing apparatus 7.

Note that when displaying an image on the image monitor 76, it is necessary to convert the image data to an analog image signal for the display, therefore, in actuality, a D/A conversion circuit becomes necessary. Further, when an analog VTR apparatus is used as the image source 74, an A/D conversion circuit becomes necessary for supplying the image data of the digital format to the image data processing apparatus 7. In FIG. 34, however, the D/A conversion circuit and A/D conversion circuit are omitted deeming that they are respectively contained in the image monitor 76 and the image source 74.

GUI Screen

FIGS. 35A to 35D are views of the GUI image displayed by the personal computer 72 on the monitor thereof.

Note that, in actuality, a plurality of windows of the GUI screen are provided corresponding to types of color signals (types of RGB, YIQ, and YCrCb) and components of color signals. That is, for example, when the image data processing system 8 performs nonlinear processing with respect to components of the RGB signal and components of the YIQ signal on the GUI screen, six windows respectively corresponding to these components are displayed. Note that for simplification of the explanation and illustration, in FIGS. 35A to 35D, only the window of the GUI image with respect to one component signal of one type of color signal is shown.

As shown in FIGS. 35A to 35D, a window of the GUI screen occupies a large part of the upper portion of the window and contains a function graph part for displaying the function showing the nonlinear characteristic in the form of a graph and a mode switch part for displaying radio buttons for mode switches of "Add", "Move", and "Delete" operations.

The abscissa of the function graph part indicates the value of the component of the input color signal, and an ordinate indicates the value of the output data. That is, where a perpendicular line is drawn with respect to the value of the component signal of the abscissa and a straight line passing through a cross point of this perpendicular line and the curve of graph and in parallel to the abscissa is drawn, the value indicated by the cross point of this parallel line and the ordinate of the graph indicates the value of the output data corresponding to the value of the input component.

As mentioned above, in the mode switch part, radio buttons for "Add", "Move", and "Delete" are displayed. The user designates any mode with respect to the personal computer 72 by for example clicking these radio buttons by a mouse of the input device 70. Note that, even in the case where the user does not select a mode, the personal computer 72 displays the window of a mode on the monitor.

Figure 35A:
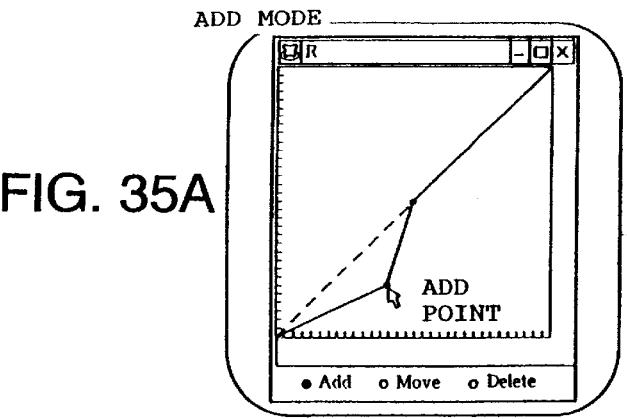
FIGS. 35A to 35D are views of a GUI image displayed by a personal computer (FIG. 34) on a monitor thereof.

Among these modes, the "Add" mode is used when performing an operation for adding a point through which the curve of the graph is to pass (passing point) to a position in the function graph part designated by clicking by the user by the mouse of the input device 70 as shown in FIG. 35A.

Figure 35B:
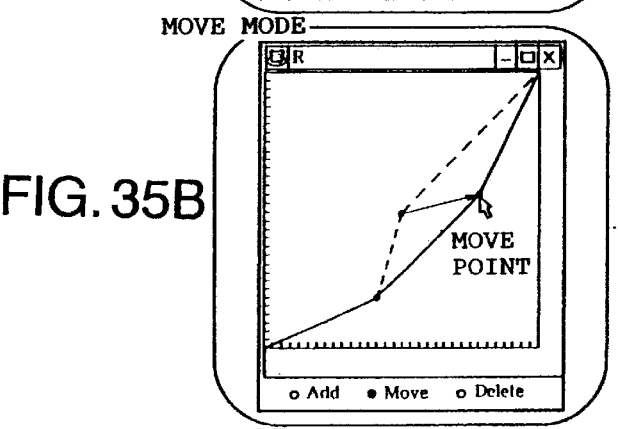

The "Move" mode is used when performing an operation for moving a point on the curve of the function graph closest to the position designated by clicking by the mouse by the user to the designated position by dragging the mouse as shown in FIG. 35B.

Figure 35C:
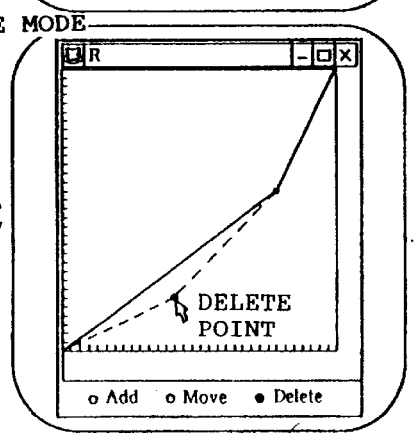

The "Delete" mode is used when performing an operation for deleting a passing point designated by the "Add" mode etc. by the user as shown in FIG. 35C.

Operation of Image Data Processing System 8

Below, the operation of the image data processing system 8 will be explained.

Figure 36:
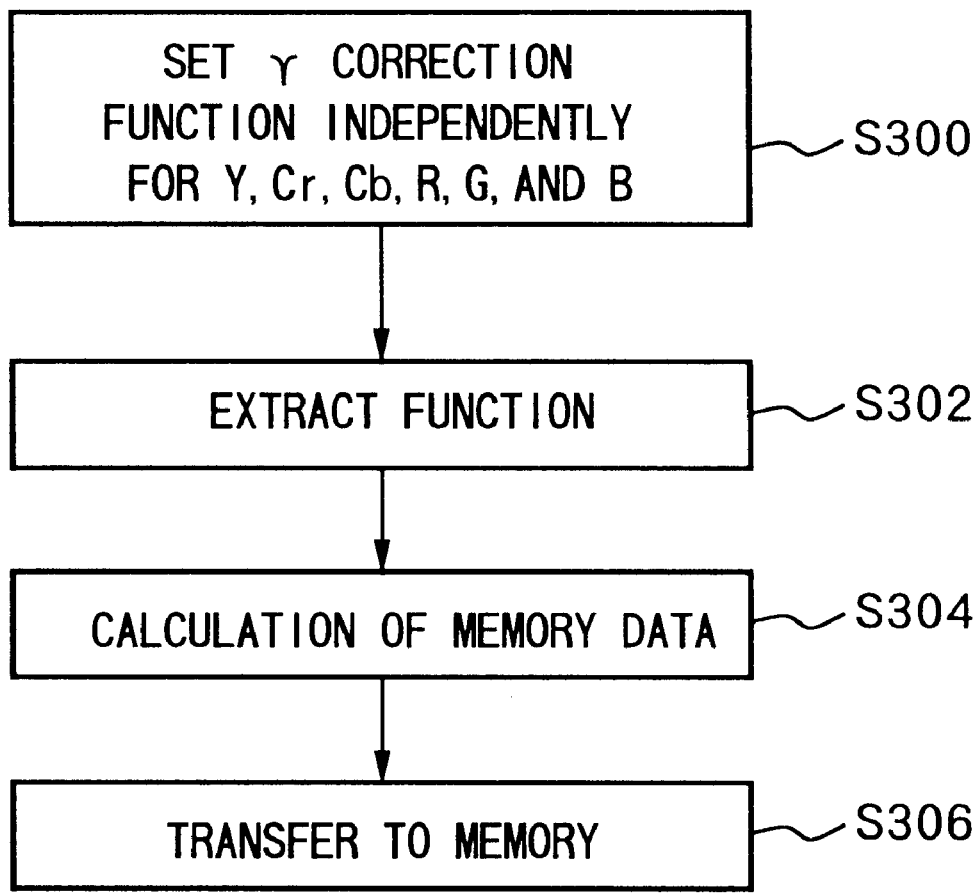
FIG. 36 is a flow chart of the processing of a image data processing system shown in FIG. 34.

FIG. 36 is a flow chart of the processing of the image data processing system 8 shown in FIG. 34.

First, the personal computer 72 displays a window of one of the modes shown in FIGS. 35A to 35C on the monitor in accordance with the manipulation of the user with respect to the input device 70. The initial function displayed in the function graph part of FIGS. 35A to 35C is for example y=x (note, x is the value of the component input to the image data processing apparatus 7, and y is the value of the output data of the image data processing apparatus 7). The graph showing this initial function becomes a right-hand rising straight line.

Next, as shown in FIG. 36, at step S300, the user suitably sets the mode, adds, moves, and deletes passing points by using the mouse etc. of the input device 70 with respect to the window for designating the nonlinear characteristic of each of the components (for example, Y, Cr, Cb, R, G and B) of the color signals, and sets the nonlinear characteristic (γ correction function) independently with respect to each of these components. The personal computer 72 successively displays the curve (break point approximation line) of the graph of the function passing through each passing point on the monitor according to the manipulation of the user.

When the user notifies the termination of designation of the nonlinear characteristic to the personal computer 72 by clicking for example an execution button (not illustrated) in the GUI screen by using the mouse of the input device 70, at step S302, the personal computer 72 extracts the break point approximation function of the final nonlinear characteristic of each of the components designated by the user.

At step S304, the personal computer 72 calculates the nonlinear data (memory data) of each of the components stored in the memory circuit 62 of the image data processing apparatus 7 based on the break point approximation function extracted in accordance with the designation of the user.

At step S306, the personal computer 72 stores the calculated nonlinear data in the memory circuit 62 of the image data processing apparatus 7 for processing each of the components.

When the above operations are terminated, the personal computer 72 controls the selector circuit 60 of each image data processing apparatus 7 to make them output components of color signals input from the image source 74 to the image data processing apparatuses 7 for processing these components.

Each of the image data processing apparatuses 7 performs nonlinear processing with respect to an input component as mentioned in the seventh embodiment and outputs the output data to the image monitor 76.

The image monitor 76 converts the component of the color signal output from each of the image data processing apparatuses 7 to a video signal of an analog format and displays this to show the same to the user.

Ninth Embodiment

Below, a ninth embodiment of the present invention will be explained.

According to the image data processing system 8 shown as the eighth embodiment, the content of the nonlinear processing can be freely set by using a GUI for every component (Y, Cr, Cb, R, G, B, etc.) of the color signal. Further, the result of the processing can be quickly confirmed on the monitor.

However, the image data processing system 8 (FIG. 34) is constituted only for nonlinear processing such as color correction and γ correction. Further, when it is desired to perform other processing such as imparting of a special effect, it is necessary to further add other processors to the image data processing system 8.

The ninth embodiment of the present invention is constituted so as to perform nonlinear processing with respect to the image data by using a DSP in order to solve the above problem.

Configuration of Image Data Processing System 9

Figure 37:
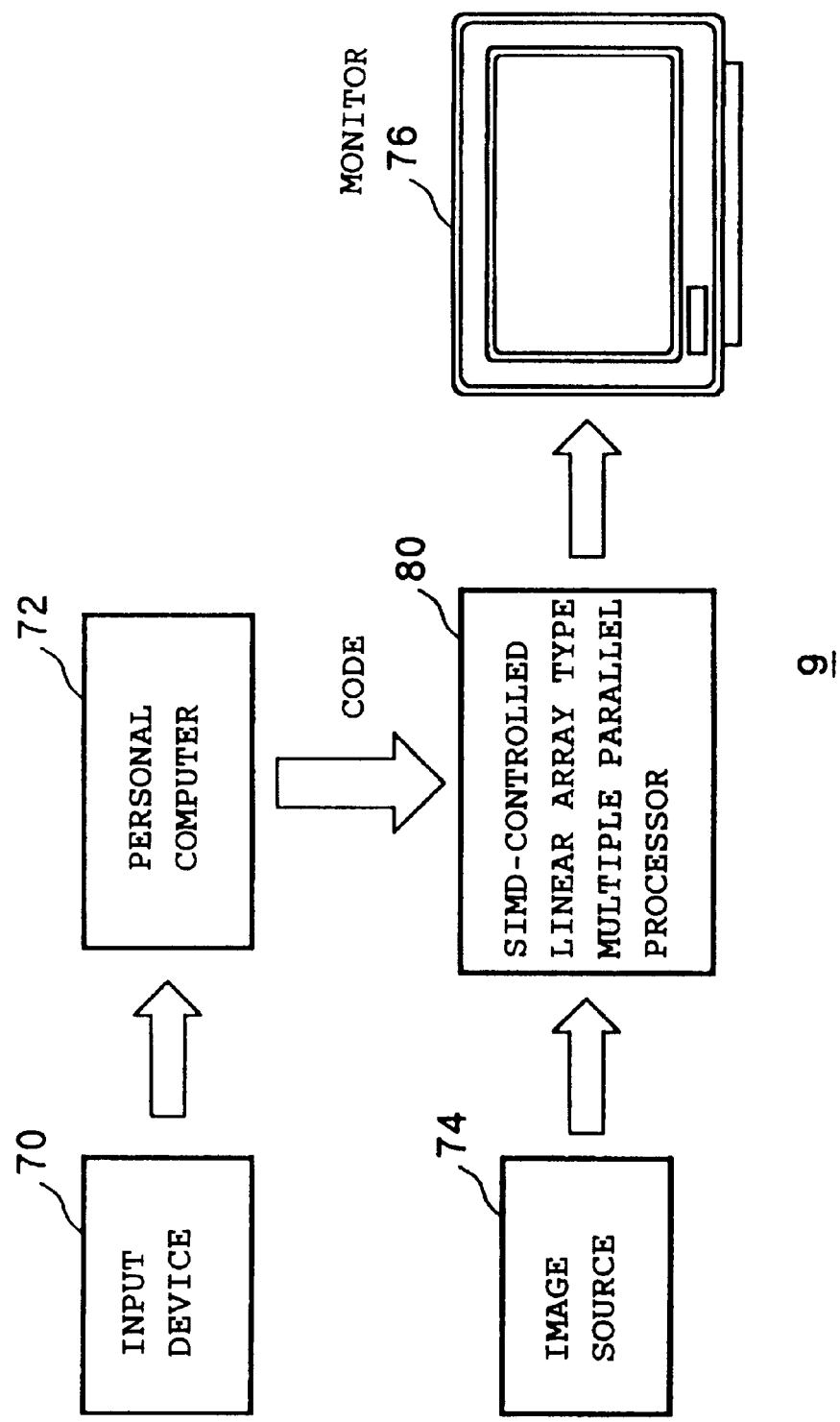
FIG. 37 is a view of the configuration of a ninth embodiment of the present invention.

FIG. 37 is a view of the configuration of the ninth embodiment (image data processing system 9) of the present invention. Note that, the same constituent parts as those of the image data processing system 8 shown in FIG. 34 among the constituent parts of the image data processing system 9 shown in FIG. 37 are indicated by the same reference numerals.

As shown in FIG. 37, the image data processing system 9 is configured with the image data processing apparatus 7 of the image data processing system 8 (FIG. 34) mentioned in the eighth embodiment replaced by a DSP 80.

DSP 80

The SIMD-controlled linear array type multiple parallel type DSP 80 is for example a parallel processor 2 to 6 indicated in the second embodiment to the sixth embodiment (FIG. 13, FIG. 16, FIG. 25, FIG. 30, FIG. 32), processes the components of color signals input under SIMD control in parallel, and outputs the same to the image monitor 76.

Operation of Image Data Processing System 9

Below, an explanation will be made of the operation of the image data processing system 9.

Figure 38:
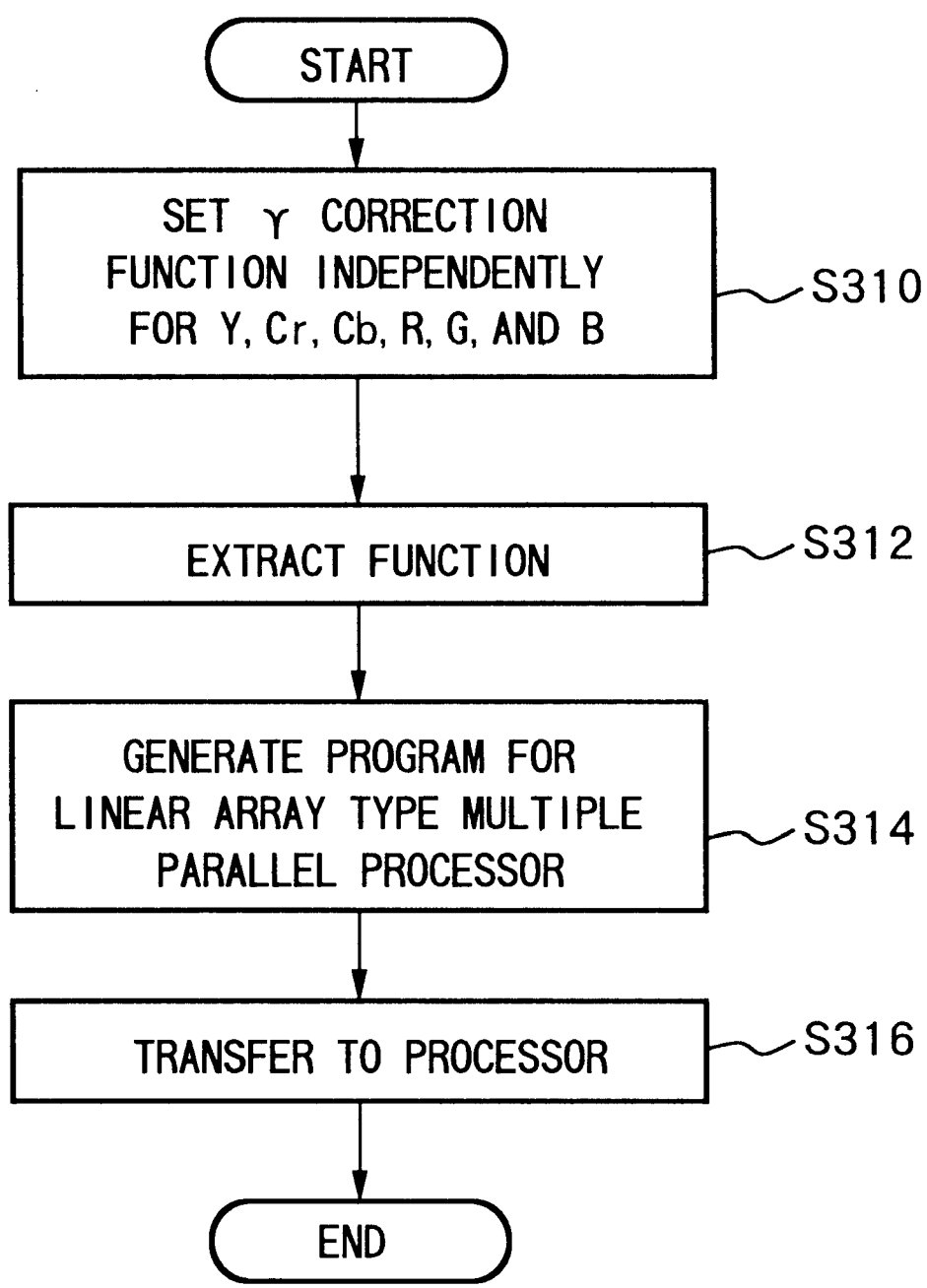
FIG. 38 is a flow chart of the processing of the image data processing system shown in FIG. 37.

FIG. 38 is a flow chart of the processing of the image data processing system 9 shown in FIG. 37.

Figure 39:
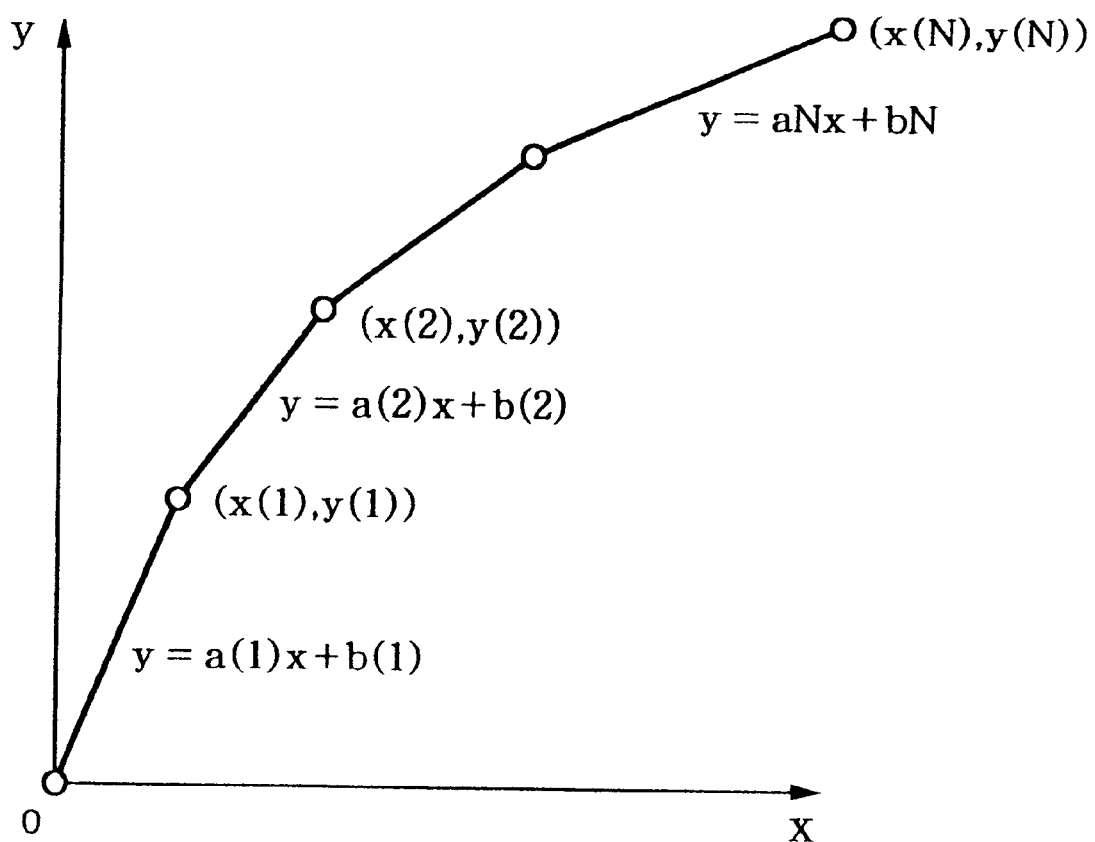
FIG. 39 is a view of an example of a break point approximation function extracted by a personal computer of the image data processing system shown in FIG. 37.

FIG. 39 is a view of an example of the break point approximation function extracted by the personal computer 72 of the image data processing system 9 shown in FIG. 37.

In the image data processing system 9, first, the personal computer 72 displays a window of one of the modes shown in FIGS. 35A to 35C on the monitor in accordance with the manipulation of the user with respect to the input device 70 in the same way as that in the image data processing system 8 (FIG. 34).

Next, as shown in FIG. 36, at step S310, the user suitably sets the mode, adds, moves, and deletes the passing points by using the mouse etc. of the input device 70 with respect to the window for designating the nonlinear characteristic of each of components of the color signals (for example, Y, Cr, Cb, R, G, B), and sets the nonlinear characteristic (γ correction function) independently with respect to each of these components. The personal computer 72 sequentially displays curves (break point approximation lines) of the graph of functions passing through passing points on the monitor in accordance with the manipulation of the user in the same way as that in the image data processing system 8.

Figure 35D:
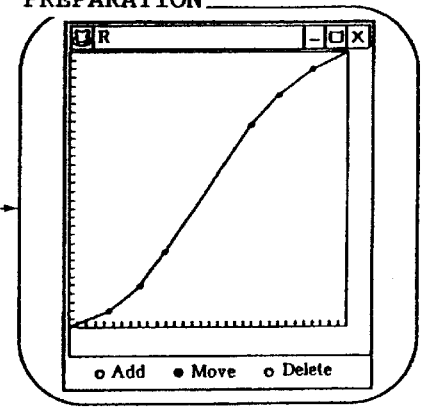

When the user informs the ending of designation of the nonlinear characteristic with respect to the personal computer 72 by clicking the execution button (not illustrated) in the GUI screen by using the mouse of the input device 70, at step S312, the personal computer 72 displays the break point approximation function of the final nonlinear characteristic shown in for example FIG. 39 in the windows of each of the components in the same way as that in the image data processing system 8 (FIG. 35D).

At step S314, the personal computer 72 generates a program for executing the nonlinear processing indicated by the extracted break point approximation function by the linear array type multiple parallel processor (DSP 80).

At step S316, the personal computer 72 downloads the generated program to the DSP 80.

By the operations explained in the second to sixth embodiments, the DSP 80 performs nonlinear processing with respect to the input component as mentioned in the second to seventh embodiments and outputs the output data to the image monitor 76.

The image monitor 76 converts the component of the color signal output by the DSP 80 to a video signal of the analog format and displays and indicates the same to the user in the same way as that in the image data processing system 8.

Example of Program of DSP 80

Below, an explanation will be made of an example of the program downloaded to the DSP 80 by the personal computer 72.

By the processings of S312 and S314 of FIG. 38, the personal computer 72 extracts the nonlinear characteristic as a set of primary functions (N number of break point approximation functions) defined by the following equations in each of the N number of areas. Accordingly, the nonlinear processing can be realized by performing a linear operation for each of these N number of areas.

$$y=a_1x+b_1 \text{ (0 (smallest value)} < x \leq 30; x_1=30)$$
$$y=a_2x+b_2 \text{ (30} < x \leq 80; x_2=80)$$
$$y=a_3x+b_3 \text{ (80} < x \leq 120; x_2=120)$$
$$y=a_Nx+b_N \text{ (200} < x \leq 255 \text{ (largest value)}; x_2=255) \quad (9)$$

Below, an explanation will be made of the content of the processing of the program downloaded to the DSP 80 by the personal computer 72 by referring to FIG. 40.

Figure 40:
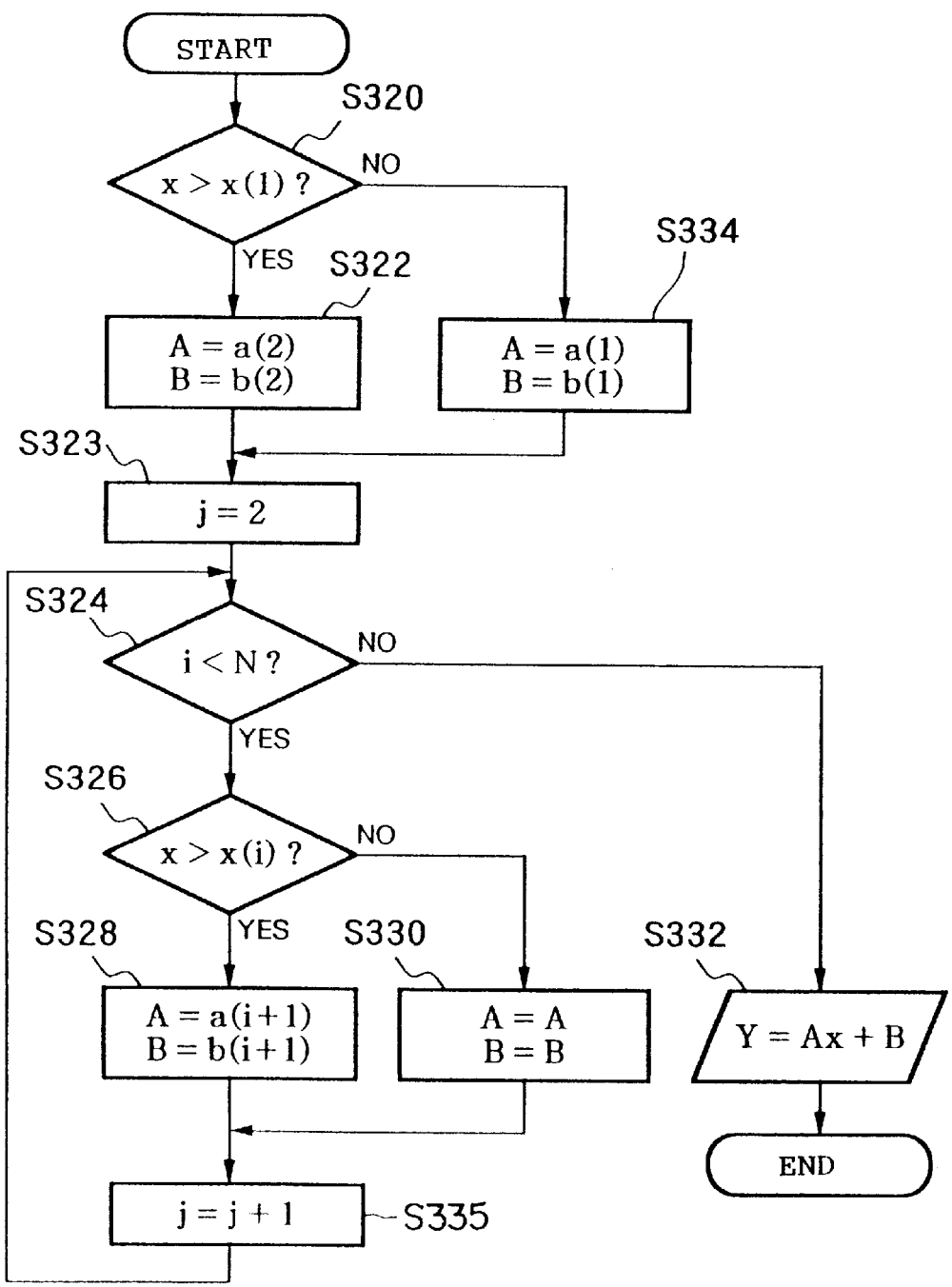
FIG. 40 is a flow chart of a program of a DSP (FIG. 37) realizing nonlinear processing by performing a linear operation for every N number of areas.

FIG. 40 is a flow chart of the program of the DSP 80 (FIG. 37) for realizing the nonlinear processing by performing the linear operation for every N number of areas.

First, the DSP 80 secures the area for storing the coefficient of each primary function shown in equation 5 in the memory.

At step S320, the DSP 80 decides whether or not the value x of the component of the color signal input is larger than a first boundary value $x_1$ of the area, proceeds to the processing of S322 where it is larger than the latter, and proceeds to the processing of S334 where it is not larger than the latter.

At step S322, the DSP 80 assigns a coefficient $a_2$ (a(2)) shown in equation 5 for a variable A and assigns a coefficient $b_2$ (b(2)) for a variable B.

At step S334, the DSP 80 assigns a coefficient $a_1$ (a(1)) shown in equation 5 for the variable A and assigns a coefficient $b_1$ (b(1)) for the variable B.

At step S323, the DSP 80 assigns the numerical value 2 for the variable i.

At step S324, the DSP 80 decides whether or not the variable i is less than the number N of areas, proceeds to the processing of S326 where i<N, and proceeds to the processing of S332 where i is not less than N.

At the processing of step S326, the DSP 80 decides whether or not the value x of the component is larger than $x_i$ (x(i)) of each equation of equation 5, proceeds to the processing of S328 where x>$x_i$, and proceeds to the processing of S330 where x is not larger than $x_i$.

At step S328, the DSP 80 assigns coefficients $a_{i+1}$ and $b_{i+1}$ shown in equation 5 for the variables A and B, respectively, stores the same, and proceeds to the processing of S335.

At step S330, the DSP 80 stores the values of the variables A and B and proceeds to the processing of S335.

At step S335, the DSP 80 adds the numerical value 1 to the variable i and proceeds to the processing of S330.

At step S332, the DSP 80 multiplies the value x of the component with the variables A and B and further adds the variable b to calculate the value of the output data y (y=Ax+B).

In other words, the DSP 80 performs the following processing instead of the processing of S326 to S332 and S335 mentioned above.

In the processing of step S326, the DSP 80 decides whether or not the value x of the component is larger than $x_i$ (x(2)) of each equation of equation 5, proceeds to the processing of S328 where x>$x_2$, and proceeds to the processing of S330 where x is not larger than $x_2$.

Further, the DSP 80 repeats the processing of S326, S328, and S330 up to the value $x_{N-1}$ of the component and variables $a_N$ and $b_N$ while changing the value of the component $x_2$ and values of the variables $a_3$ and $b_3$.

At step S332, the DSP 80 finally multiplies the value x of component and the variable A and further adds the value of the variable B to obtain the output data y.

According to the image data processing systems 8 and 9 shown as the eighth and ninth embodiments of the present invention, the data indicating the characteristic of the nonlinear processing can be input with the method of input using a GUI which had not been considered in the related art.

Further, according to the image data processing system 9 shown as the ninth embodiment of the present invention, the DSP 80 (parallel processors 2 to 6) is used in place of the image data processing apparatus 7 (FIG. 34), therefore processing other than the nonlinear processing such as imparting a special effect with respect to the components of the color signal can be carried out by software.

Further, according to the image data processing systems 8 and 9 shown as the eighth and ninth embodiments of the present invention, the output data obtained as the result of the processing can be immediately confirmed and the nonlinear characteristic can be optimized while confirming the output image.

10th Embodiment

Chroma key processing has been considered indispensable in systems for adding special effects to the image of a TV, camera, video, image editing apparatus, special effect apparatus, etc. irrespective of the purpose such as a consumer use or broadcasting station use.

Note that, for example, where the image of a man standing in front of a blue wall and the image of a building are chroma key synthesized to prepare an image of the man is standing in front of the building is prepared, the image of the man is referred to as a foreground image (image for synthesis), the image of the building is referred to as the background image (base image), and the blue part on the outside of the man is referred to as a background color (color of key or color of back). That is, by the chroma key processing, the pixel of the color designated as the background color in a foreground image is replaced with a pixel of the background image.

Figure 41:
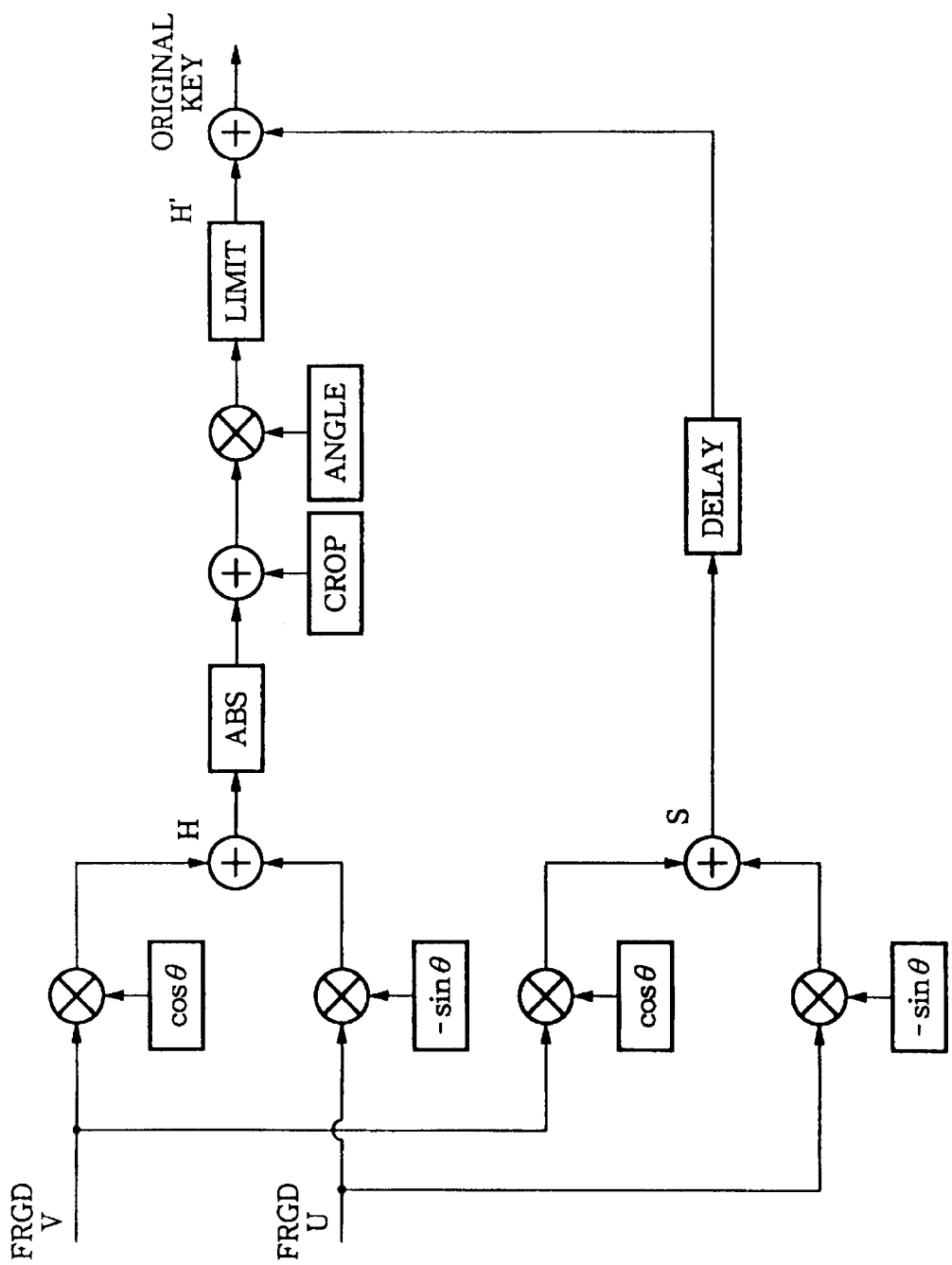
FIG. 41 is a view of an example of the configuration of a chroma key device performing analog processing.

FIG. 41 is a view of an example of the configuration of the chroma key apparatus performing analog processing.

Figure 42:
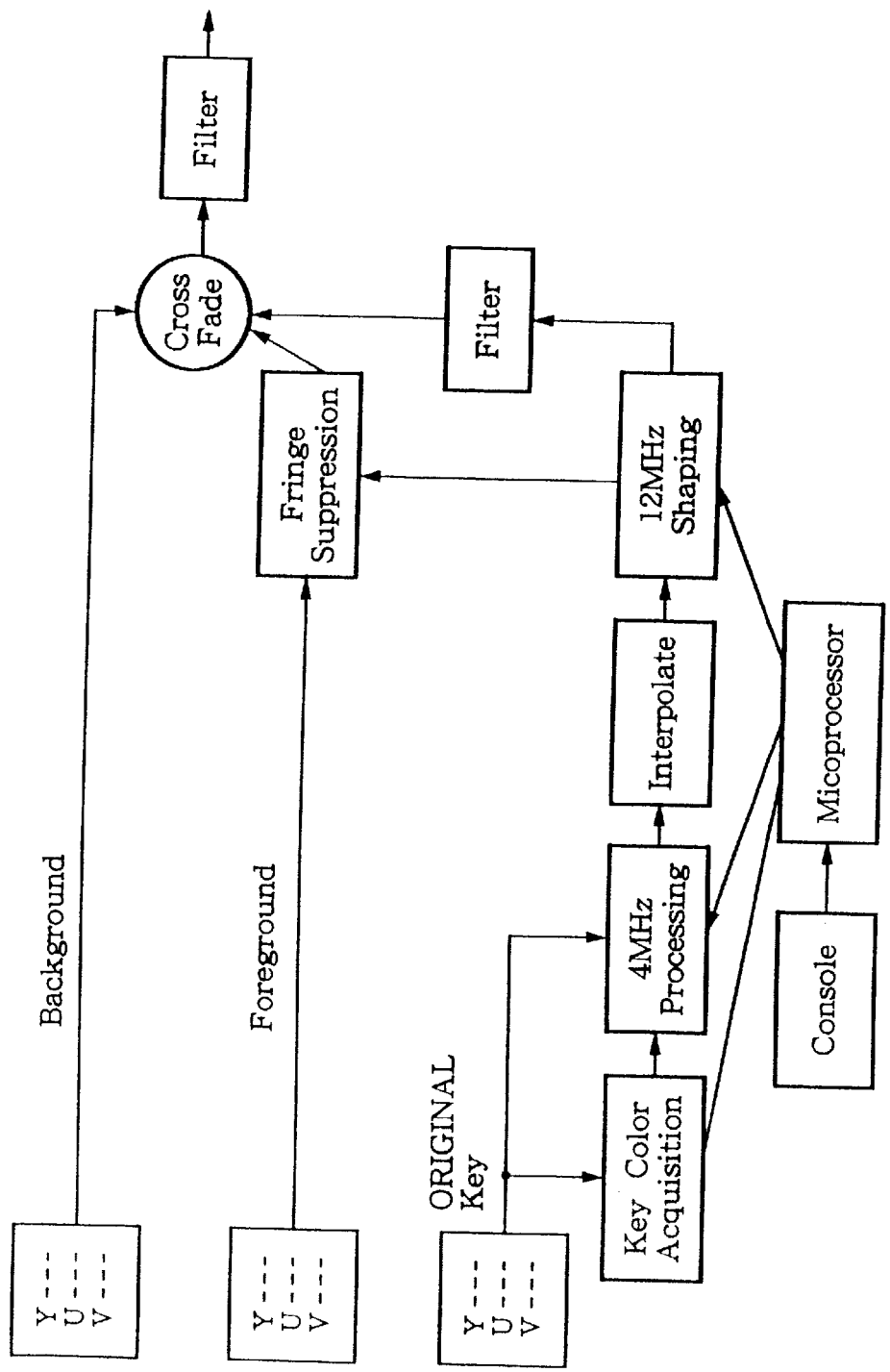
FIG. 42 is a view of an example of the configuration of a chroma key device performing digital processing.

FIG. 42 is a view of an example of the configuration of the chroma key apparatus performing digital processing.

In general, a chroma key apparatus which performs chroma key processing with respect to an image in an analog or digital format is configured with a large number of multipliers, adders, etc. connected as shown in FIG. 41 and FIG. 42.

However, if chroma key processing is carried out by the analog chroma key apparatus shown in FIG. 41, the quality of the image after processing is deteriorated.

Further, the digital chroma key apparatus shown in FIG. 42 has a large circuit size and in addition can designate only a predetermined color (for example blue color) as the background image.

An image data processing system 10 explained below as the 10th embodiment of the present invention was made so as to solve the problem of the general chroma key apparatus mentioned above and is constituted so as to be able to prevent deterioration of the quality of the image after processing, designate any color as the background image, and designate the content of the chroma key processing by the GUI.

Configuration of Image Data Processing System 10

Figure 43:
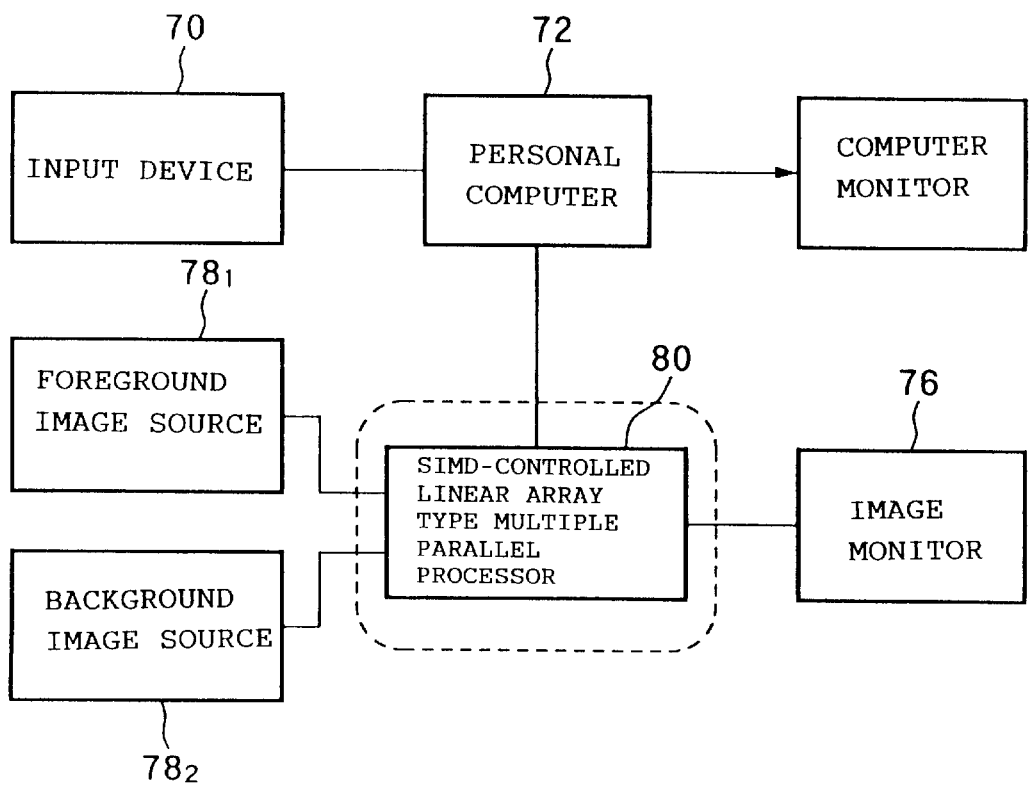
FIG. 43 is a view of the configuration of a 10th embodiment of the present invention.

FIG. 43 is a view of the configuration of the 10th embodiment (image data processing system 10) of the present invention. Note that, constituent parts the same as those of the image data processing systems 8 and 9 shown in FIG. 34 and FIG. 37 among the constituent parts of the image data processing system 10 shown in FIG. 43 are indicated by the same reference numerals.

Figure 44:
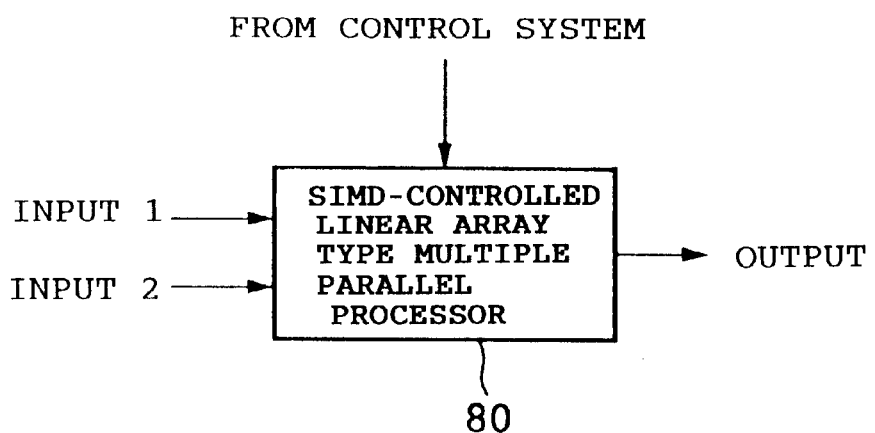
FIG. 44 is a view of the data input or output to or from the DSP shown in FIG. 43.

FIG. 44 is a view of the data input to or output from the DSP 80 shown in FIG. 43.

As shown in FIG. 43, the image data processing system 10 is constituted by the input device 70, personal computer 72, image monitor 76, DSP 80, a foreground image source $78_1$, and a background image source $78_2$.

That is, it adopts a configuration in which the image source 74 of the image data processing system 9 (FIG. 37) is replaced with the foreground image source $78_1$ and the background image source $78_2$ and, as shown in FIG. 44, the foreground image data which becomes the target of the chroma key processing is input to the DSP 80 from the foreground image source $78_1$ as the input data 1 and the background image data is similarly input from the background image source $78_2$ as the input data 2.

Constituent Parts of Image Data Processing System 10

Below, an explanation will be made of the operation of the constituent parts of the image data processing system 10 different from those in the image data processing systems 8 and 9.

Input Device 70

Figure 45:
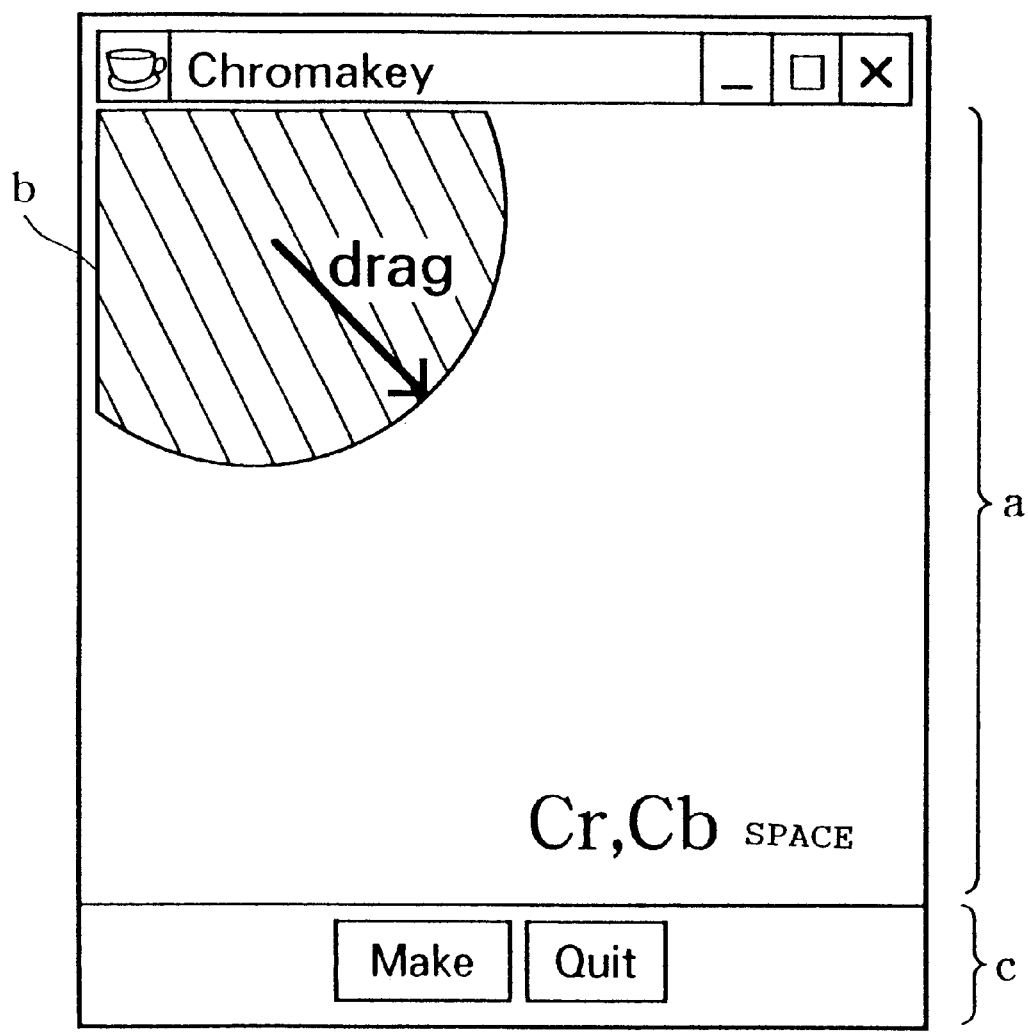
FIG. 45 is a view of an example of a GUI image for setting a background color of the chroma key processing displayed by the personal computer of the image data processing system (FIG. 43) on the monitor.

FIG. 45 is a view of an example of the GUI image for setting the background color of the chroma key processing displayed on the computer monitor (may be the image monitor 76 too) by the personal computer 72 of the image data processing system 10 (FIG. 43).

The input device 70 contains a keyboard, tablet, track ball, acupoint, etc. in the same way as those in the image data processing systems 8 and 9 (FIG. 34 and FIG. 37) etc., receives the setting operation of the user with respect to the GUI image shown in FIG. 45, and outputs the background initialization data for designating the image part for replacing the foreground image of the chroma key processing by the background image to the personal computer 72.

Foreground Image Source $78_1$, Background Image Source $78_2$

The foreground image source $78_1$ and the background image source $78_2$ are a video camera, VTR apparatus, etc. in the same way as the image source 74 of the image data processing system 9.

The foreground image source $78_1$ outputs the background image and the foreground image data to be superimposed on the background image to the DSP 80.

The background image source $78_2$ outputs the foreground image and the background image data to be superimposed on the foreground image to the DSP 80.

Personal Computer 72

The personal computer 72 displays the GUI image used for indicating for example the color space (Cr-Cb space) of the background color shown in FIG. 45 and setting the background color of the chroma key processing and controls the DSP 80 based on the background color data input via the input device 70.

Background Color Setting GUI Image and Designation of Background Color Using This Below, an explanation will be made of the content of the GUI image for setting the background color shown in FIG. 45 and the processing for setting the background color by the personal computer 72.

A range a of the GUI image for setting the background color indicates the color (Cr-Cb) space. For example, an abscissa (x) of the range a indicates the chroma signal Cr, an ordinate (y) indicates the chroma signal Cb, and a coordinate of the x-axis and y-axis correspond to intensities (values) of the chroma signals Cb and Cr, respectively. Further, inside the square part of the range a, colors expressed by chroma signals of Cb and Cr of values respectively corresponding to coordinates of the x-axis and y-axis, that is, in the range a of the GUI image for setting the background color, all of the colors contained in the foreground image data output from the foreground image source $78_1$ to the image monitor 76 (colors which can be displayed on the image monitor 76) are displayed in a graduation.

For example, when the user moves a cursor to the range a of the GUI image for setting the background color displayed on the monitor of the computer of the personal computer 72 by using the mouse of the input device 70 and clicks on and moves (drags) the cursor while depressing the predetermined button of the mouse, the personal computer 72 displays an arrow (drag) and an oval b corresponding to the area from the position at which the user first depresses the button of the mouse to the position to which the user drags the mouse in the range a on the screen of the monitor of the computer in accordance with the manipulation of the user as shown in FIG. 45 in accordance with the predetermined setting with respect to the mouse.

Further, when the user releases the button of the mouse, the personal computer 72 defines an oval b (graphic) having the first clicked position ($x_1$, $y_1$) as the center, having the position ($x_2$, $y_2$) at which the user released the button of the mouse as a point of the circumference, and having two axes in parallel to the x-axis and y-axis and uses all colors contained within the range of the defined oval b (figure) as the background colors (key colors) of the chroma key processing.

Alternatively, the personal computer 72 defines a rectangle (graphic, not illustrated) having for example a line connecting the first clicked position ($x_1$, $y_1$) and the position ($x_2$, $y_2$) at which the user releases the button of the mouse as a diagonal and having sides parallel to the x-axis or y-axis and uses all colors contained within the range of the defined rectangle (graphic) as background colors of the chroma key processing in accordance with other settings with respect to the mouse.

Further, when the user clicks for example the "Make" button in a range c of the GUI image for setting the background color by the mouse, the personal computer 72 generates software for calculating the ranges of values of chroma signals Cb and Cr corresponding to all colors contained within the range of the defined graphic and superposing background image data input from the background image source $78_2$ in that corresponding range so as to replace by the background image those of the pixels of the foreground image data input from the foreground image source $78_1$ in which values of the chroma signals Cb and Cr are within the range of the calculated chroma signals Cb and Cr and sets this in the DSP 80.

Example of Program for DSP 80

Below, an explanation will be given of the content of the processing of the program for the DSP 80 generated by the personal computer 72 in accordance with a manipulation by the user on the GUI image for setting the background color taking as an example a case where the range of the oval b shown in FIG. 45 is defined as the background color by further referring to FIG. 46.

Figure 46:
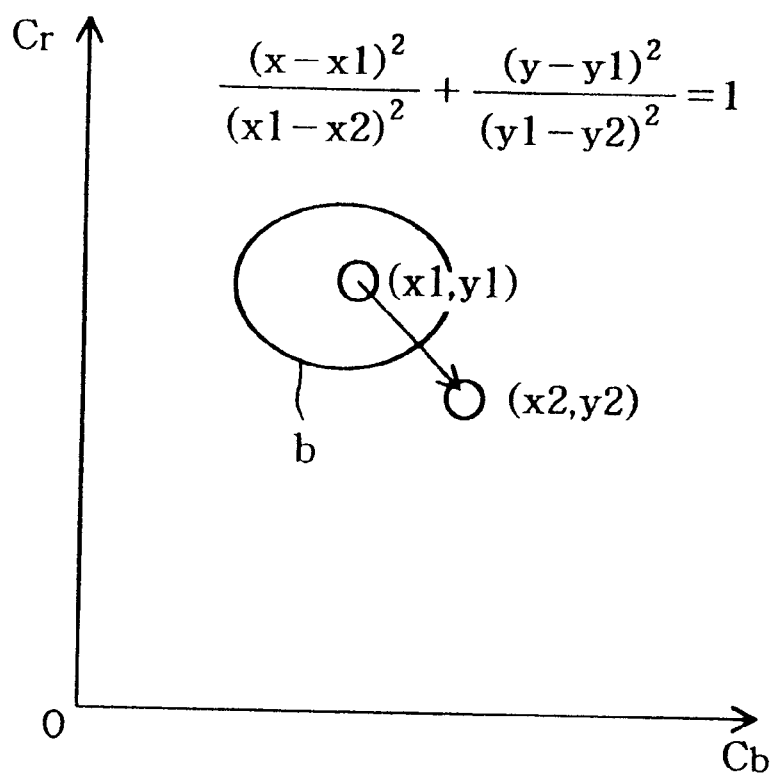
FIG. 46 is a view of an example of the processing of a chroma key processing program for a DSP generated by the personal computer of the image data processing system (FIG. 43).

FIG. 46 is a view of an example of the processing of the chroma key processing program for the DSP 80 generated by the personal computer 72 of an image data processing system 10 (FIG. 43).

The personal computer 72 generates a program for making the DSP 80 perform the processing for deciding whether or not the coordinates (x, y) in the color (Cr-Cb) space corresponding to the chroma signals Cb and Cr of the pixels of the foreground image data are located inside the oval b (FIG. 45) as shown in FIG. 46 and replacing pixels of the foreground image data with coordinates (x, y) in the color (Cr-Cb) space of the chroma signals Cb and Cr located inside the oval b with pixels of the background image data at the corresponding positions. Note that the generation of the program mentioned here includes for example processing for rewriting only the parameters in a template program.

Content of Processing of DSP 80

First, the content of processing of the DSP 80 will be briefly explained.

Each of the processor elements 30 (FIG. 32, etc.) of the DSP 80 receives one of the pixel data of the background image and foreground image contained in one horizontal scanning period and assigns numerical values $(x-x_1)$ and $(y-y_1)$ obtained by subtracting the center coordinates $(x_1, y_1)$ of the oval b in the color space from the coordinates (x, y) in the color space of the chroma signals Cb and Cr of the pixel data of the foreground image for the variables $T_1$ and $T_2$ ($T_1=x-x_1$, $T_2=y-y_1$).

Next, the processor element 30 squares the values of the variables $T_1$ and $T_2$ calculated by the above processing and assigns the squared values for the variables $T_1$ and $T_2$ respectively ($T_1=(x_2-x_1)^2$, $T_2=(y_2-y_1)^2$).

Next, it assigns an added value of the variable $T_1$ and the variable $T_2$ for a variable $T_3$ ($T_3=T_1+T_2$).

Next, the processor element 30 compares the variable $T_3$ and a numerical value $T_4$. When the variable $T_3$ is less than the constant $T_4$, which does not depend upon the data for every pixel ($T_4=(x_2-x_1)^2\times(y_2-y_1)^2$), it decides that the coordinates of the chroma signals Cb and Cr of the pixel data are located inside the oval b and proceeds to the following processing B, while when the variable $T_3$ is equal to or larger than the constant $T_4$, decides that the coordinates of the chroma signals Cb and Cr of the pixel data are located outside of the oval b and proceeds to the following processing A.

In the processing A, the processor element 30 performs the processing for output of the pixel data of the input background image.

In the processing B, the processor element 30 performs the processing for output of the pixel data of the foreground image in place of the pixel data of the input background image.

Note that it is also possible for the DSP 80 to subtract a numerical value $((x_2-x_1)^2\times(y_2-y_1)_2)\times0.8$ from the value of the calculated variable $T_3$, limits this within the range of 0 to $((x_2-x_1)^2\times(y_2-y_1)_2)\times0.2$, multiplies the variable $T_3$ by a numerical value $5/((x_2-x_1)^2\times(y_2-y_1)_2)$ to calculate a new variable $T_3$, uses the variable $T_3$ as the chroma key data and for the processor element 30 to perform the processing for output of the pixel data obtained by adding the multiplied value of the pixel data of the foreground image and the variable $T_3$ (pixel data of foreground image$\times T_3$) and the multiplied value of the pixel data of the background image and a value obtained by subtracting the variable $T_3$ from 1 so as to make the switch between the background image and the foreground image smooth. Note that this is the technique referred to as a "soft key".

Figure 47:
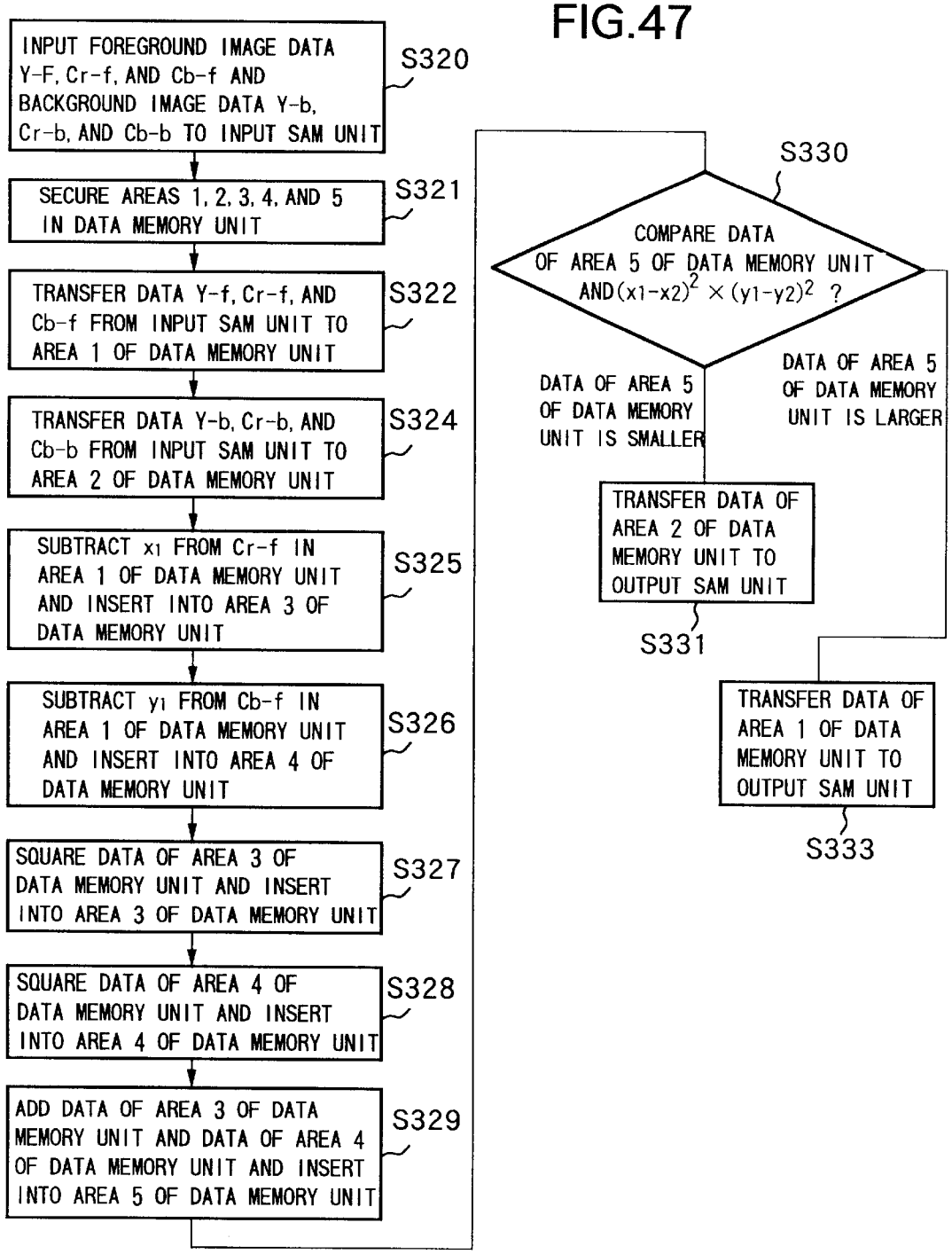
FIG. 47 is a flow chart exemplifying the content of the chroma key processing program executed by a processor element (FIG. 32, etc.) for a DSP generated by the personal computer of the image data processing system (FIG. 43).

The processing of the DSP 80 based on the program generated by the personal computer 72 will be concretely explained by further referring to FIG. 47.

FIG. 47 is a flow chart of an example of the content of the chroma key processing program executed by the processor element 30 (FIG. 32 etc.) for the DSP 80 generated by the personal computer 72 of the image data processing system 10 (FIG. 43).

At step S320, the processor elements 30 of the DSP 80 input data of Y-f, Cr-f, and Cb-f of the background image data and data of Y-f, Cr-f and Cb-f of the foreground image data to the input SAM unit.

At step S321, the processor elements 30 secure the areas 1 to 5 in the data memory unit.

At step S322, the processor element 30 transfer data of Y-f, Cr-f, and Cb-f of the foreground image from the input SAM unit to area 1 of the data memory unit.

At step S324, the processor elements 30 transfer data of Y-f, Cr-f, and Cb-f of the background image from the input SAM unit to a data area 2.

At step S325, the ALU array units of the processor elements 30 subtract the numerical value $X_1$ input from the GUI from the Cr-f data of the foreground image of area 1 of the data memory and store (assign) this into area 3 of the data memory unit.

At step S326, the ALU array units of the processor elements 30 subtract the numerical value $Y_1$ input from the GUI from the Cb-f data of the data memory unit and store (assign) this into area 4 of the data memory unit.

At step S327, the ALU array units of the processor elements 30 square the data of area 3 of the data memory unit and store (assign) this into area 3 of the data memory unit.

At step S328, the ALU array units of the processor elements 30 square the data of area 4 of the data memory unit and store (assign) this into area 4 of the data memory unit.

At step S329, the ALU array units of the processor elements 30 add the data of area 3 and the data of area 4 of the data memory unit and store (assign) this into area 5 of the data memory unit.

At step S330, the ALU array units of the processor elements 30 compare the data of area 5 of the data memory unit and the constant $T_4$ ($T_4=(x_2-x_1)^2\times(y_2-y_1)^2$) and proceed to the processing of S331 when the data of area 5 of the data memory unit is less than the constant $T_4$, while proceed to the processing of S332 when the data of area 5 of the data memory unit is equal to or larger than the constant $T_4$.

At step S331, the processor elements 30 output the data of area 2 of the data memory unit via the output SAM unit.

At step S332, the processor elements 30 output the data of area 1 of the data memory unit via the output SAM unit.

Operation of Image Data Processing System 10

Below, an explanation will be made of the operation of the image data processing system 10 shown in FIG. 43 by referring to FIG. 48.

Figure 48:
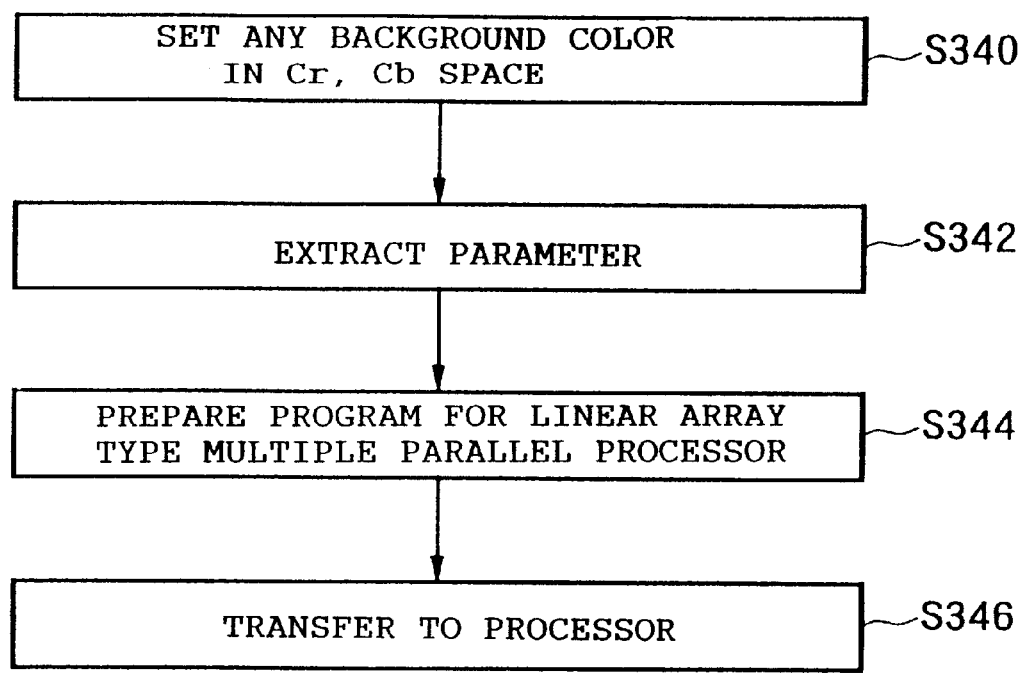
FIG. 48 is a flow chart of the chroma key processing by the image data processing system (FIG. 43).

FIG. 48 is a flow chart of the chroma key processing by the image data processing system 10 (FIG. 43).

As shown in FIG. 48, at step S340, the personal computer 72 displays a GUI image (FIG. 45) for setting the background color on the monitor of the computer.

At step S342, the user designates the range of the color which should be used as the background color by a graphic by the mouse etc. of the input device 70 with respect to the display of the GUI image for setting the background color.

At step S344, when the user depresses the "Make" button of the GUI image for setting the background color by the mouse etc. of the input device 70, the personal computer 72 generates a program for setting all of the colors contained in the range designated by the graphic as the background color and superimposing the background image on the part of the background color of the foreground image (FIG. 46 and FIG. 47).

At step S346, the personal computer 72 downloads the generated program to the DSP 80. The DSP 80 executes the downloaded program, performs the real time image processing shown in FIG. 46 and FIG. 47, and displays the result of the chroma key processing on the image monitor 76.

As explained above, by the image data processing system 10 according to the present invention, chroma key processing can be realized by a software programmable small SIMD-controlled linear array type multiple parallel processor having a high generality and the background color of the chroma key can be easily set by a GUI operation.

Further, since the image data processing system 10 according to the present invention performs the chroma key processing by software, any background color can be set and in addition the change thereof is simple.

Note that, in the above 10th embodiment, a case was shown where an oval or rectangular range of the color space was set as the background color, but it is also possible to set the inside of a range of another graphic, for example a circle or a square or the outside of the range as the background color.

Further, in the 10th embodiment, the color space was expressed by the chroma signals Cb and Cr, but it is also possible to constitute the image data processing system 10 so that the color space is expressed by another signal, for example, RGB signals, and subject the RGB signal of the image data input from the foreground image source $78_1$ and the background image source $78_2$ to the chroma key processing.

Further, the method of setting the background color of the chroma key processing in the 10th embodiment can be applied to not only an SIMD-controlled linear array type multiple parallel processor, but also a DSP of other formats.

11th Embodiment

Below, an 11th embodiment of the present invention will be explained.

Contour Enhancement

Below, an explanation will be made of contour enhancement by referring to FIG. 49 and FIG. 50.

Figure 49:
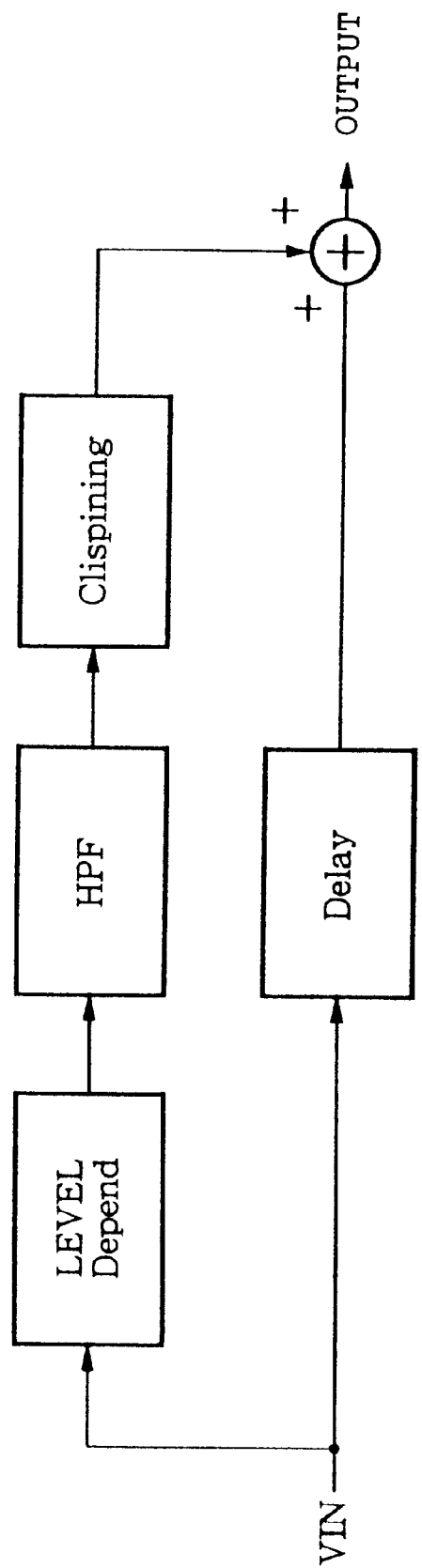
FIG. 49 is a first view of contour enhancement by the image data processing system (FIG. 37) shown as an 11th embodiment.

FIG. 49 is a first view of the contour enhancement by the image data processing system 9 (FIG. 37) shown as the 11th embodiment.

FIGS. 50A to 50E are second views of the contour enhancement by the image data processing system 9 (FIG. 37) shown as the 11th embodiment.

As shown in FIG. 49, the contour enhancement includes level depend processing, filtering, clispining, delay, and addition. Note that, in actuality, conversion (FIG. 50A) for the contour of either of the luminance signal Y or the chroma signals Cb and Cr is placed before these processings.

Level Depend Processing

Figure 50A:
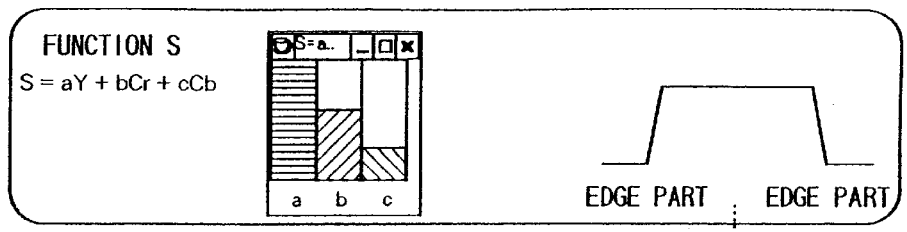
FIGS. 50A to 50E are second views of the contour enhancement by the image data processing system (FIG. 37) shown as the 11th embodiment.
Figure 50B:
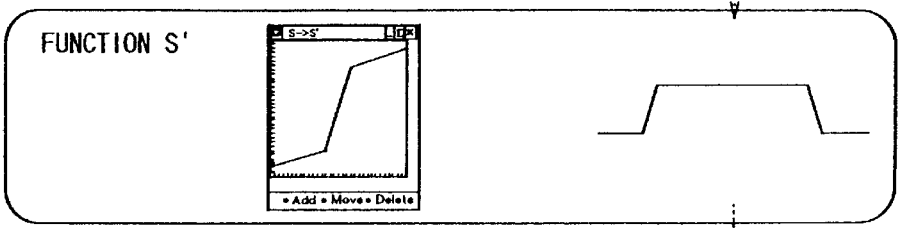

In the contour enhancement, the level depend processing shown in FIG. 50B is for nonlinear conversion of the image data VIN input from a video apparatus such as an external VTR apparatus by a similar method to the color correction (γ correction) indicated in the eighth embodiment and for enhancement of the component for enhancing the contour of the image of the object in the image data.

Filtering

Figure 50C:
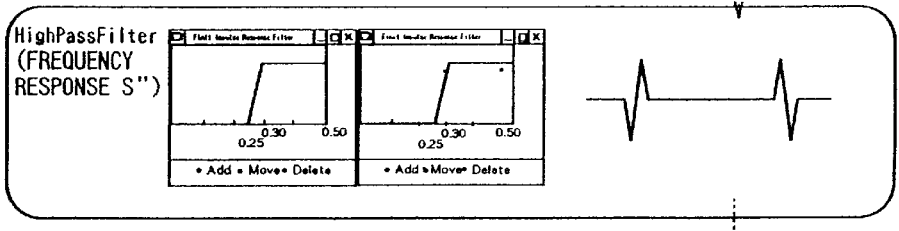

The filtering shown in FIG. 50C performs filtering using a high pass filter (HPF, in actuality an FIR filter is used. Refer to the 12th embodiment) for passing only the high frequency component of the level depend processed image data, detects the contour of the image of the object in the image data, and generates the contour data indicating the contour of the detected image.

Clispining

Figure 50D:
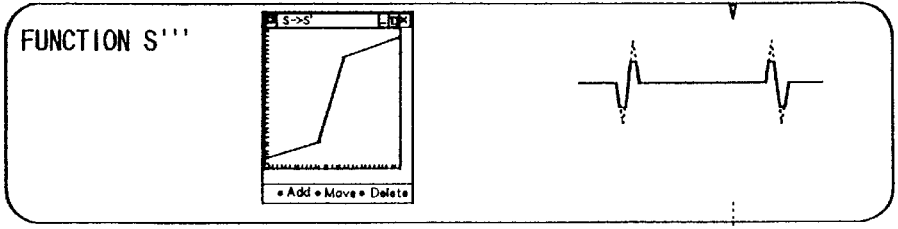

The clispining shown in FIG. 50D is for nonlinear conversion of the contour data to prevent the contour resulting from synthesis with the original image data from standing out too much.

Delay

The delay processing is for giving a time delay to the original image data by exactly a time required for the above processings so as to matching the timings of the clispined contour data processing and the original image data.

Addition

Figure 50E:
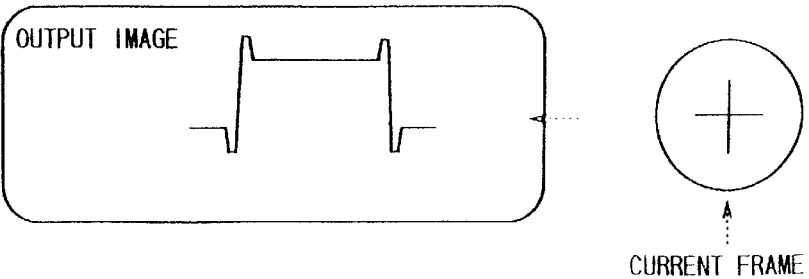

The addition shown in FIG. 50E is for adding the delayed original image data and the clispined contour data to generate the image data enhancing the contour of the image of the object.

In the 11th embodiment of the present invention, the operation of the image data processing system 9 shown in FIG. 37 is changed so as to be able to perform the contour enhancement by simply setting the processing characteristic of the above processings by for example a GUI.

Operation of Constituent Parts of Image Data Processing System 9 (FIG. 37)

Below, an explanation will be made of the operation of the constituent parts of the image data processing system 9 shown as the 11th embodiment.

DSP 80

The DSP 80 executes the program prepared by the personal computer 72, executes the conversion of the image data VIN and generation of an image data S by a function S, the level depend processing of the image data S and generation of an image data S' by a function S', the filtering by the filter indicating a frequency response S" and the generation of an image data S', the clispining of the image data S" and the generation of an image data S'" by a function S'", the delay processing of the image data VIN, and the addition of the delayed image data VIN and the image data S'", performs the contour enhancement, and displays the image data obtained as the result of processing on the image monitor 76.

Personal Computer 72

Below, an explanation will be made of the operation of the personal computer 72 by referring to FIG. 51 to FIG. 52.

Setting of Conversion Function

Figure 51:
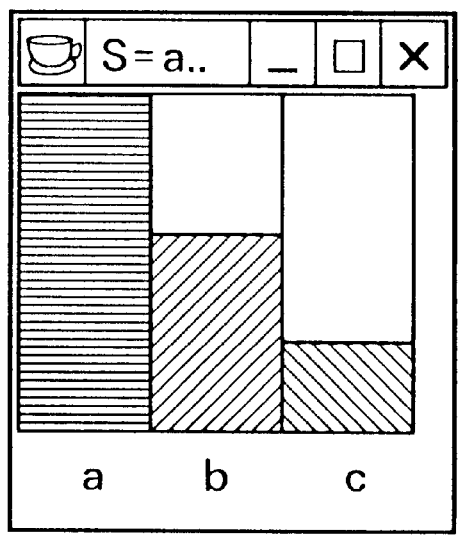
FIG. 51 is a view of a GUI image used for setting the function for enhancing a luminance signal Y and chroma signals Cb and Cr in the contour enhancement of the image data processing system (FIG. 37).

FIG. 51 is a view of the GUI image used for setting the function of enhancing the luminance signal Y and the chroma signals Cb and Cr in the contour enhancement by the image data processing system 9 (FIG. 37).

The personal computer 72 displays a GUI image for setting the function shown in FIG. 51 on the monitor in accordance with manipulation of the user via the input device 70.

The bars in the window in the GUI image for setting the function respectively correspond to the coefficients a to c multiplied with the luminance signal Y and the chroma signals Cb and Cr. The function S is defined by the following equation 10. That is, the coefficients a to c set by the function setting GUI correspond to the degree of enhancement of the contour of any of the luminance signal Y and chroma signals Cb and Cr of the image data for the contour enhancement.

$$S=aY+bCb+cCr \quad (10)$$

The user drags on each of the three bars in the window by the mouse etc. of the input device 70 in accordance with the display of the function setting GUI to change the lengths of the bars corresponding to the coefficients a to c in the window. The personal computer 72 receives the coefficients a to c corresponding to the lengths of the bars in the window after the change, prepares a program for the DSP 80 for changing the image source 74 by the function S, and downloads this to the DSP 80.

The DSP 80 executes the downloaded program, converts each of the luminance signal Y and the chroma signals Cb and Cr of the image data input from the image source 74 by the function S to generate the image data S, and sets this as the target of the contour enhancement.

Setting of Level Depend Processing Characteristic

FIGS. 52A to 52D are views of the GUI screen used for setting the characteristic of the nonlinear conversion in the level depend processing or the clispining in the contour enhancement by the image data processing system 9.

Figures 52A, 52B, 52C, 52D:
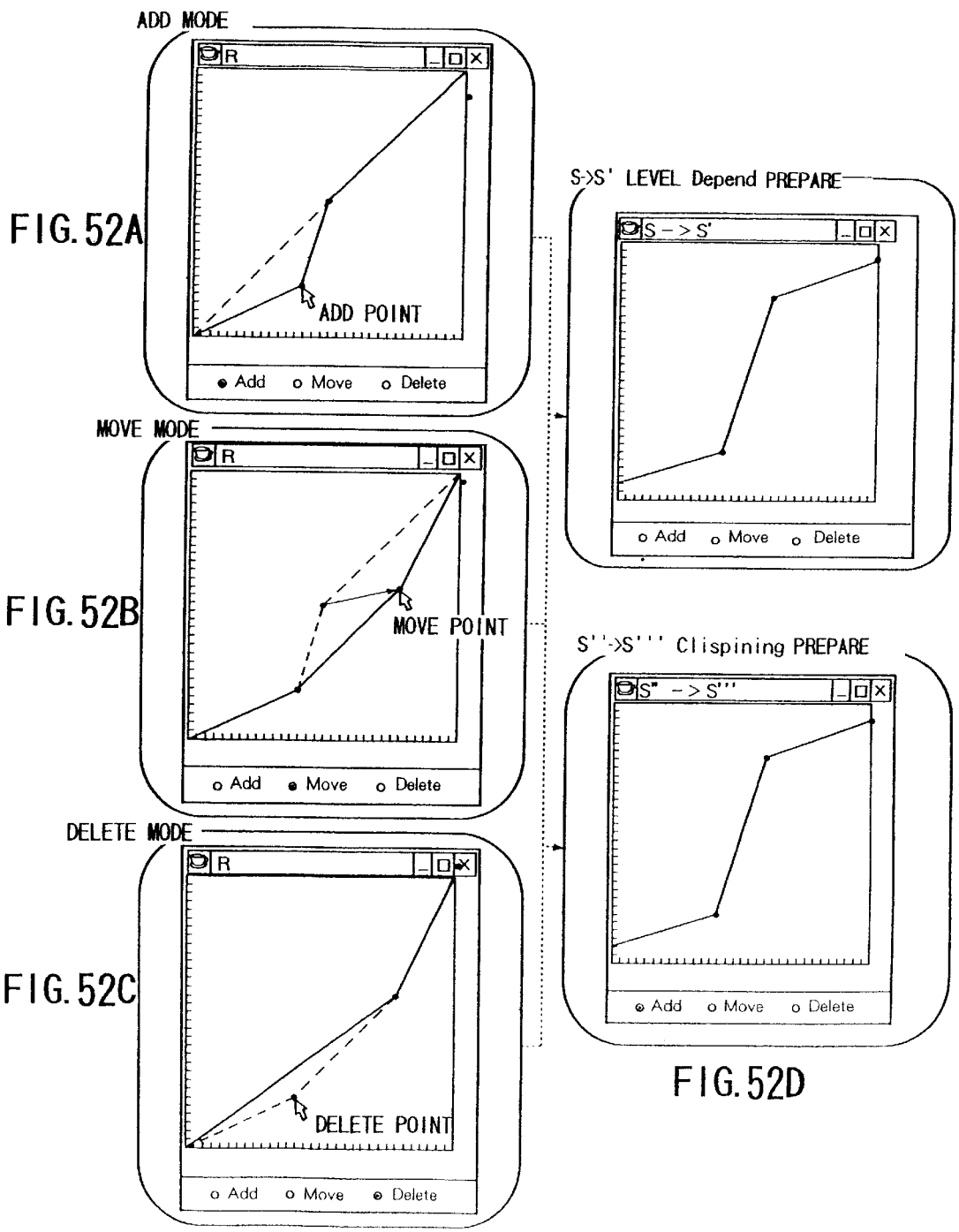
FIGS. 52A to 52D are views of a GUI image used for setting the characteristic of nonlinear conversion in level depend or clispining in contour enhancement by the image data processing system (FIG. 37).

The personal computer 72 displays the GUI image for setting the characteristic of the level depend processing shown in FIGS. 52A to 52C on the monitor in accordance with manipulation of the user via the input device 70.

The level depend processing is a type of nonlinear conversion as mentioned above. The personal computer 72 expresses the conversion characteristic of the level depend processing by a graph format in which, as shown in FIGS. 52A to 52D, the abscissa (x) indicates the value of the pixel data of the image data S, and the ordinate (y) indicates the value of the pixel data of the image data S' after the level depend processing.

The user depresses the "Add" button, "Move" button, or "Delete" button in the window of the lower portion of the GUI image for setting the level depend characteristic by a mouse etc. of the input device 70 so as to select one of the "Add" mode, "Move" mode, and "Delete" mode respectively shown in FIGS. 52A to 52C and thereby to add, ove, or delete the passing point (point) of the curve of the graph indicating the characteristic of the level depend processing and change the curve of the graph so as to exhibit the desired characteristic.

Further, when the user instructs the end of the setting of the characteristic of the level depend processing to the personal computer 72 by using the input device 70, the personal computer 72 receives the curve of the graph after change shown in FIG. 52D and extracts the function S' corresponding to the received curve.

Setting of Filtering Characteristic

FIGS. 53A to 53C are views of the GUI screen used for setting the characteristic of the filtering in the contour enhancement by the image data processing system 9.

As mentioned above, the contour detection is realized by filtering the image data S'. The personal computer 72 expresses the filtering characteristic in the form of a graph of the frequency response in which the abscissa (x) indicates the frequency and the ordinate (y) indicates an attenuation amount (gain amount) as shown in FIGS. 53A to 53C. Note that, in the graphs shown in FIGS. 53A to 53C, the upper portion of the ordinate indicates the passed frequency band, and the lower portion of the ordinate indicates the blocked frequency band.

The user depresses the "Add" button, "Move" button, or "Delete" button in the window of the lower portion of the GUI image for setting the filtering characteristic by a mouse etc. of the input device 70 so as to select one of the "Add" mode, "Move" mode, and "Delete" mode respectively shown in FIGS. 53A to 53C and thereby to add, move, or delete the passing point (point) of the curve of the graph indicating the filtering characteristic and change the curve of the graph so as to exhibit the desired characteristic.

Further, when the user instructs the end of the setting of the filtering characteristic to the personal computer 72 by using the input device 70, the personal computer 72 receives the curve of the graph after change and extracts the frequency response S" corresponding to the received curve.

Setting of Clispining Characteristic

The personal computer 72 displays the GUI image for setting the characteristic of the clispining shown in FIGS. 52A to 52C on the monitor in accordance with the operation of the user via the input device 70.

Clispining is a type of nonlinear conversion in the same way as the level depend processing as mentioned above. The personal computer 72 expresses the conversion characteristic of clispining in the form of a graph in which the abscissa (x) indicates the pixel data of the image data S" and the ordinate (y) indicates the value of the pixel data of the image data S''' after the clispining as shown in FIGS. 52A to 52D.

The user always depresses the "Add" button, "Move" button, or "Delete" button in the window of the lower portion of the GUI image for setting the clispining characteristic by a mouse etc. of the input device 70 so as to select one of the "Add" mode, "Move" mode, and "Delete" mode respectively shown in FIGS. 52A to 52C and thereby to add, move, or delete the passing point of the curve of the graph indicating the characteristic of the clispining and change the curve of the graph so as to exhibit the desired characteristic.

Further, when the user instructs the end of the setting of the clispining characteristic to the personal computer 72 by using the input device 70, the personal computer 72 receives the curve of the graph after change shown in FIG. 52D and extracts the function S''' corresponding to the received curve.

Preparation of Program for DSP 80

When user finishes setting the characteristics of the processing with respect to the GUI image for setting characteristics shown in FIGS. 52A to 52D and FIGS. 53A to 53C, the personal computer 72 defines the characteristic of each processing in accordance with the manipulation of the user via the input device 70 and prepares the program or parameter file for the DSP 80 for performing each processing by the defined characteristic.

That is, the personal computer 72 prepares the program of the DSP 80 for performing the nonlinear conversion (level depend) for the image data S by the function S' corresponding to the curve of the graph indicating the level depend shown in FIG. 52D, filtering the image data S' by the frequency response S" corresponding to the curve of the graph after change shown in FIGS. 53A to 53C, performing the nonlinear conversion (clispining) for the image data S" by the function S''' corresponding to the curve of the graph indicating the clispining shown in FIG. 52D, and further performing the addition of the delayed original image data VIN and the image data S''' and downloads this to the DSP 80.

That is, the personal computer 72 generates a program for performing these processings by the set characteristics based on the setting of characteristics of processings shown in FIG. 49 and sets this in the DSP 80. Note, in this program, the delay processing of the original image data can be realized by holding the original image data VIN up to the execution of the addition, therefore it is not necessary to particularly prepare the delay processing as an independent program module.

Content of Program of DSP 80

Below, an explanation will be made of the content of the processing of the program of the DSP 80 generated by the personal computer 72.

Preparation of Conversion Function S

First, the processor elements 30 of the DSP 80 (SIMD-controlled linear array type multiple parallel processor; parallel processor 6, etc. shown in FIG. 32) secure the area (word area) for storing the luminance signal Y, chroma signals Cb and CR, variable S, and the data of the result in the middle of operation by the ALU array unit 24 input to the data memory unit 23 via the input SAM unit 22.

Next, the ALU array units 24 of the processor elements 30 of the DSP 80 (parallel processor 6) multiply the luminance signal Y and the coefficient a stored in the data memory unit 23 and assign the result of multiplication for the variable S (S=aY).

Further, the ALU array units 24 multiply the chroma signal Cb and the coefficient b, add the results of multiplication and the variable S, and assign the same for the variable S (S=aY+bCb).

Further, the ALU array units 24 multiply the chroma signal Cr and the coefficient c, add the results of multiplication and the variable S, and assign the same for the variable S (S=aY+bCb+cCb).

Level Depend and Clispining

The level depend and the clispining are the same in principle, therefore, here, the level depend of the case where the function S' is as shown in the following Table 1 will be explained as an example.

TABLE 1

$$\begin{array}{l} / \\ /....y = a3x + b3 \\ / \\ /........y = a2x + b2 \\ / \\ /..........y = a1x + b1 \\ / \\ 0 \quad 100 \quad 150 \quad 255 \\ \text{Area } 1 \mid 2 \mid 3 \end{array} \quad (1)$$

When the function S' is as shown in Table 1, the processor elements 30 of the DSP 80 (parallel processor 6) first approximate the function S' by a primary function for every range of each of areas 1 to 3.

Next, the DSP 80 (parallel processor 6) secures the areas A and B for storing the coefficients in the data memory unit 23 and the work area.

Next, the ALU array units 24 of the processor elements 30 of the DSP 80 (parallel processor 6) decide whether or not the value of the variable S is larger than the numerical value 100, store coefficients $a_3$ and $b_3$ in the areas A and B when it is larger than the numerical value 100, and respectively store coefficients $a_1$ and $b_1$ in the areas A and B when it is equal to or less than the numerical value 100.

Next, the ALU array units 24 of the processor elements 30 decide whether or not the value of the pixel data is larger than the numerical value 150, store the coefficients $a_2$ and $b_2$ in the areas A and B when it is larger than the numerical value 150, and hold values of coefficients stored in the areas A and B as they are when it is equal to or less than the numerical value 150.

By the above processings, coefficients are stored in the areas A and B according to which area of Table 1 the pixel data input to the processor elements 30 belongs.

The ALU array units 24 of the processor elements 30 further perform the processing of the function S' based on values of coefficients stored in the areas A and B and the value x of the pixel data.

Calculation of Filtering Coefficient

The personal computer 72 calculates the filter coefficient of the FIR filter based on parameters indicating the filtering characteristic (FIGS. 53A to 53C).

Filtering in Horizontal Direction

When realizing filtering in the horizontal direction by an FIR filter of a 16-tap configuration, the processor elements 30 of the DSP 80 (parallel processor 6) repeat the processing for shifting the data converted by the function S' to the processor element 30 in the forward direction (left direction in FIG. 32) by an amount of 7 taps in advance for storage and for multiplying the filter coefficient calculated by the personal computer 72 in order from the processor element 30 in the rear direction (right side in FIG. 32) and transferring the result to the right side processor element 30 16 times.

Filtering in Vertical Direction

Next, when realizing the filtering in the vertical direction by an FIR filter of a 16-tap configuration, first the processor elements 30 of the DSP 80 (parallel processor 6) store the data filtered in the horizontal direction as mentioned above in the data memory unit 23 in advance.

The ALU array units 24 of the processor elements 30 use addresses after rotation when accessing the pixel data of the data memory unit 23, write the pixel data of the newest input line at the next address of the pixel data of the oldest input line, and perform the processing as if the pixel data of the newer input line were recorded at the address of the younger number in order from the predetermined address on the program processing as shown in the following Table 2.

TABLE 2

| Memory address | :No. of lines :of actually :written :pixel data | :Line on program: :after n cycles: :n = 16; n = 17; n = 18: |
|---|---|---|
| 0–15 | :Line 1, 17 | :Line 1, Line 2, Line 3: |
| 16–31 | :Line 2, 18 | :Line 2; Line 3; Line 4: |
| 32–47 | :Line 3 | :Line 3; Line 4; Line 5: |
| 48–63 | :Line 4 | :Line 4; Line 5; Line 6: |
| 64–79 | :Line 5 | :Line 5; Line 6; Line 7: |
| 80–95 | :Line 6 | :Line 6; Line 7; Line 8: |
| 96–111 | :Line 7 | :Line 7; Line 8; Line 9: |
| 112–127 | :Line 8 | :Line 8; Line 9; Line 10: |
| 128–143 | :Line 9 | :Line 9; Line 10; Line 11: |
| 144–159 | :Line 10 | :Line 10; Line 11; Line 12: |
| 160–175 | :Line 11 | :Line 11; Line 12; Line 13: |
| 176–191 | :Line 12 | :Line 12; Line 13; Line 14: |
| 192–207 | :Line 13 | :Line 13; Line 14; Line 15: |
| 208–223 | :Line 14 | :Line 14; Line 15; Line 16: |
| 224–239 | :Line 15 | :Line 15; Line 16; Line 17: |
| 240–255 | :Line 16 | :Line 16; Line 17; Line 18: |
| | | ↑ ↑ ↑ |
| Address rotation | | 0 −16 −32 |

... (2)

By rotating addresses as in Table 2, addresses 0 and 15 of the data memory unit 23 of the processor elements 30 are always handled as addresses of the endmost pixel data in 16 taps of the FIR filter on the program, and the pixel data of the addresses 16 and 32 are always handled as the adjoining pixel data of the endmost pixel data.

Accordingly, the ALU array units 24 of the processor elements 30 can perform the filtering in the vertical direction by sequentially multiplying filter coefficients from the pixel data of the endmost addresses (addresses 0, 15) and adding the same.

Note that, where the data memory units 23 of the processor elements 30 have an insufficient storage capacity and cannot store all of the 16 taps' worth of the pixel data, by dividing the 16 taps' worth of the pixel data into two groups of 8 taps' worth each and similarly rotating addresses, they write the pixel data of the newest input line at the address next to the pixel data of the oldest input line and perform processing as shown in the following Table 3 and Table 4 as if the pixel data of the newer input line were recorded at the address of younger address from the predetermined address in order in the processing of the program.

The processing from the ninth tap to the 16th tap of the 16-tap configuration FIR filter is carried out on the first block among the two blocks of pixel data obtained by division and storage in this way. The result of the processing and the oldest pixel data are transferred to the second block of the pixel data.

Similarly, the processing from the first tap to the eighth tap of the 16-tap configuration FIR filter is carried out on the second block of the pixel data. The result of processing and the result of processing on the first block of the pixel data are added to obtain the final filtering result.

Further, even in a case where the pixel data is divided into a further larger number of blocks, the processing of the FIR filter can be carried out in completely the same way.

TABLE 3

First block

| Memory address | :No. of lines :of actually :written :pixel data | :Line on program: :after n cycles: :n = 16; n = 17; n = 18: |
|---|---|---|
| 0–15 | :Line 1, 9 | :Line 9; Line 10; Line 11: |
| 16–31 | :Line 2, 10 | :Line 10; Line 11; Line 12: |
| 32–47 | :Line 3 | :Line 11; Line 12; Line 13: |
| 48–63 | :Line 4 | :Line 12; Line 13; Line 14: |
| 64–79 | :Line 5 | :Line 13; Line 14; Line 15: |
| 80–95 | :Line 6 | :Line 14; Line 15; Line 16: |
| 96–111 | :Line 7 | :Line 15; Line 16; Line 17: |
| 112–127 | :Line 8 | :Line 16; Line 17; Line 18: |
| | Address rotation | ↑   ↑   ↑<br>0  −16  −32 |

. . . (3)

TABLE 4

Second block

| Memory address | :No. of lines :of actually :written :pixel data | :Line on program: :after n cycles: :n = 16; n = 17; n = 18: |
|---|---|---|
| 0–15 | :Line 1, 17 | :Line 1; Line 2; Line 3: |
| 16–31 | :Line 2, 18 | :Line 2; Line 3; Line 4: |
| 32–47 | :Line 3 | :Line 3; Line 4; Line 5: |
| 48–63 | :Line 4 | :Line 4; Line 5; Line 6: |
| 64–79 | :Line 5 | :Line 5; Line 6; Line 7: |
| 80–95 | :Line 6 | :Line 6; Line 7; Line 8: |
| 96–111 | :Line 7 | :Line 7; Line 8; Line 9: |

TABLE 4-continued

Second block

| Memory address | :No. of lines :of actually :written :pixel data | :Line on program: :after n cycles: :n = 16; n = 17; n = 18: |
|---|---|---|
| 112–127 | :Line 8 | :Line 8; Line 9; Line 10: |
| | Address rotation | ↑   ↑   ↑<br>0  −16  −32 |

. . . (4)

Operation of Image Data Processing system 9 in 11th Embodiment

Below, an explanation will be made of the operation of the image data processing system 9 (FIG. 37) in the 11th embodiment by referring to FIG. 54.

Figure 54:
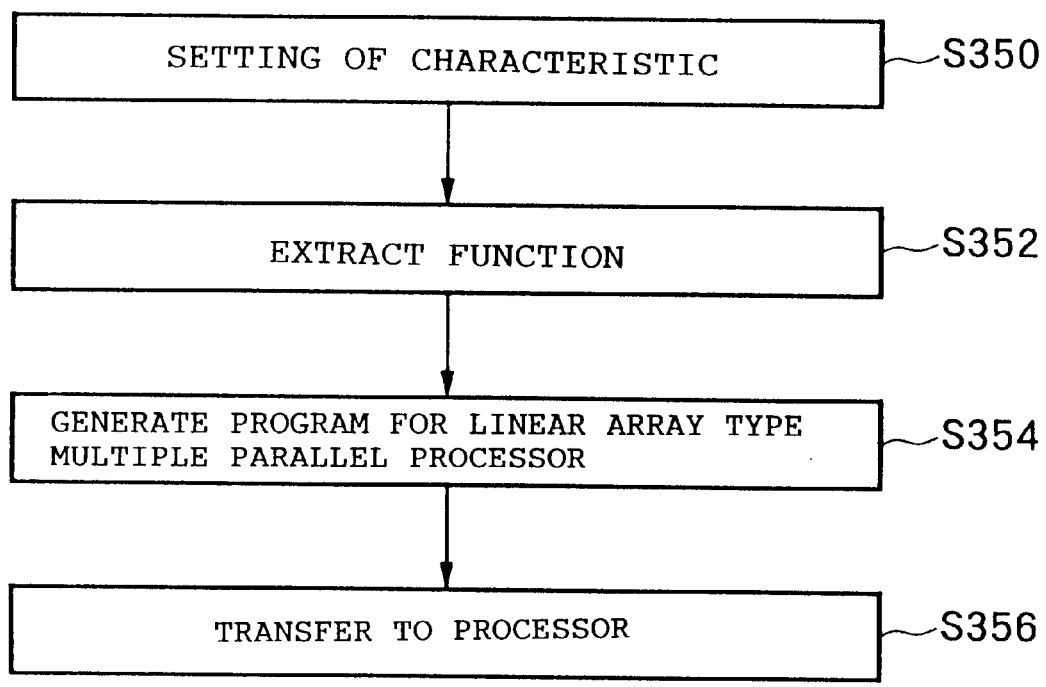
FIG. 54 is a flow chart showing the contour enhancement by the image data processing system (FIG. 37) shown as the 11th embodiment.

FIG. 54 is a flow chart of the contour enhancement by the image data processing system 9 shown as the 11th embodiment.

As shown in FIG. 54, at step S350, the user manipulates the GUI image for setting the characteristic displayed by the personal computer 72 of the image data processing system 9 on the monitor (FIGS. 52A to 52D, FIGS. 53A to 53C), sets the functions S, S', and S''' and the sets the filtering characteristic. The personal computer 72 receives the functions S, S', and S''' and filtering characteristic in accordance with the setting of the user.

At step S352, the personal computer 72 performs the processing for extraction of the functions S, S', and S''' and generates the filter coefficient for realizing the filtering characteristic.

At step S354, the personal computer 72 generates the program of the DSP 80 (linear array type multiple parallel processor) for converting the image data by the extracted functions S, S', and S''' and filtering the image data by using the calculated filter coefficients.

At step S356, the personal computer 72 downloads the generated program to the DSP 80. The DSP 80 executes the downloaded program, performs the contour enhancement with respect to the image data VIN input from the image source 74, and displays this on the image monitor 76.

Note that, when the result of contour enhancement displayed on the image monitor 76 is unnatural, the user can repeat the processings of S350 to S356 until satisfactory image data is obtained so as to find the optimum processing characteristic and thereby generate an image with a naturally enhanced contour.

As explained above, according to the operation of the image data processing system 9 in the 11th embodiment, since contour enhancement with respect to the image data can be realized by software by using the DSP 80 (SIMD-controlled linear array type multiple parallel processor), the size of the hardware of the contour enhancement apparatus can be made small.

Further, according to the operation of the image data processing system 9 in the 11th embodiment, a GUI can be used to enable easy change of the frequency response of the filtering in the contour enhancement or the degree etc. of contour enhancement by the nonlinear conversion or other characteristics and, in addition, the result of the processing can be immediately viewed.

Note that the method of setting the processing characteristic of the contour enhancement in the 11th embodiment can be applied not only to an SIMD-controlled linear array type multiple parallel processor, but also to DSPs of other formats.

12th Embodiment

Below, a 12th embodiment of the present invention will be explained.

In the 12th embodiment of the present invention takes particular note of the filtering by the FIR filter among the processing included in the contour enhancement of the image data processing system 9 (FIG. 37) shown as the 11th embodiment. This is made independent.

Filtering by FIR Filter

Below, an explanation will be made of the filtering by the FIR filter by referring to FIG. 55 and FIG. 56.

Figure 55:
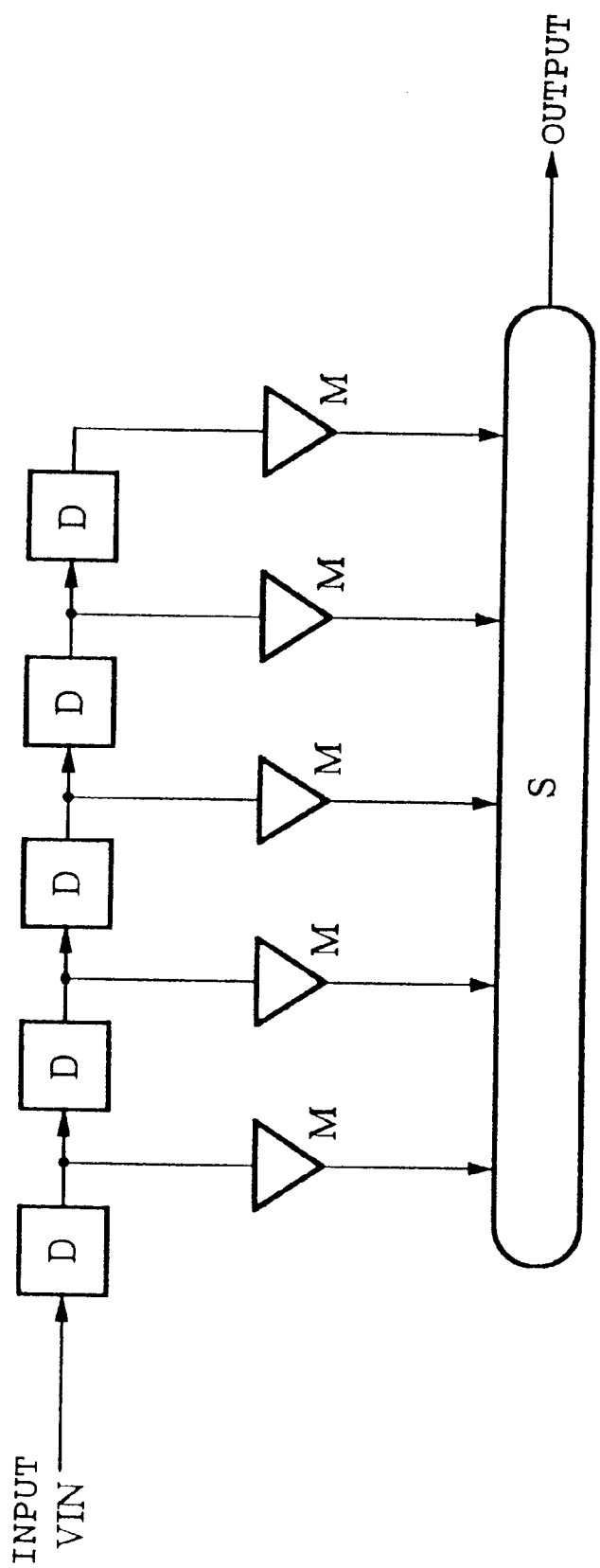
FIG. 55 is a view of the content of the filtering of a horizontal direction by an FIR filter carried out by using the image data processing system (FIG. 37) shown as a 12th embodiment.

FIG. 55 is a view of the content of the filtering in the horizontal direction by the FIR filter performed by using the image data processing system 9 (FIG. 37) shown as the 12th embodiment.

Figure 56:
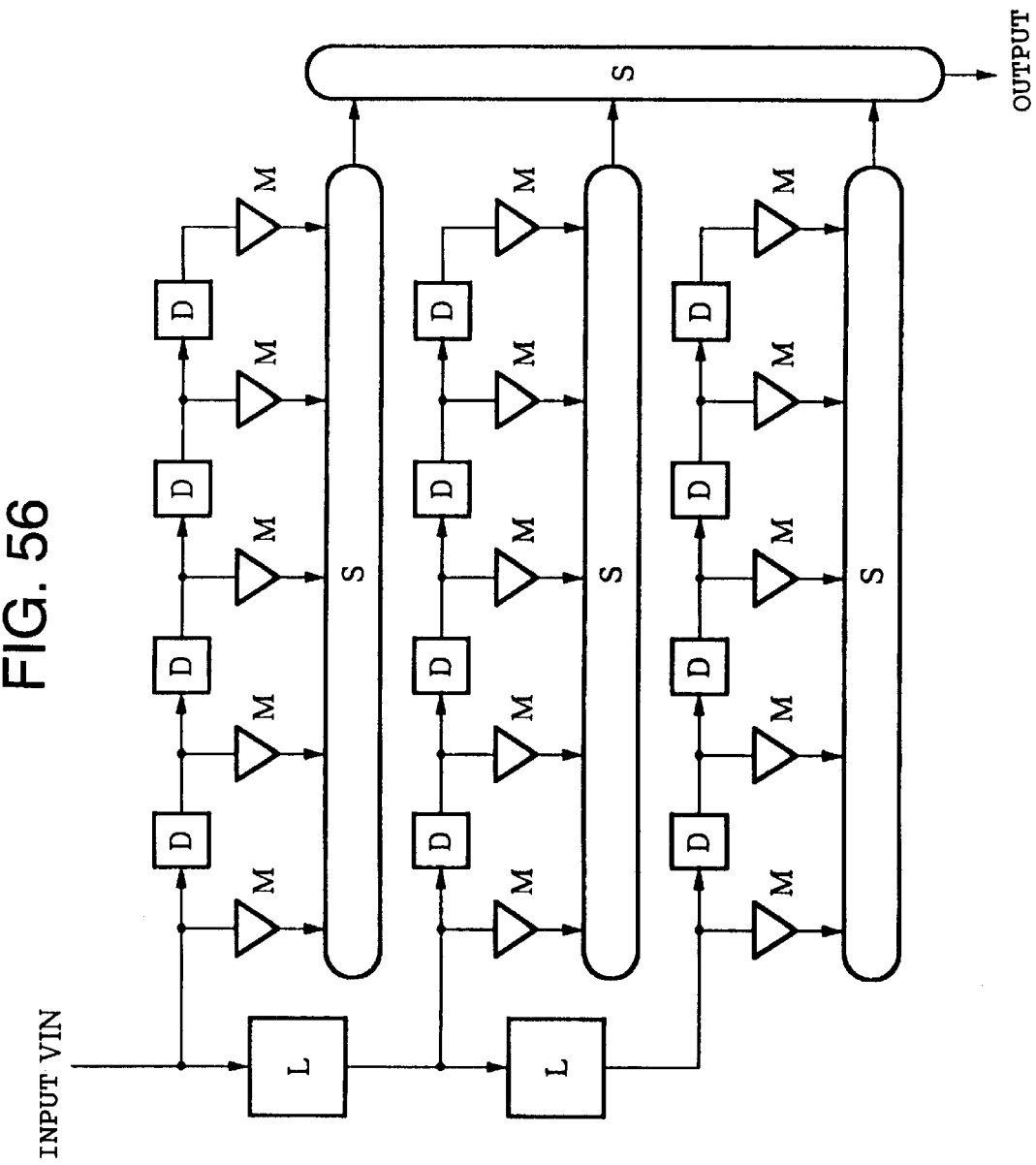
FIG. 56 is a view of the content of the filtering of a horizontal direction and vertical direction by the FIR filter carried out by using the image data processing system (FIG. 37) shown as the 12th embodiment.

FIG. 56 is a view of the content of the filtering in the horizontal direction and vertical direction by the FIR filter performed by using the image data processing system 9 (FIG. 37) shown as the 12th embodiment. Note that, the filtering shown in FIG. 56 is actually frequently carried out while separating the filtering in the horizontal direction and the filtering in the vertical direction.

As shown in FIG. 55 and FIG. 56, the filtering by the FIR filter includes one pixel's worth of the delay processing D, one horizontal scanning period's worth of the delay processing L, multiplication M of the filter coefficient and the pixel data, and addition S of the results of multiplication.

Operations of Constituent Parts of Image Data Processing System 9 (FIG. 37)

Below, an explanation will be made of the operations of constituent parts of the image data processing system 9 shown as the 12th embodiment.

DSP 80

The DSP 80 executes the program prepared by the personal computer 72, performs the filtering by the FIR filter corresponding to contents shown in FIG. 55 and FIG. 56, and displays the image data obtained as the result of processing on the image monitor 76.

Personal Computer 72

Below, an explanation will be made of the operation of the personal computer 72 by referring to FIG. 57 and FIG. 58.

Setting of Filtering Characteristic

Figure 57A:
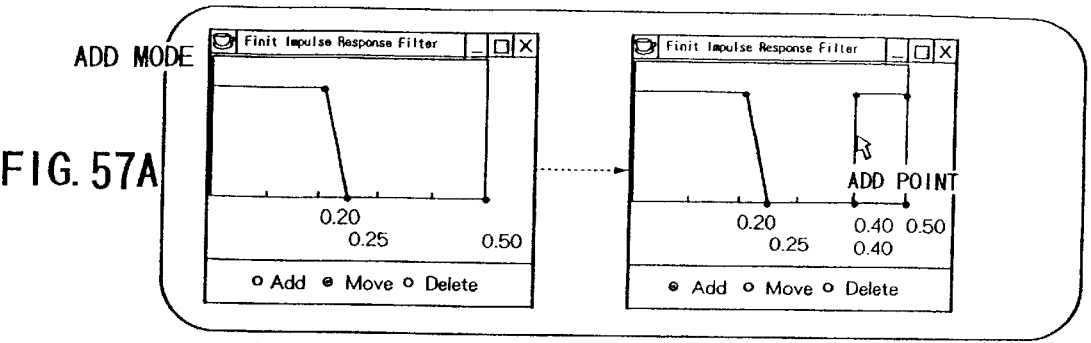
FIGS. 57A to 57C are views of a GUI screen used for setting the characteristic of filtering in the filtering by the FIR filter by the image data processing system (FIG. 37).
Figure 57B:
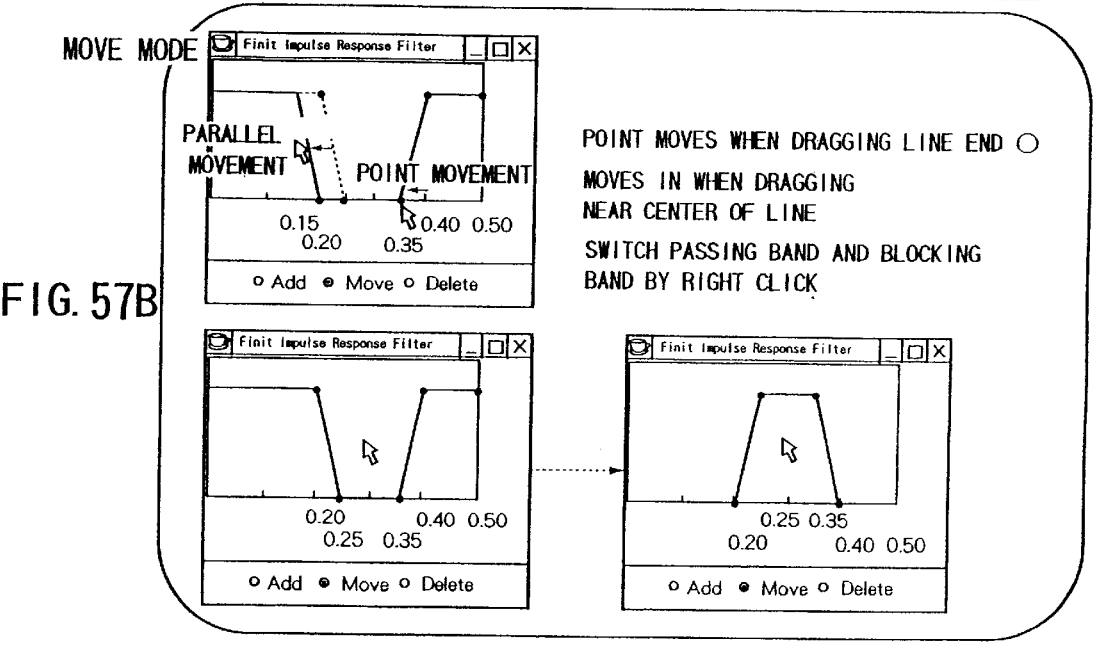
Figure 57C:
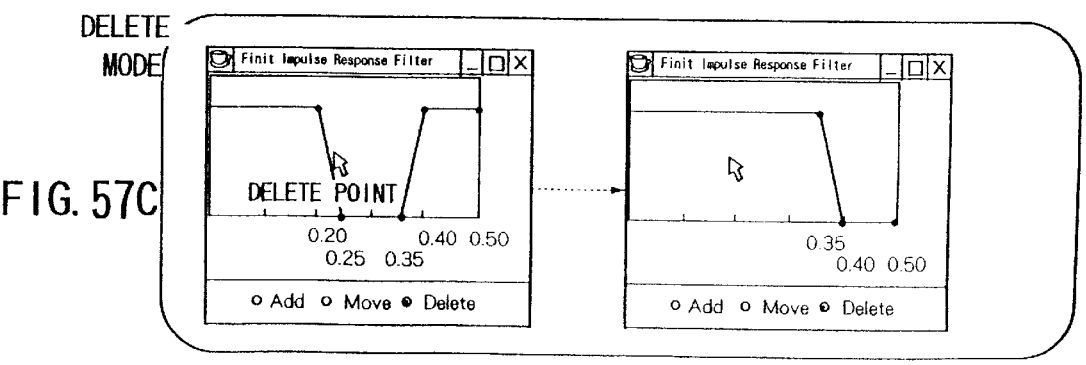

FIGS. 57A to 57C are views of the GUI screen used for setting the filtering characteristic in the filtering by the FIR filter by the image data processing system 9. Note that, FIGS. 57A to 57C are the same as FIGS. 53A to 53C referred to in the explanation of the 11th embodiment.

The personal computer 72 expresses the filtering characteristic by the FIR filter in the form of a graph in which, as shown in FIGS. 57A to 57C, the abscissa (x) indicates the frequency and the ordinate (y) indicates the attenuation amount (gain amount). Note that, in the graphs shown in FIGS. 57A to 57C, the upper portion of the ordinate indicates the passed frequency band, and the lower portion of the ordinate indicates the blocked frequency band.

The user depresses the "Add" button, "Move" button, or "Delete" button in the window of the lower portion of the GUI image for setting the level depend characteristic by a mouse etc. of the input device 70 so as to select one of the "Add" mode, "Move" mode, and "Delete" mode respectively shown in FIGS. 57A to 57C and thereby to add, move, or delete the passing point of the curve of the graph indicating the filtering characteristic and change the curve of the graph so as to exhibit the desired characteristic.

That is, in the "Add" mode, the personal computer 72 newly provides the passing point of the graph when the user clicks the desired point in the window of the GUI screen by using the mouse etc. of the input device 70, moves the corresponding point in the curve of the graph up to the clicked point, changes the shape of the curve of the graph, and displays the same.

Further, in the "Move" mode, the personal computer 72 moves the already existing passing point closest to a clicked point in accordance with the dragging of the user when the user clicks and drags the desired point in the window of the GUI screen by using the mouse etc. of the input device 70, changes the shape of curve of the graph, and displays the same.

Further, in the "Delete" mode, the personal computer 72 deletes an already existing passing point closest to a clicked point when the user clicks a desired point in the window of the GUI screen by using the mouse etc. of the input device 70, changes the shape of the curve of the graph so as to connect the two passing points adjoining the deleted passing point by a straight line, and displays the same.

Design of FIR Filter

When the user terminates the setting of the filtering characteristic with respect to the GUI image for setting characteristics shown in FIGS. 57A to 57C, the personal computer 72 defines the characteristic in accordance with the manipulation of the user via the input device 70 and designs an FIR filter for performing processing for using the filter coefficient calculated from the parameters indicating the filtering characteristic to perform filtering by the defined characteristic by the filter design tool.

Preparation of Program for DSP 80

The personal computer 72 prepares the program for the DSP 80 for performing the processings for the filtering by the designed FIR filter.

That is, the personal computer 72 generates the program of the DSP 80 for filtering the image data VIN by the frequency response S" corresponding to the curve of the graph after the change shown in FIGS. 53A to 53C and downloads this to the DSP 80.

Content of Program of DSP 80

Below, an explanation will be made of the content of the processing of the program of the DSP 80 generated by the personal computer 72 by further referring to FIG. 58.

Figure 58:
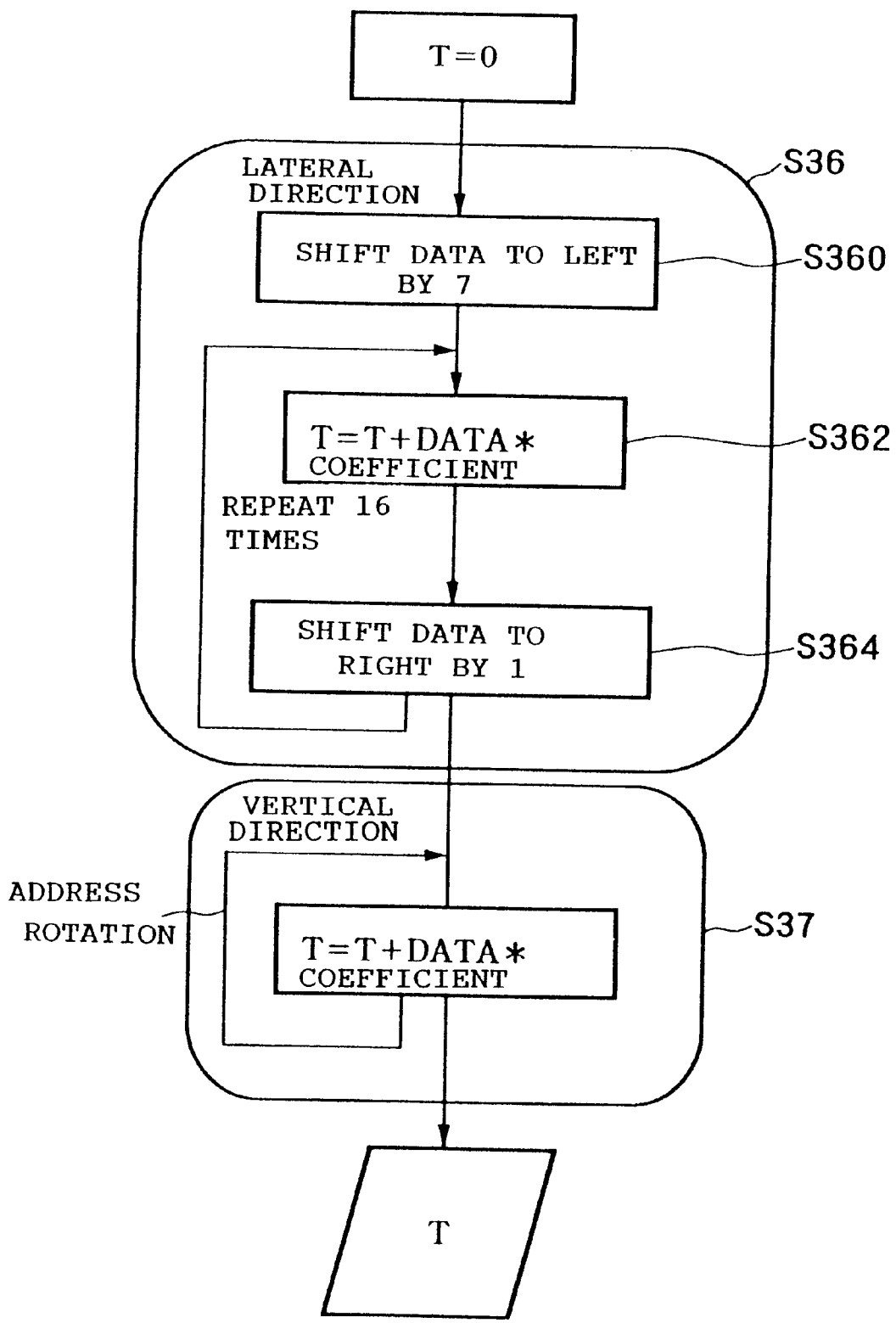
FIG. 58 is a view of the processing content (S36, S37) of the program of a DSP of the image data processing system (FIG. 37) for performing the filtering by the FIR filter shown as the 12th embodiment.

FIG. 58 is a view of the content of the processing of the program (S36, S37) of the DSP 80 of the image data processing system 9 (FIG. 37) for performing the filtering by the FIR filter shown as the 12th embodiment.

Calculation of Filtering Coefficient

The personal computer 72 calculates the filter coefficient of the FIR filter based on the parameters indicating the filtering characteristic (FIGS. 57A to 57C).

Filtering in Horizontal Direction (S36)

When realizing filtering in the horizontal direction by a 16-tap configuration FIR filter, as shown in FIG. 58, at step S360 (S360) of the filtering (S36) in the horizontal direction, the processor element 30 of the DSP 80 (for example parallel processor 6; FIG. 32) store the pixel data of the image data while shifting the same by the amount of 7 taps in advance to the processor elements 30 in the forward direction (left direction in FIG. 32).

At step S362, the processor elements 30 of the DSP 80 multiply the filter coefficient calculated by the personal computer 72 and the pixel data.

At step S364, the processor elements 30 of the DSP 80 transfer the results of multiplication in S362 to the processor elements 30 in the rear direction (adjoining on right in FIG. 32).

Note that the DSP 80 repeats the multiplication and transfer of the results of multiplication at S362 and S364 16 number of times.

Filtering in Vertical Direction

When realizing the filtering in the vertical direction by a 16-tap configuration FIR filter, in the filtering in the vertical direction (S37), the processor elements 30 of the DSP 80 (parallel processor 6) store 16 lines' worth of the pixel data of the image data S' in the data memory unit 23 in advance.

Further, the ALU array units 24 of the processor elements 30 use addresses by rotation when accessing the pixel data of the data memory unit 23, write the pixel data of the newest input line at the address of the pixel data of the oldest input line, and perform the processing as shown in the following Table 5 (same as Table 2 indicated in the 11th embodiment) as if the pixel data of the newer input line were recorded at the address of the younger number from the predetermined address in order in the processing of the program.

TABLE 5

| Memory address | :No. of lines :of actually :written :pixel data | :Line on program: :after n cycles: :n = 16; n = 17; n = 18: |
|---|---|---|
| 0–15 | :Line 1, 17 | :Line 1; Line 2; Line 3: |
| 16–31 | :Line 2, 18 | :Line 2; Line 3; Line 4: |
| 32–47 | :Line 3 | :Line 3; Line 4; Line 5: |
| 48–63 | :Line 4 | :Line 4; Line 5; Line 6: |
| 64–79 | :Line 5 | :Line 5; Line 6; Line 7: |
| 80–95 | :Line 6 | :Line 6; Line 7; Line 8: |
| 96–111 | :Line 7 | :Line 7; Line 8; Line 9: |
| 112–127 | :Line 8 | :Line 8; Line 9; Line 10: |
| 128–143 | :Line 9 | :Line 9; Line 10; Line 11: |
| 144–159 | :Line 10 | :Line 10; Line 11; Line 12: |
| 160–175 | :Line 11 | :Line 11; Line 12; Line 13: |
| 176–191 | :Line 12 | :Line 12; Line 13; Line 14: |
| 192–207 | :Line 13 | :Line 13; Line 14; Line 15: |
| 208–223 | :Line 14 | :Line 14; Line 15; Line 16: |
| 224–239 | :Line 15 | :Line 15; Line 16; Line 17: |
| 240–255 | :Line 16 | :Line 16; Line 17; Line 18: |
| Address rotation | | 0    −16    −32 |

$$\ldots (5)$$

By rotating the addresses as shown in Table 5, virtual addresses 0 to 15 of the data memory units 23 of the processor elements 30 are handled as addresses of the endmost pixel data in 16 taps of the FIR filter on the program, and the pixel data of virtual addresses 16 to 32 are always handled as the pixel data adjoining the endmost pixel data.

Accordingly, the ALU array units 24 of the processor elements 30 can perform the filtering in the vertical direction by sequentially multiplying filter coefficients from the pixel data of the virtual addresses 0, 15 and adding the same.

Note that, where the data memory units 23 of the processor elements 30 have an insufficient storage capacity and cannot store all of the 16 taps' worth of the pixel data, by dividing the 16 taps' worth of the pixel data into two groups of 8 taps' worth each and similarly rotating addresses, they writes the pixel data of the newest input line at the address next to the pixel data of the oldest input line and performs processing as shown in the following Table 6 and Table 7 as if the pixel data of the newer input line were recorded at the address of younger address from the predetermined address in order in the processing of the program.

The processing from the ninth tap to the 16th tap of the 16-tap configuration FIR filter is carried out on the first block among the two blocks of pixel data obtained by division and storage in this way. The result of the processing and the oldest pixel data are transferred to the second block of the pixel data.

Similarly, the processing from the first tap to the eighth tap of the 16-tap configuration FIR filter is carried out on the second block of the pixel data. The result of processing and the result of processing on the first block of the pixel data are added to obtain the final filtering result.

Further, even in a case where the pixel data is divided into a further larger number of blocks, the processing of the FIR filter can be carried out in completely the same way.

TABLE 6

First block

| Memory address | :No. of lines :of actually :written :pixel data | :Line on program: :after n cycles: :n = 16; n = 17; n = 18: |
|---|---|---|
| 0–15 | :Line 1, 9 | :Line 9; Line 10; Line 11: |
| 16–31 | :Line 2, 10 | :Line 10; Line 11; Line 12: |
| 32–47 | :Line 3 | :Line 11; Line 12; Line 13: |
| 48–63 | :Line 4 | :Line 12; Line 13; Line 14: |
| 64–79 | :Line 5 | :Line 13; Line 14; Line 15: |
| 80–95 | :Line 6 | :Line 14; Line 15; Line 16: |
| 96–111 | :Line 7 | :Line 15; Line 16; Line 17: |
| 112–127 | :Line 8 | :Line 16; Line 17; Line 18: |
| Address rotation | | 0    −16    −32 |

$$\ldots (6)$$

TABLE 7

Second block

| Memory address | :No. of lines :of actually :written :pixel data | :Line on program: :after n cycles: :n = 16; n = 17; n = 18: |
|---|---|---|
| 0–15 | :Line 1, 17 | :Line 1; Line 2; Line 3: |
| 16–31 | :Line 2, 18 | :Line 2; Line 3; Line 4: |
| 32–47 | :Line 3 | :Line 3; Line 4; Line 5: |
| 48–63 | :Line 4 | :Line 4; Line 5; Line 6: |
| 64–79 | :Line 5 | :Line 5; Line 6; Line 7: |
| 80–95 | :Line 6 | :Line 6; Line 7; Line 8: |
| 96–111 | :Line 7 | :Line 7; Line 8; Line 9: |
| 112–127 | :Line 8 | :Line 8; Line 9; Line 10: |
| Address rotation | | 0    −16    −32 |

$$\ldots (7)$$

Description of Filter Circuit

The personal computer 72 prepares the description by hardware description language (HDL etc.) for realizing the circuit of the FIR filter designed as mentioned above and outputs the same to the file etc.

Processing of DSP 80

Below, an explanation will be made of the processing of the DSP 80 by referring to FIG. 59 and FIG. 60.

Figure 60:
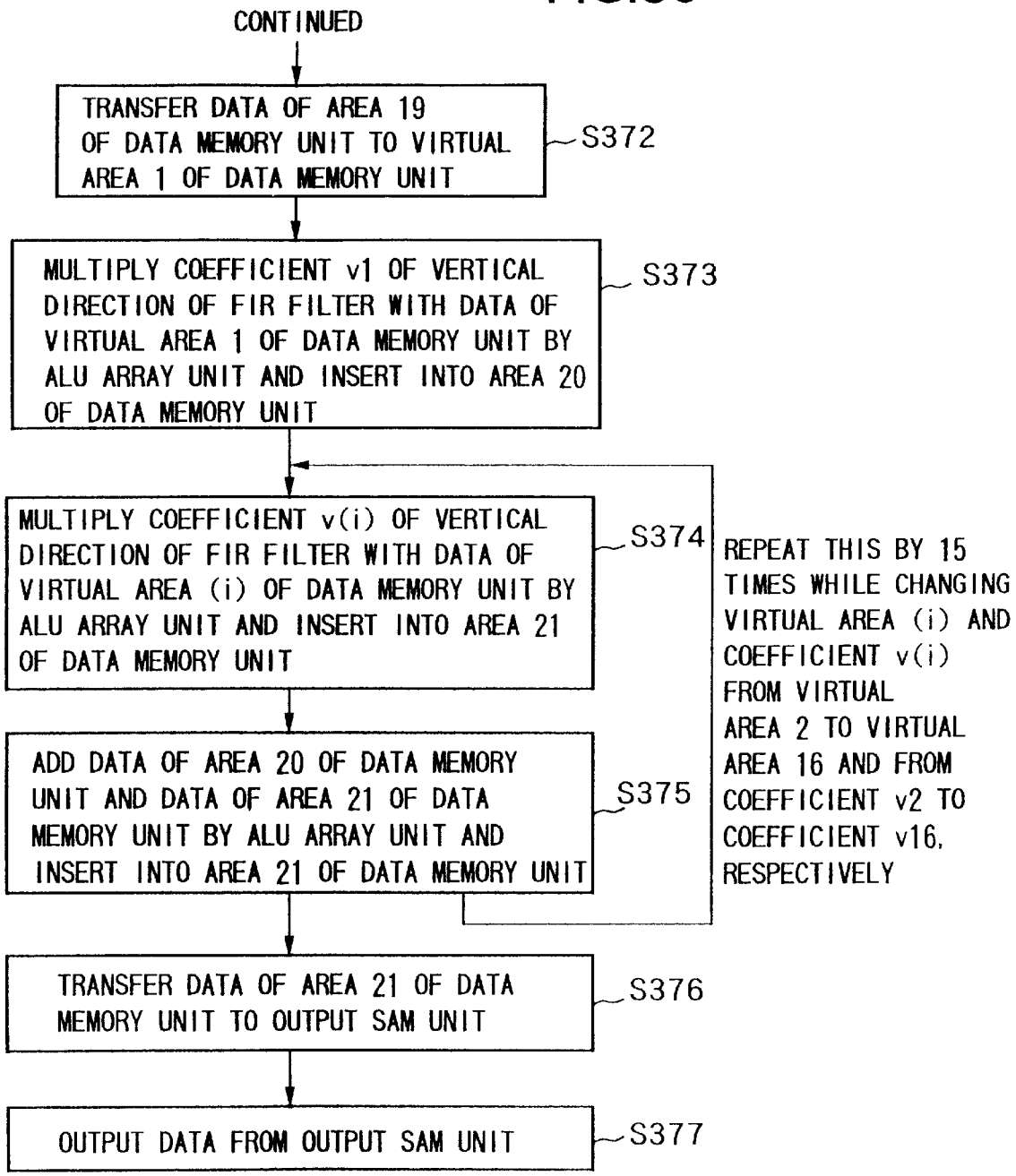
FIG. 60 is a second flow chart of the processing of a DSP in the 12th embodiment.

FIG. 50 and FIG. 60 are first and second flow charts showing the processing of the DSP 80 in the 12th embodiment.

First, the DSP 80 secures areas 1 to 16 for storing the image data and areas 17 to 21 used for the processing in the data memory unit as shown in the following Table 8.

Note that, the areas 1 to 16 secured in the data memory unit are used as virtual areas 1 to 16 by the address rotation for every line (processor element 30), and the address rotation is executed by the part controlling the data memory unit in the control circuit.

Further, areas 17 to 21 are not covered by the address rotation.

TABLE 8

| Data memory unit | Line n | Line n + 1 | Line n + 2 | Line n + 3 | ... | |
|---|---|---|---|---|---|---|
| Area 1 | V. area 1 | V. area 2 | V. area 3 | V. area 4 | ... | (8) |
| Area 2 | V. area 2 | V. area 3 | V. area 4 | V. area 5 | ... | |
| Area 3 | V. area 3 | V. area 4 | V. area 5 | V. area 6 | ... | |
| Area 4 | V. area 4 | V. area 5 | V. area 6 | V. area 7 | ... | |
| Area 5 | V. area 5 | V. area 6 | V. area 7 | V. area 8 | ... | |
| Area 6 | V. area 6 | V. area 7 | V. area 8 | V. area 9 | ... | |
| Area 7 | V. area 7 | V. area 8 | V. area 9 | V. area 10 | ... | |
| Area 8 | V. area 8 | V. area 9 | V. area 10 | V. area 11 | ... | |
| Area 9 | V. area 9 | V. area 10 | V. area 11 | V. area 12 | ... | |
| Area 10 | V. area 10 | V. area 11 | V. area 12 | V. area 13 | ... | |
| Area 11 | V. area 11 | V. area 12 | V. area 13 | V. area 14 | ... | |
| Area 12 | V. area 12 | V. area 13 | V. area 14 | V. area 15 | ... | |
| Area 13 | V. area 13 | V. area 14 | V. area 15 | V. area 16 | ... | |
| Area 14 | V. area 14 | V. area 15 | V. area 16 | V. area 1 | ... | |
| Area 15 | V. area 15 | V. area 16 | V. area 1 | V. area 2 | ... | |
| Area 16 | V. area 16 | V. area 1 | V. area 2 | V. area 3 | ... | |
| Area 17 | V. area 17 | V. area 17 | V. area 17 | V. area 17 | ... | |
| Area 18 | V. area 18 | V. area 18 | V. area 18 | V. area 18 | ... | |
| Area 19 | V. area 19 | V. area 19 | V. area 19 | V. area 19 | ... | |
| Area 20 | V. area 20 | V. area 20 | V. area 20 | V. area 20 | ... | |
| Area 21 | V. area 21 | V. area 21 | V. area 21 | V. area 21 | ... | |

That is, by first assigning the data from the input SAM unit into the virtual area 1 for each line, when viewing by a certain line, the newest data is in the virtual area 1 of the data memory unit, the next newest data is in the virtual area 2, . . . , and the oldest data is in the virtual area 16.

The 16 taps of filter coefficients which are determined by the GUI manipulation and realize the FIR filter are calculated on the personal computer. The filter coefficients in the horizontal direction are described as the filter coefficients h1, h2, . . . , h16, and filter coefficients in the vertical direction are described as the filter coefficients v1, v2, . . . , v16.

Figure 59:
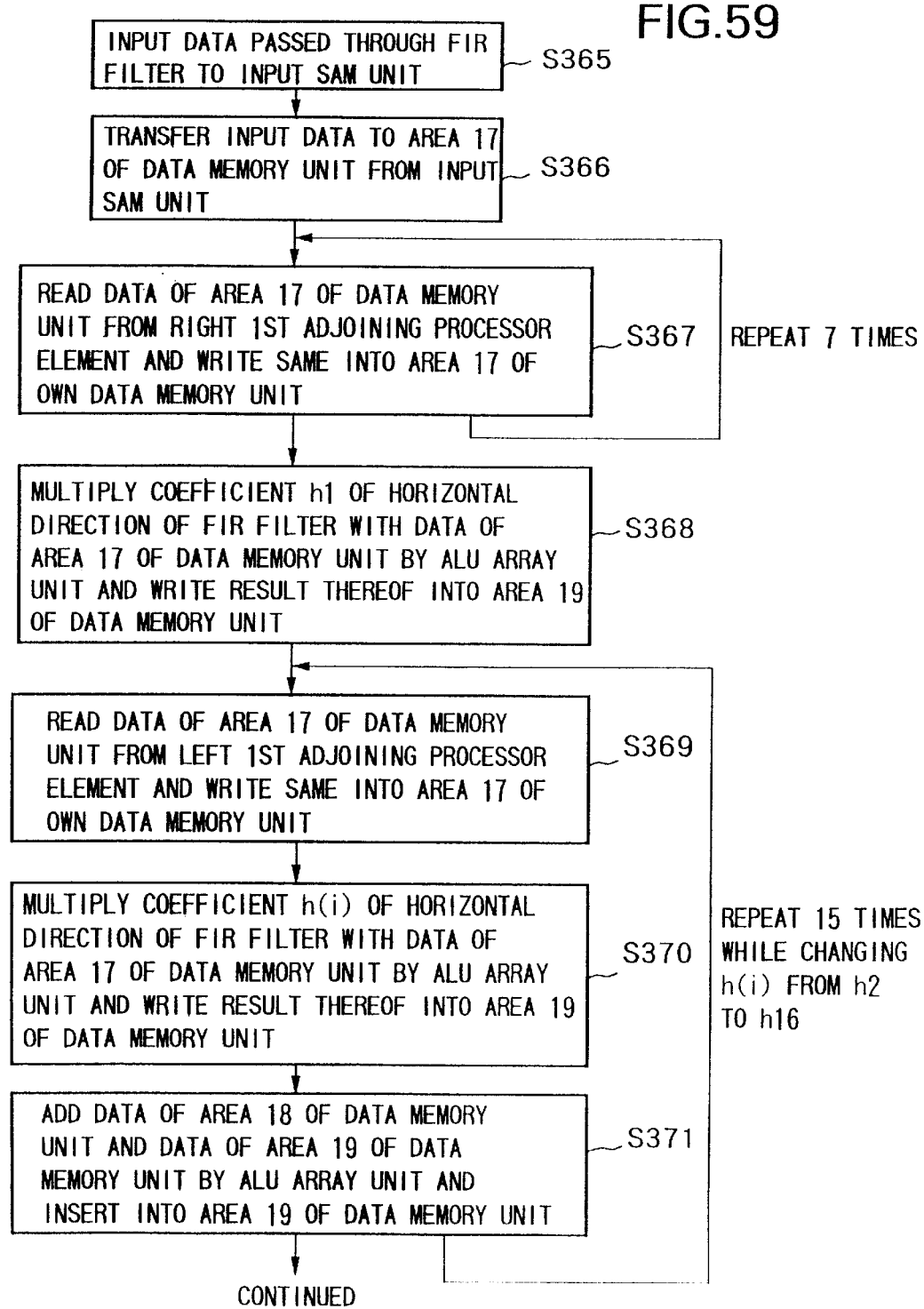
FIG. 59 is a first flow chart of the processing of a DSP in the 12th embodiment.

As shown in FIG. 59, at step S365, the DSP 80 inputs the data to be subjected to the FIR filter processing to the input SAM units of the processor elements 30.

At step S366, the input SAM units of the processor elements 30 transfer the data input in the processing of S365 to the area 17 of the data memory unit.

At step S367, the processor elements 30 read the data of the area 17 of the data memory unit of the right adjoining processor elements 30 and store the same in the area 17 of the data memory unit. By this processing, the data of the area 17 of the data memory unit is shifted to the left by the amount of one processor element 30. The processor elements 30 repeat the processing of S367 seven times to shift the data of the area 17 of the data memory unit to the left by the amount of seven processor elements 30.

At step S368, the ALU array units of the processor elements 30 multiply the filter coefficient h1 in the horizontal direction of the FIR filter with the data of the area 17 of the data memory unit and store the same in the area 19 of the data memory unit.

At step S369, the processor elements 30 read the data of the area 17 of the data memory units of the left adjoining processor elements 30 and store the same in the area 17 of the data memory unit. By the processing of S369, the data of the area 17 of the data memory units of the processor elements 30 is shifted to the right by the amount of one processor element 30.

At step S370, the ALU array units of the processor elements 30 multiply the filter coefficient h2 in the horizontal direction of the FIR filter with the data of the area 17 of the data memory unit and store the same in the area 18 of the data memory unit.

At step S371, the ALU array units of the processor elements 30 add the data of the area 18 of the data memory unit and the data of the area 19 of the data memory unit and store the same in the area 19 of the data memory unit.

As shown in FIG. 60, at step S372, the data of the area 17 of the data memory units of the left adjoining processor elements 30 is read and stored in the area 17 of the data memory unit. By the processing of S369, the data of the area 17 of the data memory units of the processor elements 30 is shifted to the right by amount of one processor element 30.

At step S373, the ALU array units of the processor elements 30 multiply the filter coefficient v1 in the horizontal direction of the FIR filter with the data of the area 1 of the data memory unit and store the same in the area 20 of the data memory unit.

At step S374, the ALU array units of the processor elements 30 multiply the filter coefficient vi in the vertical direction with the data of the virtual area i of the data memory unit and store the same in the area 21 of the data memory unit.

At step S375, the ALU array units of the processor element 30 add the data of the area 20 of the data memory unit and the data of the area 21 of the data memory unit and store the same in the area 21 of the data memory unit.

Note that, the ALU array units of the processor element 30 repeat the processings of S374 and S375 15 number of times by changing the virtual area i and the filter coefficient v1 from the virtual area 2 to virtual area 16 and from the filter coefficient 2 to filter coefficient 16, respectively.

At step S376, the processor elements 30 transfer the data of the area 21 of the data memory unit to the output SAM unit.

At step S378, the processor elements 30 output the data from the output SAM unit.

Operation of Image Data Processing System 9 in 12th Embodiment

Below, an explanation will be made of the operation of the image data processing system 9 (FIG. 37) in the 12th embodiment by referring to FIG. 61.

Figure 61:
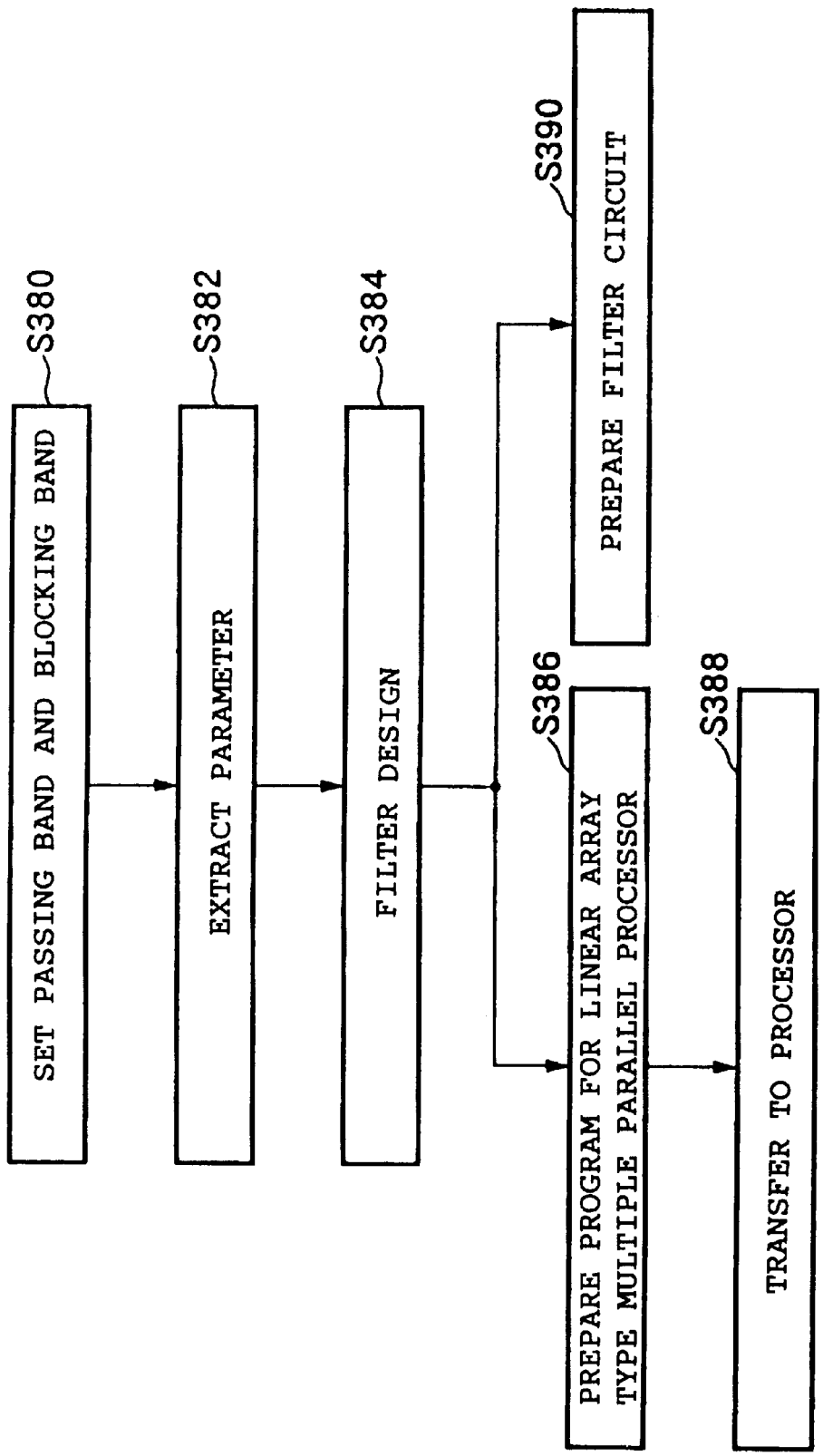
FIG. 61 is a flow chart showing the filtering by the FIR filter using the image data processing system shown as the 12th embodiment.

FIG. 61 is a flow chart showing the filtering by the FIR filter using the image data processing system 9 shown as the 12th embodiment.

As shown in FIG. 61, at step S380, the user manipulates the GUI image (FIGS. 56A to 56C) for setting the characteristic displayed on the monitor by the personal computer 72 of the image data processing system 9 to set the filtering characteristic (frequency response S"). The personal computer 72 receives the filtering characteristic in accordance with the setting of the user.

At step S382, the personal computer 72 extracts the parameters set in the processing of S380.

At step S384, the personal computer 72 calculates the filter coefficient from the parameters extracted at S382.

At step S386, the personal computer 72 prepares the program of the DSP 80 (linear array type multiple parallel processor) for performing the filtering by the designed FIR filter mentioned above by referring to FIG. 59 and FIG. 60.

At step S388, the personal computer 72 downloads the generated program to the DSP 80. The DSP 80 executes the downloaded program, performs the filtering by the FIR filter with respect to the image data VIN input from the image source 74, and displays the result of the processing on the image monitor 76.

At step S390, the personal computer 72 generates the description by the hardware description language of the designed filter circuit and outputs the same.

Note that, when the filtering result displayed on the image monitor 76 is not satisfactory, the user can repeating the processings of S380 to S388 until the satisfactory image data is obtained to find the optimum filtering characteristic.

As explained above, according to the operation of the image data processing system 9 in the 12th embodiment, the filtering with respect to the image data can be realized by software by using the DSP 80 (SIMD-controlled linear array type multiple parallel processor), therefore the size of the hardware of the filtering apparatus using the FIR filter can be made small.

Further, according to the filtering using the image data processing system 9 in the 12th embodiment, a GUI can be used to freely set and easily change the frequency response S" to perform the filtering and, in addition, the result of the processing can be immediately viewed. Accordingly, the filtering using the image data processing system 9 in the 12th embodiment is very useful when performing processing for imparting a special effect to the image data.

Note that the method of setting the processing characteristic of the filtering by the FIR filter in the 12th embodiment can be applied to the filtering of various data, for example, sound, vibration, temperature, or humidity.

Further, the method of setting the processing characteristic of the filtering by the FIR filter in the 12th embodiment can be applied to filtering by another method, for example, filtering using an FFT other than filtering by an FIR filter.

Further, the method of setting the processing characteristic of the filtering by the FIR filter in the 12th embodiment can be applied to filtering by a DSP of another format than filtering by an SIMD-controlled linear array multiple parallel processor.

Further, the image data processing system 9 shown as the 12th embodiment designs the filter circuit, prepares the description by the hardware description language of the designed filter circuit, and outputs this, therefore a filter circuit having the desired characteristic can be immediately actually manufactured. Accordingly, the image data processing system 9 shown as the 12th embodiment is very useful in the design and manufacture of an ASIC or dedicated LSI.

13th Embodiment

Granular noise means the granular noise frequently seen in old film pictures etc. When broadcasting old films etc. to televisions, it is necessary to eliminate or reduce this granular noise. Granular noise elimination (reduction) has been considered indispensable in image processing systems.

The 13th embodiment of the present invention is a modification obtained by applying the image data processing systems 9 and 10 (FIGS. 37, 43) to the granular noise elimination.

Granular Noise Elimination

Below, an explanation will be made of the granular noise elimination by referring to FIG. 62 and FIG. 63.

Figure 62:
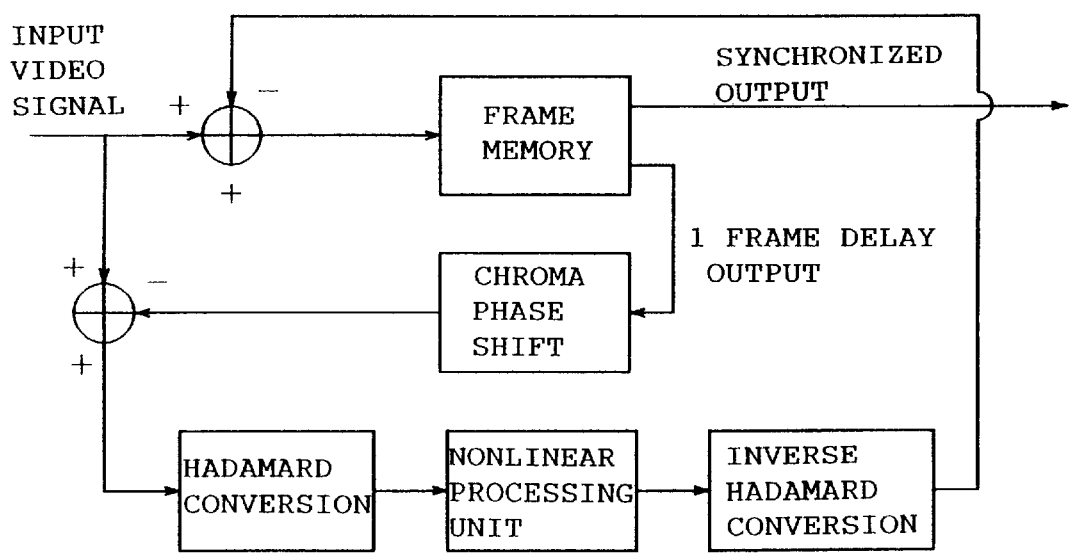
FIG. 62 is a first view of granular noise elimination in a 13th embodiment of the present invention.

FIG. 62 is a first view of the granular noise elimination in the 13th embodiment of the present invention.

FIGS. 63A to 63E are second views showing the granular noise elimination in the 13th embodiment of the present invention.

As shown in FIG. 62, the granular noise elimination includes subtraction, delay, Hadamard conversion, noise separation (nonlinear processing), and inverse Hadamard conversion.

Subtraction

In the noise elimination, the subtraction shown in FIGS. 63A and 63E is for eliminating (reducing) the granular noise by subtracting the image data (noise image data P''') obtained as the result of the inverse Hadamard conversion from the input image data VIN containing the granular noise and outputting the same as the output image data.

Hadamard Conversion

The Hadamard conversion shown in FIG. 63B is for converting the output image data (P) obtained by FIG. 63A by using a Hadamard matrix (M) and separating a motion component (P') indicating the motion of the image.

Noise Separation

The noise separation shown in FIG. 63C is for separating only the noise component (P") from the motion component by deciding the motion component having the value larger than the predetermined threshold value among motion components (P') subjected to the Hadamard conversion as the motion of the object in the image, deciding portions having a smaller surface area than the predetermined threshold value as granular noise, and performing nonlinear processing so as to leave those having a small absolute value.

Inverse Hadamard Conversion

The inverse Hadamard conversion shown in FIG. 63D is for converting the noise component (P") separated by the noise separation by using a Hadamard inverse matrix ($M^{-1}$) to generate the noise image data (P''').

Figure 64:
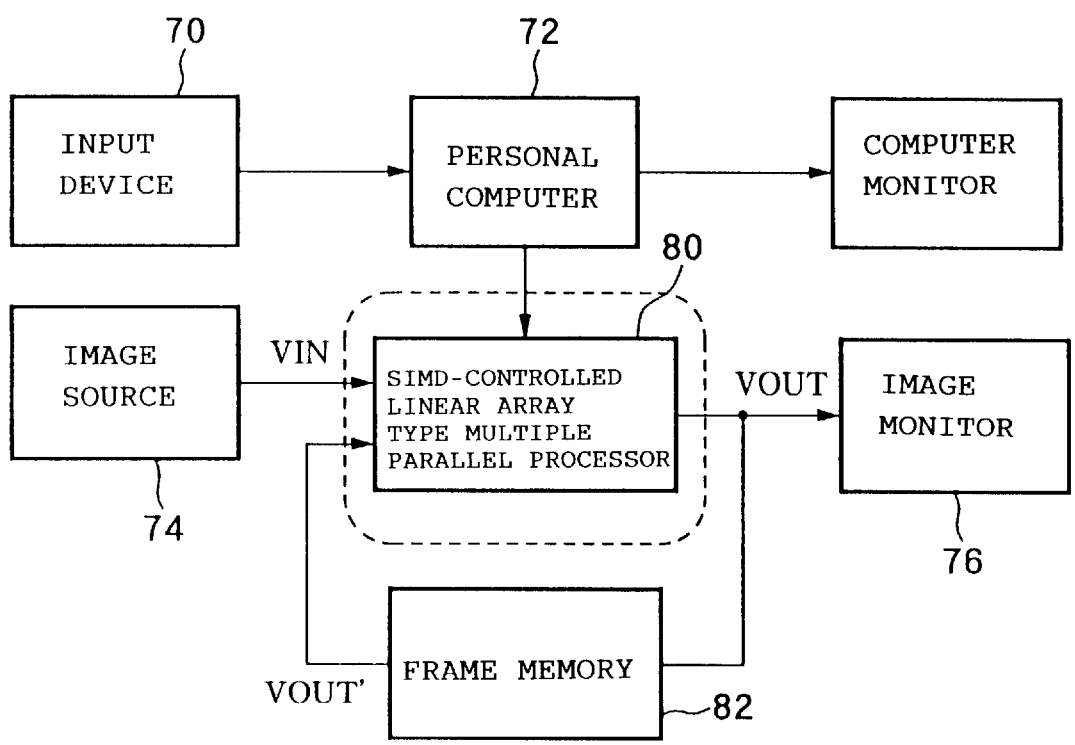
FIG. 64 is a view of the configuration of the image data processing system shown as the 13th embodiment of the present invention.

The 13th embodiment (image data processing system 11; FIG. 64) of the present invention is constituted so as to be able to perform the noise separation by making it possible to set any value by the GUI as the threshold value used for the judgement of the noise component among the motion components in the noise separation among these processings and easily change the setup and in addition immediately visually confirm the result of the noise separation.

Configuration of Image Data Processing System 11

FIG. 64 is a view of the configuration of the image data processing system 11 shown as the 13th embodiment of the present invention.

Figure 65:
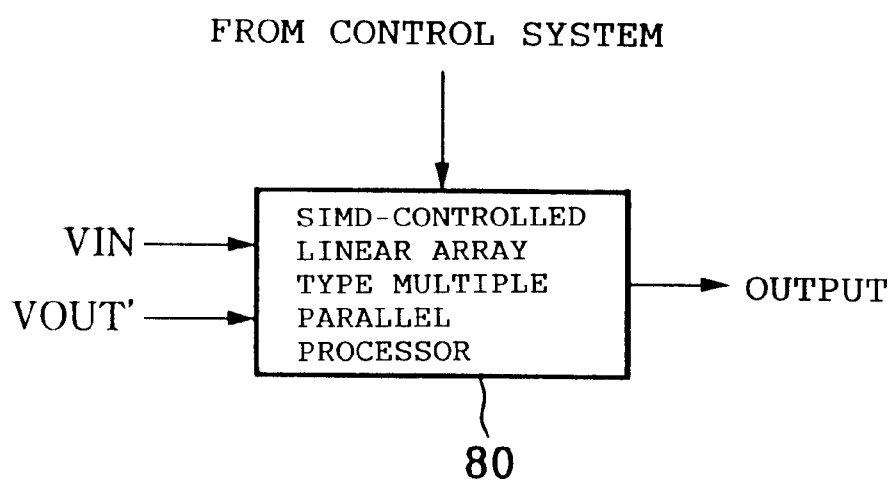
FIG. 65 is a view of the data input and output with respect to the DSP shown in FIG. 64.

FIG. 65 is a view of the data input to and output from the DSP 80 shown in FIG. 64.

Note that, in FIG. 64 and FIG. 65, among the constituent parts of the image data processing system 11, those the same as the constituent parts of the image data processing systems 9 and 10 already shown in FIG. 37, FIG. 43, etc. are indicated by the same reference numerals.

As shown in FIG. 64, the image data processing system 11 is constituted by the input device 70, personal computer 72, image source 74, image monitor 76, DSP 80, and frame memory 82. That is, the image data processing system 11 is constituted so as to give one frame's worth of a time delay to the image data VOUT obtained as the result of granular noise elimination as shown in FIG. 65 and input the same to the DSP 80 as the second input data by adding the frame memory 82 to the image data processing system 9.

The image data processing system 11 performs the granular noise elimination for eliminating (reducing) the granular noise of the image data VIN input from the image source 74 by these constituent parts.

Constituent Parts of Image Data Processing System 11

Below, an explanation will be made of constituent parts different in operation etc. from those in the embodiments before the 12th embodiment among constituent parts of the image data processing system 11 (FIG. 64).

DSP 80

The DSP 80 executes the program prepared by the personal computer 72 in accordance with the setting of the separation point to perform the granular noise elimination.

Personal Computer 72

Figure 66:
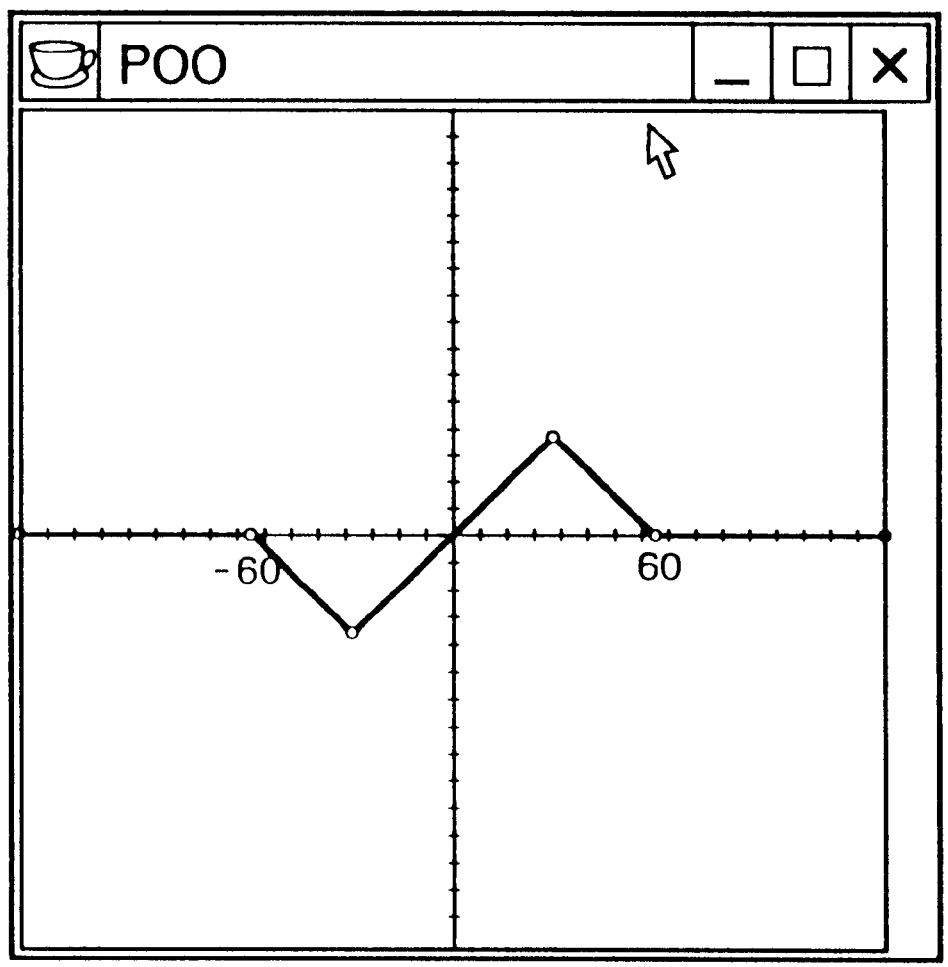
FIG. 66 is a view of a GUI image displayed on the monitor for setting a separation point of a noise component by the personal computer of the image data processing system shown in FIG. 64.

FIG. 66 is a view of the GUI image displayed on the monitor so as to set the separation point of the noise component by the personal computer 72 of the image data processing system 11 shown in FIG. 64. Note that the graph in the GUI image for setting the separation point shown in FIG. 66 exemplifies the case where the range from −60 to +60 is used as the separation point.

Display and Setting of Separation Point Setting GUI Image

The personal computer 72 displays the GUI image indicating which range of surface area (separation point) in the motion component obtained by the Hadamard conversion in the noise separation (FIG. 62, FIG. 63C) was detected as the noise component in the form of for example a graph on the monitor as shown in FIG. 66.

The user moves the passing point of the graph (mark o in FIG. 66) displayed in the image (FIG. 66) for setting the separation point of the GUI screen displayed on the monitor by a click and drag operation of the mouse etc. of the input device 70 in the same way as for example the case of setting the function S in the 11th embodiment so as to set the separation point. Note that, in this setting operation, the curve of the graph in the GUI screen is enlarged or reduced while maintaining the same shape.

Preparation of Program for DSP 80

In accordance with this setting operation of the user, the personal computer 72 changes and displays the curve of the graph in the GUI image. Further, when the user finishes setting the range and performs the predetermined operation for ending the setting of the range via the input device 70, the personal computer 72 prepares the program of the DSP 80 for defining the separation point and executing the granular noise elimination based on the defined separation point and downloads this to the DSP 80.

Content of Processing of Program for DSP 80

Below, an explanation will be made of the content of the processing of the program for the DSP 80 prepared by the personal computer 72.

The DSP 80 (parallel processor 6; FIG. 32) of the image data processing system 11 divides for example the input image data VIN into pixel blocks of lateral 4 pixels×vertical 2 pixels, performs the Hadamard conversion on each of the pixel blocks, and detects the motion component containing the noise component.

For this reason, the DSP 80 secures the area for storing the image data VIN, the area for storing eight data used for the Hadamard conversion, the area for storing eight data used for matrix operation, and the area for storing the coefficient used for the detection of the noise component in the data memory unit 23 of the processor elements 30.

Hadamard Conversion

Next, the DSP 80 calculates a difference of corresponding pixels between the newest input frame (current frame) and the frame input once before (previous frame) and performs the Hadamard conversion on the difference (FIG. 62 and FIG. 63B).

That is, the processor elements 30 of the DSP 80 designate the differences of the pixel blocks contained in a pixel block of a lateral 4 pixel×vertical 2 pixel configuration as P00 to P04 and P10 to P14, perform the Hadamard conversion shown in following equation 11 by using an 8×8 Hadamard matrix with respect to an 8×1 matrix consisting of these differences as elements, and detect the motion component P' containing the noise component P''.

$$P' = MP \tag{11}$$

where, | | indicates a matrix.

$$P = \begin{vmatrix} P\,00 \\ P\,01 \\ P\,02 \\ P\,03 \\ P\,10 \\ P\,11 \\ P\,12 \\ P\,13 \end{vmatrix} \quad P' = \begin{vmatrix} P'\,00 \\ P'\,01 \\ P'\,02 \\ P'\,03 \\ P'\,10 \\ P'\,11 \\ P'\,12 \\ P'\,13 \end{vmatrix}$$

$$M = \begin{vmatrix} 1 & 1 & 1 & 1 & 1 & 1 & 1 & 1 \\ 1 & -1 & 1 & -1 & 1 & -1 & 1 & -1 \\ 1 & 1 & -1 & -1 & 1 & 1 & -1 & -1 \\ 1 & -1 & -1 & 1 & 1 & -1 & -1 & 1 \\ 1 & 1 & 1 & 1 & -1 & -1 & -1 & -1 \\ 1 & -1 & 1 & -1 & -1 & 1 & -1 & 1 \\ 1 & 1 & -1 & -1 & -1 & -1 & 1 & 1 \\ 1 & -1 & -1 & 1 & -1 & 1 & 1 & -1 \end{vmatrix}$$

Here, in the processing with respect to each element in equation 11, numerical values X01 to X03 and Y01 to Y032 are defined as shown in the following equations 13 and 14 from the numerical values A and B shown in the following equation 12 by using a function F for calculating A+B and A−B.

$$F(A, B \rightarrow A+B, A-B) \tag{12}$$

$F(P00,P01 \rightarrow X00=P00+P01, X01=P00-P01$ $$F(P02,P03 \rightarrow X02=P02+P03, X03=P02-P03 \tag{13}$$

$F(X00,X02 \rightarrow Y00=P00+P01+P02+P03, Y01=P00+P01-P02-P03)$ $$F(X01,X03 \rightarrow Y02=P00-P01+P02-P03, Y03=P00-P01-P02+P03) \tag{14}$$

Further, elements P00 to P034 of the matrix P are classified as an upper line (first line), and elements P10 to P13 are classified as a lower line (second line), but it is sufficient so far as the numerical values Y10 to Y13 shown in the following equation 15 store the values calculated in the processing of the first line by the processor elements 30 up to the processing of the second line.

$Y10=P10+P11+P12+P13$ $Y11=P10+P11-P12-P13$ $Y12=P10-P11+P12-P13$ $$Y13=P10-P11-P12+P13 \tag{15}$$

Further, the processor elements 30 can calculate the 8×1 matrix P' (motion component P') shown in equation 11 by performing the processing shown in the following equation 16.

$F(Y00,Y10 \rightarrow P'00=Y00+Y10, P'10=Y00-Y10)$ $F(Y02,Y12 \rightarrow P'01=Y02+Y12, P'12=Y02-Y12)$ $F(Y01,Y11 \rightarrow P'02=Y01+Y11, P'11=Y01-Y11)$ $$F(Y03,Y13 \rightarrow P'03=Y03+Y10, P'13=Y03-Y13) \tag{16}$$

Noise Component Detection Next, the processor elements 30 of the DSP 80 judge those elements P'00 to P'13 of the matrix P' (motion component P') obtained by the Hadamard conversion which have values near the numerical value 0 as the noise component (P") and eliminates elements other than the noise component (P").

The processor elements 30 of the DSP 80 perform the conversion by approximating for example the function P" shown in the following Table 9 (FIG. 66) by a primary function every first to fifth areas by using the parameters extracted from the separation point set in the GUI image shown in FIG. 66 and use this to detect the noise component P".

That is, the processor elements 30 of the DSP 80 judge elements having values out of the range of −60 to +60 among the elements of the matrix P' as the motion component, make the values 0, judge the elements having values within the range of −60 to +60 as the noise component P", and leave the same.

TABLE 9

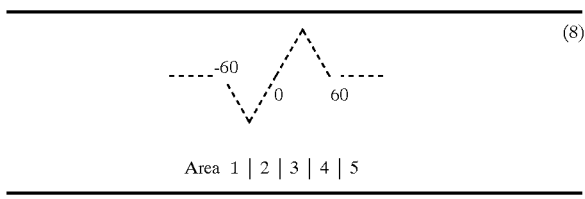

Area 1 | 2 | 3 | 4 | 5

The noise component detection of the processor elements 30 of the DSP 80 will be further concretely explained next.

First, the processor elements 30 of the DSP 80 secure areas for storing coefficients A and B in the data memory unit 23.

Next, the processor elements 30 decide whether or not the values of the elements of the matrix P' are larger than −60, respectively assign numerical values −1 and −60 for the coefficients A and B when the values are larger than −60, and respectively assigns numerical values 0 and 0 if the values are smaller than −60.

Next, the processor elements 30 decide whether or not the values of the elements of the matrix P' are larger than −30, respectively assigns numerical values 1 and 0 for the coefficients A and B when the values are larger than the latter, and do not change the values of the coefficients A and B if the values are smaller than the latter.

By repeating the calculation of the coefficients A and B explained above, the processor elements 30 can find values of the coefficients A and B in accordance with to which area among the five areas shown in Table 9 the value X of the elements of the matrix P' belongs to and can detect the noise component P" by assigning the value P' of the elements of the matrix P' into the following equation 17 using the coefficients A and B.

$$P'' = AP' + B \qquad (17)$$

where, $$P'' = \begin{vmatrix} P'' \ 00 \\ P'' \ 01 \\ P'' \ 02 \\ P'' \ 03 \\ P'' \ 10 \\ P'' \ 11 \\ P'' \ 12 \\ P'' \ 13 \end{vmatrix}$$

Inverse Hadamard Conversion

Further, the processor elements 30 of the DSP 80 perform the inverse Hadamard conversion with respect to the matrix P" (P"00 to P"13) by using the Hadamard inverse matrix $M^{-1}$ as shown in the following equation 18 and generate the noise image P'" of an 8×1 matrix format indicating the granular noise.

$$P''' = M^{-1} P \qquad (18)$$

Note, $$P''' = \begin{vmatrix} P''' \ 00 \\ P''' \ 01 \\ P''' \ 02 \\ P''' \ 03 \\ P''' \ 10 \\ P''' \ 11 \\ P''' \ 12 \\ P''' \ 13 \end{vmatrix}$$

$$M^{-1} = \frac{1}{8} \begin{vmatrix} 1 & 1 & 1 & 1 & 1 & 1 & 1 & 1 \\ 1 & -1 & 1 & -1 & 1 & -1 & 1 & -1 \\ 1 & 1 & -1 & -1 & 1 & 1 & -1 & -1 \\ 1 & -1 & -1 & 1 & 1 & -1 & -1 & 1 \\ 1 & 1 & 1 & 1 & -1 & -1 & -1 & -1 \\ 1 & -1 & 1 & -1 & -1 & 1 & -1 & 1 \\ 1 & 1 & -1 & -1 & -1 & -1 & 1 & 1 \\ 1 & -1 & -1 & 1 & -1 & 1 & 1 & -1 \end{vmatrix}$$

Note that the matrix operation shown in equation 18 can also be realized with a small amount of processing by using the function F shown in equation 13 and equation 14.

Noise Component Elimination

The processor elements 30 of the DSP 80 subtract the noise image P'" generated as explained above from the input image data VIN to eliminate the granular noise.

Operation of Image Data Processing System 11

Below, the operation of the image data processing system 11 (FIG. 64) shown as the 13th embodiment will be further explained by referring to FIG. 67 and FIG. 68.

Figure 67:
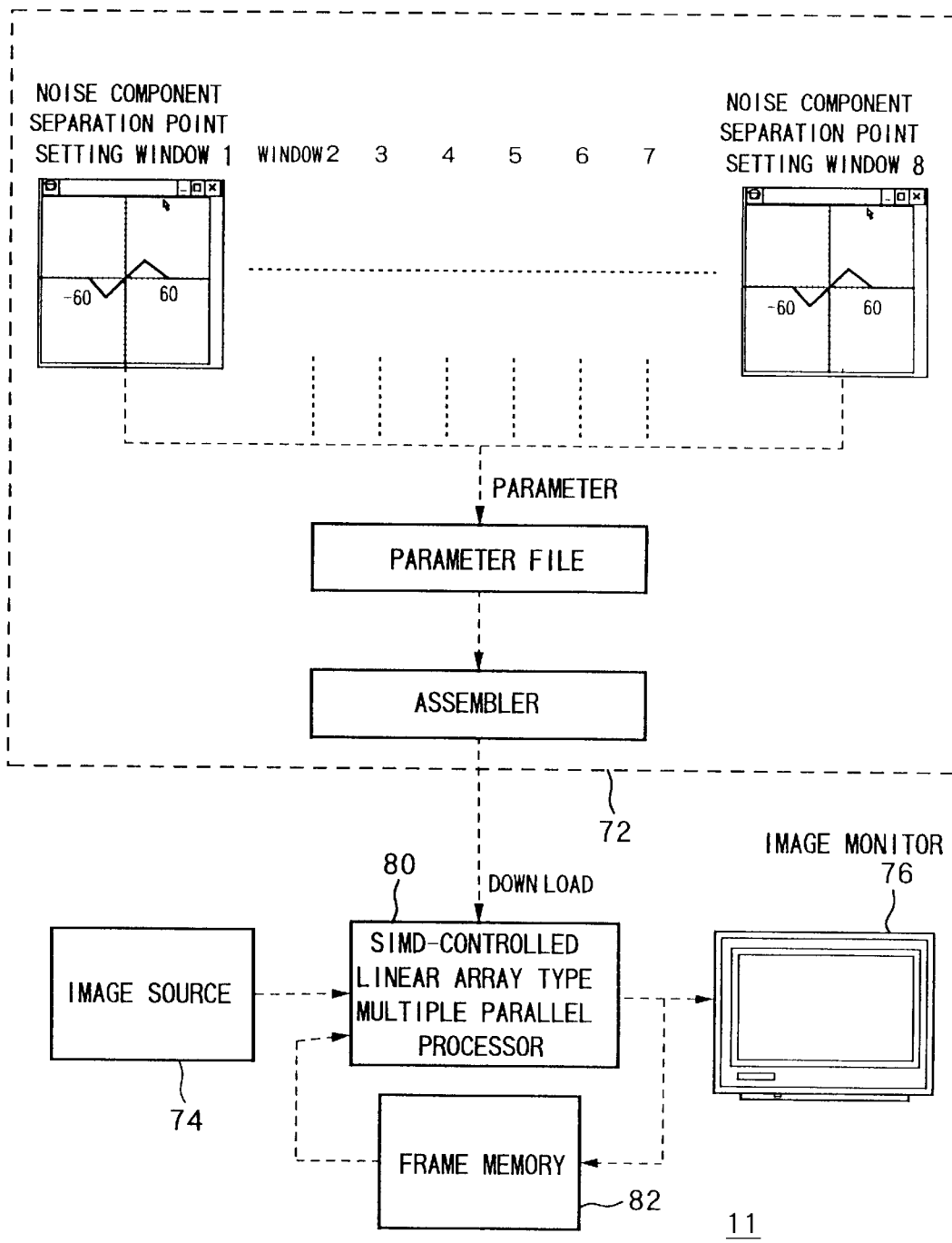
FIG. 67 is a view of the operation of the image data processing system shown as the 13th embodiment of the present invention.

FIG. 67 is a view of the operation of the image data processing system 11 shown as the 13th embodiment of the present invention.

Figure 68:
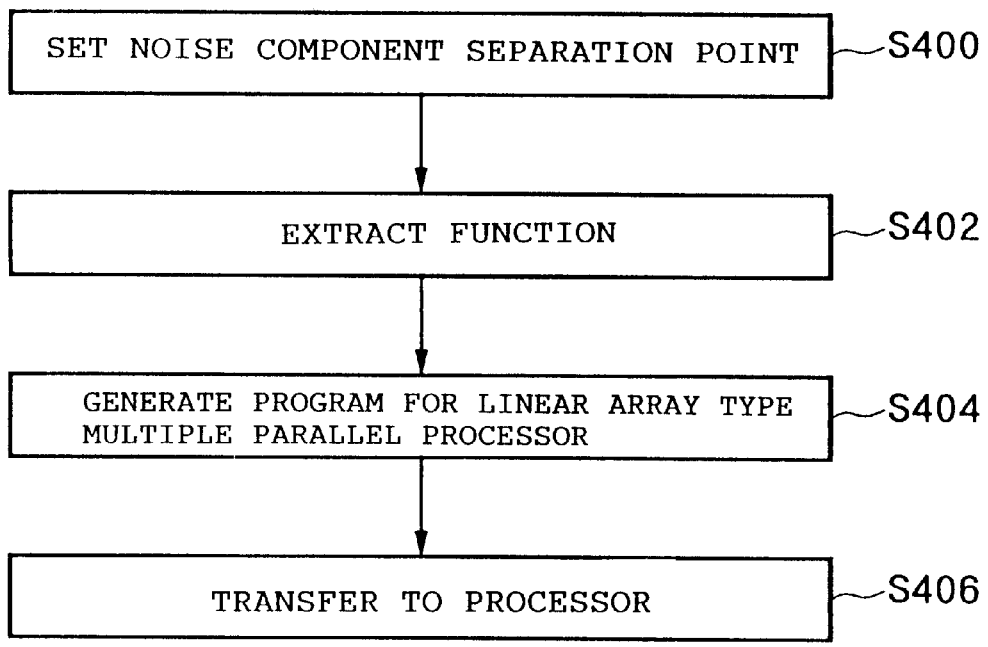
FIG. 68 is a flow chart of the operation of the image data processing system shown as the 13th embodiment of the present invention.

FIG. 68 is a flow chart of the operation of the personal computer 72 in the image data processing system 11 shown as the 13th embodiment of the present invention.

As shown in FIG. 68, at step S400, the personal computer 72 displays the GUI image for setting the separation point shown in FIG. 66 on the computer monitor device (an image monitor also possible) and sequentially changes and displays the curve of the graph in the GUI image in accordance with the manipulation of the mouse etc. of the input device 70 by the user.

Further, when the user terminates the input of the separation point and performs the predetermined processing with respect to the GUI image, the personal computer 72 fixes and receives the separation point corresponding to the curve of the graph in the GUI image.

At step S402, the personal computer 72 extracts the function P" shown in Table 9 based on the parameters obtained from the input separation point.

At step S404, the personal computer 72 prepares the parameter file for the DSP 80 for performing the granular noise elimination by using the function used in the processing of step S402 as shown in FIG. 67. Further, the personal computer 72 activates an assembler for the DSP 80 as shown in FIG. 67 and compiles the source program containing the parameter file to prepare the object program.

At step S406, the personal computer 72 transfers (downloads) the prepared object program to the DSP 80.

The DSP 80 executes the downloaded object program, performs the granular noise elimination with respect to the image data VIN input from the image source 74, and displays the output image data obtained as the result of the granular noise elimination on the image monitor 76.

As explained above, according to the image data processing system 11 shown as the 13th embodiment of the present invention, since the granular noise elimination (reduction) apparatus is realized by one SIMD-controlled linear array type multiple parallel processor, the size of the hardware of the granular noise elimination apparatus can be made small.

Further, according to the image data processing system 11 shown as the 13th embodiment of the present invention, it is possible to use the GUI to set any separation point, easily change the set separation point, and perform the granular noise elimination.

Further, according to the image data processing system 11 shown as the 13th embodiment of the present invention, since the noise elimination can be carried out by processing by software, the detection of the noise component under optimum conditions is possible by the change of the program and the quality of the image after the granular noise elimination is improved.

Further, according to the image data processing system 11 shown as the 13th embodiment of the present invention, the result of the noise elimination can be immediately confirmed on the image monitor 76.

Note that, as shown in FIG. 67, it is also possible to change the processing of the personal computer 72 so as to display a plurality of, for example, eight separation point setting GUI images, corresponding to the plurality of (eight) image data VIN, receive the separation points input in accordance with these GUI images, and perform the granular noise elimination using a different separation point with respect to each of the plurality of image data VIN.

Further, the method of setting a separation point in the image data processing system 11 shown as the 13th embodiment of the present invention can be also applied to granular noise elimination using a DSP of a format other than an SIMD-controlled linear array multiple parallel processor (DSP 80).

Further, the granular noise elimination according to the image data processing system 11 shown as the 13th embodiment of the present invention can be applied to the elimination and reduction of not only granular noise, but also other types of noise.

Further, the method of division of the pixel blocks, Hadamard matrix, and Hadamard inverse matrix in the image data processing system 11 shown as the 13th embodiment are examples and can be freely changed in accordance with the configuration of the system or the method of the noise elimination.

Further, the various modifications indicated in the embodiments up to the 12th embodiment are also possible with respect to the image data processing system 11 shown as the 13th embodiment of the present invention.

14th Embodiment

Below, as a 14th embodiment of the present invention, an explanation will be made of the method of performing color correction (γ correction), chroma key processing, filtering by an FIR filter, image contour enhancement, and granular noise reduction (hereinafter these processings will be also referred to all together as effect processing) by the image data processing systems 9 to 11 (FIG. 37, FIG. 43, and FIG. 64) shown as the ninth to 13th embodiments for only the specific area of the image data (screen).

In order to apply the effect processing to only a specific area of the image data (screen) in this way, the method of replacing the original image data by image data subjected to the effect processing only in the set area by preparing the image data subjected to the effect processing and the original image data in advance may be adopted.

Below, an explanation will be made of a method of setting the area for applying the effect processing (setting effect area) and replacing the image data by the image data processing systems 9 to 11.

Operation of Personal Computer 72 of Image Data Processing Systems 9 to 11

Below, an explanation will be made of the operation of the personal computer 72 of the image data processing systems 9 to 11 in the 14th embodiment.

Display of GUI Image

Figure 69:
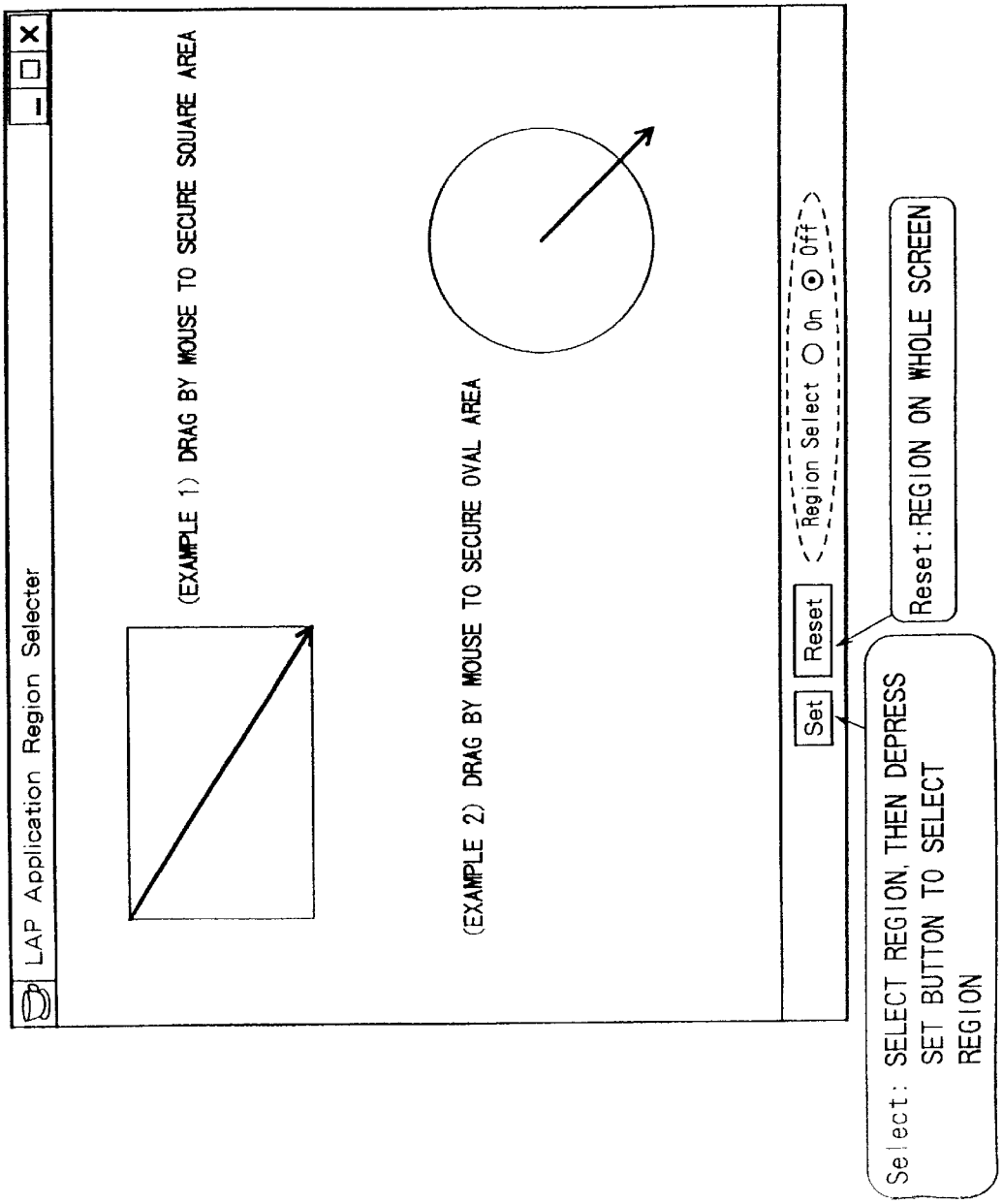
FIG. 69 is a view of a GUI image for setting an effect area displayed by the personal computer of the image data processing system (FIG. 37, FIG. 43, FIG. 64) on the monitor when setting the effect area shown as a 14th embodiment of the present invention.

FIG. 69 is a view of the GUI image for setting the effect area displayed on the monitor by the personal computer 72 of the image data processing systems 9 to 11 (FIG. 37, FIG. 43, and FIG. 64) when setting the effect area shown as the 14th embodiment of the present invention.

The personal computer 72 displays the GUI image for setting the effect area shown in FIG. 69 on the monitor.

The user sets for example performs a click and drag operation in the GUI image by using the mouse etc. of the input device 70 as shown in FIG. 69 so as to set any effect area (rectangular area shown in Example 1 of FIG. 69, circular area shown in Example 2, etc.) in the image data (screen).

Setting Rectangular Area

For example, when setting a rectangular area as shown in Example 1 of FIG. 69, the personal computer 72 sets a rectangular area having the straight line connecting the two points of a point (coordinates (X1, Y1)) which the user first clicks by the mouse of the input device 70 and a point (coordinates (X2, Y2)) where the user drags to and releases the mouse as diagonal and having sides which are parallel or perpendicular to the frame of the screen and receives the coordinates ((X1, Y1), (X2,Y2)) of the two points as parameters.

Setting Circular Area

Further, for example, when setting a circular area as shown in Example 2 of FIG. 69, the personal computer 72 sets a circular area having a point (coordinates (X1, Y1)) which the user first clicks by the mouse of the input device 70 as the center and having the distance to the point (coordinates (X2, Y2)) where the user drags to and releases the mouse as the radii in the x-direction and y-direction as the effect area and receives numerical values ($1/XR^2$, $1/YR^2$) found from the coordinates (X1, Y1) of the center point, a radius XR (XR=X2−X1) of the X-axis direction of the circle, and a radius YR (YR=Y2−Y1) of the Y-axis direction of the circle as parameters.

Preparation of Program for DSP 80

When the user sets the effect area explained above, then performs various effect processings by the image data processing systems 9 to 11, the personal computer 72 prepares the program for the DSP 80 for replacing only the image data in the effect area by the image data subjected to the effect processing.

Below, an explanation will be made of the content of the program for the DSP 80 prepared by the personal computer 72.

Figure 70:
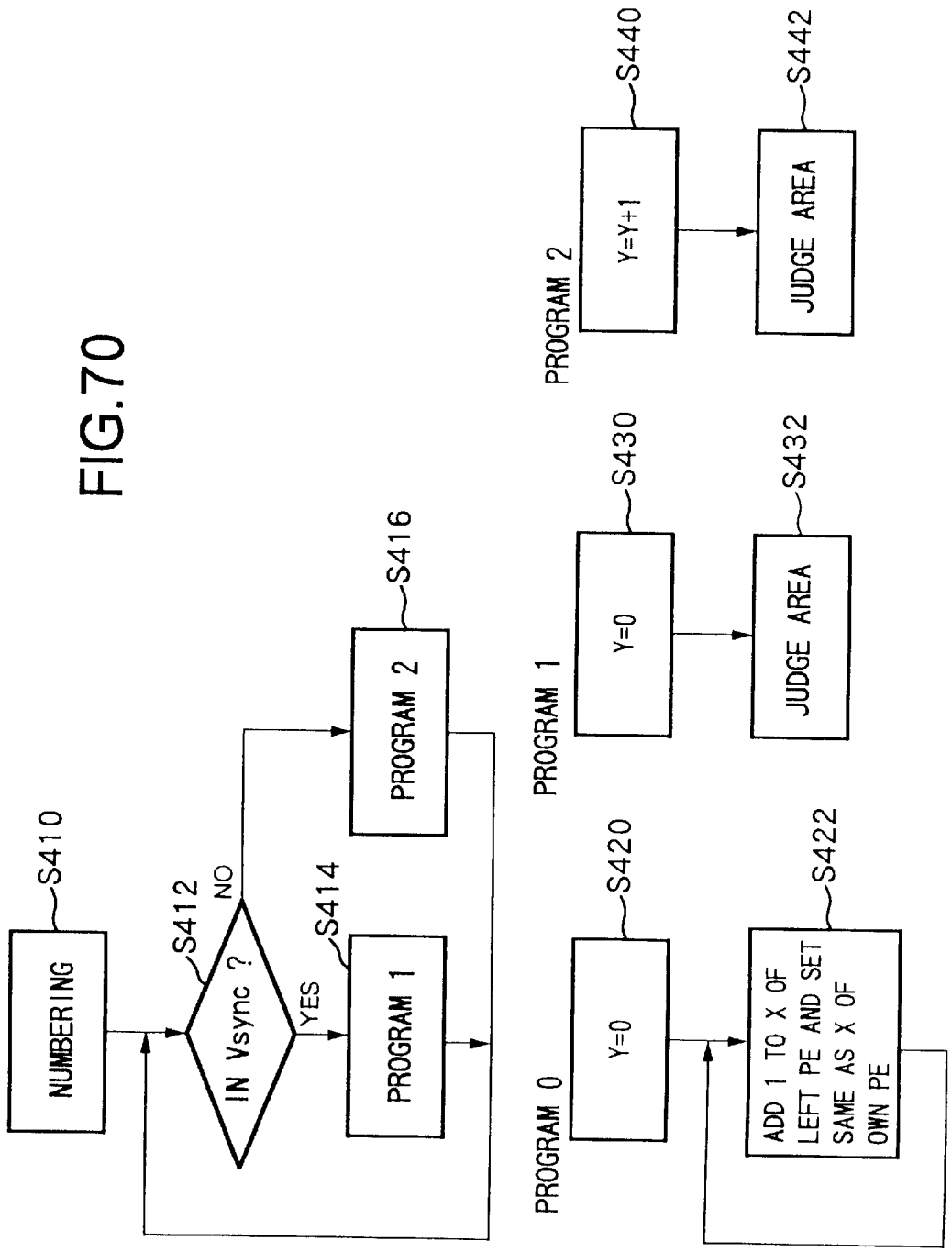
FIG. 70 is a first view of the processing of a program of a DSP generated by the personal computer of the image data processing system (FIG. 37, FIG. 43, FIG. 64) shown as the 14th embodiment.

FIG. 70 is a first view of the processing of the program of the DSP 80 generated by the personal computer 72 of the image data processing systems 9 to 11 (FIG. 37, FIG. 43, and FIG. 64) shown as the 14th embodiment.

As shown in FIG. 70, at step S410, the processor elements 30 of the DSP 80 perform numbering (program 0; S420, S422) and enable the switching of programs between for example the period of the vertical blanking period and periods other than this. Note that the numbering means giving numbers to the processor elements 30, for example, giving he number 1 to the left end processor element and giving an increasing number toward the right side in order.

That is, at step S420, the processor elements 30 of the DSP 80 (parallel processor 6; FIG. 37) assign the numerical value 0 for the variable Y.

At step S422, the processor elements 30 repeatedly perform the operation of adding the numerical value 1 to the variable X of the processor elements 30 (PE) of the forward direction (left adjoining) and assigning the numerical value 1 for the variable X of the related processor elements 30 so as to perform the numbering with respect to the variable X.

Note that when executing the numbering, since the left endmost processor element 30 (PE) does not have an adjoining processor element 30 (PE) to the further left, the value of the variable X always becomes 0 (1=1+0). Accordingly, the values of the variable X of the processor elements 30 become as shown in the following table the first time.

TABLE 10

| PE | 0 | 1 | 2 | 3 | 4 | 5 | ... (9) |
|---|---|---|---|---|---|---|---|
| X  | 1 | 1 | 1 | 1 | 1 | 1 | ... |

When further repeating the numbering, the values of the variable X of the processor elements 30 becomes as shown in the following Table 11.

TABLE 11

| PE | 0 | 1 | 2 | 3 | 4 | 5 | ... (10) |
|---|---|---|---|---|---|---|---|
| X  | 1 | 2 | 2 | 2 | 2 | 2 | ... |

When repeating such numbering, the values of the variable of the processor elements 30 become as shown in the following Table 12. The variable X becomes the values indicating the positions of the processor elements 30 in the horizontal scanning direction.

TABLE 12

| PE | 0 | 1 | 2 | 3 | 4 | 5 | ... (11) |
|---|---|---|---|---|---|---|---|
| X  | 1 | 2 | 3 | 4 | 5 | 6 | ... |

At step S412, the processor elements 30 decide whether or not the time is in the vertical blanking period. Where it is within the vertical blanking period, the processor elements 30 proceed to the processing of S414 and execute the program 1 (S430, S432). In cases other than this, they proceed to the processing of S414 and execute the program 2 (S440, S442).

At step S430 of the program 1, the processor elements 30 assign the numerical value 0 for the variable Y.

At step S431, the processor elements 30 judge whether or not the positions of the pixels of the image data are within the effect area and output the data of the values in accordance with the result of judgement.

At step S440 of the program 2, the processor elements 30 add the numerical value 1 to the variable Y (Y=y+1).

At step S431, the processor elements 30 judge whether or not the positions of the pixels of the image data are within the effect area and output the data of the values in accordance with the result of judgement.

Below, an explanation will be made of the content of the processing for judgement of whether or not a position is within the effect area at S432 and S442 of programs 1 and 2 and the processing for output of the data in accordance with the result of judgement by referring to FIG. 71 and FIG. 72.

Figure 71:
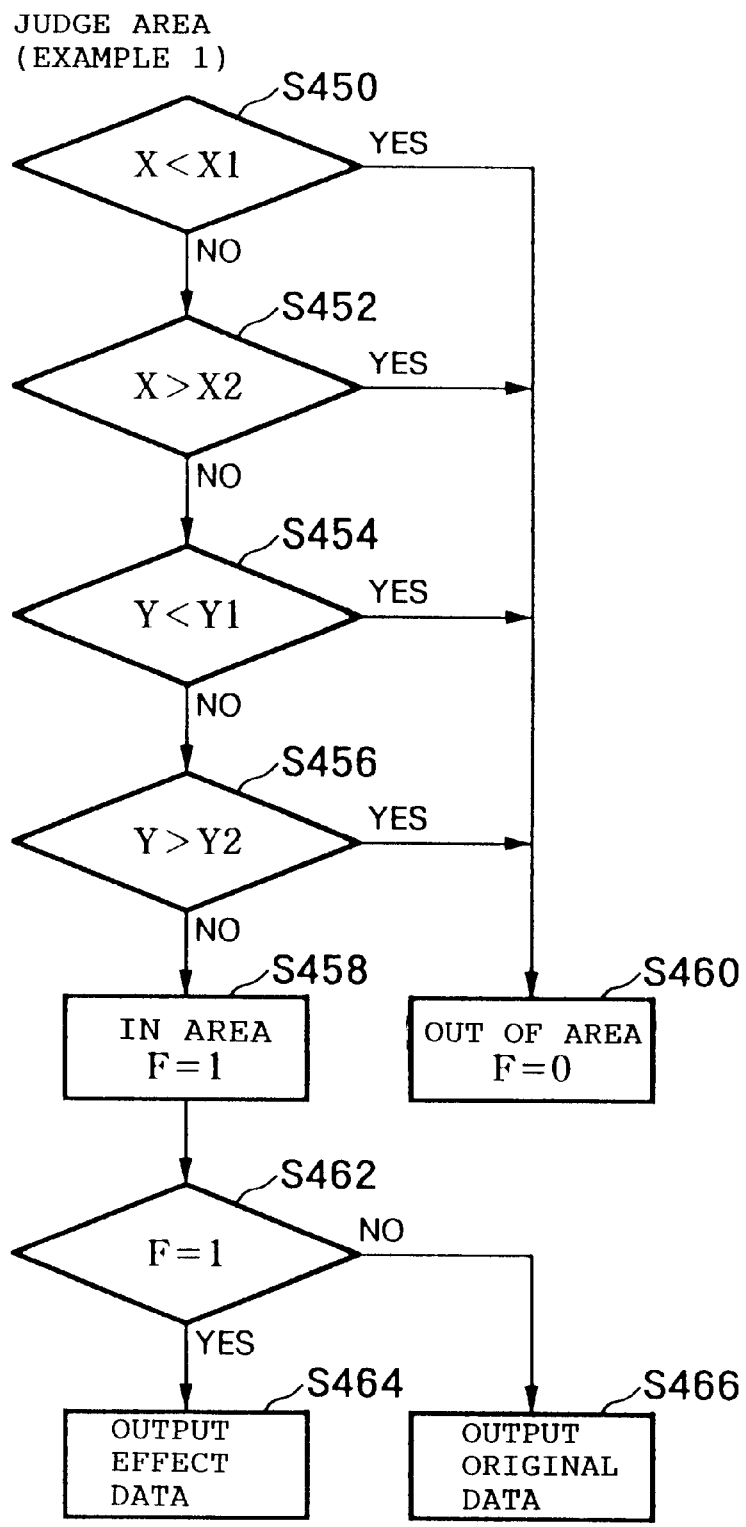
FIG. 71 is a flow chart of a processing for judgement of whether or not an area is within the effect area at S432 and S442 of programs 1 and 2 (FIG. 70) when setting a rectangular area shown in Example 1 of FIG. 69 and a processing for output of the data in accordance with the judgement result.

Case of Setting Rectangular Effect Area (Example 1) FIG. 71 is a flow chart of the processing for judgement of whether or not a position is within the effect area at S432 and S442 of the programs 1 and 2 (FIG. 70) when setting the rectangular area shown in Example 1 of FIG. 69 and the processing for output of the data in accordance with the result of judgement.

As mentioned above, when the user sets a rectangular effect area by operating the mouse etc. of the input device 70, the personal computer 72 displays the graphic shown in Example 1 of FIG. 69 in the window of the GUI, receives the coordinates (X1, Y1) of the point first clicked by the mouse and the coordinates (X2, Y2) of the point which the user dragged and released the mouse as parameters, and sets them in the processor elements 30 of the DSP 80. Note that, for simplification of explanation, an explanation will be made below by taking as an example a case where X1<X2 and Y1<Y2.

The processor elements 30 of the DSP 80 (parallel processor 6; FIG. 37) assign the numerical value 1 for the variable F. As shown in FIG. 71, at step S450, they proceed to the processing of S460 when the value of the variable X is smaller than the parameter X1, while proceed to the processing of S452 in cases other than this.

At step S452, the processor elements 30 proceed to the processing of S460 when the value of the variable X is larger than the parameter X2, while proceed to the processing of S454 in cases other than this.

At step S454, the processor elements 30 assign the numerical value 0 for the variable F and proceed to the processing of S460 when the value of the variable Y is smaller than the parameter Y1, while proceed to the processing of S456 in cases other than this.

At step S456, the processor elements 30 assign the numerical value 0 for the variable F and proceed to the processing of S460 when the value of the variable Y is larger than the parameter Y2, while proceed to the processing of S458 in cases other than this.

At step S458, the processor elements 30 judge that the pixel data to be processed is within the range of the effect area and assign the numerical value 0 for the variable F.

At step S460, the processor elements 30 judge that the pixel data to be processed is out of the range of the effect area and assign the numerical value 0 for the variable F.

At step S462, the processor elements 30 proceed to the processing of S464, where they output the image data subjected to the effect processing as the result of the processing when the value of the variable F is 1, while proceed to the processing of S466 where they output the image data (original data) not subjected to the effect processing as the result of the processing in cases other than this.

Figure 72:
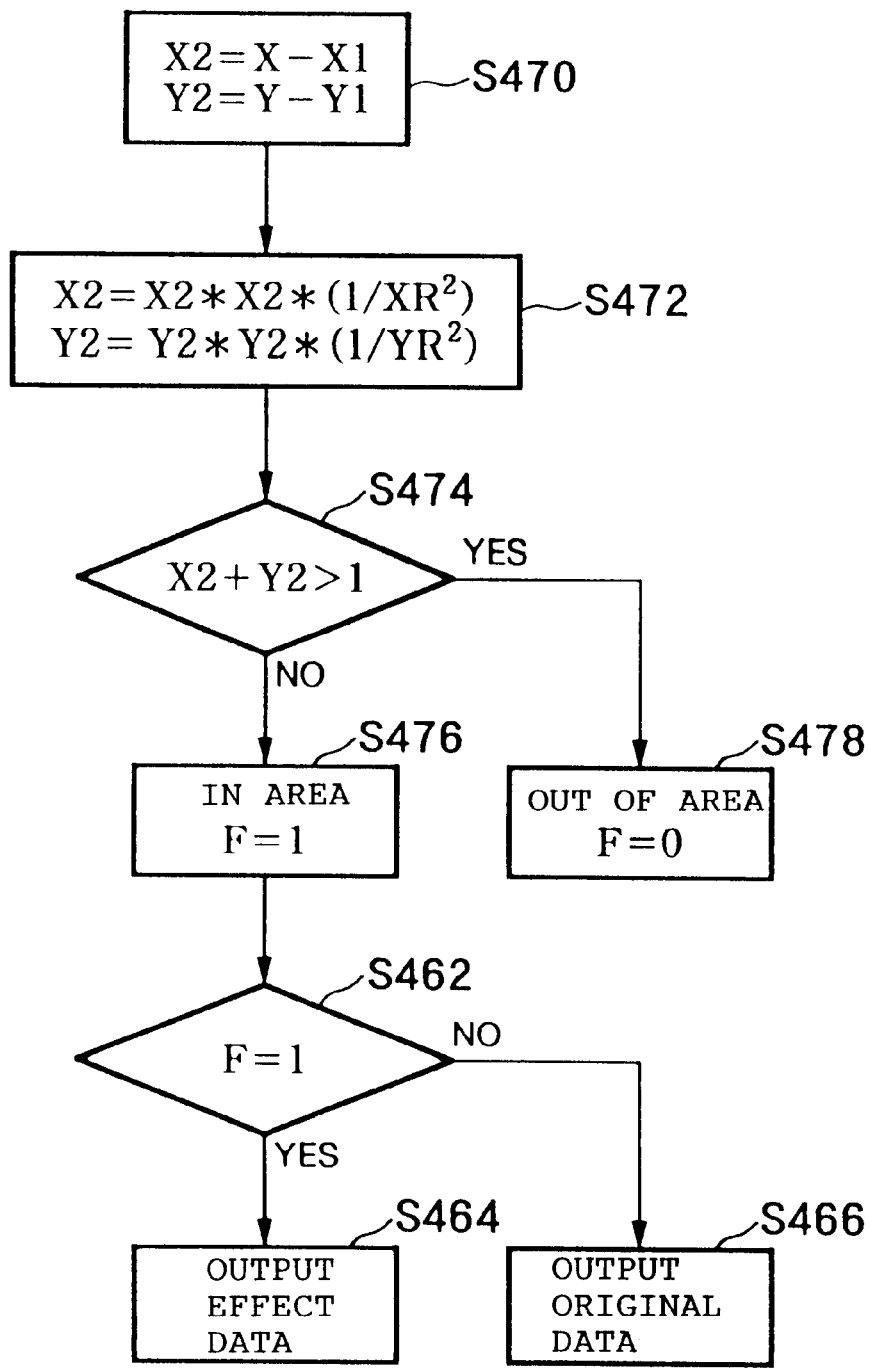
FIG. 72 is a flow chart of a processing for judgement of whether or not an area is within the effect area at S432 and S442 of programs 1 and 2 (FIG. 70) when setting a circular area shown in Example 2 of FIG. 69 and the processing for output of the data in accordance with the judgement result.

Case of Setting Circular Effect Area (Example 2) FIG. 72 is a flow chart of the processing for judgement g of whether or not a position is within the effect area at S432 and S442 of the programs 1 and 2 (FIG. 70) in the case of setting a circular area shown in Example 2 of FIG. 69 and the processing for output of the data in accordance with the result of judgement.

As mentioned above, when the user manipulates the mouse etc. of the input device 70 to set the circular effect area, the personal computer 72 displays the graphic shown in Example 2 of FIG. 69 in the window of the GUI, receives the coordinates (X1, Y1) of the point first clicked by the mouse and numerical values ($1/XR^2$, $1/YR^2$) calculated from the radii XR and YR of the X-axis direction and the Y-axis direction as parameters, and sets the same in the processor elements 30 of the DSP 80.

As shown in FIG. 72, at step S470, the processor elements 30 assign the value obtained by subtracting the variable X1 from the variable X for the variable X2 (X2=X−X1) and assign the value obtained by subtracting the variable Y1 from the variable Y for the variable Y2 (Y2=Y−Y1).

At step S472, the processor elements 30 assign the value obtained by dividing the variable $X2^2$ by the square value of the parameter XR for the variable X2 ($X2=X2^2/XR^2$) and assign the value obtained by dividing the variable $Y2^2$ by the square value of the parameter YR for the variable Y2 ($Y2=Y2^2/YR^2$).

At step S474, the processor elements 30 assign the numerical value 0 for the variable F and proceed to the processing of S478 when the added value of the variables X2 and Y2 is the numerical value 1 or more, while assign the numerical value 1 for the variable F and proceed to the processings of S462 to S466 (FIG. 71) when the added value of the variables X2 and Y2 is less than the numerical value 1.

Note that the programs shown in FIG. 70 to FIG. 72 are common to the effect processing. Accordingly, by adding the programs shown in FIG. 70 to FIG. 72 to the programs of the effect processings, the effect processings can be applied to only the pixel data within the effect area set by the user.

Operation of Image Data Processing Systems 9 to 11 in 14th Embodiment

Below, an explanation will be made of the operation of the image data processing systems 9 to 11 in the 14th embodiment by referring to FIG. 73.

Figure 73:
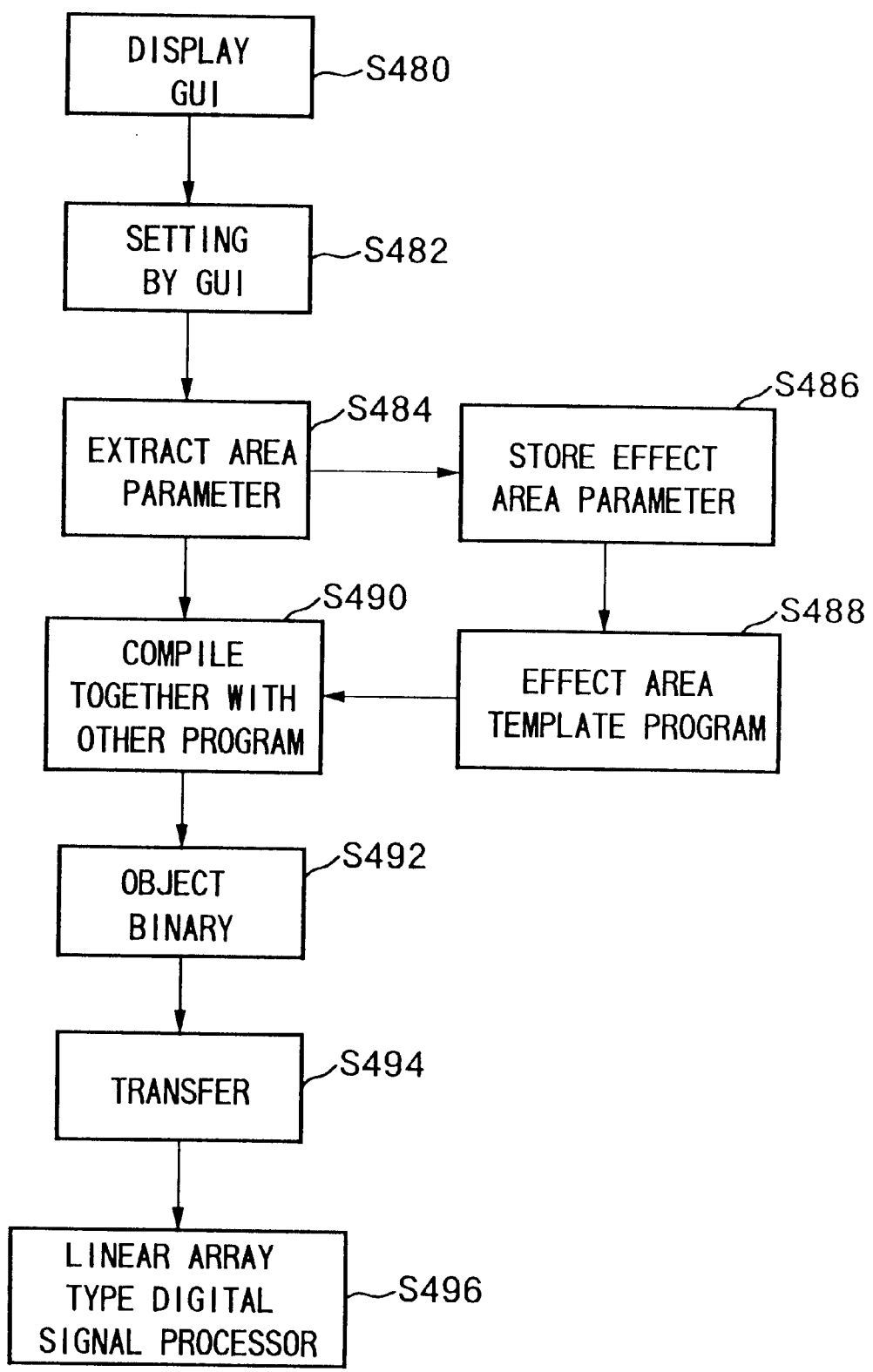
FIG. 73 is a flow chart of the operation of the image data processing system (FIG. 37, FIG. 43, FIG. 64) in the 14th embodiment.

FIG. 73 is a flow chart of the operation of the image data processing systems 9 to 11 (FIG. 37, FIG. 43, FIG. 64) in the 14th embodiment.

As shown in FIG. 73, at step S480, the personal computer 72 displays the GUI image shown in FIG. 69 on the monitor of the personal computer 72.

At step S482, the personal computer 72 changes the shape of the graphic in the window shown in FIG. 69 in accordance with the setting operation of the user and displays the same. When the user terminates the setting and performs a predetermined operation, the personal computer 72 defines the effect area.

At step S484, the personal computer 72 extracts the parameters indicating the effect area in accordance with the setting of the user and sets the same in the processor elements 30 of the DSP 80 (parallel processor 6; FIG. 37).

At step S486, the personal computer 72 stores the parameters indicating the effect area.

At step S488, the personal computer 72 prepares the program for setting the effect area shown in FIG. 70 to FIG. 72 by making the program contain the parameters.

Figure 74:
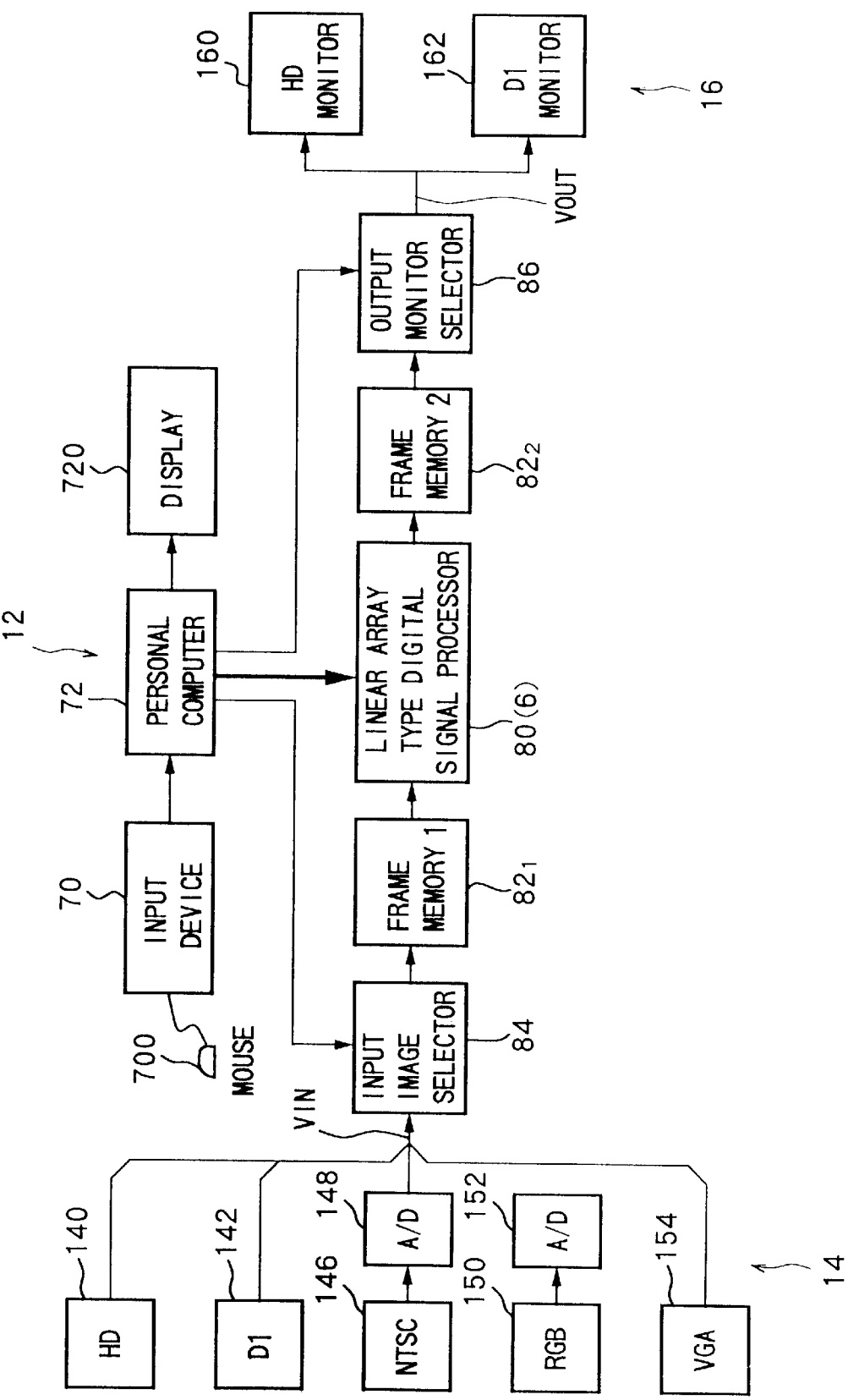
FIG. 74 is a view of the configuration of the image data processing system shown as a 15th embodiment of the present invention.

At step S490, the personal computer 72 compiles the area selection program together with each effect processing program selected as shown in FIG. 74 and at step S492 generates the object program (object binary).

At step S494, the personal computer 72 transfers (downloads) the generated object program to the processor elements 30 of the DSP 80. Note that, it is also possible to prepare the object program as a template, replace only the parameter part in that, generate an object (object binary), and transfer the same.

At step S496, each processor element 30 of the DSP 80 executes the transferred program, performs various effect processings with respect to only the image data within the set up effect area, and outputs the same as the result of the processing.

As explained above, according to the operation of the image data processing systems 9 to 11 shown as the 14th embodiment, it is possible to set up optional effect area and apply various effect processings with respect to only the image data within the set up area.

Further, to apply various effect processings such as color correction by dividing the areas, switching hardware had been necessary in the related art, but according to the operation of the image data processing systems 9 to 11 shown as the 14th embodiment, the effect processing such as color correction can be applied with respect to just the image data of any area just by rewriting the program of the DSP 80 without switching use hardware. 15th Embodiment Below, an explanation will be made of an image data processing system 12 combining various effect processings shown as the ninth to 13th embodiments and the effect area designation shown as the 14th embodiment as a 15th embodiment of the present invention.

Configuration of Image Data Processing System 12

FIG. 74 is a view of the configuration of the image data processing system 12 shown as the 15th embodiment of the present invention. Note that, in FIG. 74, among constituent parts of the image data processing system 12, those the same as the constituent parts of the image data processing systems 9 to 11 shown up to the 14th embodiment are indicated by the same reference numerals.

As shown in FIG. 74, the image data processing system 12 is constituted by the input device 70 having a mouse 700, a personal computer 72 having a display device 720, an input image selector 84, a first frame memory $82_1$, a DSP 80 (for example, a parallel processor 6; FIG. 32), a second frame memory $82_2$, and an output monitor selector 86.

That is, the image data processing system 12 is for example configured by adding the frame memories $82_1$ and $82_2$, input image selector 84, and output monitor selector 86 to the image data processing system 9 (FIG. 37). Further, the mouse 700, as one example of the input means of the input device 70, which had not been clearly indicated up to the 14th embodiment, and the display device 720 of the personal computer 72 are clearly indicated.

An input unit 14 includes an apparatus for outputting the image data of a hard disk drive (HD) 140 in the personal computer as the image data, a VTR apparatus (D1) 142 of the D1 system, an NTSC image signal source (NTSC) 146, an RGB image signal source (RGB) 150, analog/digital (A/D) conversion circuits 148 and 152 for converting analog image signals input from the NTSC image signal source 146 and the RGB image signal source 150 to digital image data, and a plurality of various digital image data sources such as a VGA apparatus 154. These constituent parts supply the image data VIN to the image data processing system 12.

An output unit 16 includes a plurality of various image display devices such as a high resolution (HD monitor) 160 and a monitor (D1 monitor) 162 of the D1 system. These constituent parts display the image data VOUT supplied from the image data processing system 12.

The image data processing system 12 performs the effect processing etc. shown in the ninth to 13th embodiments for every designated effect area with respect to the image data VIN input from any of a plurality of image data sources of the input unit 14, generates the image data OUT, and displays the same on all or any of a plurality of image display devices of the output unit 16.

Constituent Parts of Image Data Processing System 12

Below, an explanation will be made of the constituent parts not included in the image data processing systems 9 to 11 among the constituent parts of the image data processing system 12

Input Image Selector 84

The input image selector 84 selects any of the image data VIN input from a plurality of image data sources (hard disk drive 140 etc.) of the input unit 14 under the control of the personal computer 72 and outputs the same to the frame memory $82_1$. Note that, the input image selector 84 selects a plurality of image data from a plurality of image data sources of the input unit 14 if a plurality of image data are necessary as the input image data VIN and outputs the same to the frame memory $82_1$.

Frame Memory $82_1$

The frame memory $82_1$ is used for interlace/noninterlace conversion, conversion of the number of pixels in the vertical direction, establishment of frame synchronization, or other purposes, gives a time delay according to the object to the image data input from the input image selector 84, and outputs the same to the DSP 80 (parallel processor 6; FIG. 32).

Frame Memory $82_2$

The frame memory $82_2$ is used for example for interlace/noninterlace conversion or purposes similar to those of the frame memory $82_1$, gives a time delay according to the object with respect to the image data obtained as the result of processing by the DSP 80, and outputs the same to the output monitor selector 86.

Output Monitor Selector 86

The output monitor selector 86 outputs the image data VOUT input from the frame memory $82_2$ to all or part of the plurality of image display devices of the output unit 16 under the control of the personal computer 72.

Software Configuration

Figure 75:
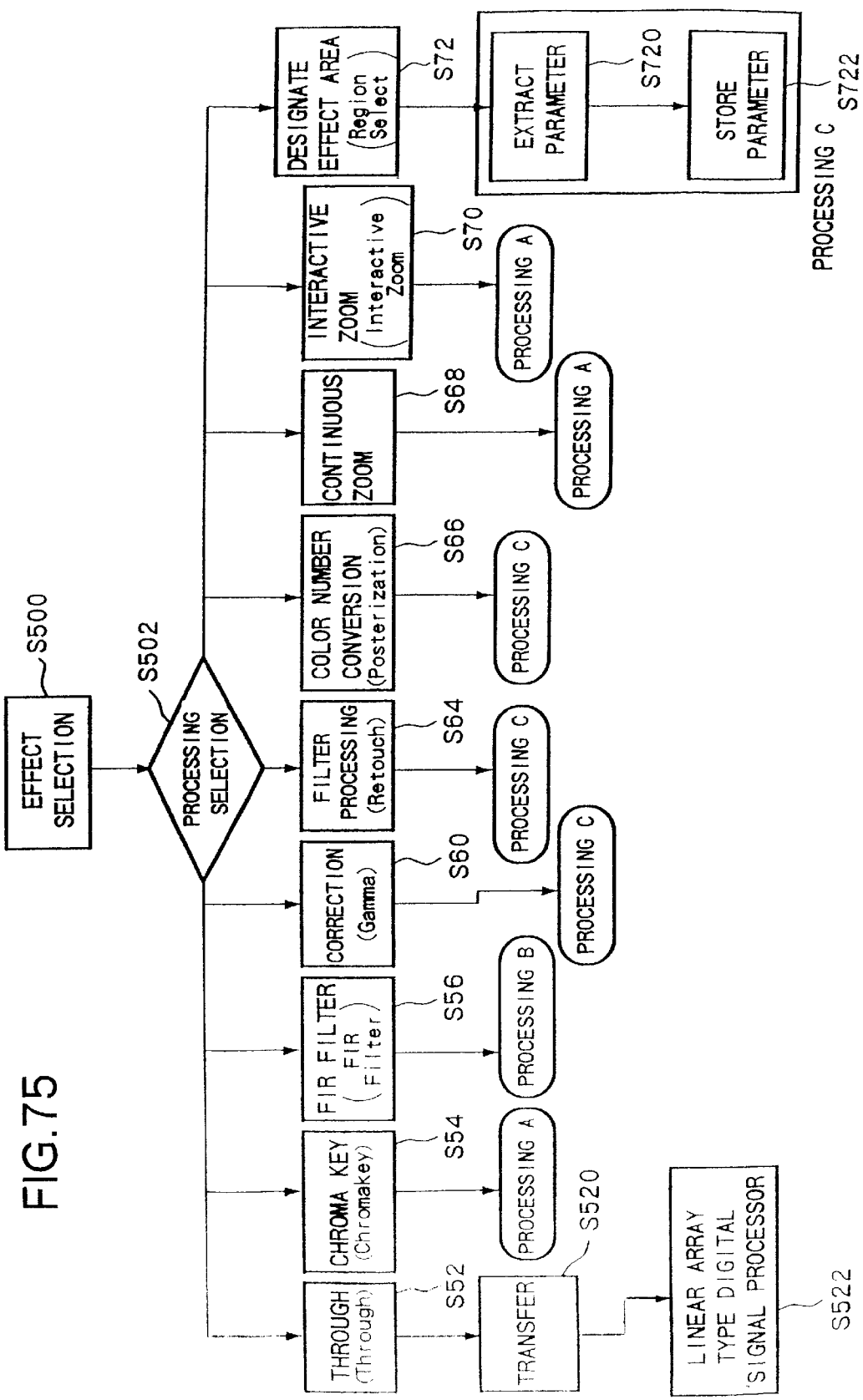
FIG. 75 is a general view of the processing of the image data processing system shown as the 15th embodiment of the present invention.

FIG. 75 is a simple view of the processing of the image data processing system 12 shown as the 15th embodiment of the present invention.

Figure 76:
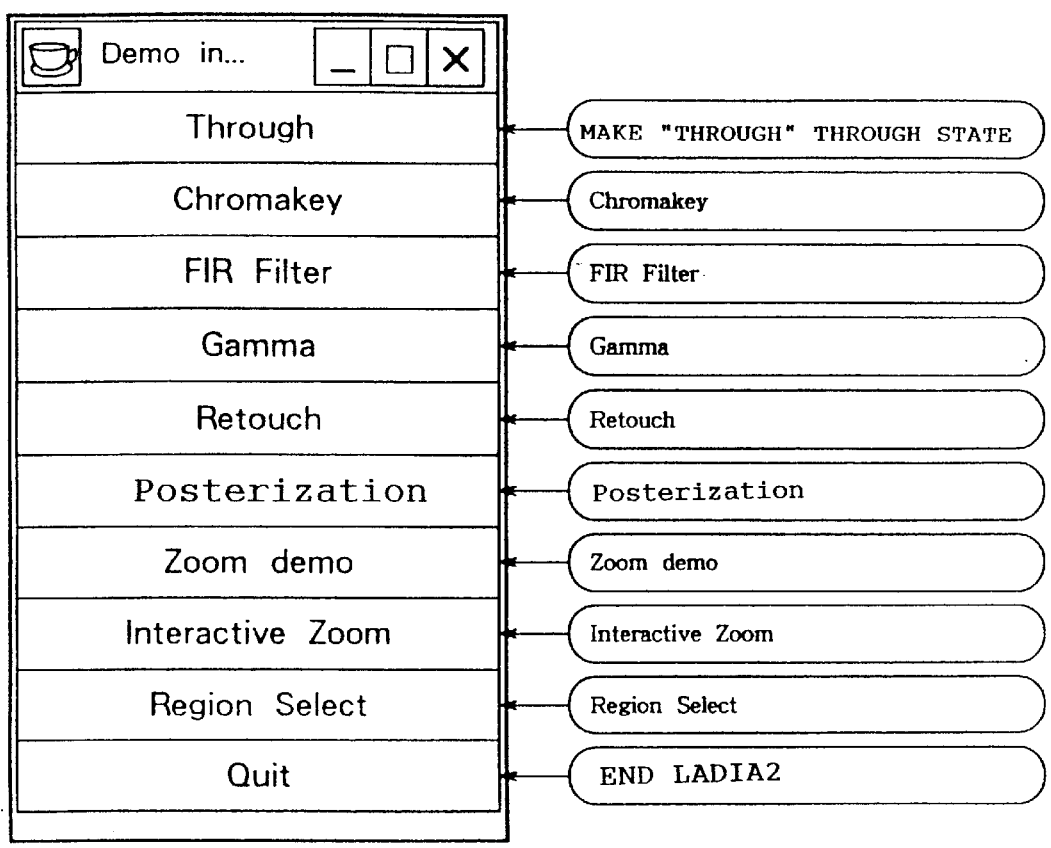
FIG. 76 is a view of a GUI image for an effect processing selection displayed by the personal computer on the display device.

FIG. 76 is a view of the GUI image for the selection of the effect processing displayed on the display device 720 by the personal computer 72.

As shown in FIG. 75, at step S500, the personal computer 72 displays a GUI image for selecting the effect processing shown in FIG. 76 on the monitor and receives the manipulation of the user for selecting the effect processing on the GUI image using the mouse 700 of the input device 70.

At step S502, the personal computer 72 proceeds to the processings of S52, S54, S56, S60, and S64 to S72 in accordance with the received selection manipulation of the user.

At step S52, the personal computer 72 prepares a program of the DSP 80 for passing the image data VIN input from the input unit 14 therethrough and outputting the same as the image data VOUT (Through).

At step S520, the personal computer 72 transfers (downloads) the through use program prepared in advance to the DSP 80.

At step S522, the DSP 80 executes the program downloaded from the personal computer 72, allows the image data VIN to pass therethrough, and outputs the same.

At step S72, the personal computer 72 performs the effect area selection processing shown as the 14th embodiment.

At step S720, the personal computer 72 selects the effect area in accordance with the manipulation of the user for designating the effect area on the GUI image using the mouse 700 of the input device 70 for designating the effect area (FIG. 69) displayed on the display device 720.

At step S722, the personal computer 72 extracts and stores the parameters of the effect area selected by the effect area designation operation and proceeds to the area selection processing.

At step S54, the personal computer 72 proceeds to the processing A (mentioned later by referring to FIG. 77) and performs the chroma key processing shown as the 10th embodiment.

At step S56, the personal computer 72 proceeds to the processing B (mentioned later by referring to FIG. 80) and performs the filtering by the FIR filter shown as the 13th embodiment.

At step S60, the personal computer 72 proceeds to the processing C (mentioned later by referring to FIG. 82) and performs the color correction (γ correction) shown as the ninth embodiment.

At step S64, the personal computer 72 proceeds to the processing C and performs the filtering in accordance with the setting by the user on the GUI image (retouch).

At step S66, the personal computer 72 proceeds to the processing C and performs the color number conversion (posterization).

At step S68, the personal computer 72 proceeds to the processing A and performs the continuous zoom for enlarging and/or reducing the image data VIN as indicated in the first to sixth embodiments.

At step S70, the personal computer 72 proceeds to the processing A and performs the interactive zoom for enlarging and/or reducing the image data VIN in accordance with the manipulation.

Processing A

Below, an explanation will be made of the processing A shown in FIG. 76 by referring to FIG. 77 to FIG. 79.

Figure 77:
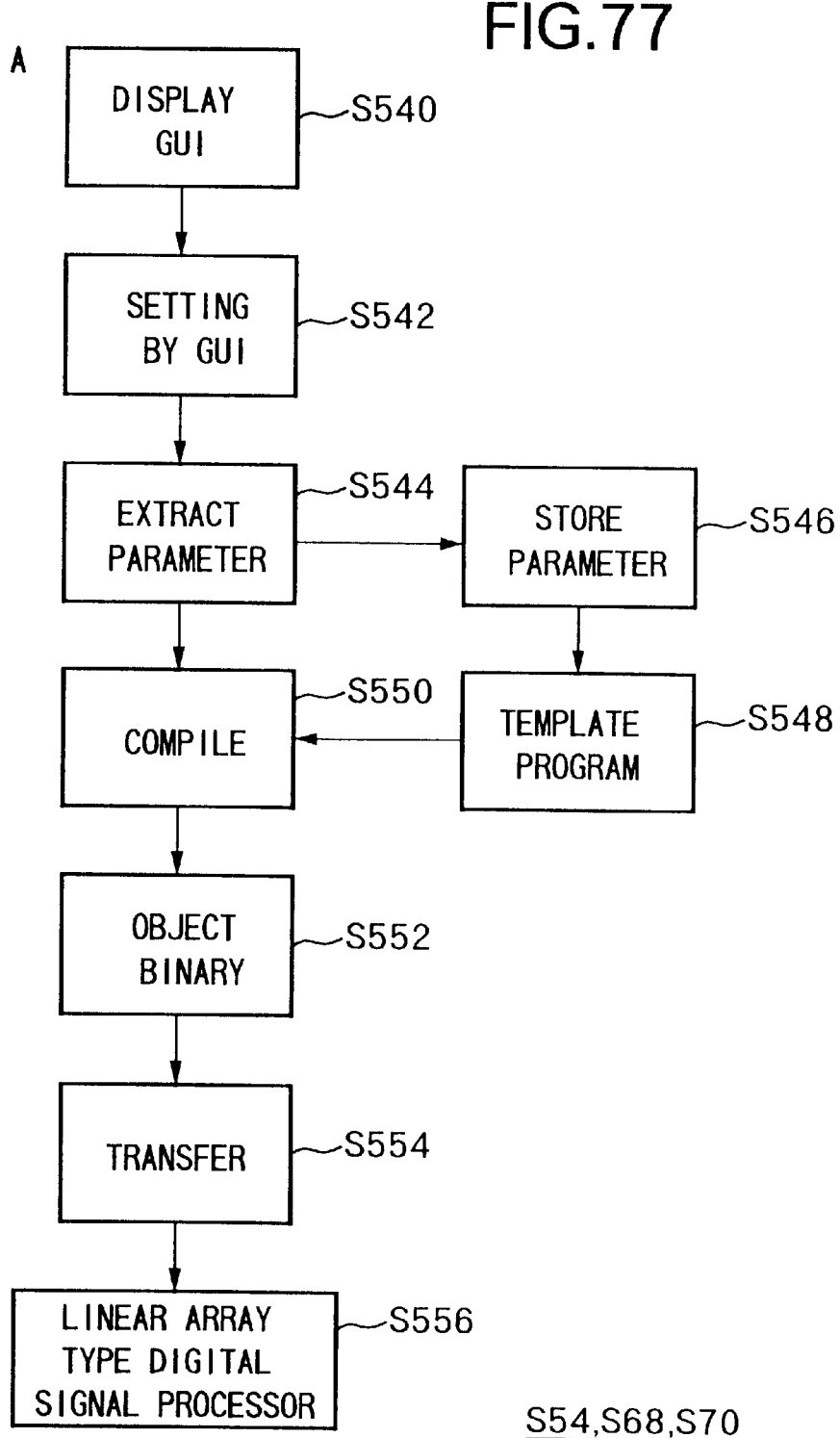
FIG. 77 is a flow chart of a processing A activated in the processing of S54, S68, and S70 shown in FIG. 76.

FIG. 77 is a flow chart of the processing A activated in the processings of S54, S68, and S70 shown in FIG. 76.

Figure 78:
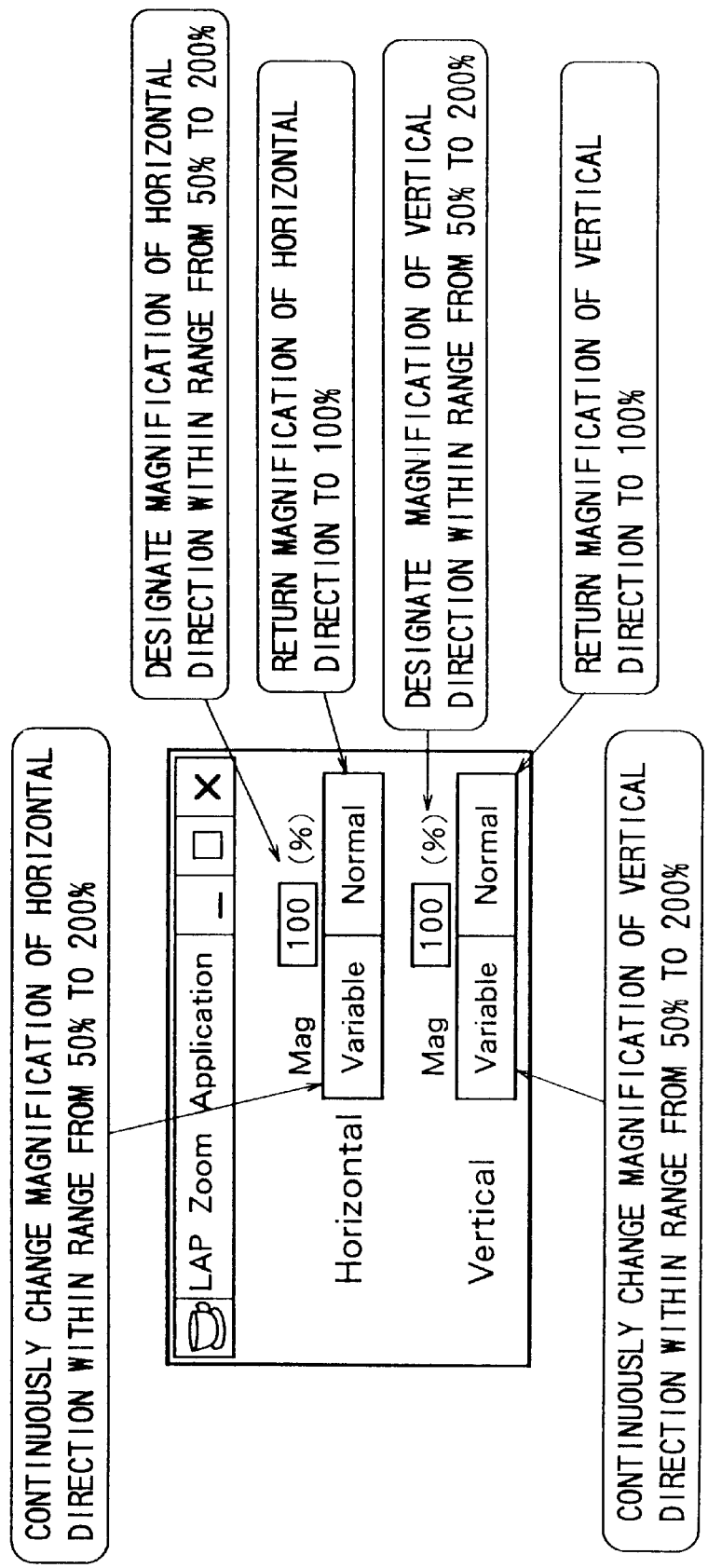
FIG. 78 is a view of an example of a GUI image for a continuous zoom displayed on the display device (FIG. 74) in the processing of S540 shown in FIG. 77.

FIG. 78 is a view of an example of the GUI image for the continuous zoom displayed on the display device 720 (FIG. 74) in the processing of S540 shown in FIG. 77.

Figure 79:
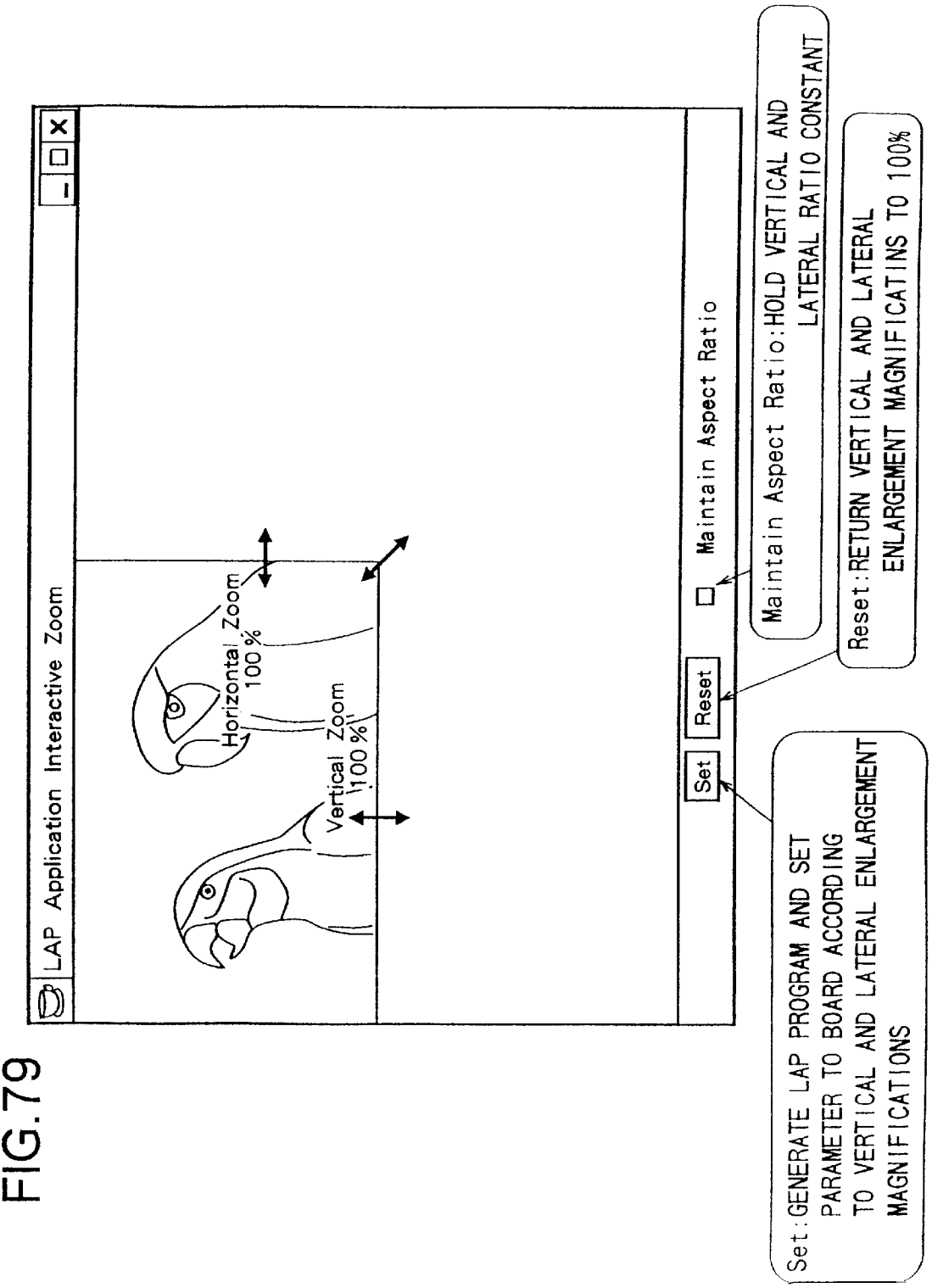
FIG. 79 is a view of an example of a GUI image for interactive processing displayed on the display device (FIG. 74) in the processing of S540 shown in FIG. 77.

FIG. 79 is a view of an example of the GUI image of the interactive processing displayed on the display device 720 (FIG. 74) in the processing of S540 shown in FIG. 77.

When the processing A is activated in the processings of S54, S68, and S70 shown in FIG. 75, as shown in FIG. 77, at step S540, the personal computer 72 displays a GUI image for selecting the background color of the chroma key processing shown in FIG. 45, a GUI image for continuous zoom shown in FIG. 78, or a GUI image for interactive zoom shown in FIG. 79 on the display device 720 in accordance with the selected effect processing.

At step S542, the personal computer 72 receives the setting operation of the user.

For example, when performing continuous zoom, the user performs an operation for setting the magnification in the horizontal direction and magnification in vertical direction with respect to the GUI image for the continuous zoom shown in FIG. 78, and the personal computer 72 receives the set magnification.

Further, for example, when performing interactive zoom, the user sets the magnification in the horizontal direction and the magnification in the vertical direction by a drag or other operation using the mouse 700 to a to c directions with respect to the window in the GUI by the depression of the buttons (set, reset, maintain aspect ratio) in the GUI for interactive zoom shown in FIG. 79, and the personal computer 72 receives the set magnification.

At step S544, the personal computer 72 extracts the parameters necessary for the realization of various types of effect processings in accordance with the setting by the user.

At step S546, the personal computer 72 stores parameters for various effect processings extracted from the processing of S544.

At step S548, the personal computer 72 prepares the program for the DSP 80 for realizing various processings from the template program and parameters for various processings.

At step S550, the personal computer 72 compiles effect processing programs prepared in the processing of S548 and generates the object program (object binary) at step S552.

At step S554, the personal computer 72 transfers (downloads) the generated object program to the processor elements 30 of the DSP 80.

At step S556, the processor elements 30 of the DSP 80 execute the transferred program, perform various effect processings, and output the result of the processing.

Processing B

Below, an explanation will be made of the processing B shown in FIG. 76 by referring to FIG. 80 and FIGS. 81A and 81B.

Figure 80:
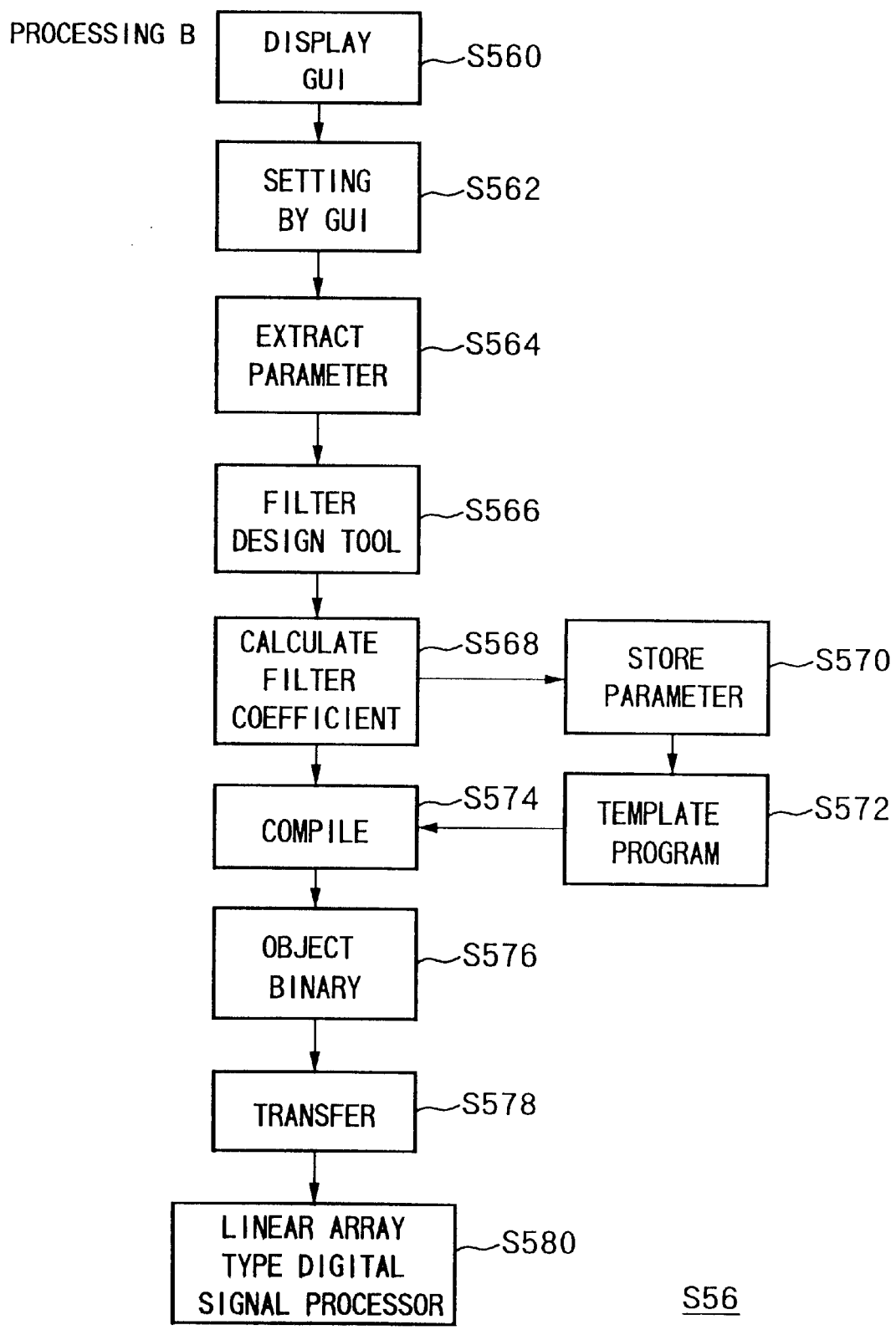
FIG. 80 is a flow chart of a processing B activated in the processing of S56 (FIR filter) shown in FIG. 76.

FIG. 80 is a flow chart of the processing B activated in the processing (FIR filter) of S56 shown in FIG. 76.

Figure 81A:
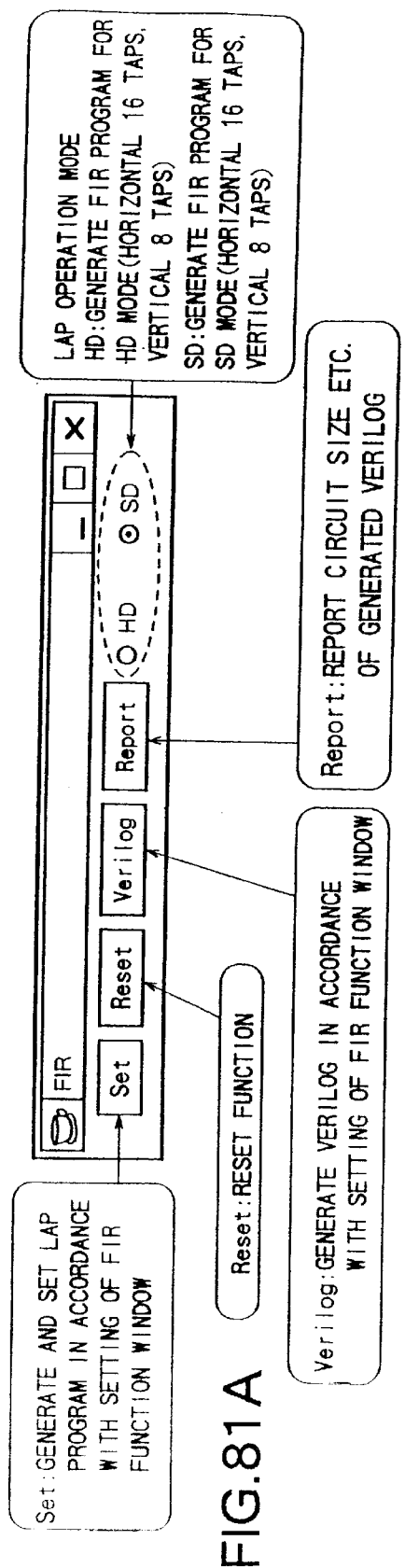
FIGS. 81A and 81B are views exemplifying a GUI image displayed on the display device (FIG. 74) in the processing of S560 shown in FIG. 80.
Figure 81B:
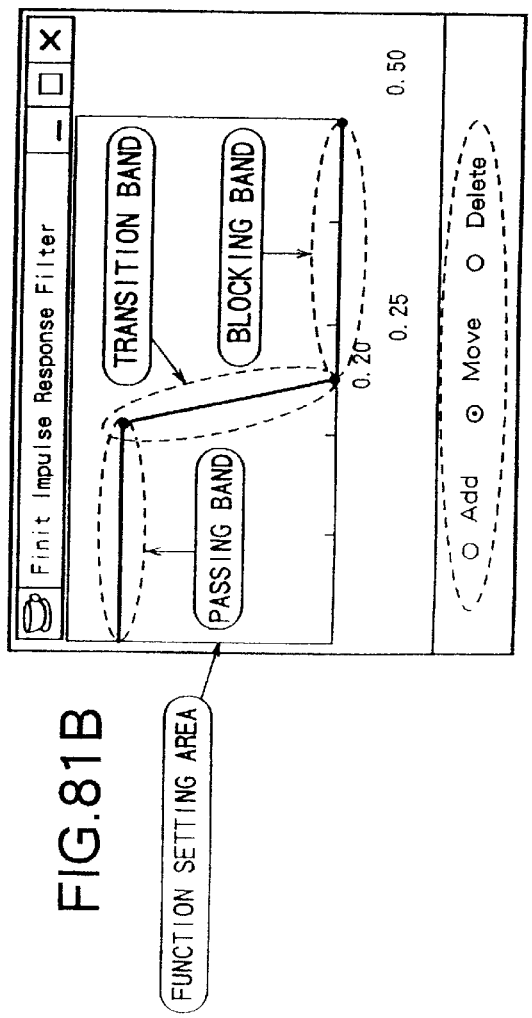

FIGS. 81A and 81B are views of examples of the GUI image displayed on the display device 720 in the processing of S560 shown in FIG. 80.

When the processing B is activated in the processing of S56 shown in FIG. 76, as shown in FIG. 80, at step S560, the personal computer 72 displays a GUI image for filtering by the FIR filter shown in FIGS. 81A and 81B on the display device 720 in accordance with the selected effect processing.

At step S562, the personal computer 72 receives the setting operation of the user as indicated in the 13th embodiment.

At step S564, the personal computer 72 extracts the parameters necessary for the realization of the filtering in accordance with the setting of the user.

At step S566, the personal computer 72 activates the filter design tool for calculating the filter coefficient from the designated passing area and element area and obtains the filter coefficient of the FIR filter having the characteristic suited to the parameters extracted in the processing of S564.

At step S568, the personal computer 72 quantizes the filter coefficient of the FIR filter designed in the processing of S566 based on the parameters extracted in the processing of S564.

At step S570, the personal computer 72 stores the parameters calculated in the processing of S568.

At step S572, the personal computer 72 makes the template program contain the parameters, thereby prepares the program for the DSP 80 for realizing the filtering by the FIR filter.

At step S574, the personal computer 72 compiles the program prepared in the processing of S572 and generates the object program (object binary) at step S576.

At step S580, the personal computer 72 transfers (downloads) the generated object program to the processor elements 30 of the DSP 80.

At step S582, the processor elements 30 of the DSP 80 execute the transferred program, perform the filtering by the FIR filter, and output the result of the processing.

Processing C

Below, an explanation will be made of the processing C shown in FIG. 76 by referring to FIG. 82 to FIG. 85.

Figure 82:
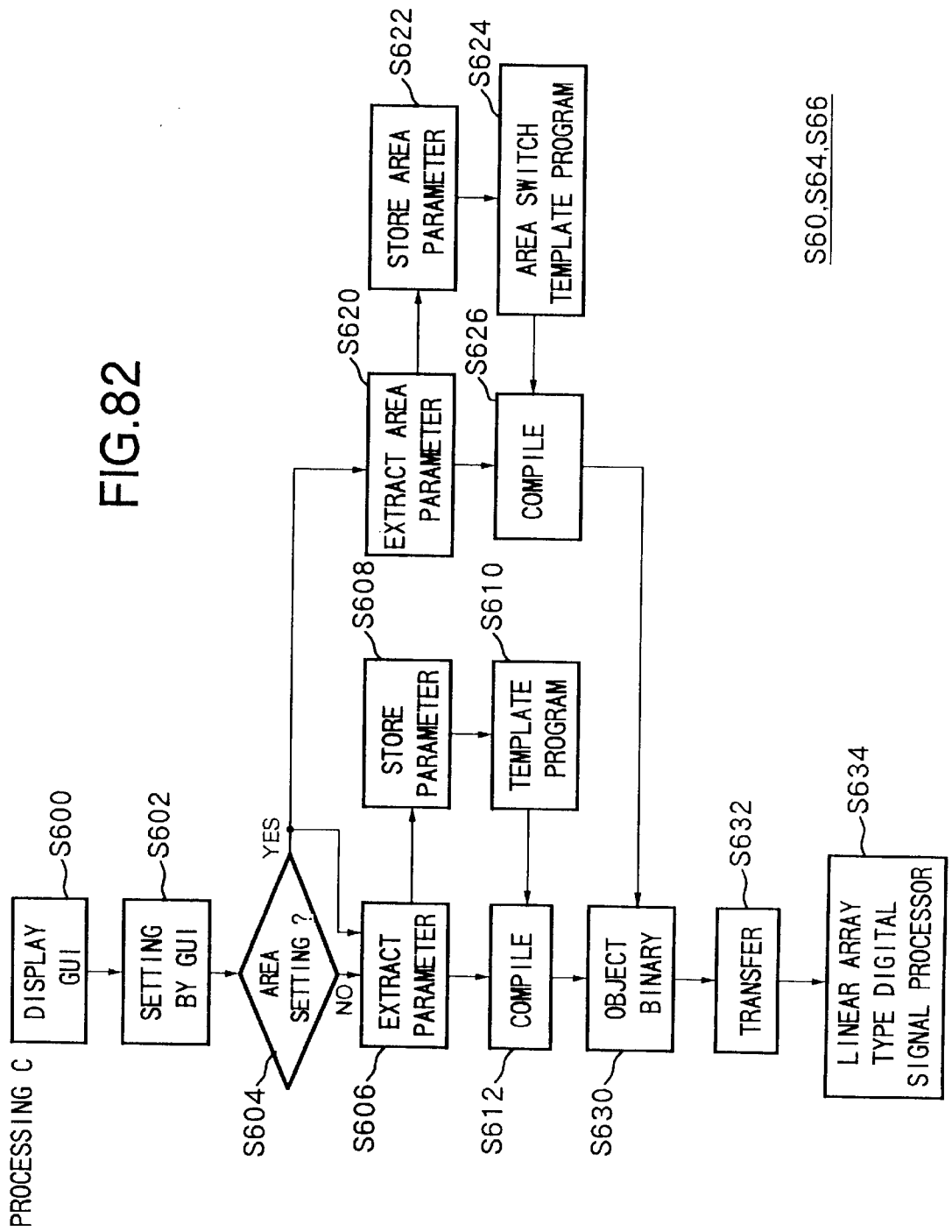
FIG. 82 is a flow chart of a processing C activated in the processing of S60, S64, and S66 shown in FIG. 76.

FIG. 82 is a flow chart of the processing C activated in the processings of S60, S64, and S66 shown in FIG. 76.

Figure 83A:
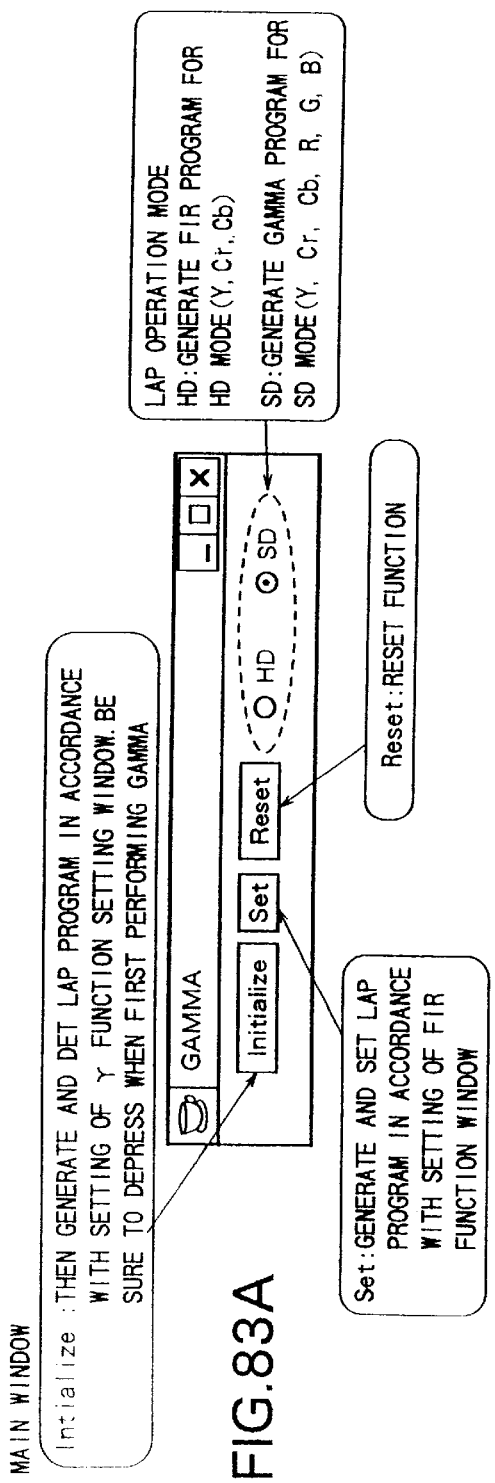
FIGS. 83A and 83B are views exemplifying a GUI image for color correction (γ correction) displayed on the display device (FIG. 74) in the processing of S600 shown in FIG. 82.
Figure 83B:
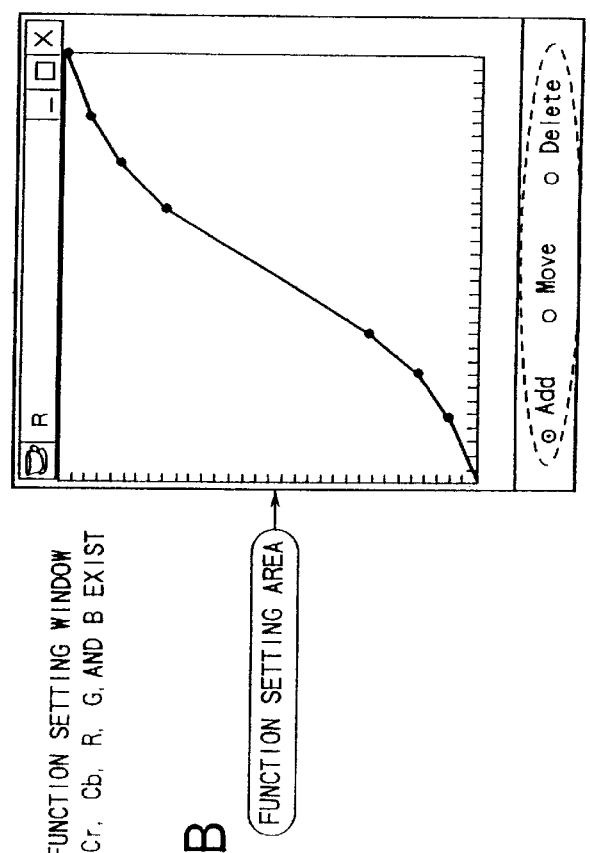

FIGS. 83A and 83B are views of examples of the GUI image for color correction (γ correction) displayed on the display device 720 in the processing of S600 shown in FIG. 82.

FIGS. 84 A to 84C are views of examples of the GUI image for filtering (retouch) displayed on the display device 720 in the processing of S600 shown in FIG. 82.

FIG. 85 is a view of an example of the GUI image for color number conversion (posterization) displayed on the display device 720 in the processing of S600 shown in FIG. 82.

When the processing C is activated in processings of S60, S64 and S66 shown in FIG. 75, as shown in FIG. 78, at step S600, the personal computer 72 displays the GUI image for various effect processings shown in FIGS. 83A and 83B and FIGS. 84A to 84C on the display device 720 in accordance with the selected effect processing.

At step S602, the personal computer 72 receives the setting operation of the user with respect to the GUI image shown in FIGS. 83A and 83B to FIG. 85.

At step S604, the personal computer 72 decides whether or not there was a setting of an effect area shown as the 14th embodiment. The personal computer 72 proceeds to the processing of S606 where there is no setting, while proceeds to the processings of S606 and S620 where there is a setting.

At step S620 to step S626, the personal computer 72 performs processing corresponding to the processing of S484 to S490 (FIG. 74) shown as the 14th embodiment, prepares the program of the DSP 80 for setting the effect area, and compiles the same.

At step S606, the parameters necessary for realizing various effects are extracted in accordance with the setting of the user.

At step S610, the personal computer 72 incorporates into the template program the parameters extracted in the processing of S606 to prepare the program of effect processing.

At step S612, the personal computer 72 compiles the program prepared in the processing of S610.

At step S630, the personal computer 72 links programs compiled in the processing of S626 and S612 in accordance with need to prepare the object program combining them.

At step S632, the personal computer 72 transfers (downloads) the object program prepared in the processing of S630 to the processor elements 30 of the DSP 80.

At step S634, the processor elements 30 of the DSP 80 execute the transferred program, perform various effect processings, and output the result of the processing.

Effect Processing

Below, an explanation will be made of the effect processing not explained up to the 14th embodiment.

Filter Processing (Retouch)

In the filter processing, the personal computer 72 displays a GUI image (FIGS. 84A to 84C) window showing a menu of various filter processings on the display device 720, generates various filter processing programs for the DSP 80 (linear array type digital signal processor) in accordance with a click by the user of a button in the GUI image using the mouse 700, and makes this execute the programs.

The personal computer 72 displays the GUI image shown in FIG. 84A. The user depresses a button in the GUI image by the mouse 700 to select the type of the filtering.

For example, when the user selects "3×3 Custom" and "5×5 Custom" among the buttons of FIG. 84A, the personal computer 72 further displays the GUI image shown in FIGS. 84B and 84C on the display device 720, and the user inputs the filter coefficient by using the keyboard etc. of the input device 70.

Note that, the division number is set in the window "Divide" in the GUI image of FIG. 84B (corresponding to the processing of S704 of FIG. 86). When checking the "Offset" window, a numerical value 128 is added to the output data so as to make the offset value 128.

Flow of filter processing

Refer to FIG. 82 again.

The personal computer 72 displays the GUI image shown in FIG. 84A on the display device 720 (S600).

As the filtering method, when a method other than "3×3 Custom" and "5×5 Custom" is selected, the personal computer 72 sets the filter coefficient prepared in advance as the parameter (S606 and S608 of FIG. 82), generates the program for the DSP 80 (S612 of FIG. 82), and downloads the same (S632 of FIG. 82).

Where "3×3 Custom" is selected as the filtering method, the personal computer 72 displays the GUI image shown in FIGS. 84B and 84C on the display device 720. Further, where "3×3 Custom" is selected, the personal computer 72 displays the GUI image shown in FIGS. 84C on the display device 720.

When the user clicks the "Set" button of the GUI image (FIGS. 84B, 84C) of the display device 720, the personal computer 72 executes the following operations.

The personal computer 72 stores the filter coefficient set on the display in the parameter file (S602 and S608 of FIG. 82), generates the program of the DSP 80 (S610 of FIG. 82), and transfers the same to the SIMD-controlled linear array type multiple parallel processor (S632 of FIG. 82).

Content of Program for DSP 80

Below, an explanation will be made of the content of the program for-the DSP 80 for performing the filter processing by referring to FIG. 86.

FIG. 86 is a flow chart of the filter processing executed by the DSP 80 of the image data processing system 12.

At step S700, the processor elements 30 of the DSP 80 (parallel processor 6) store 3 lines' worth of the pixel data in the data memory unit 23. In this case, as shown in following table 13, the processor elements 30 use addresses for storing the pixel data on the data memory unit 23 by rotation and write the data of the newest line at the next address of the pixel data of the oldest line in actuality, but from the perspective of the program, the data are stored as if the data were sequentially stored from the newest pixel data while always setting the same address at the start. By using addresses by rotation in this way, the pixel data of addresses 0 to 15 of the data memory unit 23 are always input to the first tap among the 3 taps, and the pixel data of addresses 16 to 32 are input to the next tap. Accordingly, the processor elements 30 sequentially multiply the filter coefficient from the pixel data of the addresses 0 to 15 and sequentially add the result of multiplication, whereby the filtering can be carried out.

TABLE 13

| Memory address | Actually written data | Data seen from program side after n cycles | | | (13) |
|---|---|---|---|---|---|
| | | n = 3 | n = 4 | n = 5 | |
| 0–15 | Line 1, Line 4 | Line 1 | Line 2 | Line 3 | |
| 16–31 | Line 2, Line 5 | Line 2 | Line 3 | Line 4 | |
| 32–47 | Line 3, : | Line 3 | Line 4 | Line 5 | |
| | | ↑ | ↑ | ↑ | |
| Address rotation | | 0 | −16 | −32 | |

At step S702, the ALU array units 24 of the processor elements 30 multiply the coefficient A with the pixel data of the addresses 0 to 15 of the data memory units 23 of the processor elements 30 one before (left adjoining) the processor elements 30 by using the filter coefficient (Table 14; coefficients A to I) of each of the 3×3 taps and assigns the same for the variable X.

TABLE 14

| A | B | C | (14) |
|---|---|---|---|
| D | E | F | |
| G | H | I | |

The ALU array units 24 multiply the coefficient B with the data of pixels of addresses 0 to 15 of the data memory unit 23 of the processor elements 30 and add the same to the variable X.

The ALU array units 24 multiply the coefficient C with the data of pixels of addresses 0 to 15 of the data memory units 23 of the one later (right adjoining) related processor elements 30 and add the same to the variable X.

The ALU array units 24 multiply the coefficient D with the pixel data of addresses 16 to 31 of the data memory units 23 one before (left adjoining) the related processor elements 30 and add the same to the variable X.

The ALU array units 24 multiply the coefficient E with the pixel data of addresses 16 to 31 of the data memory units 23 of the related processor elements 30 and add the same to the variable X.

The ALU array units 24 multiply the coefficient F with the pixel data of addresses 16 to 31 of the data memory units 23 behind (right adjoining) the related processor elements 30 and add the same to the variable X.

The ALU array units 24 multiply the coefficient G with the pixel data of addresses 32 to 47 of the data memory units 23 in front (left adjoining) of the related processor elements 30 and adds the same to the variable X.

The ALU array units 24 multiply the coefficient H with the pixel data of addresses 32 to 47 of the related processor elements 30 and add the same to the variable X.

The ALU array units 24 multiply the coefficient I with the pixel data of addresses 32 to 47 of the data memory units 23 behind (right adjoining) the related processor elements 30 and add the same to the variable X.

At step S704, the ALU array units 24 of the processor elements 30 divide the variable X by the division number set in the "Divide window" shown in FIG. 84B and assign the division result for the variable X.

At step S706, the processor elements 30 decide whether or not the "Offset window" shown in FIG. 84B has been checked, proceed to the processing of S708 where it has been checked, and proceed to the processing of S710 where it has not been checked.

At step S708, the processor elements 30 add the numerical value 128 to the variable X.

At step S710, the processor elements 30 output the value of the variable X as the result of filtering.

At step S712, the processor element 30 rotate addresses of the data memory unit 23 as mentioned above.

Color Number Conversion (Posterization)

Below, the color number conversion will be explained.

In the color number conversion, the personal computer 72 displays the GUI image for color number conversion shown in FIG. 85 on the display device 720, prepares a program for the DSP 80 for performing the color number conversion in accordance with manipulation of the user with respect to the displayed GUI image and makes the DSP 80 execute this.

Note that, in the GUI image for the color number conversion shown in FIG. 85, when the user clicks the "(<<) button" by the mouse 700, he sets the system to increase the degree of reduction of the color number, while when the user clicks the "(>>) button", he sets the system to reduce the degree of reduction of the color number.

Flow of Color Number Conversion

Refer to FIG. 82 again.

The personal computer 72 displays the GUI image for the color number conversion shown in FIG. 85 on the display device 720 (S600).

The user sets the color number with respect to the GUI image displayed on the display device 720. The personal computer 72 receives the set color number (S602).

Further, when the user clicks the "Set" button in the GUI screen by the mouse 700, the following processing is executed.

Figure 87:
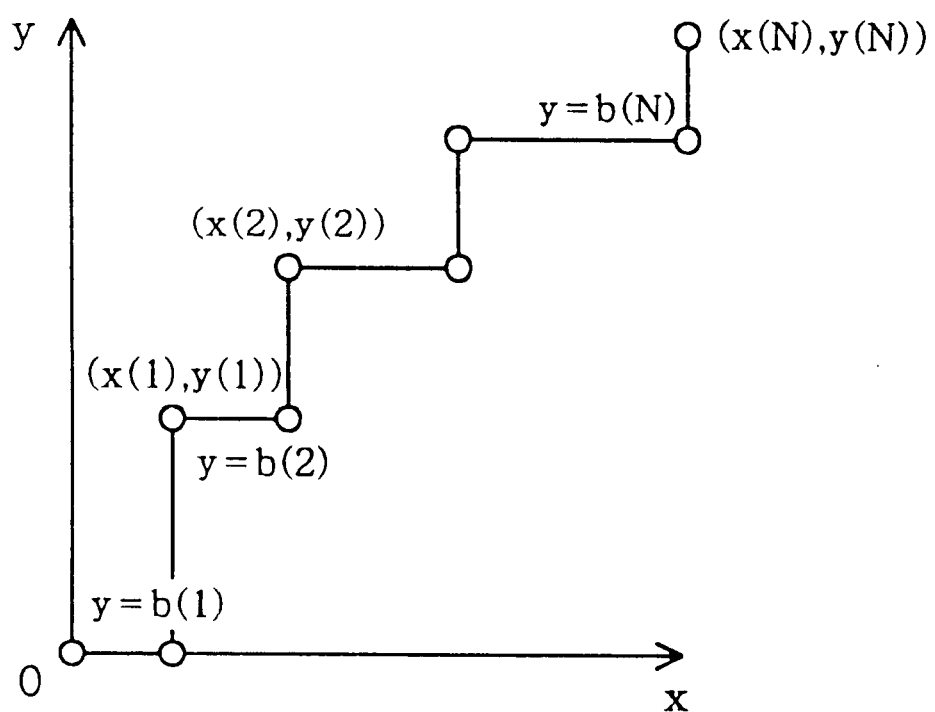
FIG. 87 is a view of an example of a step function used for the color number conversion.

FIG. 87 is a view of an example of the step function used in the color number conversion.

The personal computer 72 stores the parameters of the step function shown in FIG. 87 in the parameter file based on the color number set in accordance with the GUI image, prepares a program for the DSP 80 by using the stored parameter, and transfers this to the DSP 80 (S606 to S632).

Note that, the conversion of the color number is realized by performing the conversion using the step function shown in FIG. 87 with respect to the color data of each pixel. The increase or decrease of the color numbers is carried out by changing the step number of the step function shown in FIG. 87. Further, for example, the step function is set as shown in the following Table 15.

TABLE 15

$$y = b(1) \ 0(\text{smallest value}) < x \leq 30 \quad (x(1) = 30)$$
$$y = b(2) \ 30 < x \leq 80 \ (x(2) = 80)$$
$$y = b(3) \ 80 < x \leq 120 \ (x(3) = 120)$$
$$\ldots$$
$$y = b(N) \ 200 < x \leq 255 \ (\text{largest value}) \ (x(N) = 255)$$

(14)

Content of Program for DSP 80

Below, an explanation will be made of the content of the program for the DSP 80 performing the color conversion referring to FIG. 88.

Figure 88:
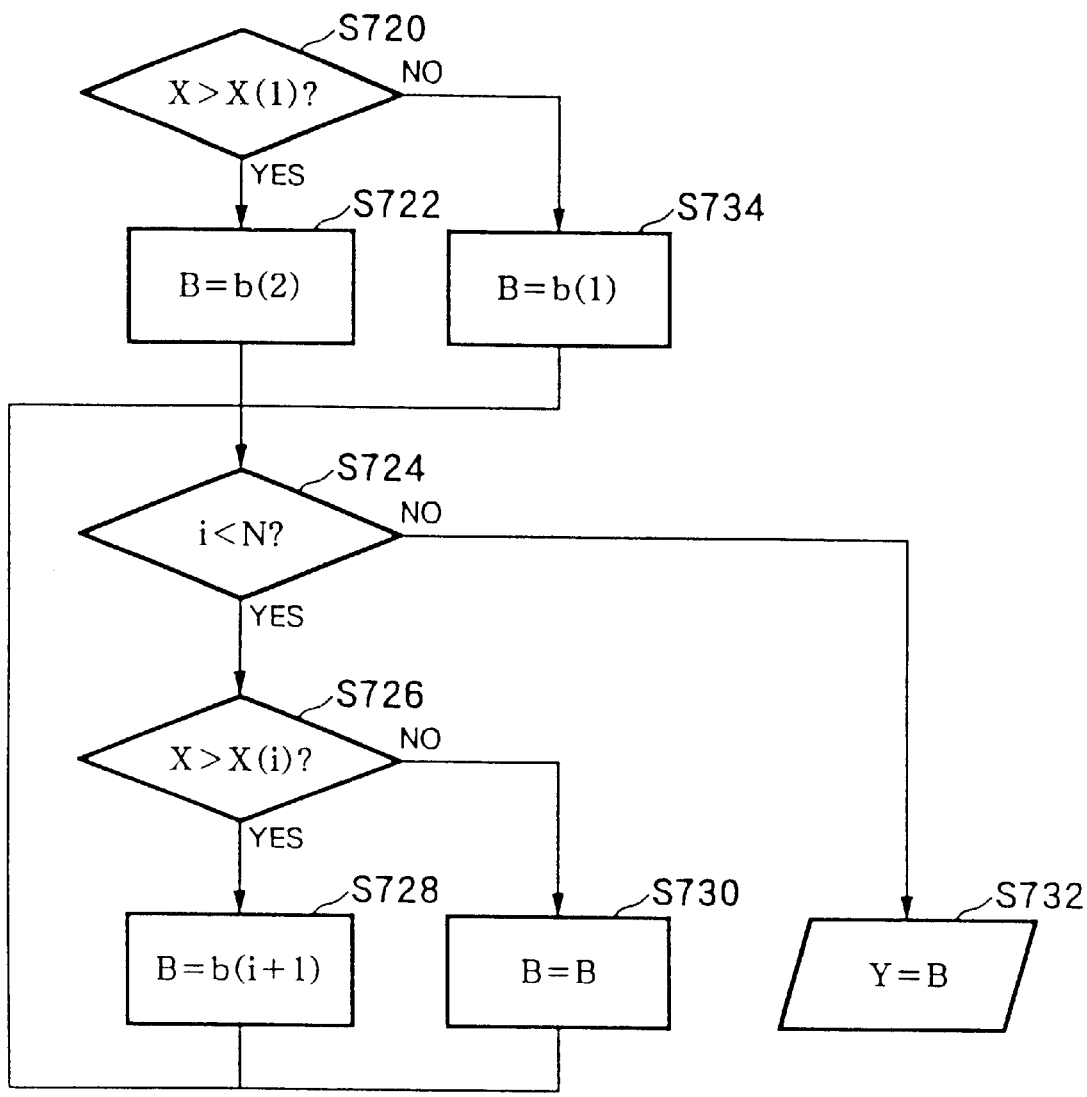
FIG. 88 is a flow chart of the color conversion executed by a DSP of the image data processing system (FIG. 74) in the 15th embodiment.

FIG. 88 is a flow chart of the color conversion executed by the DSP 80 of the image data processing system 12 in the 15th embodiment.

The processor elements 30 of the DSP 80 (parallel processor 6) secure the memory area B for storing the coefficient and work area in the data memory unit 23 and assign the numerical value 1 in the variable i.

Next, as shown in FIG. 88, at step S720, for example when the step function is set as shown in Table 15, the processor elements 30 decide whether or not the value x of the color data of each pixel is larger than the numerical value 30 (x(1)), proceed to the processing of S722 and assign the numerical value b(2) for the variable B if it is larger than the latter, and proceed to the processing of S734 and assign the numerical value b(1) for the variable B and terminates the processing if it is not larger than the latter.

At step S724, the processor elements 30 decide whether or not the variable is less than the numerical value N indicating the step number in the step function, proceed to the processing of S726 if the variable i is less than N, and proceed to the processing of S730 if it is not less than N.

At step S726, the processor elements 30 decide whether or not the value x of the color data is larger than 80 (x(2)), proceed to the processing of S728 and assign b(3) for the variable B if the former is larger than the latter, and proceed to the processing of S730 and store the value of the variable B if the former is not larger than the latter.

At step S730, the processor elements 30 output the value of the variable B.

Continuous Zoom

Below, the continuous zoom will be explained.

In the continuous zoom, the personal computer 72 displays the GUI image for continuous zoom shown in FIG. 78 on the display device 720, prepares a program for the DSP 80 for receiving the setting of magnification in accordance with the manipulation of the user and enlarging and/or reducing the image data based on the set magnification, and makes the DSP 80 execute the program.

Note that the user clicks or otherwise manipulates the GUI image for continuous zoom shown in FIG. 78 by the mouse 700 or directly inputs the data from the keyboard to set the magnification. Further, while the magnification includes magnification in the horizontal direction and magnification in the vertical direction, the methods of setting are the same, therefore an explanation will be made by taking as an example a case where the magnification in the horizontal direction is set.

When setting a fixed magnification as the magnification in the horizontal direction, the user directly inputs the magnification to a text field of Mag with respect to the GUI image for continuous zoom in percentage.

Further, when the user clicks the "[Variable]" button, the continuous variable zoom is executed, while when the user clicks the "[Normal]" button, the magnification is returned to 100%.

Flow of Continuous Zoom

Refer to FIG. 82 again.

When the user sets a fixed magnification with respect to the GUI image for continuous zoom, the personal computer 72 stores the set magnification in the parameter file, generates a program for the DSP 80, and transfers the same to the DSP 80 (S600 to S632).

Note that when the user clicks the "[Variable]" button of the GUI image for the continuous zoom, the personal computer 72 prepares and transfers a program for the DSP 80 for performing the continuous variable zoom, while when the user clicks the "[Normal]" button, the personal computer 72 stores 100% in the parameter file, generates a program for the DSP 80, and transfers this. Note that the program of the DSP 80 for performing the continuous zoom is the same as the interpolation filtering where the image data is enlarged and/or reduced with any magnification indicated in the first to sixth embodiments.

Interactive Zoom

Below, an interactive zoom will be explained.

The personal computer 72 displays the GUI image for the interactive zoom for setting the magnification of enlargement and/or reduction in a dialog format (interactively) on the display device 720 as shown in FIG. 79, prepares a program for the DSP 80 for enlarging and/or reducing the image in accordance with the setting operation of the user dragging the mouse 700 in directions indicated by a to c in FIG. 79, and makes the DSP 80 execute the program.

Where the user drags the lower side of the image at the lower side of the image display use window in the GUI image for the interactive zoom in the direction of a by the mouse 700, the personal computer 72 receives the set magnification in the vertical direction and enlarges and/or reduces the display of the window in the vertical direction.

When the user drags the side of the image display use window by the mouse 700 in the direction of b, the personal computer 72 receives the set magnification in the horizontal direction and enlarges and/or reduces the display of the window in the horizontal direction.

When the user drags the corner of the image display use window by the mouse 700 in the direction of c, the personal computer 72 receives the set magnification in the vertical direction and horizontal direction and enlarges and/or reduces the display of the window in the vertical direction and horizontal direction.

When the user checks the "Maintail Aspect Ratio" button, the personal computer 72 enlarges and/or reduces the display of the window while maintaining the ratio of the vertical direction and the horizontal direction.

Flow of Interactive Zoom

Refer to FIG. 82 again.

The personal computer 72 displays the GUI image for the interactive zoom shown in FIG. 79 on the display device 720.

When the user clicks the "[Set]" button, the following processings are executed.

The personal computer 72 extracts the parameters based on the magnification in the vertical direction and horizontal direction set with respect to the GUI image for the interactive zoom and stores the same in the parameter file. Further, the personal computer 72 prepares a program for the DSP 80 for performing the interactive zoom and transfers the same to the DSP 80 (S600 to S632).

Note, when the user clicks the "[Reset]" button of the GUI image for interactive zoom, the personal computer 72 sets the magnification in the vertical direction and the horizontal direction to 100% and generates the parameters. Further, the personal computer 72 prepares a program for the DSP 80 for performing the interactive zoom of making the magnification in the vertical direction and horizontal direction 100% and transfers the same to the DSP 80. Note that the program of the DSP 80 for performing the interactive zoom is the same as the interpolation filtering where the image data is enlarged and/or reduced with any magnification indicated in the first to sixth embodiments.

Although not illustrated in FIG. 76, the image data processing system 12 further has the following function.

Input/Output Image Selection

Figure 89:
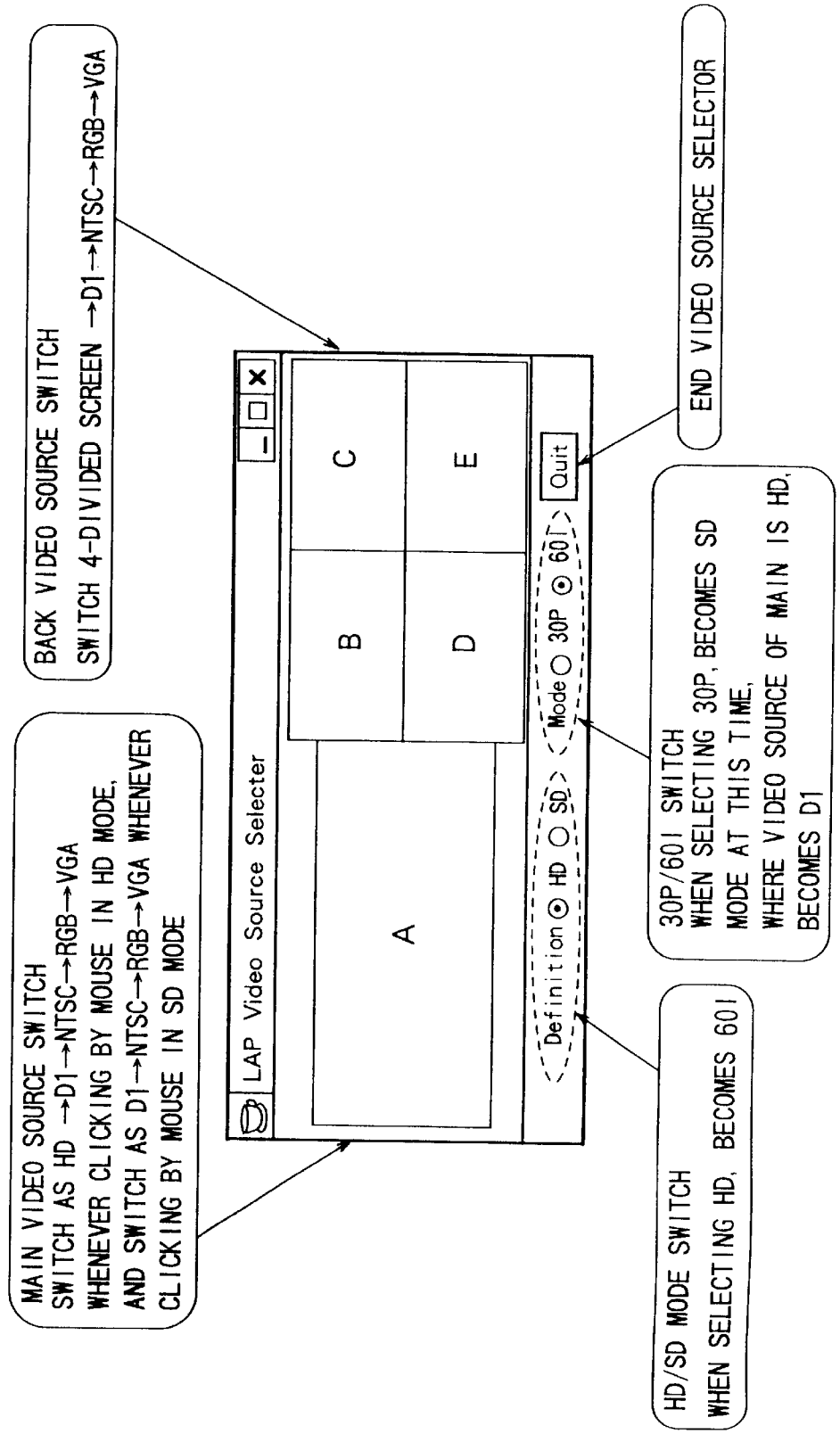
FIG. 89 is a view of a GUI image for an input/output image selection of the image data processing system (FIG. 74) shown as the 15th embodiment.

FIG. 89 is a view of the GUI image for the input/output image selection of the image data processing system 12 shown as the 15th embodiment.

The personal computer 72 displays the input/output selection use GUI for displaying the image input from the hard disk device 140 to the VGA apparatus 154 of the input unit 14 in a plurality of windows as shown in FIG. 89.

When the user clicks and selects the window in which the desired image is displayed in the input/output selection use GUI image by the mouse 700, the personal computer 72 controls the input image selector 84 to make the selector select the image data corresponding to the clicked image among a plurality of the image data input from the input unit 14 and output the same to the frame memory 82$_1$.

Note, where the image data processing system 12 is set so as to display the image data VOUT on the HD monitor 160, when the user clicks the "Main Video Source" button in the GUI image for input/output selection, the personal computer 72 controls the input image selector 84 for every click to switch the hard disk drive 140, VTR apparatus 142, NTSC image signal source 146 (A/D conversion circuit 148), and RGB image signal source 150 (A/D conversion circuit 152) in this order and select the supply side of the image data VIN.

Further, where the image data processing system 12 is set so as to display the image data VOUT on the D1 monitor 162, when the user clicks the "Main Video Source" button in the GUI image for input/output selection, the personal computer 72 controls the input image selector 84 for every click to switch the VTR apparatus 142, NTSC image signal source 146 (A/D conversion circuit 148), RGB image signal source 150 (A/D conversion circuit 152), and VGA apparatus 154 in this order and select the supply side of the image data VIN.

Further, when the user clicks the "Back Video Source" button in the GUI image for input/output selection, the personal computer 72 controls the input image selector 84 for every click to switch the VTR apparatus 142, NTSC image signal source 146 (A/D conversion circuit 148), RGB image signal source 150 (A/D conversion circuit 152), and VGA apparatus 154 in this order to select the supply side of the image data VIN and, display the image data input from these four supply sides by dividing the screen of the display device 720 into four after the display of the image data input from the VGA apparatus 154.

Selection of Output Monitor

When the user selects an item "HD" among the items of the radio buttons of "Definition" in the GUI image for input/output selection, the personal computer 72 controls the output monitor selector 86 to make this display the image data VOUT on the HD monitor 160.

Further, when the user selects an item "SD", the personal computer 72 controls the output monitor selector 86 to make this display the image data VOUT on the D1 monitor 162.

Selection of Output Mode

When the user selects an item "30P" in the radio buttons of "Mode" in the GUI image for input/output selection, the personal computer 72 generates and outputs the image data VOUT in the format of 30 frame progressive per second.

Further, when the user selects an item "60I" in the radio buttons of "Mode" in the GUI image for input/output selection, the personal computer 72 generates and outputs the image data VOUT in the format of 60 field interlace per second.

Setting of Position in Main Image at Output

Figure 90:
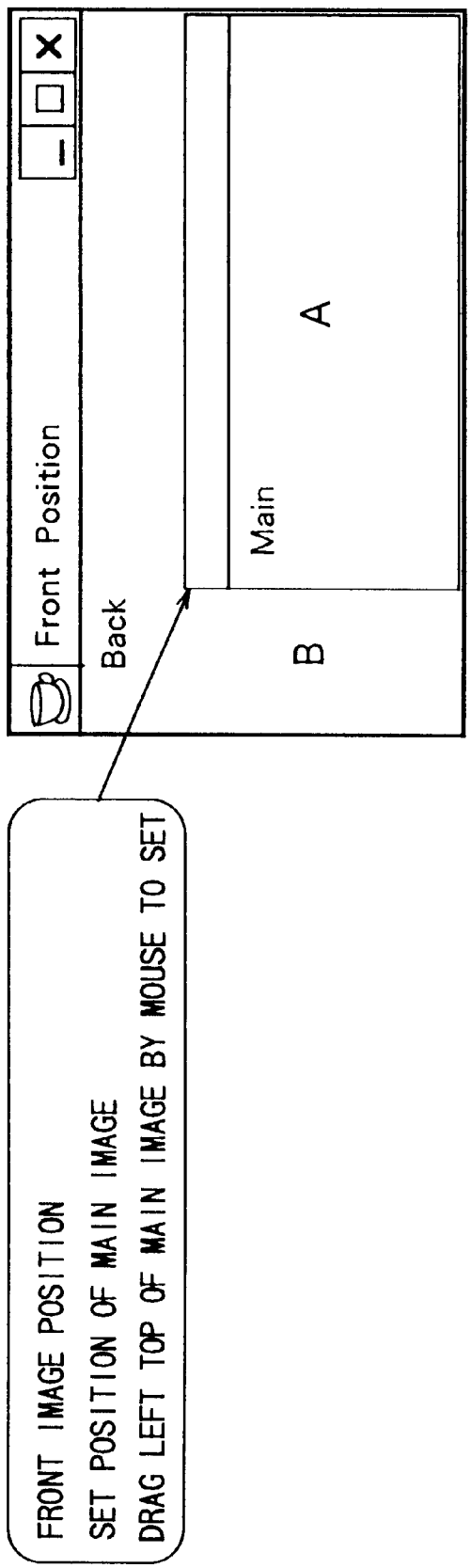
FIG. 90 is a view of a GUI image for a setting a position of a main image.

FIG. 90 is a view of the GUI image for setting the position of the main image.

The personal computer 72 displays the GUI image for setting the GUI image position shown in FIG. 90 on the display device 720. When the user clicks any position in the GUI image for setting the GUI image position, the personal computer 72 sets the clicked position at the position at the top left of the main image in the screen.

Effects

According to the present invention, for example, by using a DSP, nonlinear processing such as color correction can be carried out with respect to the image data.

Further, according to the present invention, the content of the nonlinear processing such as color correction can be freely set by using a GUI for every component (Y, Cr, Cb, R, G, B, etc.) of the color signal. Further, the results of addition of the color correction etc. can be immediately confirmed on the GUI screen.

Further, according to the present invention, contour enhancement can be carried out by software by using for example an SIMD-controlled linear array type multiple parallel processor.

Further, according to the present invention, contour enhancement can be carried out by just setting the filtering characteristic when detecting the contour of the image of the object in the image data, the characteristic of nonlinear conversion for adjusting the degree of contour enhancement, and so on by for example a GUI. Further, the results of addition of processings can be immediately confirmed.

Further, according to the present invention, the granular noise produced in the image data after the contour enhancement can be reduced.

Further, according to the present invention, the filtering can be carried out by software by using for example an SIMD-controlled linear array multiple parallel processor. Further, the entire process from the determination of the filtering characteristic to the verification of the characteristic can be centrally carried out.

Further, according to the present invention, the development period of a filtering apparatus can be shortened.

Further, according to the present invention, it is possible to simulate an apparatus for performing the filtering by software and verify the characteristic thereof. In addition, it is possible to filter the image data of a moving picture in real time and view the result thereof.

Further, the present invention is optimum for evaluation of the filtering with respect to the image data of a moving picture.

Further, according to the present invention, the user can simply perform operations from the determination to evaluation of the method of the filtering by using for example a GUI.

What is claimed is:

1. An image processing apparatus comprising:
   an input use image displaying means for displaying an input use image showing an input/output characteristic between an input image data and an output image data;
   a designation data receiving means for receiving designation data input in accordance with said displayed input use image and designating said input/output characteristic;
   an input/output characteristic extracting means for extracting said input/output characteristic from said received designation data;
   an input/output characteristic image displaying means for displaying the input/output characteristic image showing said extracted input/output characteristic; and
   an image data processing means for processing said input image data to generate said output image data so that said input image data and said output image data have a relationship indicated by said extracted input/output characteristic.

2. An image processing apparatus as set forth in claim 1, wherein:
   said input image displaying means displays a graph of an initial value of said input/output characteristic;
   said designation data receiving means receives at least:
     a first designation data for designating addition of a passing point of a curve of said displayed graph and the position of the passing point to be added on the graph,
     a second designation data for designating a change of the position of said added passing point and the position of the passing point to be changed after the change, and
     a third designation data for designating deletion of said added passing point; and
   said input image displaying means changes the graph of said input/output characteristic based on said received first designation data to third designation data.

3. An image processing apparatus as set forth in claim 1, wherein:
   further provision is made of an input/output characteristic data generating means for generating input/output characteristic data for establishing correspondence between said input image data and said output image data according to said extracted input/output characteristic; and
   said image data processing means converts the value of said input image data to the value of said output image data by a memory mapping method based on said generated input/output characteristic data.

4. An image processing apparatus as set forth in claim 1, wherein:
   said image data processing means processes said input image data based on a set program to generate said output image data and
   comprises a program generating means enabling said image data processing means to prepare a program for generating said output image data from said input image data based on said extracted input/output characteristic.

5. An image processing apparatus as set forth in claim 4, wherein said image data processing means comprises a SIMD-controlled linear array type multiple parallel processor.

6. An image processing method comprising the steps of:
   displaying an input use image showing an input/output characteristic between input image data and output image data;
   receiving designation data input in accordance with said displayed input use image and designating said input/output characteristic;
   extracting said input/output characteristic from said received designation data;
   displaying an input/output characteristic image showing said extracted input/output characteristic; and
   processing said input image data to generate said output image data so that said input image data and said output image data have a relationship indicated by said extracted input/output characteristic.

7. An image processing method as set forth in claim 6, further comprising the steps of:
   displaying a graph of the initial value of said input/output characteristic;
   receiving at least
     a first designation data for designating an addition of a passing point of a curve of said displayed graph and the position of the passing point to be added on the graph,
     a second designation data for designating a change of the position of said added passing point and the position of the passing point to be changed after the change, and
     a third designation data for designating deletion of said added passing point and
   changes the graph of said input/output characteristic based on said received first designation data to third designation data.

8. An image processing method as set forth in claim 6, further comprising the steps of:
   generating input/output characteristic data for establishing correspondence between said input image data and said output image data according to said extracted input/output characteristic and
   converting the value of said input image data to the value of said output image data by a memory mapping method based on said generated input/output characteristic data.

9. An image processing method as set forth in claim 6, further comprising the steps of:
   processing said input image data based on a set program to generate said output image data, preparing a program for generating said output image data from said input image data based on said extracted input/output characteristic, and executing that generated program to process said input image data to generate said output image data.

10. An image processing apparatus comprising:

a characteristic image displaying means for displaying a characteristic image showing a characteristic of contour enhancement with respect to image data input from an external portion;

a characteristic receiving means for receiving said characteristic of contour enhancement in accordance with an operation with respect to said displayed characteristic image;

a characteristic image changing means for changing the characteristic image showing said characteristic of contour enhancement in accordance with said received characteristic of contour enhancement; and a contour enhancement means for performing said contour enhancement with respect to said input image data based on said received characteristic of contour enhancement, wherein:

said characteristic image displaying means displays characteristic images showing each of a characteristic of a first nonlinear conversion with respect to said image data input from the external portion, a characteristic of a second nonlinear processing, and a characteristic of filtering;

said characteristic receiving means receives each of said characteristic of first nonlinear conversion, said characteristic of second nonlinear processing, and said characteristic of filtering in accordance with an operation with respect to said displayed characteristic image;

said characteristic image changing means changes the characteristic images showing each of said characteristic of first nonlinear conversion, said characteristic of second nonlinear processing, and said characteristic of filtering in accordance with said received characteristic of first nonlinear conversion, said characteristic of second nonlinear processing, and said characteristic of filtering; and said contour enhancement means comprises:

a first nonlinear processing means for applying first nonlinear conversion with respect to said image data based on said received characteristic of first nonlinear conversion, a contour detecting means for performing filtering on said first nonlinear converted image data based on said received characteristic of filtering to detect the contour of the image in said image data and generate contour data showing the detected contour, a second nonlinear processing means for applying second nonlinear processing to said generated contour data based on said received characteristic of second nonlinear conversion, a time delaying means for imparting a time delay corresponding to said first nonlinear processing, the generation of said contour data and said second nonlinear processing to said image data input from the external portion, and an adding means for adding said second nonlinear processed image data and said delayed image data.

11. An image processing method comprising the steps of:

displaying a characteristic image showing a characteristic of contour enhancement with respect to image data input from an external portion;

receiving said characteristic of contour enhancement in accordance with an operation with respect to said displayed characteristic image;

changing the characteristic image showing said characteristic of contour enhancement in accordance with said received characteristic of contour enhancement;

performing said contour enhancement with respect to said input image data based on said received characteristic of contour enhancement;

displaying characteristic images showing each of a characteristic of first nonlinear conversion with respect to said image data input from the external portion, a characteristic of second nonlinear processing, and a characteristic of filtering;

receiving each of said characteristic of first nonlinear conversion, said characteristic of second nonlinear processing, and said characteristic of filtering in accordance with an operation with respect to said displayed characteristic images;

changing each of the characteristic images showing said characteristic of first nonlinear conversion, said characteristic of second nonlinear processing, and said characteristic of filtering in accordance with said received characteristic of first nonlinear conversion, said characteristic of second nonlinear processing, and said characteristic of filtering;

applying first nonlinear conversion with respect to said image data based on said received characteristic of first nonlinear conversion;

performing filtering on said first nonlinear converted image data based on said received characteristic of filtering to detect a contour of the image in said image data and generating contour data showing the detected contour;

applying second nonlinear processing to said generated contour data based on said received characteristic of second nonlinear conversion;

imparting a time delay corresponding to said first nonlinear processing, said generation of contour data, and said second nonlinear processing to said image data input from the external portion; and adding said second nonlinear processed image data and said delayed image data.

* * * * *

UNITED STATES PATENT AND TRADEMARK OFFICE
CERTIFICATE OF CORRECTION

PATENT NO. : 6,493,467 B1
DATED : December 10, 2002
INVENTOR(S) : Hiroshi Okuda et al.

It is certified that error appears in the above-identified patent and that said Letters Patent is hereby corrected as shown below:

<u>Title page,</u>
Item [30], Foreign Application Priority Data, change
"Dec. 12, 1959 (JP) ………………………………..8-345359" to
-- Dec. 25, 1996 (JP) ……………………………..8-345359 --

Signed and Sealed this

Eighteenth Day of March, 2003

JAMES E. ROGAN
*Director of the United States Patent and Trademark Office*